(12) United States Patent
Kawai et al.

(10) Patent No.: US 10,890,213 B2
(45) Date of Patent: Jan. 12, 2021

(54) TAPERED ROLLER BEARING

(71) Applicant: NTN Corporation, Osaka (JP)

(72) Inventors: Takashi Kawai, Iwata (JP); Tomoki Matsushita, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/498,347

(22) PCT Filed: Mar. 27, 2018

(86) PCT No.: PCT/JP2018/012443
§ 371 (c)(1),
(2) Date: Sep. 26, 2019

(87) PCT Pub. No.: WO2018/181317
PCT Pub. Date: Oct. 4, 2018

(65) Prior Publication Data
US 2020/0032842 A1 Jan. 30, 2020

(30) Foreign Application Priority Data

Mar. 28, 2017 (JP) ................. 2017-063362
Mar. 28, 2017 (JP) ................. 2017-063374
Mar. 28, 2017 (JP) ................. 2017-063965

(51) Int. Cl.
F16C 33/36 (2006.01)
F16C 19/36 (2006.01)
F16C 33/58 (2006.01)

(52) U.S. Cl.
CPC .......... *F16C 19/364* (2013.01); *F16C 33/366* (2013.01); *F16C 33/585* (2013.01)

(58) Field of Classification Search
CPC .... F16C 19/364; F16C 19/383; F16C 19/385; F16C 19/386; F16C 19/388; F16C 33/36;
(Continued)

(56) References Cited

U.S. PATENT DOCUMENTS 2,631,904 A * 3/1953 Meyer ................... F16C 19/364
384/450
6,086,261 A * 7/2000 Nakagawa .......... F16C 33/6688
384/571
(Continued)

FOREIGN PATENT DOCUMENTS

EP 2423523 A1 2/2012
JP H4-331813 A 11/1992
(Continued)

OTHER PUBLICATIONS

International Search Report issued in corresponding International Patent Application No. PCT/JP2018/012443, dated Jul. 3, 2018, with English translation.
(Continued)

*Primary Examiner* — Phillip A Johnson
(74) *Attorney, Agent, or Firm* — McDermott Will & Emery LLP

(57) ABSTRACT

A value of $R/R_{BASE}$ is not smaller than 0.75 and not greater than 0.87 where R represents a reference radius of curvature of a larger end face of a roller and $R_{BASE}$ represents a distance from an apex of a cone angle of the roller to a larger flange surface of an inner ring 13. A distance from an outermost surface of at least any one of an outer ring, the inner ring, and a plurality of rollers to a bottom of a nitrogen enriched layer is not shorter than 0.2 mm. A crowning profile is formed on a rolling surface of the roller.

17 Claims, 59 Drawing Sheets

(58) Field of Classification Search
CPC .............. F16C 33/4623; F16C 33/4629; F16C 33/4635; F16C 33/4676; F16C 33/585; F16C 33/6681
See application file for complete search history.

(56) References Cited

U.S. PATENT DOCUMENTS

| | | | |
|---|---|---|---|
| 6,328,477 B1 | 12/2001 | Tsujimoto et al. | |
| 6,709,164 B2 * | 3/2004 | Takemura | F16C 19/364 384/450 |
| 8,308,383 B2 * | 11/2012 | Bouix | A45D 40/262 401/1 |
| 2003/0123769 A1 | 7/2003 | Ohki | |
| 2007/0014501 A1 | 1/2007 | Ueno et al. | |
| 2007/0098317 A1 | 5/2007 | Matsuyama et al. | |
| 2010/0002975 A1 | 1/2010 | Ueno | |
| 2012/0033909 A1 | 2/2012 | Fujiwara | |
| 2013/0255418 A1 | 10/2013 | Kobayashi et al. | |
| 2015/0259764 A1 * | 9/2015 | Hidaka | C22C 38/00 384/492 |

FOREIGN PATENT DOCUMENTS

| | | | |
|---|---|---|---|
| JP | 2000-170774 A | 6/2000 | |
| JP | 2000-170775 A | 6/2000 | |
| JP | 2002-139055 A | 5/2002 | |
| JP | 2003-226918 A | 8/2003 | |
| JP | 2006-200627 A | 8/2006 | |
| JP | 2007-24168 A | 2/2007 | |
| JP | 2007-051702 A | 3/2007 | |
| JP | 2007-113656 A | 5/2007 | |
| JP | 2008-38927 A | 2/2008 | |
| JP | 2009-197904 A | 9/2009 | |
| JP | 2010-255730 A | 11/2010 | |
| JP | 2012-241805 A | 12/2012 | |
| JP | 2013068281 A * | 4/2013 | .............. F16C 33/56 |
| WO | 2010/122955 A1 | 10/2010 | |
| WO | 2012/063499 A1 | 5/2012 | |

OTHER PUBLICATIONS

Japanese Office Action issued in corresponding Japanese Patent Application No. 2017-063965, dated Jul. 7, 2020, with English translation.
Japanese Office Action issued in corresponding Japanese Patent Application No. 2017-063362, dated Jul. 7, 2020, with English translation.
Japanese Office Action issued in corresponding Japanese Patent Application No. 2017-063374, dated Jul. 7, 2020, with English translation.
Extended European Search Report issued in corresponding European Patent Application No. 18776681.1, dated Nov. 24, 2020.

* cited by examiner a: C × x+D (ANY VALUE WITHIN 0 ≤ x ≤ 1)
l: B+C+D
zm: F a: C × x+D (ANY VALUE WITHIN 0 ≤ x ≤ 1)
l: B+C+D
zm: F

TAPERED ROLLER BEARING

CROSS-REFERENCE TO RELATED APPLICATIONS

This application is the U.S. National Phase under 35 U.S.C. § 371 of International Application No. PCT/JP2018/012443, filed on Mar. 27, 2018, which claims the benefit of Japanese Application No. 2017-063362, filed Mar. 28, 2017, Japanese Application No. 2017-063374 filed Mar. 28, 2017 and Japanese Application No. 2017-063965, filed Mar. 28, 2017, the entire contents of each are hereby incorporated by reference.

TECHNICAL FIELD

The present invention relates to a tapered roller bearing.

BACKGROUND ART

With efforts for enhancing fuel economy in recent years, bearings have increasingly been reduced in size in a transmission and a differential gear for automobiles. Accordingly, a space permitted for a bearing is made smaller and a small bearing should bear a high load. Furthermore, as a housing made of aluminum is adopted, rigidity of a case included in a bearing has lowered and inclination of a shaft has become greater. Therefore, the bearing is required to have durability even in an environment where misalignment is noticeable. With the backgrounds above, tapered roller bearings capable of bearing a high load including misalignment in spite of their small sizes have increasingly been used.

As an approach to such enhancement in fuel economy, it has been proposed to obtain a contour line of a crowning profile expressed by a logarithmic function in a bearing component disclosed, for example, in Japanese Patent Laying-Open No. 2009-197904 (PTL 1). Furthermore, for example, Japanese Patent Laying-Open No. 2003-226918 (PTL 2) discloses a bearing component including a nitride layer made finer by special heat treatment called fine austenite strengthening (FA treatment) for achieving a longer lifetime.

CITATION LIST

Patent Literature

PTL 1: Japanese Patent Laying-Open No. 2009-197904
PTL 2: Japanese Patent Laying-Open No. 2003-226918

SUMMARY OF INVENTION

Technical Problem

Since a construction including both of the contour line of the crowning profile expressed by the logarithmic function and the nitride layer made finer by FA treatment has not yet been proposed, contribution to enhanced fuel economy of automobiles has not been sufficient.

In a tapered roller bearing, a larger end face of a tapered roller comes in sliding contact with a larger flange surface of an inner ring. Therefore, when the tapered roller bearing is used for an instruction to a gear shaft of a differential gear or the like which rotates at a high speed under a high load, friction torque due to sliding friction is greater. Furthermore, a temperature of a bearing portion increases due to heat generation by friction, viscosity of gear oil as lubricating oil lowers, and a problem due to an insufficient oil film may arise. Fuel economy should further be enhanced by reducing torque loss and heat generation due to sliding friction between a larger flange surface of the inner ring and a larger end face of the tapered roller.

An object of the present invention is to provide a tapered roller bearing less in torque loss and heat generation caused by friction and shorter in running-in period.

Solution to Problem

A tapered roller bearing according to the present invention includes an outer ring, an inner ring, and a plurality of tapered rollers. The outer ring includes an outer-ring raceway surface around an inner circumferential surface thereof. The inner ring includes an inner-ring raceway surface around an outer circumferential surface thereof and a larger flange surface arranged on a larger diameter side relative to the inner-ring raceway surface, and is arranged on a radially inner side relative to the outer ring. The plurality of tapered rollers are disposed between the outer-ring raceway surface and the inner-ring raceway surface and the tapered roller includes a rolling surface in contact with the outer-ring raceway surface and the inner-ring raceway surface and a larger end face in contact with the larger flange surface. A value of $R/R_{BASE}$ is not smaller than 0.75 and not greater than 0.87, with R representing a reference radius of curvature of the larger end face of the tapered roller and $R_{BASE}$ representing a distance from an apex of a cone angle of the tapered roller to the larger flange surface of the inner ring. At least any one of the outer ring, the inner ring, and the plurality of tapered rollers includes a nitrogen enriched layer formed on a surface layer of the outer-ring raceway surface, the inner-ring raceway surface, or the rolling surface. A distance from an outermost surface of the surface layer to a bottom of the nitrogen enriched layer is not shorter than 0.2 mm. The rolling surface of the tapered roller is provided with a crowning profile. A sum of drops of the crowning profiles is expressed in a y-z coordinate system with a generatrix of the rolling surface of the tapered roller being defined as a y axis and a direction orthogonal to the generatrix being defined as a z axis, in an expression (1)

$$z(y) = A\ln\frac{1}{1 - \left\{1 - \exp\left(-\frac{z_m}{A}\right)\right\}\left(\frac{y-a}{K_2 a} + 1\right)^2} \quad (1)$$

where $K_1$, $K_2$, and $z_m$ represent design parameters, Q represents a load, L represents a length in a direction of the generatrix, of an effective contact portion of the rolling surface in the tapered roller, E' represents an equivalent elastic modulus, a represents a length from an origin on the generatrix of the rolling surface of the tapered roller to an end of the effective contact portion, and A is defined as $A = 2K_1 Q/\pi L E'$.

Advantageous Effects of Invention

According to the present invention, a tapered roller bearing less in torque loss and heat generation caused by friction and shorter in running-in period can be provided.

DESCRIPTION OF EMBODIMENTS

An embodiment of the present invention will be described below with reference to the drawings.

A tapered roller bearing in a first embodiment will be described stepwise below by mainly focusing on FIG. 1 and FIG. 9 which will be described later. Features of the tapered roller bearing in the first embodiment except for features that appear for the first time in FIG. 9 which will be described later will initially be described with reference to FIGS. 1 to 4.

Figure 1:
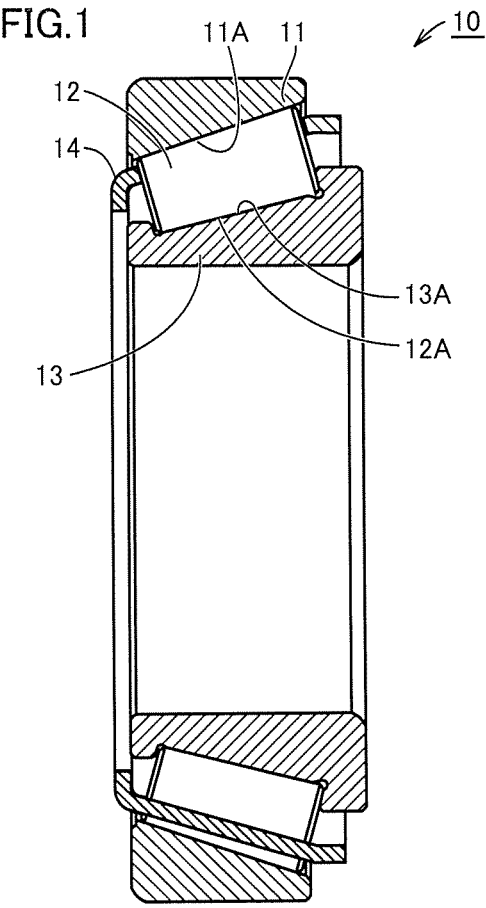
FIG. 1 is a schematic cross-sectional view roughly showing a construction of a tapered roller bearing according to a first embodiment.

A tapered roller bearing 10 shown in FIG. 1 mainly includes an outer ring 11, an inner ring 13, rollers 12 as a plurality of tapered rollers, and a cage 14. Outer ring 11 has an annular shape, and includes a raceway surface 11A as an outer-ring raceway surface 11A around its inner circumferential surface. Inner ring 13 has an annular shape, and includes a raceway surface 13A as an inner-ring raceway surface around its outer circumferential surface. Inner ring 13 is arranged on an inner diameter side of outer ring 11 such that raceway surface 13A faces raceway surface 11A. In the description below, a direction along the central axis of tapered roller bearing 10 is referred to as an "axial direction," a direction orthogonal to the central axis is referred to as a "radial direction," and a direction along a circular arc around the central axis is referred to as a "circumferential direction."

Rollers 12 are arranged on the inner circumferential surface of outer ring 11. Roller 12 has a rolling surface 12A as a roller rolling surface and comes in contact with raceway surface 13A and raceway surface 11A at rolling surface 12A. The plurality of rollers 12 are arranged at prescribed pitches in the circumferential direction in cage 14 made of a synthetic resin. Thus, roller 12 is held on the annular raceway of outer ring 11 and inner ring 13 in a rollable manner. Tapered roller bearing 10 is constructed such that the apex of a cone including raceway surface 11A, the apex of a cone including raceway surface 13A, and the apex of a cone including the locus of the rotation axis of roller 12 when the roller rolls meet at one point on the centerline of the bearing. According to such a construction, outer ring 11 and inner ring 13 of tapered roller bearing 10 are rotatable relative to each other. Cage 14 is not limited to a cage made of a resin and may be of a metal.

Outer ring 11, inner ring 13, and roller 12 may be formed of steel. Steel at least contains at least 0.6 mass % and at most 1.2 mass % of carbon, at least 0.15 mass % and at most 1.1 mass % of silicon, and at least 0.3 mass % and at most 1.5 mass % of manganese in a portion other than nitrogen enriched layers 11B, 12B, and 13B. Steel may further contain at most 2.0 mass % of chromium.

In the above construction, when a carbon content exceeds 1.2 mass %, cold workability is impaired by a high hardness of a material in spite of spheroidizing annealing, and a sufficient amount of cold working and sufficient working accuracy cannot be obtained in cold working. In addition, an over-carburized structure tends to be formed during carbonitriding treatment and cracking strength may be lowered. When the carbon content is lower than 0.6 mass %, it takes a long time to ensure a required surface hardness and a required amount of retained austenite, and it is difficult to obtain a required internal hardness in quenching after reheating.

The Si content of 0.15 to 1.1 mass % is set because Si can increase resistance against softening by tempering to ensure heat resistance and thus improve rolling fatigue life characteristics under lubrication with foreign matters being introduced. When the Si content is less than 0.15 mass %, the rolling fatigue life characteristics under lubrication with foreign matters being introduced are not improved. When the Si content exceeds 1.1 mass %, hardness after normalizing becomes too high to impair cold workability.

Mn is effective for ensuring hardenability of a carbonitrided layer and a core portion. When the Mn content is less than 0.3 mass %, sufficient hardenability cannot be obtained and sufficient strength cannot be ensured in the core portion. When the Mn content exceeds 1.5 mass %, hardenability becomes excessive and a hardness after normalizing becomes high and cold workability is impaired. Furthermore, austenite is excessively stabilized, which leads to an excessive amount of retained austenite in the core portion and acceleration of dimensional change over time. When steel contains at most 2.0 mass % of chromium, a carbide or a nitride of chromium is precipitated at a surface layer portion and a hardness of the surface layer portion can easily be enhanced. The Cr content of at most 2.0 mass % is set because the Cr content exceeding 2.0 mass % leads to significant lowering in cold workability and the content exceeding 2.0 mass % is less in effect of enhancement to a hardness of the surface layer portion.

Naturally, steel in the present disclosure may contain Fe as a main component and may contain an inevitable impurity in addition to the elements above. Examples of the inevitable impurity include phosphorus (P), sulfur (S), nitrogen (N), oxygen (O), aluminum (Al), and the like. An amount of these inevitable impurity elements is 0.1 mass % or less.

From a different point of view, outer ring 11 and inner ring 13 are preferably made of a steel material representing an exemplary bearing material such as JIS SUJ2. Roller 12 may be made of a steel material representing an exemplary bearing material such as JIS SUJ2. Alternatively, roller 12 may be made of another material such as a sialon sintered material.

Figure 2:
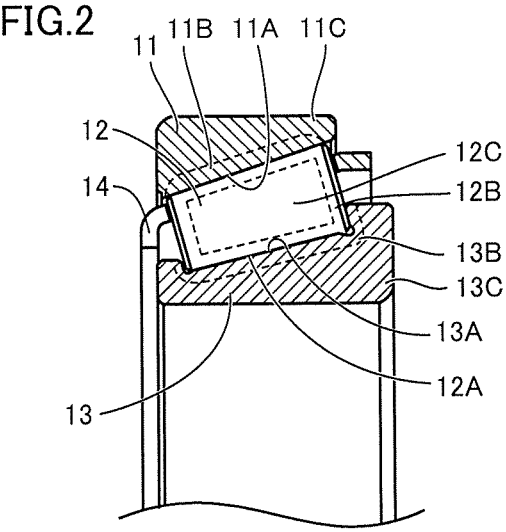
FIG. 2 is an enlarged cross-sectional view of a main portion of the tapered roller bearing shown in FIG. 1.

As shown in FIG. 2, nitrogen enriched layers 11B and 13B are formed on raceway surface 11A of outer ring 11 and raceway surface 13A of inner ring 13, respectively. In inner ring 13, nitrogen enriched layer 13B extends from raceway surface 13A to a smaller flange surface and a larger flange surface which will be described later. Nitrogen enriched layers 11B and 13B are regions higher in nitrogen concentration than an unnitrided portion 11C of outer ring 11 or an unnitrided portion 13C of inner ring 13. Nitrogen enriched layer 12B is formed in a surface of roller 12 including rolling surface 12A. Nitrogen enriched layer 12B of roller 12 is a region higher in nitrogen concentration than an unnitrided portion 12C of roller 12. Nitrogen enriched layers 11B, 12B, and 13B can be formed by any conventionally well-known method such as carbonitriding and nitriding.

Nitrogen enriched layer 12B may be formed only in roller 12, nitrogen enriched layer 11B may be formed only in outer ring 11, or nitrogen enriched layer 13B may be formed only in inner ring 13. Alternatively, a nitrogen enriched layer may be formed in two of outer ring 11, inner ring 13, and roller 12.

Figure 3:
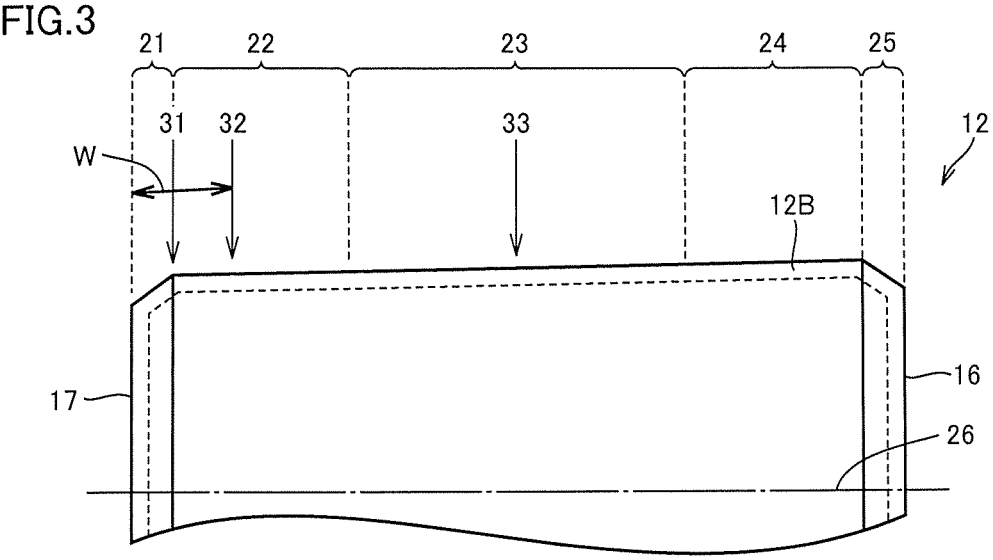
FIG. 3 is a partial cross-sectional schematic diagram of the tapered roller of the tapered roller bearing shown in FIG. 1.

As shown in FIG. 3, rolling surface 12A (see FIG. 2) of roller 12 includes crowned portions 22 and 24 located at opposing ends and a central portion 23 connecting crowned portions 22 and 24 to each other. Central portion 23 is uncrowned and linear in a cross section in a direction along a centerline 26 representing the rotation axis of roller 12. A chamfered portion 21 is formed between a smaller end face 17 which is a left end face of roller 12 and crowned portion 22. A chamfered portion 25 is also formed between a larger end face 16 which is a right end face and crowned portion 24.

Figure 4:
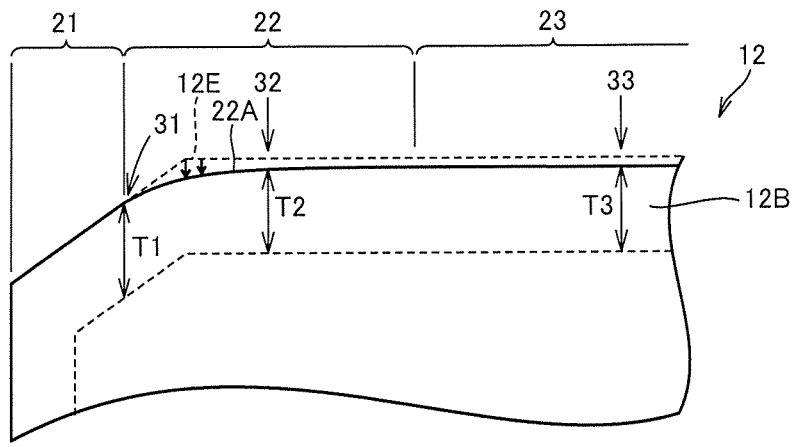
FIG. 4 is an enlarged partial cross-sectional schematic diagram of the tapered roller shown in FIG. 3.

In a method of manufacturing roller 12, in treatment for forming nitrogen enriched layer 12B (carbonitriding treatment), roller 12 is not crowned but an outer geometry of roller 12 is a yet-to-be-worked surface 12E shown with a dotted line in FIG. 4. After the nitrogen-enriched layer is formed in this state, roller 12 has a side surface worked as shown with an arrow in FIG. 4 as finishing so that crowned portions 22 and 24 are obtained as shown in FIGS. 3 and 4.

A depth of nitrogen-enriched layer 12B in roller 12, that is, a distance from the outermost surface of nitrogen-enriched layer 12B to the bottom of nitrogen-enriched layer 12B, is 0.2 mm or more. Specifically, at a first measurement point 31 representing a boundary point between chamfered portion 21 and crowned portion 22, a second measurement point 32 at a distance W of 1.5 mm from small end face 17, and a third measurement point 33 at the center of rolling surface 12A of roller 12, depths T1, T2, and T3 of nitrogen enriched layer 12B at these positions are 0.2 mm or more. The depth of nitrogen enriched layer 12B means a thickness of nitrogen enriched layer 12B in a radial direction orthogonal to centerline 26 of roller 12 and toward the outer circumference. Values of depths T1, T2, and T3 of nitrogen enriched layer 12B can be modified as appropriate, depending on a shape and a size of chamfered portions 21 and 25 and a process condition such as a condition for treatment to form nitrogen enriched layer 12B and a condition for finishing. For example, in the exemplary construction shown in FIG. 4, depth T2 of nitrogen enriched layer 12B is smaller than other depths T1 and T3 due to formation of a crowning profile 22A after formation of nitrogen enriched layer 12B as described above. By changing the process condition described above, however, relation in magnitude among the values of depths T1, T2, and T3 of nitrogen enriched layer 12B can be modified as appropriate.

A thickness of nitrogen enriched layers 11B and 13B in outer ring 11 and inner ring 13 representing a distance from the outermost surface to the bottom thereof is again not smaller than 0.2 mm. The thickness of nitrogen enriched layers 11B and 13B means a distance to nitrogen enriched layers 11B and 13B in a direction perpendicular to the outermost surface of nitrogen enriched layers 11B and 13B.

A crowning profile formed in crowned portions 22 and 24 of roller 12 is defined as below. More specifically, a sum of crown drops is expressed in a y-z coordinate system with a generatrix of rolling surface 12A of roller 12 being defined as the y axis and a direction orthogonal to the generatrix being defined as the z axis by the expression (1) above where $K_1$, $K_2$, and $z_m$ represent design parameters, Q represents a load, L represents a length of an effective contact portion of rolling surface 12A of roller 12 along the generatrix, E' represents an equivalent elastic modulus, a represents a length from an origin on the generatrix of the rolling surface of roller 12 to an end of the effective contact portion, and A is defined as $A=2K_1Q/\pi LE'$.

Figure 5:
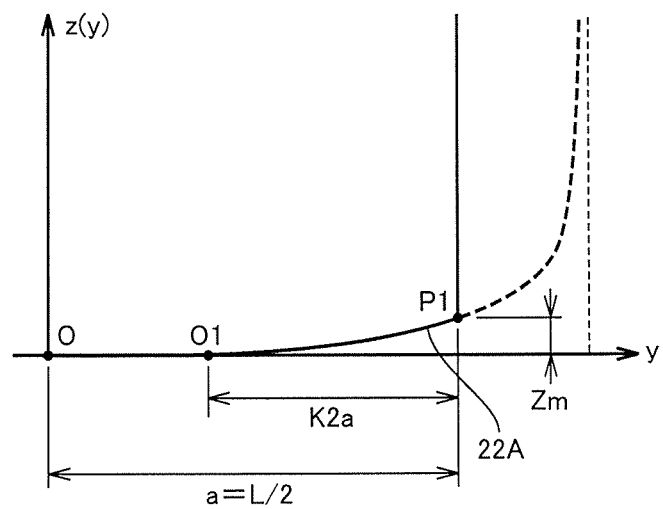
FIG. 5 is a y-z coordinate diagram representing an exemplary crowning profile.

FIG. 5 shows an exemplary crowning profile expressed in the expression (1) in the y-z coordinate system with the generatrix of roller 12 being defined as the y axis, origin O being taken on the generatrix of roller 12 at the central portion of the effective contact portion between inner ring 13 or outer ring 11 and roller 12, and a direction orthogonal to the generatrix (a direction of radius) being defined as the z axis. In FIG. 5, the ordinate represents the z axis and the abscissa represents the y axis. The effective contact portion refers to a portion of contact between inner ring 13 or outer ring 11 and roller 12 when roller 12 is uncrowned. Since the plurality of rollers 12 constituting tapered roller bearing 10 are crowned normally in line symmetry with respect to the z axis passing through the central portion of the effective contact portion, FIG. 5 only shows one crowning profile 22A.

Load Q, length L of the effective contact portion along the generatrix, and equivalent elastic modulus E' are given as design conditions, and length a from the origin to the end of the effective contact portion has a value determined by a position of the origin.

In the above expression (1), z(y) represents drop of crowning profile 22A at a position y in the direction of the generatrix of roller 12, and a coordinate of a starting point O1 of crowning profile 22A is expressed as $(a-K_2a, 0)$. Therefore, in the expression (1), y has a range of $y>(a-K_2a)$. In FIG. 5, since origin O is defined at the central portion of the effective contact portion, relation of $a=L/2$ is satisfied. A region from origin O to starting point O1 of crowning profile 22A is the uncrowned central portion (a straight portion). Therefore, when relation of $0\leq y\leq(a-K_2a)$ is satisfied, relation of $z(y)=0$ is satisfied.

Design parameter $K_1$ means a multiplying factor for load Q and geometrically means a degree of curvature of crowning profile 22A. Design parameter $K_2$ means a ratio of a length ym of crowning profile 22A along the generatrix to length a from origin O to the end of the effective contact portion along the generatrix ($K_2=ym/a$). Design parameter $z_m$ means drop at the end of the effective contact portion, that is, maximum drop of crowning profile 22A.

A crowning profile of the roller shown in FIG. 7 which will be described later is a full crowning profile without a straight portion defined by design parameter $K_2=1$, and ensures sufficient drop which does not cause edge loading. Excessive drop, however, leads to large machining allowance taken from a raw material as a material to be worked, which will invite increase in cost. Accordingly, design parameters $K_1$, $K_2$, and $z_m$ in the expression (1) are optimized as below.

Design parameters $K_1$, $K_2$, and $z_m$ can be optimized by various methods, and for example, a direct search method such as the Rosenbrock method can be adopted. Since surface-originating damage in a rolling surface of a roller depends on a contact pressure, by setting the contact pressure as an objective function for optimization, a crowning profile that prevents oil film breakage at a contact surface under lean lubrication can be obtained.

When the roller is provided with a logarithmic crowning profile, a straight portion (central portion 23) is preferably provided in a central portion of the rolling surface in order to secure working accuracy of the roller. In this case, $K_2$ is set to a constant value and $K_1$ and $z_m$ should only be optimized.

Figure 6:
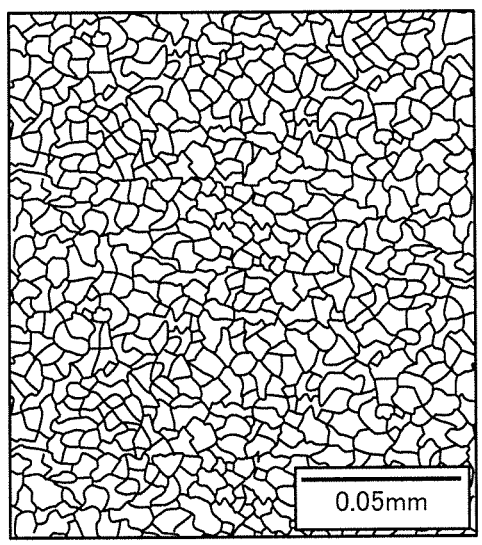
FIG. 6 schematically illustrates a microstructure, in particular a prior austenite crystal grain boundary, of a bearing component.

FIG. 6 shows a microstructure in nitrogen enriched layer 12B. A grain size number defined under the JIS, of a prior austenite crystal grain size in nitrogen enriched layer 12B in the first embodiment is equal to or greater than 10, and the grain size is sufficiently fine even in comparison with a conventional general hardened product.

A method of measuring a nitrogen concentration will be described. Bearing components such as outer ring 11, roller 12, and inner ring 13 are subjected to line analysis in a direction of depth by electron probe micro analysis (EPMA) in cross-sections perpendicular to surfaces of regions where nitrogen enriched layers 11B, 12B, and 13B are formed. Measurement is conducted by cutting each bearing component from a measurement position in a direction perpendicular to the surface to expose a cut surface and subjecting the surface to measurement. For example, roller 12 is cut in a direction perpendicular to centerline 26 from each of first measurement point 31 to third measurement point 33 shown in FIG. 3 to expose a cut surface. The cut surface is analyzed for a nitrogen concentration by EPMA at a plurality of measurement positions each located at a distance of 0.05 mm inward from the surface of roller 12. For example, five measurement positions are determined and an average value of measurement data obtained at the five locations is adopted as a nitrogen concentration of roller 12.

For outer ring 11 and inner ring 13, a central portion of raceway surfaces 11A and 13A in the direction of the central axis of the bearing is set as a measurement position, a cross-section along the central axis and a radial direction orthogonal to the central axis is exposed, and the cross-section is thereafter subjected to nitrogen concentration measurement in a manner the same as above.

Method of Measuring Distance from Outermost Surface to Bottom of Nitrogen Enriched Layer:

Outer ring 11 and inner ring 13 are subjected to hardness distribution measurement in a direction of depth from the surface in the cross-section subjected to measurement in the method of measuring a nitrogen concentration. A Vickers hardness measurement instrument can be employed for measurement. Tapered roller bearing 10 tempered at 500° C.×1 h is subjected to hardness measurement at a plurality of measurement points aligned in the direction of depth such as measurement points arranged at intervals of 0.5 mm. A region having a Vickers hardness of HV 450 or more is determined as a nitrogen enriched layer.

Roller 12 is subjected to hardness distribution measurement in the direction of depth as described above in a cross-section at first measurement point 31 shown in FIG. 3 to determine the region of the nitrogen enriched layer.

A prior austenite crystal grain size is measured by a method defined under JIS G0551: 2013. Measurement is conducted in the cross-section subjected to measurement in the method of measuring a distance to the bottom of the nitrogen enriched layer. A grain size number of a prior austenite crystal can thus be determined.

A crowning profile of roller 12 can be measured by any method. For example, the crowning profile may be measured by measuring a profile of roller 12 with a surface texture measurement instrument.

As set forth above, since nitrogen enriched layer 11B, 12B, or 13B having a sufficiently fine prior austenite crystal grain size has been formed in at least one of outer ring 11, inner ring 13, and roller 12 as the tapered roller, a rolling fatigue life can be long and a Charpy impact value, a fracture toughness value, ultimate strength, and the like can be improved.

Since rolling surface 12A of roller 12 is provided with a crowning profile having a contour line represented by such a logarithmic function (what is called a logarithmic crowning profile) that the expression (1) represents a sum of drops, local increase in contact pressure can be suppressed and wear of rolling surface 12A of roller 12 can be suppressed as compared with an example where a conventional crowning profile represented by a partially circular arc is provided.

An effect of the logarithmic crowning profile described above will now be described in more detail. FIG. 7 represents a contour line of a roller provided with a crowning profile with the contour line being represented by a logarithmic function and a contact surface pressure at a roller rolling surface as being superposed on each other. FIG. 8 represents a contour line of a roller with a portion between a partially arcuate crowning profile and a straight portion being represented by an auxiliary circular arc and a contact surface pressure at a roller rolling surface as being superposed on each other. In FIGS. 7 and 8, the ordinate on the left side represents drop (unit: mm) of the crowning profile. In FIGS. 7 and 8, the abscissa represents a position in the axial direction in the roller (unit: mm). In FIGS. 7 and 8, the ordinate on the right side represents a contact surface pressure (unit: GPa).

In an example where a contour line of the rolling surface of the tapered roller is formed in a shape including a partially arcuate crowning profile and a straight portion, even though a gradient at a boundary between the straight portion, the auxiliary circular arc, and the crowning profile is continuous as shown in FIG. 8, the contact surface pressure locally increases when the curvature is discontinuous. Therefore, an oil film may break or a surface may be damaged. Unless a lubricating film having a sufficient thickness is formed, wear due to metal-to-metal contact easily occurs. When the contact surface is partially worn, metal-to-metal contact is more likely in the vicinity thereof, which accelerates wear of the contact surface and leads to damage to the tapered roller.

Figure 7:
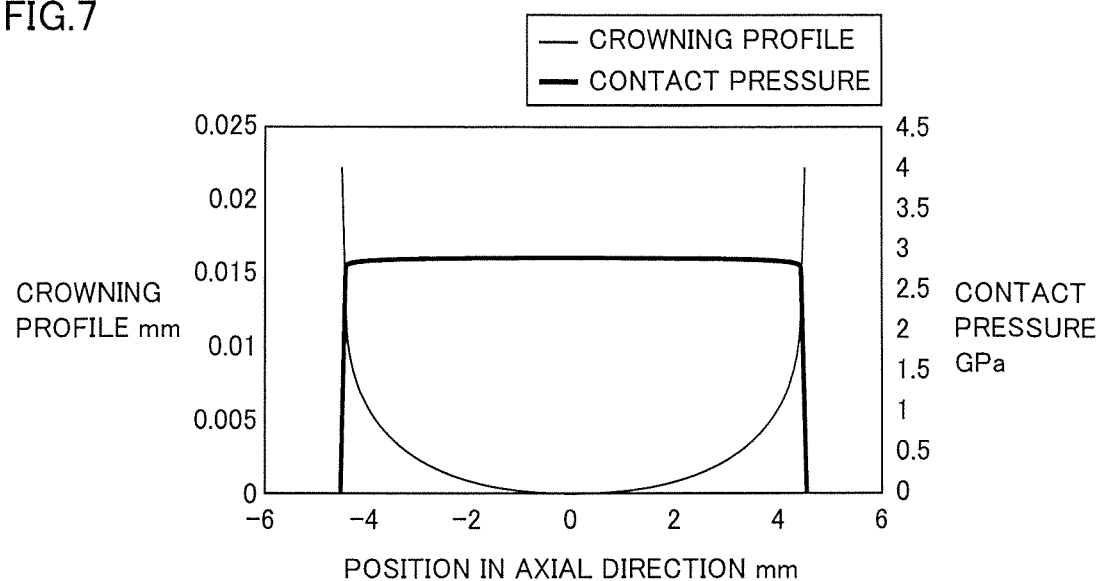
FIG. 7 shows a crowned roller with a contour line being represented by a logarithmic function.
Figure 8:
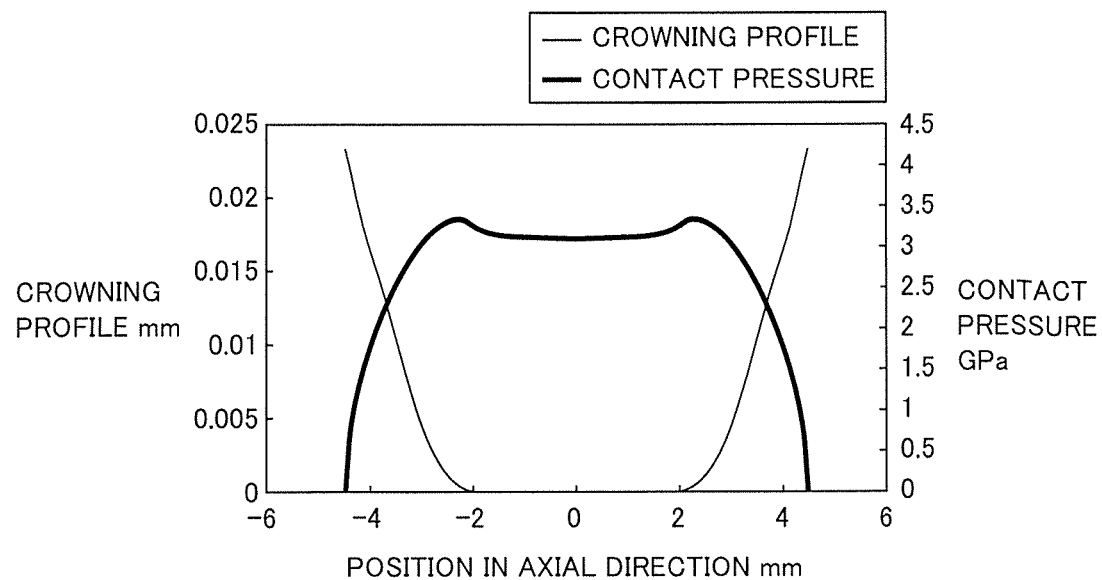
FIG. 8 shows a contour line of a roller provided with a partially arcuate crowning profile and a straight portion and a contact surface pressure at a roller rolling surface as being superimposed on each other.

When the rolling surface of the tapered roller serving as a contact surface is provided with a crowning profile defined by a contour line represented by a logarithmic function as shown, for example, in FIG. 7, a local contact pressure is lower and wear of the contact surface is less likely than in an example where a crowning profile represented by a partial circular arc in FIG. 8 is provided. Therefore, even when lubricant present on the rolling surface of the tapered roller is reduced to a small amount or reduced in viscosity and a lubricating film is reduced in thickness, the contact surface can be prevented from being worn and the tapered roller can be prevented from being damaged. FIGS. 7 and 8 show the contour line of the roller with origin O of the abscissa being set at the central portion of the effective contact portion between the inner ring or the outer ring and the roller in a rectangular coordinate system with the abscissa representing the direction of the generatrix of the roller and the ordinate representing a direction orthogonal to the generatrix and show a contact surface pressure as being superimposed on the former with the contact pressure being represented on the ordinate. Thus, tapered roller bearing 10 exhibiting a long lifetime and high durability can be provided by adopting the construction as described above.

In tapered roller bearing 10, a nitrogen concentration in nitrogen enriched layers 11B, 12B, and 13B at a position of depth of 0.05 mm from the outermost surface is not lower than 0.1 mass %. When measurement is conducted in nitrogen enriched layer 12B of roller 12, the nitrogen concentration at first measurement point 31 in FIG. 3 is 0.2 mass %, the nitrogen concentration at second measurement point 32 is 0.25 mass %, and the nitrogen concentration at third measurement point 33 is 0.3 mass %. In this case, since the nitrogen concentration in the outermost surface of nitrogen enriched layers 11B, 12B, and 13B can have a sufficient value, a hardness of the outermost surface of nitrogen enriched layers 11B, 12B, and 13B can be sufficiently high. Conditions such as the prior austenite crystal grain size in grain size number, the distance to the bottom of the nitrogen enriched layer, and the nitrogen concentration described above are preferably satisfied at least at first measurement point 31 in FIG. 3.

In tapered roller bearing 10, a distance to the bottom of nitrogen enriched layer 12B of roller 12 is measured. Consequently, at first measurement point 31 in FIG. 3, the distance to the bottom of nitrogen enriched layer 12B is 0.3 mm. At second measurement point 32, the distance is 0.35 mm, and at third measurement point 33, the distance is 0.3 mm.

In tapered roller bearing 10, at least one of outer ring 11, inner ring 13, and roller 12 in which nitrogen enriched layers 11B, 12B, and 13B are formed is made of steel. Steel at least contains at least 0.6 mass % and at most 1.2 mass % of carbon (C), at least 0.15 mass % and at most 1.1 mass % of silicon (Si), and at least 0.3 mass % and at most 1.5 mass % of manganese (Mn) in a portion other than nitrogen enriched layers 11B, 12B, and 13B, that is, in unnitrided portions 11C, 12C, and 13C. In tapered roller bearing 10, steel may further contain at most 2.0 mass % of chromium. In this case, nitrogen enriched layers 11B, 12B, and 13B constructed as defined in the present embodiment can easily be formed by heat treatment or the like which will be described later.

In tapered roller bearing 10, at least one of design parameters $K_1$, $K_2$, and $z_m$ in the expression (1) is optimized with a contact surface pressure between roller 12 and outer ring 11 or between roller 12 and inner ring 13 being defined as an objective function.

While design parameters $K_1$, $K_2$, and $z_m$ are optimized and determined with any one of a contact surface pressure, stress, and a lifetime being defined as an objective function, damage originating from a surface depends on a contact surface pressure. According to the embodiment, design parameters $K_1$, $K_2$, and $z_m$ are optimized and set with a contact surface pressure being defined as an objective function, and hence a crowning profile that can prevent the contact surface from being worn even under a condition where lubricant is lean can be obtained.

In tapered roller bearing 10, at least one of outer ring 11 and inner ring 13 includes nitrogen enriched layer 11B or 13B. In this case, in at least one of outer ring 11 and inner ring 13, nitrogen enriched layer 11B or 13B made finer in crystal structure is formed so that outer ring 11 or inner ring 13 long in lifetime and high in durability can be obtained.

In tapered roller bearing 10, roller 12 includes nitrogen enriched layer 12B. In this case, in roller 12, nitrogen enriched layer 12B made finer in crystal structure is formed so that roller 12 long in lifetime and high in durability can be obtained.

Figure 9:
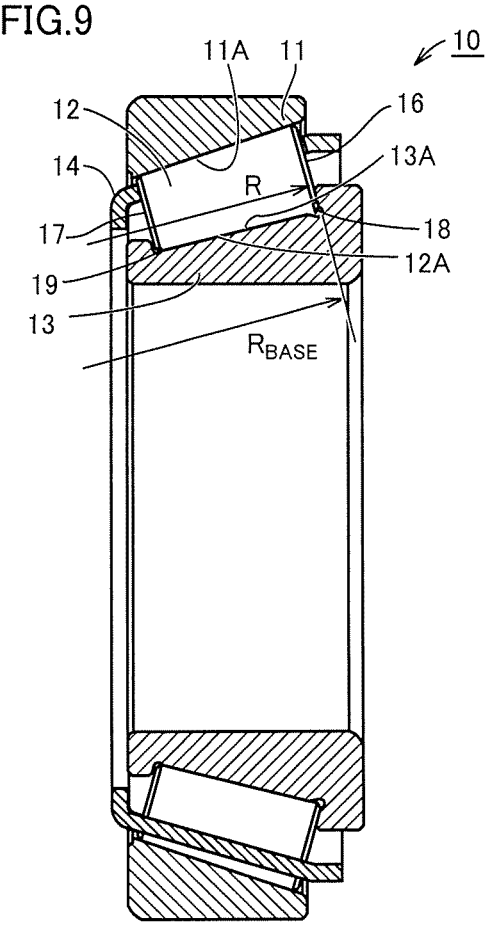
FIG. 9 is a schematic cross-sectional view more detailed than FIG. 1 for defining a larger flange surface and a smaller flange surface of the tapered roller bearing in the first embodiment.

FIG. 9 shows a manner premised on the basic construction in FIG. 1 and including features close to those in the first embodiment. Referring to FIG. 9, tapered roller bearing 10 in the first embodiment is provided with a larger flange surface 18 on a larger diameter side of raceway surface 13A of inner ring 13 and a smaller flange surface 19 on a smaller diameter side thereof. A larger end face 16 in contact with larger flange surface 18 is provided on the larger diameter side of roller 12 and a smaller end face 17 in contact with smaller flange surface 19 is provided on the smaller diameter side of roller 12.

Larger flange surface 18 is formed with an end on the larger diameter side of raceway surface 13A and a grinding undercut being interposed. Larger flange surface 18 guides roller 12 as it comes in contact with larger end face 16 of roller 12 while tapered roller bearing 10 is used. Smaller flange surface 19 is formed with an end on the smaller diameter side of raceway surface 13A and a grinding undercut being interposed.

Figure 10:
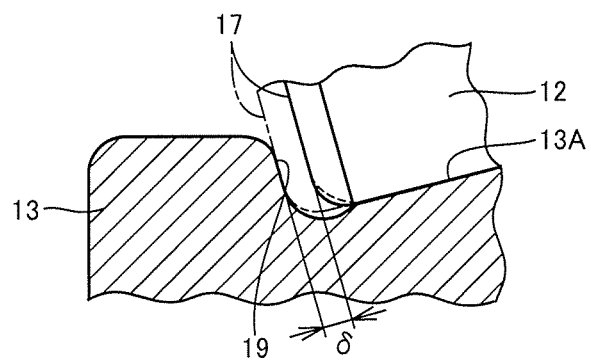
FIG. 10 is an enlarged cross-sectional view of a main portion in FIG. 9.

As shown as being enlarged in FIG. 10, smaller flange surface 19 of inner ring 13 is finished to a ground surface in parallel to smaller end face 17 of roller 12 and in surface contact with smaller end face 17 of roller 12 in an initial assembled state shown with a chain dotted line in the figure. Smaller end face 17 is distant from smaller flange surface 19 of roller 12. A gap δ between smaller flange surface 19 of inner ring 13 and smaller end face 17 of roller 12 provided while roller 12 shown with a solid line is set in place, that is, while larger end face 16 of roller 12 is in contact with larger flange surface 18 of inner ring 13, is within a restricted dimension range defined as δ≤0.4 mm. Thus, the number of rotations required until roller 12 is set in place in running-in can be decreased and a running-in period can be shorter.

Figure 11:
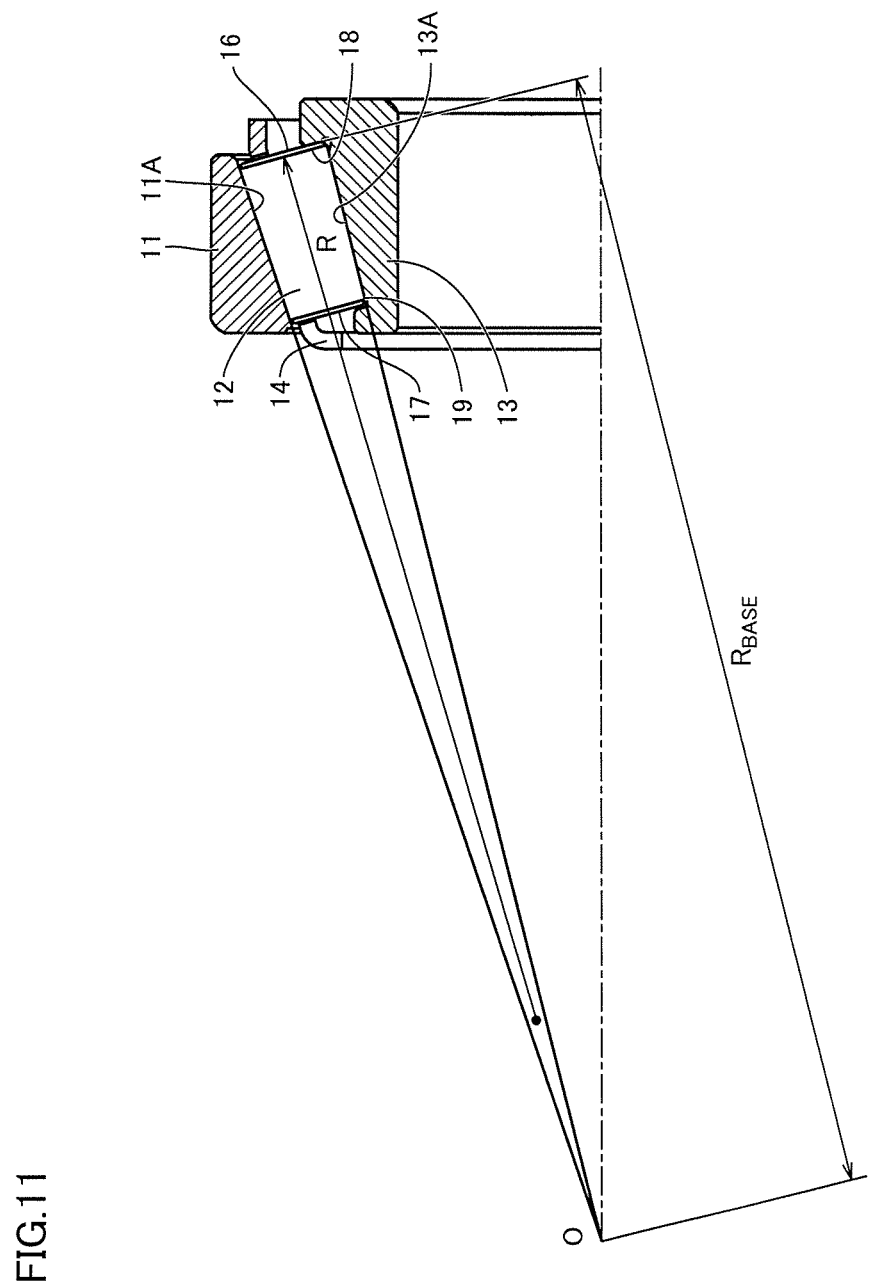
FIG. 11 is a schematic cross-sectional view illustrating design specifications of the tapered roller bearing in FIG. 9.

As shown in FIG. 11, apexes of cone angles of roller 12 and raceway surfaces 11A and 13A of outer ring 11 and inner ring 13 meet at one point O on the centerline of tapered roller bearing 10. With R representing a reference radius of curvature of larger end face 16 of roller 12 and $R_{BASE}$ representing a distance from the O point which is the apex of the cone angle of roller 12 to larger flange surface 18 of inner ring 13, a ratio between R and $R_{BASE}$, that is, a value of $R/R_{BASE}$, is within a range from 0.75 to 0.87. Larger flange surface 18 is ground to have surface roughness Ra of 0.12 μm.

By setting $R/R_{BASE}$ to be within such a numeric range, torque loss and heat generation caused by sliding friction between larger flange surface 18 of inner ring 13 and larger end face 16 of roller 12 can be lessened.

The above is summarized. Tapered roller bearing 10 in the first embodiment shown, for example, in FIG. 9 includes outer ring 11, inner ring 13, and a plurality of rollers 12. Outer ring 11 includes raceway surface 11A around an inner circumferential surface thereof. Inner ring 13 includes raceway surface 13A around an outer circumferential surface thereof and larger flange surface 18 arranged on the larger diameter side relative to raceway surface 13A, and is arranged on a radially inner side of outer ring 11. The plurality of rollers 12 are disposed between raceway surface 11A and raceway surface 13A and the roller includes rolling surface 12A to be in contact with raceway surface 11A and raceway surface 13A and larger end face 16 to be in contact with larger flange surface 18. A value of $R/R_{BASE}$ is not smaller than 0.75 and not greater than 0.87 where R represents a reference radius of curvature of larger end face 16 of roller 12 and $R_{BASE}$ represents a distance from an apex of a cone angle of roller 12 to larger flange surface 18 of inner ring 13. At least any one of outer ring 11, inner ring 13, and the plurality of rollers 12 includes nitrogen enriched layer 11B, 12B, or 13B formed on a surface layer of raceway surface 11A, raceway surface 13A, or rolling surface 12A. A distance from an outermost surface of the surface layer to the bottom of nitrogen enriched layer 11B, 12B, or 13B is not shorter than 0.2 mm. Crowned portions 22 and 24 are formed in rolling surface 12A of roller 12. A sum of drops of crowned portions 22 and 24 is expressed in a y-z coordinate system with a generatrix of the rolling surface of the tapered roller being defined as a y axis and a direction orthogonal to the generatrix being defined as a z axis, in the expression (1) where $K_1$, $K_2$, and $z_m$ represent design parameters, Q represents a load, L represents a length in a direction of the generatrix of an effective contact portion of the rolling surface of the tapered roller, E' represents an equivalent elastic modulus, a represents a length from an origin on the generatrix of the rolling surface of the tapered roller to an end of the effective contact portion, and A is defined as $A=2K_1Q/\pi LE'$.

In the description so far and in description hereafter, tapered roller bearing 10 in the present embodiment is premised on the features described above in the present paragraph.

In tapered roller bearing 10 in the present embodiment, arithmetic mean roughness Ra of larger flange surface 18 is not smaller than 0.1 μm and not greater than 0.2 μm, skewness Rsk of a roughness profile of larger flange surface 18 is not smaller than −1.0 and not greater than −0.3, and kurtosis Rku of the roughness profile of larger flange surface 18 is not smaller than 3.0 and not greater than 5.0. Skewness Rsk of the roughness profile refers to skewness Rsk of a roughness profile defined under 4.2.3 of the Japanese Industrial Standards (JIS) B0601:2013, and kurtosis Rku of the roughness profile refers to kurtosis Rku of the roughness profile defined under 4.2.4 of the Japanese Industrial Standards (JIS) B0601:2013.

In order to stabilize rotational torque under a condition of rotation of outer ring 11 or inner ring 13 of tapered roller bearing 10 at a low speed, that is, within a range of the number of rotations not more than 200 r/min., arithmetic mean roughness Ra of larger flange surface 18 is not smaller than 0.1 μm and not greater than 0.2 μm.

Skewness Rsk of the roughness profile is defined as a quotient of the mean cube value of ordinate values z(x) and the cube of a root mean square deviation of primary profile Rq within a sampling length as shown in an expression (2) below. Skewness Rsk of the roughness profile is expressed as a numeric value representing measures of asymmetry of a probability density function of a profile, and it is a parameter strongly affected by a projecting peak or valley.

$$Rsk = \frac{1}{Rq^3}\left[\frac{1}{l}\int_0^l z^3(x)dx\right] \quad (2)$$

Figure 12:
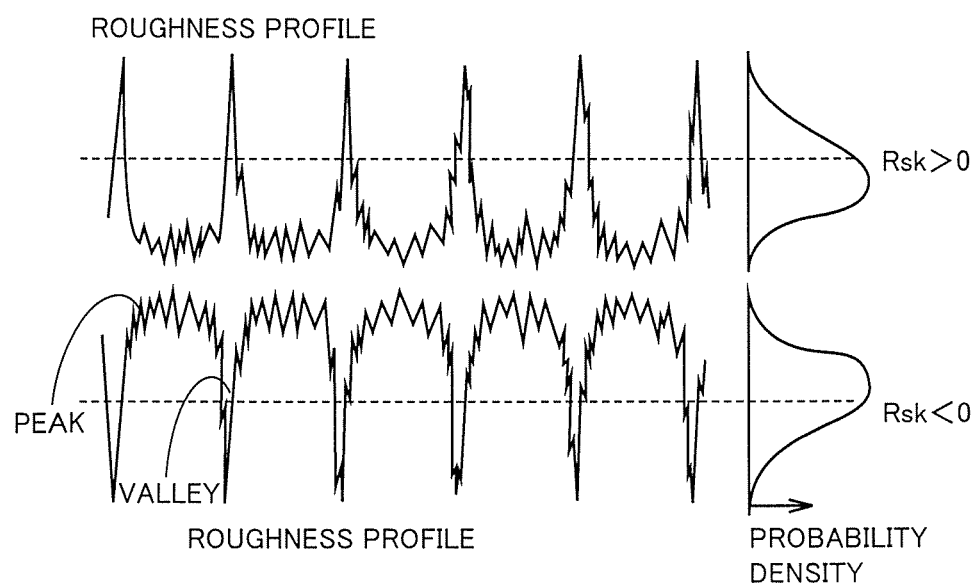
FIG. 12 shows a roughness profile representing skewness Rsk of the larger flange surface in the first embodiment.

FIG. 12 shows a roughness profile which satisfies relation of skewness Rsk>0 and a roughness profile which satisfies relation of skewness Rsk<0.

As is clear from comparison between these roughness profiles, when relation of skewness Rsk>0 is satisfied, there are a number of peaks steeply projecting upward on the sheet plane in FIG. 12, and in such a case, seizure resistance of larger flange surface 18 may significantly be poorer than that in an example of roughness at a superfinishing level. When relation of skewness Rsk<0 is satisfied, however, a surface texture is such that pointed peaks steeply projecting upward on the sheet plane in FIG. 12 tend to relatively be fewer and hence break of an oil film is less likely, which is advantageous for prevention of seizure. As a negative value of skewness Rsk is greater, a width of the valley is larger in a lateral direction over the sheet plane in FIG. 12, and a surface (larger flange surface 18 of inner ring 13 in contact with larger end face 16 of roller 12 in tapered roller bearing 10) at which the number of projecting and pointed peaks is relatively small is smaller in width. Since stress is thus concentrated to a boundary portion between the surface and the valley, formation of an oil film is interfered. By setting skewness Rsk of the roughness profile of larger flange surface 18 of inner ring 13 to be not smaller than −1.0 and not greater than −0.3, larger flange surface 18 has such a characteristic as having a smooth plane including relatively few projecting and pointed peaks in the direction of width of FIG. 12 and has a surface texture advantageous in formation of an oil film.

As shown on the right in FIG. 12, a probability density function of Rsk is located unevenly above an average line shown with a dotted line in the figure as extending laterally when the condition of Rsk<0 is satisfied. Therefore, by satisfying relation of Rsk<0 and in particular by setting Rsk to be not smaller than −1.0 and not greater than −0.3, larger flange surface 18 has a profile having gentle peaks over a wide range.

Kurtosis Rku of a roughness profile is defined as a quotient of the mean quartic value of ordinate values z(x) and the fourth power of root mean square deviation Rq of the primary profile within a sampling length as shown in an expression (3) below. Kurtosis Rku of the roughness profile is expressed as a numeric value representing measures of pointedness (sharpness) of a probability density function of a profile, and it is a parameter strongly affected by a projecting peak or valley.

$$Rku = \frac{1}{Rq^4}\left[\frac{1}{l}\int_0^l z^4(x)dx\right] \quad (3)$$

Figure 13:
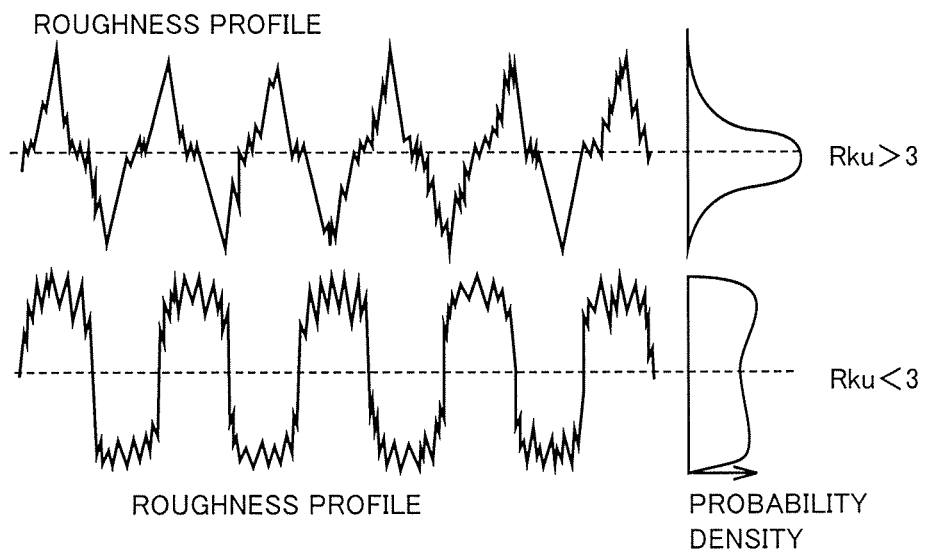
FIG. 13 shows a roughness profile representing kurtosis Rku of the larger flange surface in the first embodiment.

FIG. 13 shows a roughness profile which satisfies relation of kurtosis Rku>3 and a roughness profile which satisfies relation of kurtosis Rku<3.

As is clear from comparison between these roughness profiles, when relation of kurtosis Rku<3 is satisfied, there are few pointed and steeply projecting peaks or valleys in the profile, and in such a case, rotational torque may not be stable. When relation of kurtosis Rku>3 is satisfied, however, there tend to be more peaks and valleys pointed and relatively steeply projecting upward and downward in the figure. Thus, larger flange surface 18 can moderately come in contact with a metal, which is advantageous in stabilization of rotational torque of tapered roller bearing 10. When a positive value of kurtosis Rku is excessively large, however, excessive contact of larger flange surface 18 with a metal occurs and seizure resistance is lowered. By setting kurtosis Rku of the roughness profile of larger flange surface 18 of inner ring 13 to be not smaller than 3.0 and not greater than 5.0, larger flange surface 18 has such a surface texture as a protrusion with roughness for achieving stabilization of rotational torque in rotation at a low speed.

By adjusting arithmetic mean roughness Ra, skewness Rsk of the roughness profile, and kurtosis Rku of the roughness profile of larger flange surface 18 as set forth above, both of stabilization of rotational torque and seizure resistance of tapered roller bearing 10 can be achieved.

When grinding finishing is employed for working larger flange surface 18 of inner ring 13 which has roughness characteristics described above, a defined range of roughness is too fine and resistance in working is excessively high. Therefore, such a defect as grinding burn may be caused in larger flange surface 18 and such working is difficult to perform. Then, in working larger flange surface 18 of inner ring 13 with the roughness characteristics above, superfinishing is preferably performed for an ultrashort time period, for example, not shorter than 0.5 second and not longer than two seconds.

Roughness of larger end face 16 of roller 12 affects less to the function of tapered roller bearing 10 than roughness of larger flange surface 18 of inner ring 13. Therefore, a condition for roughness of larger end face 16 of roller 12 is milder than that for larger flange surface 18. Specifically, from a point of view of obtaining a good wedging effect of lubricating oil, arithmetic mean roughness Ra of larger end face 16 of roller 12 should only be not greater than 0.1 μm. Particularly good seizure resistance can be achieved when larger end face 16 of roller 12 and larger flange surface 18 of inner ring 13 ideally satisfy relation of contact between a spherical surface and a plane. Therefore, when larger flange surface 18 is in a shape of a generatrix with projections and recesses, a maximum value of a dimension of the projections and recesses of larger flange surface 18 is preferably not greater than 1 μm.

Figure 14:
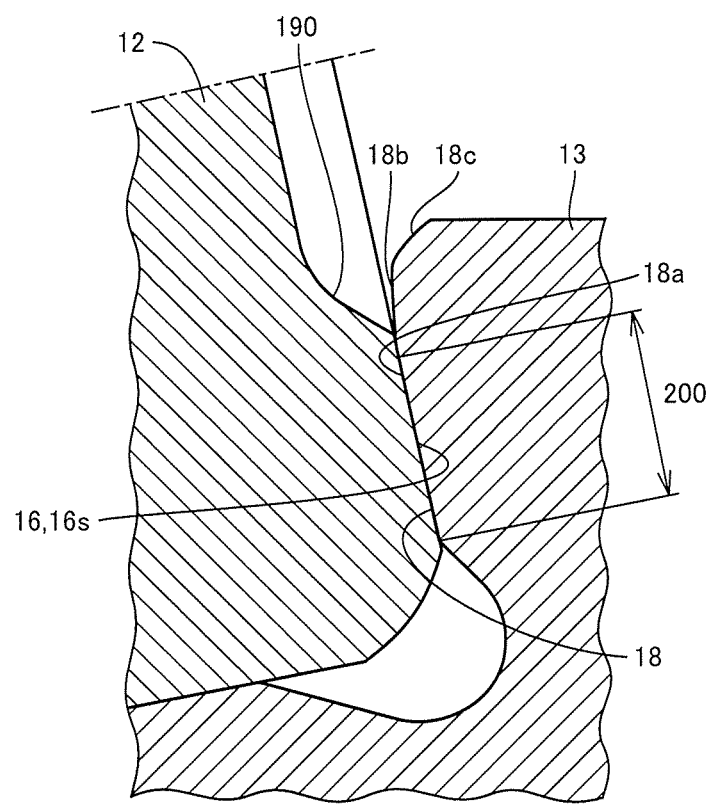
FIG. 14 is a cross-sectional view showing the main portion in FIG. 9 as being more enlarged than in FIG. 10.

As shown as being enlarged in FIG. 14, larger flange surface 18 of inner ring 13 is constituted of a conical surface 18a and a flank 18b of an arcuate cross-section smoothly connected to an outer side of conical surface 18a, and the outer side of flank 18b is provided with a chamfer 18c. Conical surface 18a is formed with the O point shown in FIG. 11 being defined as the center. Larger end face 16 of roller 12 is formed by a spherical surface 16s having a radius of curvature R at least 0.75 time and at most 0.87 time as large as distance $R_{BASE}$ from the O point to larger flange surface 18 of inner ring 13, and a central portion of spherical surface 16s is provided with an undercut 190 as a circular region. An outer circumferential end of undercut 190 extends to the vicinity of a boundary between conical surface 18a and flank 18b of larger flange surface 18.

Since roller 12 rolls with larger end face 16 being pressed against larger flange surface 18 during use of a bearing, a part of spherical surface 16s comes in contact with conical surface 18a and a contact ellipse 200 is produced by the curves as shown in a cross-section in FIG. 14. The boundary between flank 18b and conical surface 18a is provided in the vicinity of an outer edge of contact ellipse 200, and flank 18b and spherical surface 16s define a gap in a shape of a wedge at an acute angle proximate to contact ellipse 200.

Contact ellipse 200 is larger as an axial load during use of the bearing is higher. With a largest contact ellipse under a highest allowable axial load being assumed, tapered roller bearing 10 is designed such that the boundary between flank 18b and conical surface 18a is located in the vicinity of the outer edge of the largest contact ellipse, and the gap in a shape of a wedge into which lubricating oil is introduced can appropriately be provided within a range of all loads employed.

Thus, in the present embodiment, larger flange surface 18 of inner ring 13 includes conical surface 18a in contact with larger end face 16 of roller 12 and flank 18b smoothly continuous to the outer side of conical surface 18a and curved in a direction away from larger end face 16 of roller 12.

Specifically, by smoothly connecting curved flank 18b to conical surface 18a of larger flange surface 18 of inner ring 13 in contact with larger end face 16 of roller 12 and providing the gap in the shape of the wedge at an acute angle in the vicinity of the outer edge of a contact region, a function to introduce lubricating oil into the contact region is enhanced so that a sufficient oil film can be formed. By forming smooth flank 18b, flaws due to impingement against larger flange surface 18 of inner ring 13 when roller 12 is skewed can be prevented.

Flank 18b has an arcuate cross-sectional shape. Therefore, flank 18b excellent in function of introduction of lubricating oil can readily be worked.

Figure 15:
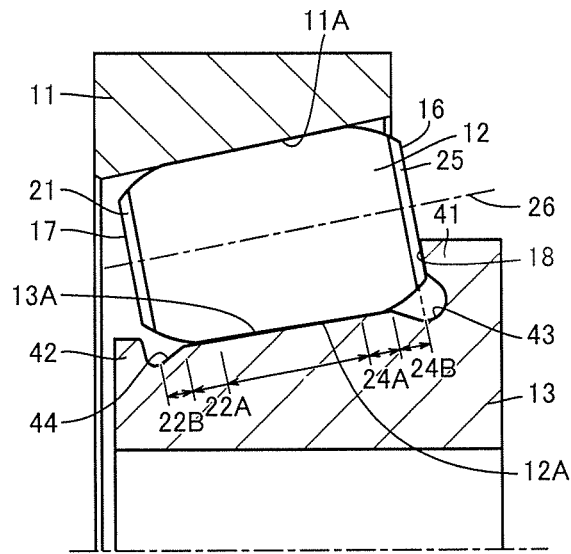
FIG. 15 is a schematic cross-sectional view more detailed than FIG. 1 for defining a larger flange, a smaller flange, and an undercut of the tapered roller bearing in the first embodiment.
Figure 16:
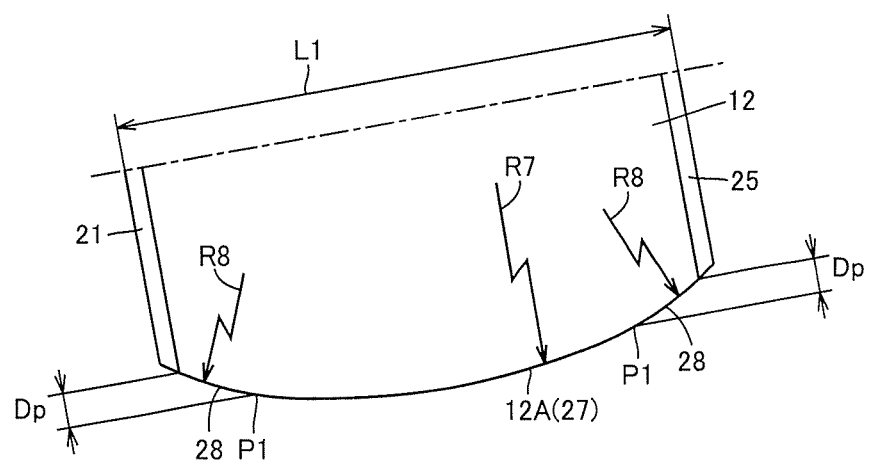
FIG. 16 is a diagram showing a crowning profile of the tapered roller bearing in FIG. 15.

As shown in FIGS. 15 and 16, in the tapered roller bearing in the present embodiment, a first grinding undercut 43 is provided at a corner where raceway surface 13A and a larger flange 41 meet each other, and a second grinding undercut 44 is provided at a corner between raceway surface 13A and a smaller flange 42. Raceway surface 13A has a linear generatrix extending in an axial direction of the inner ring. Around an inner circumference of outer ring 11, raceway surface 11A opposed to raceway surface 13A is formed, no flange is provided therewith, and raceway surface 11A has a linear generatrix extending in an axial direction of the outer ring.

As shown in FIGS. 15 and 16, in rolling surface 12A around the outer circumference of roller 12, crowning profiles 22A and 22B as crowned portion 22 and crowning profiles 24A and 24B as crowned portion 24 are formed, and opposing ends of roller 12 are provided with chamfered portions 21 and 25. Crowned portions 22 and 24 of rolling surface 12A can be considered as a crowning profile formed portion where a crowning profile is formed. The crowning profile formed portion is specifically formed as a contact area crowned portion 27 and a non-contact area crowned portion 28. Of these, contact area crowned portion 27 is within a range of the axial direction of raceway surface 13A and in contact with raceway surface 13A. Non-contact area crowned portion 28 is out of the range in the axial direction of raceway surface 13A and not in contact with raceway surface 13A.

Contact area crowned portion 27 and non-contact area crowned portion 28 have generatrices extending in the axial direction of the roller expressed by functions different from each other and being smoothly continuous at a connection point P1. In the vicinity of connection point P1, a curvature R8 of the generatrix of non-contact area crowned portion 28 is set to be smaller than a curvature R7 of the generatrix of contact area crowned portion 27. "Being smoothly continuous" refers to being continuous without forming a corner and ideally refers to the generatrix of contact area crowned portion 27 and the generatrix of non-contact area crowned portion 28 being continuous to have a tangential line in common at a continuous point, that is, such a function that the generatrices can continuously be differentiated at the continuous point.

According to such a construction, a crowned portion is formed in rolling surface 12A around the outer circumference of roller 12, so that a grindstone can be applied to rolling surface 12A in a more necessary and sufficient manner than in formation of a crowned portion only in raceway surface 13A. Therefore, poor working of rolling surface 12A can be prevented. Crowned portions 22 and 24 formed in rolling surface 12A can bring about lowering in contact pressure or stress in a contact portion and a longer lifetime of tapered roller bearing 10. In the vicinity of connection point P1 between contact area crowned portion 27 and non-contact area crowned portion 28, curvature R8 of the generatrix of non-contact area crowned portion 28 is smaller than curvature R7 of the generatrix of contact area crowned portion 27, so that drops at opposing ends of roller 12 can be reduced. Therefore, as compared, for example, with an example of a conventional crowning profile of a single circular arc, an amount of grinding can be suppressed, efficiency in working of roller 12 can be improved, and manufacturing cost can be reduced.

The generatrix of contact area crowned portion 27 is defined by a logarithmic curve of a logarithmic crowning profile expressed in the expression (1) above.

Contact area crowned portion 27 expressed by the logarithmic crowning profile can lower a contact pressure or stress in a contact portion so that tapered roller bearing 10 can have a longer lifetime.

Figure 17:
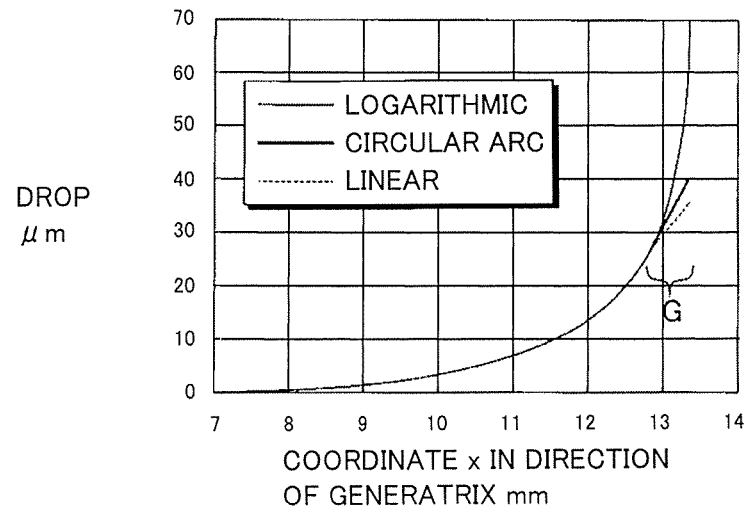
FIG. 17 is a diagram showing relation between a coordinate in a direction of a generatrix and drop of a tapered roller in FIG. 15.

When a crowning profile is optimized by a mathematical optimization approach in connection with $K_1$ and $z_m$ in the expression (1) above, under the present condition, a crowning profile as shown with "logarithmic" in FIG. 17 is obtained. Largest drop of the crowning profile of roller 12 at this time is 69 μm. A region shown with G in FIG. 17, however, corresponds to crowned portion 24B facing first grinding undercut 43 and second grinding undercut 44 of inner ring 13 in FIG. 15, and it does not come in contact with inner ring 13. Therefore, region G of roller 12 does not have to be provided with the logarithmic crowning profile and it may be defined by a straight line, a circular arc, or other functions. Even though region G of roller 12 is defined by a straight line, a circular arc, or other functions, a contact pressure distribution is identical to that in an example in which roller 12 is entirely provided with a logarithmic crowning profile, and a function thereof is comparable.

The approach to mathematical optimization of the logarithmic crowning profile will be described.

By appropriately selecting $K_1$ and $z_m$ in a functional expression expressive of the logarithmic crowning profile, the optimum logarithmic crowning profile can be designed.

A crowning profile is generally designed to reduce a maximum value of stress or contact pressure in a contact area. It is assumed that a rolling fatigue life occurs in accordance with von Mises yield criterion and hence $K_1$ and $z_m$ are selected to minimize the maximum value of von Mises equivalent stress.

$K_1$ and $z_m$ can be selected with the use of an appropriate mathematical optimization approach. Though various algorithms have been suggested for the mathematical optimization approach, a direct search method representing one of those algorithms can allow optimization without using a differential coefficient of a function and is useful when an objective function and a variable cannot directly be expressed by a mathematical formula. Optimum values of $K_1$ and $z_m$ are determined by the Rosenbrock method representing one of the direct search methods.

Figure 18:
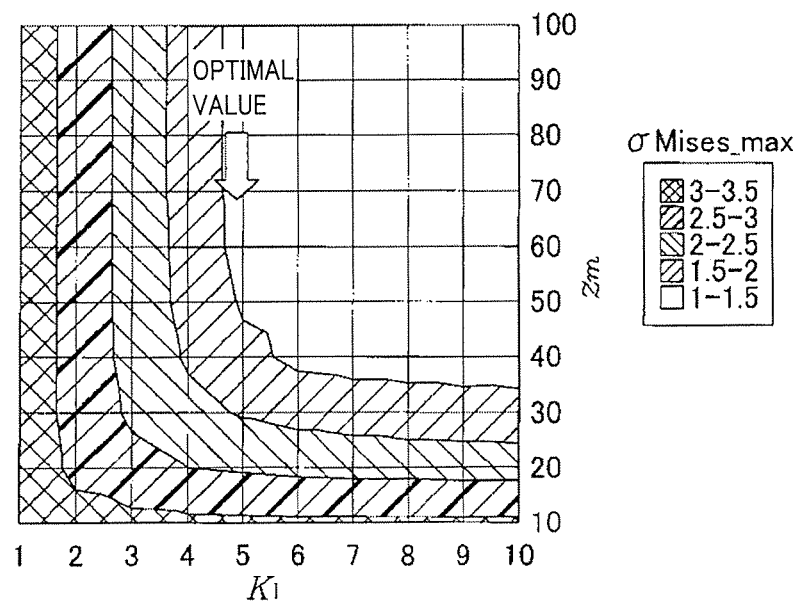
FIG. 18 is a diagram showing relation between a maximum value of von Mises equivalent stress and a logarithmic crowning parameter.

Under the conditions above, that is, when a radial load effective to 35% of a basic dynamic rated load is applied to the tapered roller bearing having the bearing number of 30316 and misalignment is 1/600, a maximum value sMises_max of von Mises equivalent stress and logarithmic crowning parameters $K_1$ and $z_m$ assume relation as in FIG. 18. When appropriate initial values are given to $K_1$ and $z_m$ and $K_1$ and $z_m$ are modified under the rules of the Rosenbrock method, a combination of optimum values in FIG. 18 is derived and sMises_max is minimized.

So long as contact between roller 12 and inner ring 13 is considered, any crowning profile in region G in FIG. 17 may be applicable. When contact with outer ring 11 or formability by a grindstone during working is taken into consideration, however, it is not desirable that gradient at point P1 of connection with a logarithmically crowned portion is smaller than a gradient at the logarithmically crowned portion. Since drop will increase when gradient greater than gradient of the logarithmically crowned portion is given to the crowning profile in region G, this is also undesirable. In other words, the crowned portion in region G and the logarithmic crowning profile are desirably designed to smoothly be continuous to each other with their gradients matching with each other at connection point P1. In FIG. 17, a linear crowning profile in region G of roller 12 is shown with a dotted line and an arcuate crowing profile thereof is shown with a bold solid line. When the crowning profile in region G is linear, drop Dp of the crowning profile of roller 12 is, for example, 36 μm. When the crowning profile in region G is arcuate, drop Dp of the crowning profile of roller 12 is, for example, 40 μm.

Figure 19:
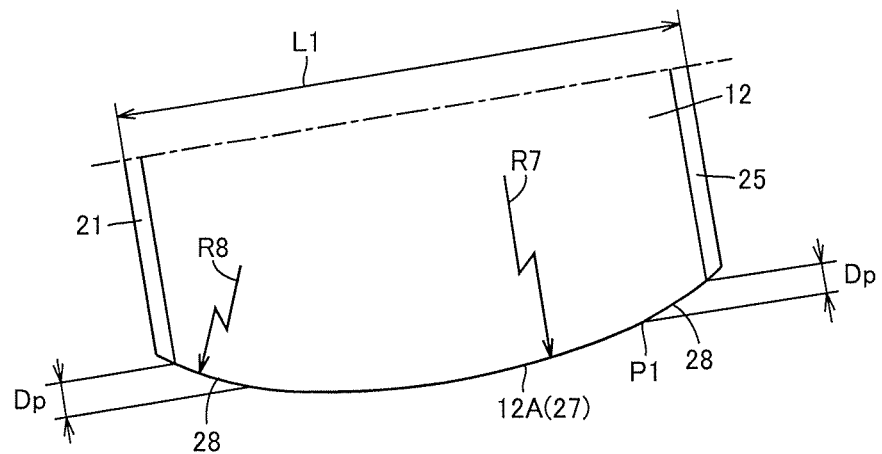
FIG. 19 is a diagram showing a crowning profile of a tapered roller included in a tapered roller bearing according to a first modification to FIG. 15.

One or both of portions on the larger and smaller diameter sides of the generatrix of non-contact area crowned portion 28 may be arcuate. In this case, drop Dp can be made smaller than in an example in which the generatrix of the entire roller rolling surface is represented, for example, by a logarithmic curve. Accordingly, an amount of grinding can be reduced. As shown in FIG. 19, one or both of portions on the larger and smaller diameter sides of the generatrix of non-contact area crowned portion 28 may be linear (in the example in FIG. 19, only a portion on the larger diameter side being linear). In this case, drop Dp can further be made smaller than in an example in which the generatrix of non-contact area crowned portion 28 is arcuate.

A part or the entirety of the generatrix of contact area crowned portion 27 may be represented by the logarithmic crowning profile expressed in the expression (1). Owing to contact area crowned portion 27 represented by the logarithmic crowning profile, a contact pressure or stress in the contact area can be lowered so that the tapered roller bearing can have a longer lifetime.

Figure 20:
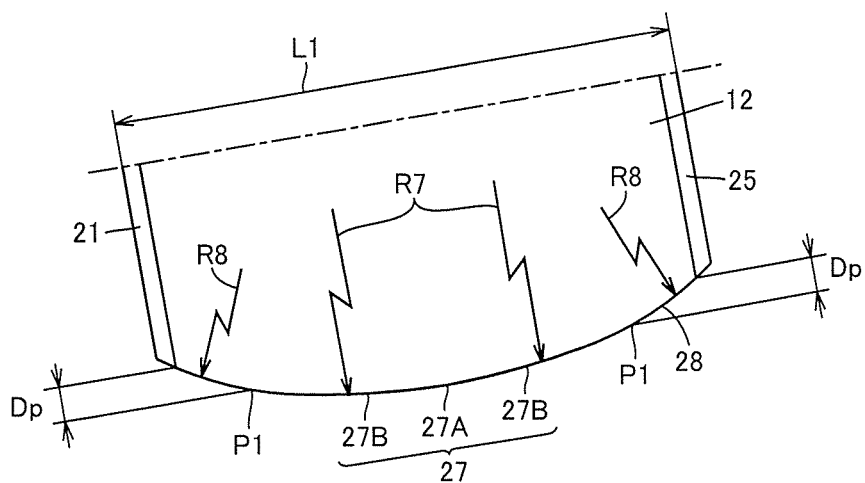
FIG. 20 is a diagram showing a crowning profile of a tapered roller included in a tapered roller bearing according to a second modification to FIG. 15.

As shown in FIG. 20, the generatrix of contact area crowned portion 27 may be represented by a straight portion 27A (identical in meaning to central portion 23 in FIG. 3) formed as being flat along the axial direction of the roller and a portion 27B formed by a logarithmic curve of the logarithmic crowning profile.

In order to secure working accuracy of a crowning profile, straight portion 27A is desirably provided in the outer circumference of roller 12. When crowned portions 22 and 24 in symmetry between a portion on the smaller diameter side and a portion on the larger diameter side with the center in the axial direction of the roller being defined as the reference are assumed, among the design parameters in the expression (1) of the logarithmic crowning profile, $K_2$ is fixed and $K_1$ and an are to be designed.

Figure 21:
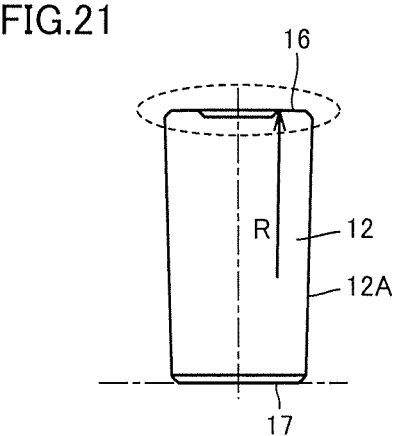
FIG. 21 is a cross-sectional view for illustrating a reference radius of curvature of a roller in the tapered roller bearing as a modification to FIG. 9.
Figure 22:
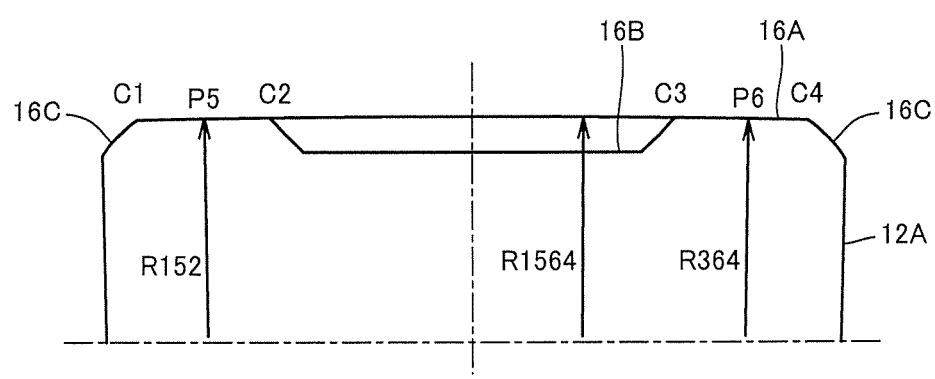
FIG. 22 is a partial cross-sectional view showing an area surrounded by a dotted line in FIG. 21.
Figure 23:
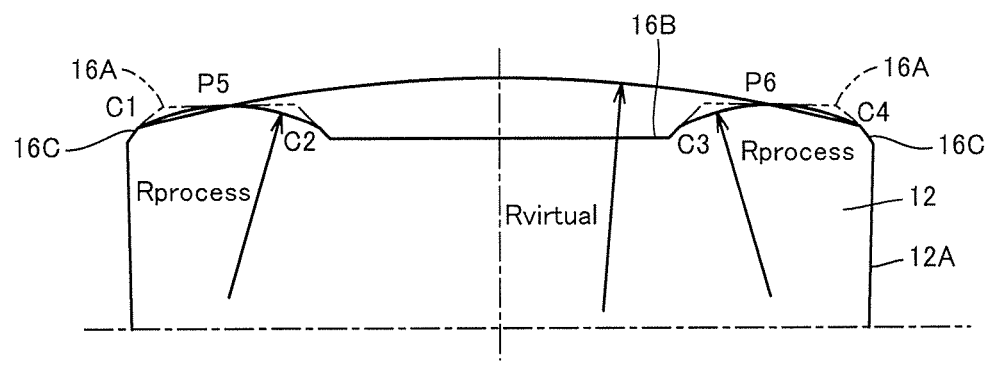
FIG. 23 is a cross-sectional view for illustrating an actual radius of curvature of the roller in the tapered roller bearing as the modification to FIG. 9.

Referring to FIGS. 21 to 23, tapered roller bearing 10 in the present embodiment may have a ratio Rprocess/R not lower than 0.8 between an actual radius of curvature Rprocess (see FIG. 23) and reference radius of curvature R (see FIG. 22) where Rprocess represents an actual radius of curvature after working of larger end face 16 of roller 12.

FIGS. 21 and 22 are schematic cross-sectional views along an axis of revolution of roller 12 obtained when grinding is ideally performed. When grinding is ideally performed, obtained larger end face 16 of roller 12 defines a part of a spherical surface around an apex O (see FIG. 11) of the cone angle of roller 12. As shown in FIGS. 21 and 22, when such grinding as leaving a part of a projection 16A is ideally performed, larger end face 16 of roller 12 including an end face of projection 16A defines a part of one spherical surface around the apex of the cone angle of roller 12. In this case, an inner circumferential end of projection 16A in a radial direction around the axis of revolution of roller 12 is connected to a recess 16B with points C2 and C3 being interposed. Projection 16A has an outer circumferential end connected to a chamfered portion 16C with points C1 and C4 being interposed. In ideal larger end face 16, points C1 to C4 are arranged on one spherical surface as described above.

Radius of curvature R of larger end face 16 of roller 12 refers to an R dimension when larger end face 16 of roller 12 shown in FIG. 21 is a set ideal spherical surface. Specifically, as shown in FIG. 22, with points at an end of larger end face 16 of roller 12 being defined as C1, C2, C3, and C4, with a point intermediate between points C1 and C2 being defined as P5, and with a point intermediate between points C3 and C4 being defined as P6, a radius of curvature R152 which passes through points C1, P5, and C2, a radius of curvature R364 which passes through points C3, P6, and C4, and a radius of curvature C1564 which passes through points C1, P5, P6, and C4 define an ideal single arcuate curve which satisfies relation of R152=R364=R1564. Points C1 and C4 are points of connection between projection 16A and chamfered portion 16C and points C2 and C3 are points of connection between projection 16A and recess 16B. The ideal single arcuate curve which satisfies relation of R=R152=R364=R1564 is called a reference radius of curvature. Reference radius of curvature R is different from actual radius of curvature Rprocess measured as a radius of curvature of larger end face 16 of roller 12 obtained by actual grinding as will be described later.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape. From a different point of view, a projection resulting from the punch of the forging apparatus is formed in an outer circumferential portion of a surface to be the larger end face of the formed product obtained by forging. The projection has, for example, an annular two-dimensional shape. At least a part of the projection of the formed product is removed by subsequently performed grinding.

FIG. 23 is a schematic cross-sectional view along the axis of revolution of roller 12 obtained by actual grinding. FIG. 23 shows the ideal larger end face shown in FIG. 22 with a dotted line. As shown in FIG. 23, the larger end face of a tapered roller actually obtained by grinding a formed product provided with the recess and the projection as above does not define a part of one spherical surface around an apex of a cone angle of the tapered roller. Points C1 to C4 on the projection of the actually obtained tapered roller sag as compared with the projection shown in FIG. 22. As compared with points C1 and C4 shown in FIG. 22, points C1 and C4 shown in FIG. 23 are arranged on an outer circumferential side (a side distant from the axis of revolution) in the radial direction (a lateral direction in the figure) with respect to the center of the axis of revolution and arranged on an inner side (on a lower side in the figure) in a direction of extension (a vertical direction in the figure) of the axis of revolution (R152 on one side with respect to R1564 of the entire larger end face 16 being not identical but being small). As compared with points C2 and C3 shown in FIG. 22, points C2 and C3 shown in FIG. 23 are arranged on an inner circumferential side (a side closer to the axis of revolution) in the radial direction with respect to the center of the axis of revolution and arranged on the inner side (the lower side in the figure) in the direction of extension of the axis of revolution (R364 on one side with respect to R1564 of the entire larger end face 16 not being identical but being small). Intermediate points P5 and P6 shown in FIG. 23 are formed at positions substantially equal to intermediate points P5 and P6 shown, for example, in FIG. 22.

As shown in FIG. 23, in larger end face 16 actually formed by grinding, apex C1 and apex C4 are arranged on one spherical surface and apex C2 and apex C3 are arranged on another spherical surface. R152 and R364 on one side after working of larger end face 16 of roller 12 are called actual radius of curvature Rprocess. Actual radius of curvature Rprocess is substantially equal to one circular arc 16C defined by a part of the larger end face formed on one projection. In general grinding, a radius of curvature of one circular arc 16C defined by a part of the larger end face formed on one projection 16A is substantially equal to a radius of curvature of circular arc 16C defined by a part of the larger end face formed on the other projection 16A. Actual radius of curvature Rprocess is substantially equal to a radius of curvature of circular arc 16C which passes through apex C3, intermediate point P6, and apex C4. Actual radius of curvature Rprocess is not greater than reference radius of curvature R.

Roller 12 of the tapered roller bearing according to the present embodiment has ratio Rprocess/R of actual radius of curvature Rprocess to reference radius of curvature R not lower than 0.8.

As shown in FIG. 23, in the larger end face actually formed by grinding, a radius of curvature Rvirtual (which is referred to as a virtual radius of curvature below) of a virtual circular arc which passes through apex C1, intermediate point P5 between apex C1 and apex C2, intermediate point P6 between apex C3 and apex C4, and apex C4 is not greater than reference radius of curvature R. Roller 12 of tapered roller bearing 10 according to the present embodiment has a ratio Rprocess/Rvirtual of actual radius of curvature Rprocess to virtual radius of curvature Rvirtual not lower than 0.8. In other words, Rvirtual represents a radius of curvature R1 which passes through a center point (intermediate point) P5 of a first portion of the larger end face located on one side (on a left side in FIG. 23) with respect to the axis of revolution and a center point (intermediate point) P6 of a second portion of the larger end face located on the other side (on a right side in FIG. 23) with respect to the axis of revolution. Rprocess represents a radius of curvature R2 of circular arc 16C which is the first portion of the larger end face located on one side (on the left side in FIG. 23) with respect to the axis of revolution. R2/R1 at this time is not lower than 0.8.

Actual radius of curvature Rprocess and virtual radius of curvature Rvirtual of roller 12 actually formed by grinding can be measured by any method, and can be measured, for example, by using a surface roughness measurement instrument (for example, Surface Roughness Tester Surftest SV-100 manufactured by Mitutoyo Corporation). When the surface roughness measurement instrument is used, an axis of measurement is initially set along the radial direction around the axis of revolution and a surface texture of the larger end face is determined. Apexes C1 to C4 and intermediate points P5 and P6 are plotted on the obtained profile of the larger end face. Actual radius of curvature Rprocess is calculated as a radius of curvature of a circular arc which passes through plotted apex C1, intermediate point P5, and apex C2. Virtual radius of curvature Rvirtual is calculated as a radius of curvature of a circular arc which passes through plotted apex C1, intermediate points P5 and P6, and apex C4.

Reference radius of curvature R is estimated based on each dimension of a tapered roller obtained by actual grinding, for example, based on industrial standards such as the JIS. Preferably, larger end face 16 has surface roughness Ra not greater than 0.10 μm.

Figure 24:
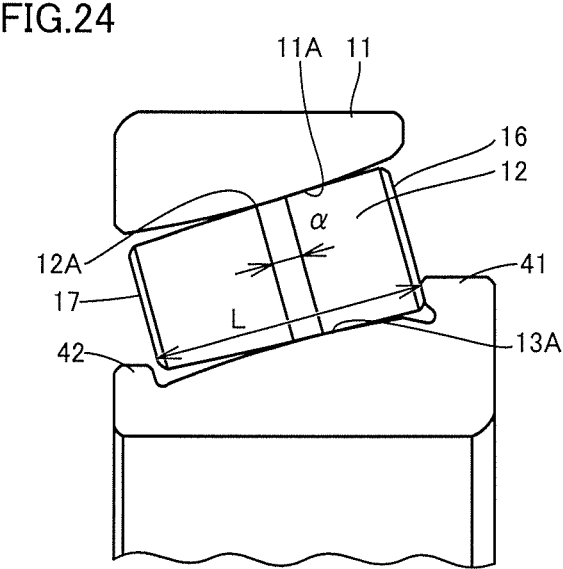
FIG. 24 is a cross-sectional view showing an exemplary method of changing a position of abutment between a rolling contact surface and a rolling surface in the tapered roller bearing as the modification to FIG. 9.
Figure 25:
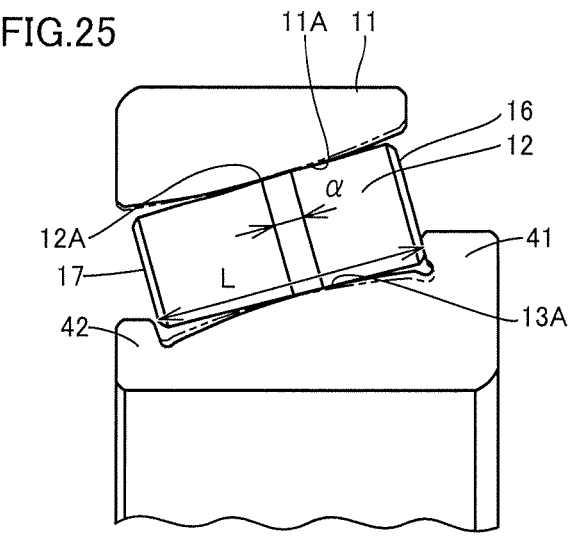
FIG. 25 is a cross-sectional view showing another exemplary method of changing a position of abutment between a rolling contact surface and a rolling surface in the tapered roller bearing as the modification to FIG. 9.

Preferably, as shown in FIGS. 24 and 25, a ratio α/L of an amount α of displacement from a midpoint of the rolling surface in a direction of extension of the axis of revolution, of a position of abutment between raceway surfaces 11A and 13A of the inner ring and outer ring 11 and the rolling surface to a width L of the roller rolling surface in the direction of extension is not lower than 0% and lower than 20%. The position of abutment when ratio α/L exceeds 0% is located at a central position in the rolling surface or located closer to the larger end face than the central position in the direction of extension of the axis of revolution.

A construction in which ratio α/L exceeds 0% can be realized by relatively displacing a position of an apex of each of a crowning profile formed on rolling surface 12A of roller 12 and a crowning profile formed on raceway surface 11A of outer ring 11 and raceway surface 13A of inner ring 13 as shown in FIG. 24.

Alternatively, the construction in which ratio α/L exceeds 0% can be realized by relatively varying an angle formed by raceway surface 13A of the inner ring with respect to the axial direction of inner ring 13 and an angle formed by raceway surface 11A of outer ring 11 with respect to the axial direction of outer ring 11 as shown in FIG. 25. Specifically, the construction in which ratio α/L exceeds 0% can be realized by at least any method of increasing an angle formed by raceway surface 13A of the inner ring with respect to the axial direction of the inner ring and decreasing an angle formed by raceway surface 11A of outer ring 11 with respect to the axial direction of outer ring 11 as compared with an example in which displacement amount α of the position of abutment shown with a dotted line in FIG. 25 is zero.

The tapered roller bearing including features in FIGS. 21 to 25 above has ratio Rprocess/R of actual radius of curvature Rprocess to reference radius of curvature R not lower than 0.8. As will be described later, the present inventors confirmed that the tapered roller bearing having ratio Rprocess/R not lower than 0.8 can achieved improved seizure resistance as compared with a tapered roller bearing having Rprocess/R lower than 0.8.

The tapered roller bearing can bear a certain axial load as the larger end face of the roller and the larger flange surface of the inner ring are in sliding contact. Owing to sliding contact, when lubrication between the larger end face and the larger flange surface is insufficient, a contact surface pressure between the larger end face and the larger flange surface increases and metal-to-metal contact occurs.

When the rolling surface of the tapered roller is crowned as in the tapered roller bearing, increase in contact surface pressure between the roller rolling surface and raceway surfaces 11A and 13A of the inner and outer rings can be suppressed whereas skew occurs. When skew occurs, tangential force applied between the larger end face and the larger flange surface increases and friction torque increases. When a skew angle increases, the larger end face and the larger flange surface are in what is called edge contact with each other and hence metal-to-metal contact between these surfaces occurs.

Therefore, in order to further improve seizure resistance of the tapered roller bearing, increase in rotational torque due to friction at a point of contact between the larger end face of the roller and the larger flange surface of the inner ring should be suppressed and heat generation should be reduced.

In order to suppress metal-to-metal contact between the larger end face of the roller and the larger flange surface of the inner ring and to reduce heat generation, a sufficient thickness of an oil film between the surfaces should be secured.

As described above, a value of a ratio $R/R_{BASE}$ of reference radius of curvature R of the larger end face of the tapered roller to distance $R_{BASE}$ from the apex of the cone angle of the tapered roller to the larger flange surface of the inner ring is not smaller than 0.75 and not greater than 0.87, so that an oil film thickness t can be large and maximum Hertz stress p can be small based on FIGS. 11 and 12, and torque loss and heat generation due to sliding friction between the larger end face and the larger flange surface can be reduced.

When ratio Rprocess/R is not lower than 0.8 as above, a contact surface pressure between the larger end face and the larger flange surface can be lowered and increase in skew angle can be suppressed as compared with the tapered roller bearing of which ratio Rprocess/R is lower than 0.8. Consequently, increase in contact surface pressure between the larger end face and the larger flange surface can be suppressed and a sufficient thickness of an oil film between the surfaces can be secured. This effect was confirmed based on a result of calculation below.

Table 1 shows a result of calculation of each ratio of a contact surface pressure p between the larger end face and the larger flange surface, a skew angle θ, and an oil film parameter Λ with ratio Rprocess/R being varied to a contact surface pressure p0, a skew angle θ0, and an oil film parameter Λ0 when ratio Rprocess/R is 1.

TABLE 1

| | | | | | |
|---|---|---|---|---|---|
| Ratio $R_{prosess}/R$ of Radius of Curvature | 0.5 | 0.7 | 0.8 | 0.9 | 1.0 |
| Ratio p/p0 of Contact Surface Pressure | 2.2 | 1.6 | 1.4 | 1.2 | 1 |
| Ratio Φ/Φ0 of Skew Angle | 5 | 3 | 1.5 | 1.2 | 1 |
| Ratio Λ/Λ0 of Oil Film Parameter | 0.3 | 0.5 | 0.8 | 0.9 | 1 |

As shown in Table 1, when ratio Rprocess/R is not higher than 0.7, ratio p/p0 of the contact surface pressure between the larger end face and the larger flange surface is not lower than 1.6, ratio θ/θ0 of the skew angle is not lower than 3, and ratio Λ/Λ0 of the oil film parameter is not higher than 0.5. When such a tapered roller bearing is used, for example, in an environment not good in lubrication where oil film parameter Λ is smaller than 2, oil film parameter θ is smaller than 1 and a state of contact between the larger end face and the larger flange surface is in a boundary lubrication region where metal-to-metal contact occurs. In contrast, when ratio Rprocess/R is not lower than 0.8, ratio p/p0 of the contact surface pressure is not higher than 1.4, ratio θ/θ0 of the skew angle is not higher than 1.5, and ratio Λ/Λ0 of the oil film parameter is not lower than 0.8. Therefore, it was confirmed based on the result of calculation that the tapered roller bearing having ratio Rprocess/R not lower than 0.8 could secure an oil film thickness between the larger end face and the larger flange surface as compared with the tapered roller bearing having ratio Rprocess/R lower than 0.8.

As set forth above, in the construction in FIGS. 21 to 25, the larger end face has surface roughness Ra preferably not greater than 0.10 μm. Thus, a more sufficient oil film thickness can be secured between the larger end face of the roller and the larger flange surface of the inner ring. Specifically, when the larger end face has surface roughness Ra within the numeric range, oil film parameter Λ (=h/σ) defined as "a ratio between an oil film thickness h and composite roughness σ of root mean roughness of a larger end face and a larger flange surface found based on elastohydrodynamic lubrication theory" can be enhanced as compared with an example in which surface roughness is out of the numeric range. Therefore, a sufficient oil film thickness can be secured between the larger end face and the larger flange surface.

Preferably, in the tapered roller bearing in FIGS. 21 to 25, ratio α/L of amount α of displacement from the midpoint of the rolling surface in the direction of extension of the axis of revolution, of the position of abutment between raceway surfaces 11A and 13A of outer ring 11 and inner ring 13 and the rolling surface to width L of the roller rolling surface in the direction of extension is not lower than 0% and lower than 20%, and the position of abutment is located at a central position in the rolling surface or located closer to the larger end face than the central position in the direction of extension of the axis of revolution. The present inventors confirmed that, by setting ratio α/L to be not lower than 0% and lower than 20% and setting the position of abutment when ratio α/L exceeded 0% to be located at the central position or closer to the larger end face than the central position of the rolling surface in the direction of extension of the axis of revolution, a skew angle could be decreased and increase in rotational torque could be suppressed as compared with an example in which the position of abutment when ratio α/L exceeded 0% was located at the central position or closer to the smaller end face than the central position of the rolling surface in the direction of extension of the axis of revolution.

Table 2 shows a result of calculation of each ratio of skew angle θ and rotational torque M with displacement amount α being varied to skew angle θ0 and rotational torque M0 when displacement amount α is 0, that is, when the position of abutment between raceway surfaces 11A and 13A of the inner ring and outer ring 11 and the rolling surface is located at the midpoint of the rolling surface in the direction of extension of the axis of revolution. Table 2 shows with a negative value, a displacement amount when the position of abutment is displaced toward the smaller end face relative to the midpoint.

TABLE 2

| | Displacement Amount α (%) | | | | | | |
|---|---|---|---|---|---|---|---|
| | −10 | −5 | 0 | 5 | 10 | 15 | 20 |
| Ratio Φ/Φ0 of Skew Angle | 2 | 1.5 | 1 | 0.75 | 0.5 | 0.4 | 0.3 |
| Ratio M/M0 of Rotational Torque | 1.2 | 1.1 | 1 | 1.03 | 1.05 | 1.1 | 1.2 |
| Determination | B | A | A | A | A | A | B |

As shown in Table 2, when the position of abutment is displaced toward the smaller end face relative to the midpoint, ratio θ/θ0 of the skew angle is as high as 1.5 or more. When the position of abutment is displaced toward the smaller end face relative to the midpoint, slight increase in displacement amount results in significant increase in rotational torque. In contrast, when displacement amount α is not lower than 0% and not higher than 20%, ratio θ/θ0 of the skew angle is not higher than 1 and slight increase in displacement amount does not result in significant increase in rotational torque. Though not shown in Table 2, when displacement amount α exceeds 20%, rotational torque is high to such an extent as unfavorably causing other defects such as peeling. Therefore, it was confirmed based on the result of calculation that a skew angle could be made smaller by setting ratio α/L to be not lower than 0% and lower than 20% and setting the position of abutment when ratio α/L exceeded 0% to be located at the central position or closer to the larger end face than the central position of the rolling surface in the direction of extension of the axis of revolution.

A method of manufacturing a tapered roller bearing will be described below with reference to FIGS. 26 to 29.

Figure 26:
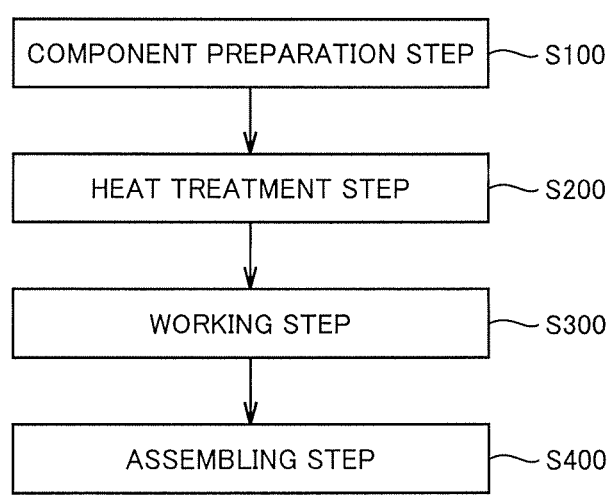
FIG. 26 is a flowchart for illustrating a method of manufacturing a tapered roller bearing.

As shown in FIG. 26, initially, a component preparation step (S100) is performed. In this step (S100), members to be bearing components such as outer ring 11, inner ring 13, roller 12, and cage 14 are prepared. A member to be roller 12 is uncrowned, and a surface of the member is yet-to-be-worked surface 12E as shown with a dotted line in FIG. 4. Roller 12 is formed to include larger end face 16 and smaller end face 17 as shown in FIG. 9 and inner ring 13 is formed to include larger flange surface 18 and smaller flange surface 19 as shown in FIG. 9.

Figure 27:
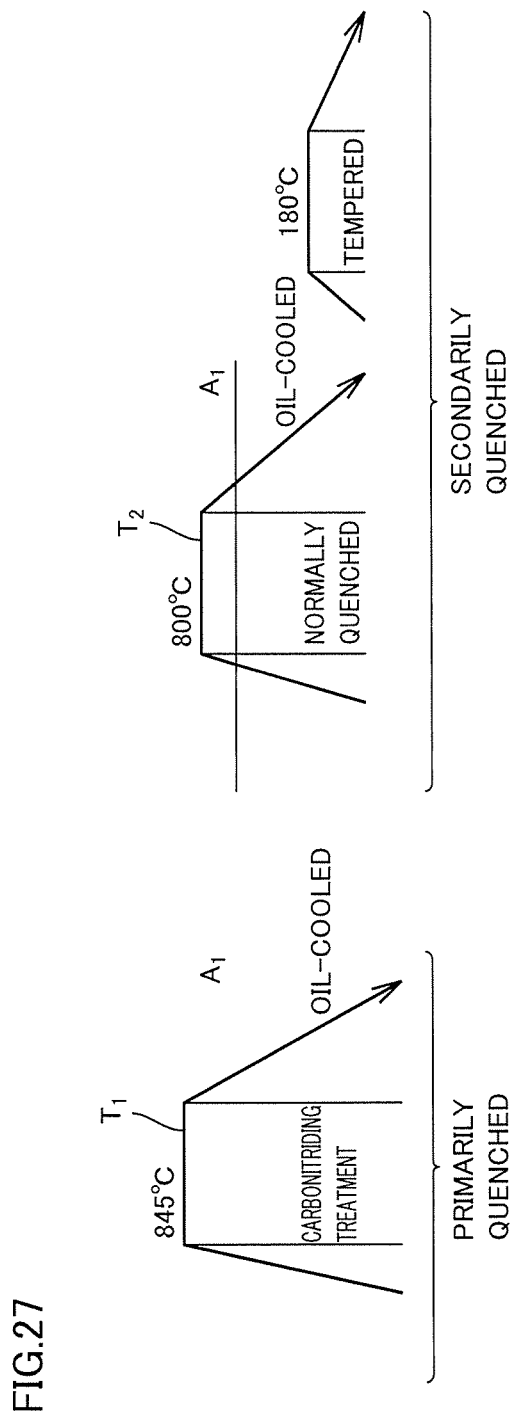
FIG. 27 is a schematic diagram showing a heat treatment pattern in a heat treatment step in FIG. 26.
Figure 28:
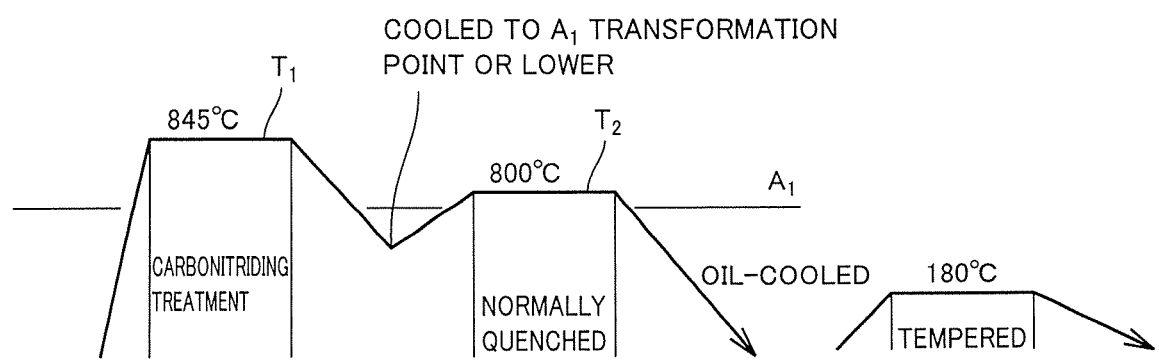
FIG. 28 is a schematic diagram showing a modification to the heat treatment pattern shown in FIG. 27.
Figure 29:
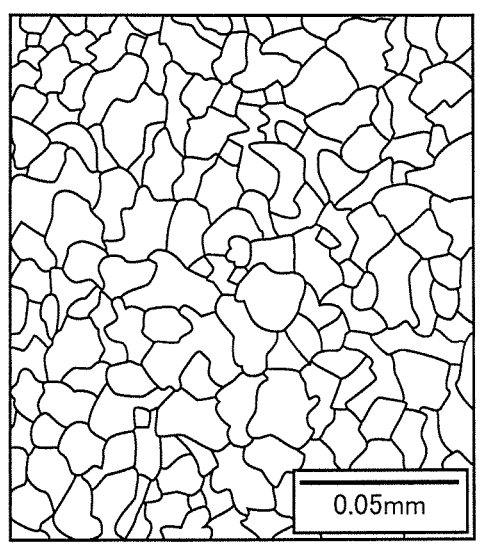
FIG. 29 is a schematic diagram illustrating a microstructure, in particular a prior austenite crystal grain boundary, of a bearing component as a comparative example.

Then, a heat treatment step (S200) is performed. In this step (S200), prescribed heat treatment is performed to control characteristics of bearing components. For example, in order to form nitrogen enriched layer 11B, 12B, or 13B according to the present embodiment in at least one of outer ring 11, roller 12, and inner ring 13, carbonitriding or nitriding, quenching, tempering, and the like are performed. An exemplary heat treatment pattern in this step (S200) is shown in FIG. 27. FIG. 27 shows a heat treatment pattern representing a method of performing primary quenching and secondary quenching. FIG. 28 shows a heat treatment pattern representing a method in which a material is cooled to a temperature lower than an $A_1$ transformation point during quenching and thereafter the material is reheated and finally quenched. In these figures, in treatment $T_1$, carbon, nitrogen, and the like are diffused through a steel matrix and carbon is also sufficiently dissolved therein, and thereafter the material is cooled to a temperature lower than the $A_1$ transformation point. Then, in treatment $T_2$ shown in the figure, the material is reheated to a temperature lower than in treatment $T_1$ and oil-quenched. Thereafter, the material is, for example, tempered at a heating temperature of 180° C.

According to the heat treatment, as compared with ordinary quenching, that is, carbonitriding treatment followed by quenching once, cracking strength can be improved and a rate of change in dimension over time can be lowered while a surface layer portion of a bearing component is carbonitrided. According to the heat treatment step (S200), nitrogen enriched layers 11B, 12B, and 13B as a quenched structure can have such a microstructure as shown in FIG. 6 that a grain size of prior austenite crystal grains is equal to or less than ½ of that in a microstructure in a conventional quenched structure shown in FIG. 29. The bearing component subjected to the heat treatment has a long life against rolling fatigue and increased cracking strength, and can also achieve a reduced rate of change in dimension over time.

Then, a working step (S300) is performed. In this step (S300), the material is finished to have a final shape of each bearing component. Roller 12 is provided with crowning profile 22A and chamfered portion 21 by machining such as cutting, as shown in FIG. 4.

Then, an assembling step (S400) is performed. In this step (S400), tapered roller bearing 10 shown in FIG. 9 is obtained by assembling the bearing components prepared as described above. Thus, tapered roller bearing 10 shown in FIG. 1 can be manufactured.

Example 1

From a viewpoint of verifying rotational driving force, a plurality of types of tapered roller bearings including inner rings different in larger flange surfaces were subjected to a rotational torque test. The test model number of tapered roller bearing 10 was 30307D, and rust-proofing oil having kinematic viscosity of 16.5 mm²/s at 40° C. and 3.5 mm²/s at 100° C. was used.

As a tapered roller bearing to be tested, a sample of tapered roller bearing 10 with larger flange surface 18 having arithmetic mean roughness Ra of 0.149 μm and skewness Rsk of a roughness profile of −0.96 and kurtosis Rku of the roughness profile of 4.005 according to the present embodiment was used. Two types of samples for comparison according to the conventional art were used, one including larger flange surface 18 with arithmetic mean roughness Ra of 0.2 μm and the other including a larger flange surface with arithmetic mean roughness Ra of 0.08 μm. Arithmetic mean roughness Ra, skewness Rsk, and kurtosis Rku of the larger flange surface could all be measured by a surface roughness measurement instrument.

The test was conducted by measuring rotational torque when the number of rotations of the tapered roller bearing was changed from 0 r/min. to 200 r/min. A measurement result thereof is shown in FIG. 30.

Figure 30:
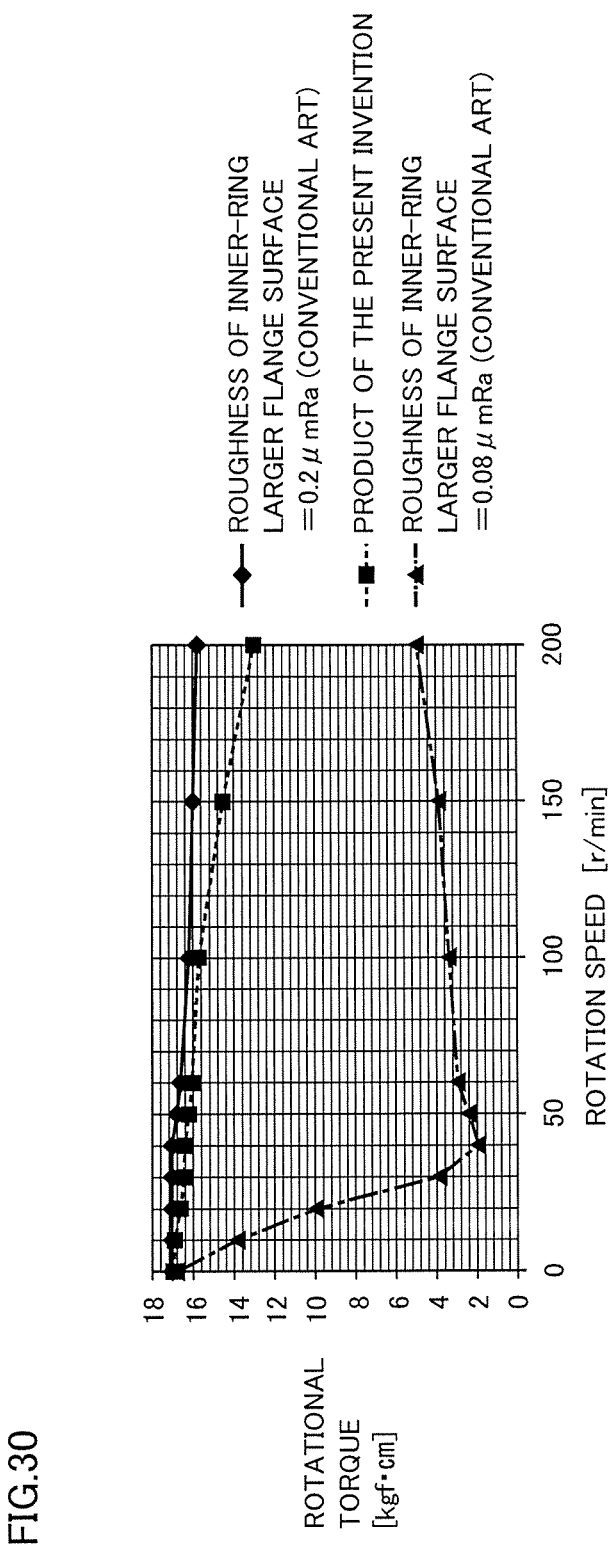
FIG. 30 shows a graph showing a result of a rotational torque test of the tapered roller bearing in the first embodiment.

As shown in FIG. 30, a product of the present invention which is a sample of the present embodiment is substantially equivalent in stable torque characteristic to the conventional product having Ra of 0.2 μm. This is because lubricating oil has a low wedging effect for a range of a low rotation speed of 200 r/min. or less, an oil film thickness of lubricating oil is small, and boundary lubrication is achieved up to the condition of 200 r/min.

A value of rotational torque of the conventional product having Ra of 0.08 μm abruptly decreases even at a rotation speed of 50 r/min. or less, which results from formation of an oil film of a sufficient thickness before reaching 50 r/min. because roughness of the larger flange surface is smaller than others. In the conventional product having Ra of 0.08 μm, rolling resistance at the rolling surface becomes dominant when the rotation speed is 50 r/min. or more.

Preload management (or torque check) after assembly of an actual machine is often performed under such a condition as the number of rotations in a range not lower than 10 r/min. and not higher than 50 r/min. It can be concluded that the product of the present invention which can stabilize torque in that range allows satisfactory assembly of an actual machine.

Example 2

From a viewpoint of verifying seizure resistance, test targets identical in type to the tapered roller bearing subjected to the rotational torque test, that is, samples from the same lot, were subjected to a test at an increased temperature. The test model number of tapered roller bearing 10 was 30307D, and a radial load of 17 kN and a radial load of 1.5 kN were applied. Turbine oil VG56 was used as an oil bath for temperature increase. The temperature of the outer ring of each sample was measured and increase in temperature was checked. A test result is as shown in Table 3 below. In the Table, "a" indicates a temperature of the outer ring not higher than 120° C., "C" indicates a temperature of the outer ring not lower than 120° C. and lower than 150° C., and "B" indicates a temperature of the outer ring not lower than 150° C.

TABLE 3

|  | 500 r/min. | 1000 r/min. | 2000 r/min. | 3000 r/min. | 4000 r/min. | 5000 r/min. |
|---|---|---|---|---|---|---|
| Product with Larger Flange Surface with Roughness Ra = 0.2 μm | A | A | C | B | — | — |
| Product with Larger Flange Surface with Roughness Ra = 0.08 μm | A | A | A | A | A | A |
| Product of Present Invention | A | A | A | A | A | C |

Table 3 shows a result that the product of the present invention was equivalent in seizure resistance to the conventional product with Ra of 0.08 μm.

In order to have such a characteristic, the larger end face of the tapered roller and the larger flange surface of the inner ring are preferably in contact with each other in such relation as "contact between a sphere and a plane." From this point of view, larger flange surface 18 of inner ring 13 according to the present embodiment is preferably a plane generally straight to such an extent that can be obtained in an industrial product.

Example 3

Results evaluated for various combinations of arithmetic mean roughness Ra, skewness Rsk of a roughness profile, and kurtosis Rku of the roughness profile according to the test conducted at an increased temperature and the rotational torque test are shown in Table 4 to Table 7. In each Table, "S" indicates being very good, "A" indicates being good, "C" indicates not being good but not being bad, and "B" indicates being bad.

TABLE 4

| Ra (μm) | Rsk | Rku | Seizure Resistance | Torque Stability |
|---|---|---|---|---|
| 0.05 | −3.0 | 6.0 | S | B |
|  |  | 4.0 |  |  |
|  |  | 2.0 |  |  |
|  | −2.0 | 6.0 | S | B |
|  |  | 4.0 |  |  |
|  |  | 2.0 |  |  |
|  | −1.0 | 6.0 | S | B |
|  |  | 4.0 |  |  |
|  |  | 2.0 |  |  |
|  | −0.2 | 6.0 | S | B |
|  |  | 4.0 |  |  |
|  |  | 2.0 |  |  |
|  | −0.1 | 6.0 | S | B |
|  |  | 4.0 |  |  |
|  |  | 2.0 |  |  |

TABLE 5

| Ra (μm) | Rsk | Rku | Seizure Resistance | Torque Stability |
|---|---|---|---|---|
| 0.1 | −3.0 | 6.0 | B | A |
|  |  | 4.0 | C | A |
|  |  | 2.0 | C | B |
|  | −2.0 | 6.0 | B | A |
|  |  | 4.0 | C | A |
|  |  | 2.0 | C | B |

TABLE 5-continued

| Ra (μm) | Rsk | Rku | Seizure Resistance | Torque Stability |
|---|---|---|---|---|
|  | −1.0 | 6.0 | B | A |
|  |  | 4.0 | A | A |
|  |  | 2.0 | A | B |
|  | −0.2 | 6.0 | C | A |
|  |  | 4.0 | C | C |
|  |  | 2.0 | A | B |

TABLE 5-continued

| Ra (μm) | Rsk | Rku | Seizure Resistance | Torque Stability |
|---|---|---|---|---|
| | −0.1 | 6.0 | B | A |
| | | 4.0 | B | A |
| | | 2.0 | C | B |

TABLE 6

| Ra (μm) | Rsk | Rku | Seizure Resistance | Torque Stability |
|---|---|---|---|---|
| 0.2 | −3.0 | 6.0 | B | A |
| | | 4.0 | C | A |
| | | 2.0 | A | C |
| | −2.0 | 6.0 | B | A |
| | | 4.0 | C | A |
| | | 2.0 | A | C |
| | −1.0 | 6.0 | B | A |
| | | 4.0 | A | A |
| | | 2.0 | A | C |
| | −0.2 | 6.0 | C | A |
| | | 4.0 | C | C |
| | | 2.0 | C | C |
| | −0.1 | 6.0 | B | A |
| | | 4.0 | C | C |
| | | 2.0 | C | C |

TABLE 7

| Ra (μm) | Rsk | Rku | Seizure Resistance | Torque Stability |
|---|---|---|---|---|
| 0.25 | −3.0 | 6.0 | B | S |
| | | 4.0 | | |
| | | 2.0 | | |
| | −2.0 | 6.0 | B | S |
| | | 4.0 | | |
| | | 2.0 | | |
| | −1.0 | 6.0 | B | S |
| | | 4.0 | | |
| | | 2.0 | | |
| | −0.2 | 6.0 | B | S |
| | | 4.0 | | |
| | | 2.0 | | |
| | −0.1 | 6.0 | B | S |
| | | 4.0 | | |
| | | 2.0 | | |

A larger flange surface having arithmetic mean roughness Ra of 0.05 μm has a finished surface with a particularly smooth texture as shown in Table 4. Therefore, it can be seen that, regardless of whether the larger flange surface has skewness Rsk of the roughness profile in a range not smaller than −1.0 and not greater than −0.3 and regardless of whether the larger flange surface has kurtosis Rku of the roughness profile in a range not smaller than 3.0 and not greater than 5.0, particularly satisfactory seizure resistance is obtained whereas torque stability is particularly poor.

As shown in Tables 5 and 6, when a larger flange surface having arithmetic mean roughness Ra of 0.1 μm or 0.2 μm is compared with that having arithmetic mean roughness Ra=0.05, the former tends to exhibit poorer seizure resistance and higher torque stability than the latter. It can be seen that, when a larger flange surface has skewness Rsk of the roughness profile satisfying relation of Rsk<−1.0, an oil film is less likely to be formed, which is disadvantageous for seizure resistance. When a larger flange surface has skewness Rsk of the roughness profile satisfying relation of Rsk>−0.3, both of seizure resistance and torque stability cannot be achieved due to trade-off between skewness and characteristics of kurtosis Rku of the roughness profile of the larger flange surface shown below. It can further be seen that, when a larger flange surface has kurtosis Rku of the roughness profile satisfying relation of Rku<3, an oil film is excessively formed, which is disadvantageous for torque stability. It can be seen that, when a larger flange surface has kurtosis Rku of the roughness profile satisfying relation of Rku>5, a surface has excessively sharp small peaks, which are readily in metal-to-metal contact with the larger end face of the roller, and an oil film is less likely to be formed, which is disadvantageous for seizure resistance.

As shown in Table 7, when a larger flange surface having arithmetic mean roughness Ra of 0.25 μm is compared with those shown in Tables 5 and 6, the former exhibits further poorer seizure resistance and higher torque stability than the latter. Specifically, it can be seen that, regardless of whether the larger flange surface has skewness Rsk of the roughness profile in the range not smaller than 1.0 and not greater than 0.3 and regardless of whether the larger flange surface has kurtosis Rku of the roughness profile in the range not smaller than 3.0 and not greater than 5.0, torque stability is particularly satisfactory whereas seizure resistance is particularly poor.

Thus, it can be seen that a product of the present invention with larger flange surface 18 having arithmetic mean roughness Ra of 0.1 μm≤Ra≤0.2 μm, skewness Rsk of the roughness profile of −1.0≤Rsk≤−0.3, and kurtosis Rku of the roughness profile of 3.0≤Rku≤5.0 can achieve both of seizure resistance and torque stability.

Example 4

<Samples>

Four types of tapered rollers of samples Nos. 1 to 4 were prepared as samples. The model number of the tapered rollers was 30206. As a material for the tapered rollers, a JIS SUJ2 material (1.0 mass % of C-0.25 mass % of Si-0.4 mass % of Mn-1.5 mass % of Cr) was used.

Sample No. 1 was carbonitrided and quenched, and thereafter provided at opposing ends with a logarithmic crowning profile according to the present embodiment shown in FIG. 5. The sample was carbonitrided at 845° C. for 150 minutes. The sample was carbonitrided in an atmosphere of RX gas+ammonia gas. Sample No. 2 was carbonitrided and quenched similarly to sample No. 1, and thereafter provided with a partially arcuate crowning profile shown in FIG. 8.

Sample No. 3 was subjected to the heat treatment pattern shown in FIG. 27, and thereafter provided at opposing ends with a logarithmic crowning profile according to the present embodiment shown in FIG. 5. The sample was carbonitrided at 845° C. for 150 minutes. The sample was carbonitrided in an atmosphere of RX gas+ammonia gas. The sample was finally quenched at 800° C.

Sample No. 4 was subjected to the heat treatment pattern shown in FIG. 27, and thereafter provided at opposing ends with a logarithmic crowning profile according to the present embodiment shown in FIG. 5. In order to achieve a nitrogen concentration not lower than 0.1 mass % in the nitrogen enriched layer at a position of depth of 0.05 mm from the outermost surface of the sample, the sample was carbonitrided at 845° C. for 150 minutes. The sample was carbonitrided in an atmosphere of RX gas+ammonia gas. The atmosphere in the furnace was strictly controlled. Specifically, unevenness of the temperature in the furnace and unevenness of the ammonia gas atmosphere were suppressed. The sample was finally quenched at 800° C. Samples Nos. 3 and 4 described above correspond to Examples of the present invention. Samples Nos. 1 and 2 correspond to Comparative Examples.

<Contents of Experiments>

Experiment 1: Life Test

A life test apparatus was employed. As test conditions, test loads of Fr=18 kN and Fa=2 kN, lubricating oil of turbine oil 56, and a lubricating system of oil bath lubrication were applied. In the life test apparatus, two tapered roller bearings to be tested were arranged to support a support shaft at opposing ends. At a central portion of the support shaft in a direction of extension, that is, at a central portion between the two tapered roller bearings, a cylindrical roller bearing for applying a radial load to the tapered roller bearings via the support shaft was arranged. By applying a radial load to the load applying cylindrical roller bearing, the radial load was applied to the tapered roller bearings to be tested. An axial load was transmitted from one tapered roller bearing to the support shaft through a housing of the life test apparatus and applied to the other tapered roller bearing. Thus, the tapered roller bearing was subjected to the life test.

Experiment 2: Life Test with Unevenly Distributed Load Applied

The same test apparatus as in the life test in Experiment 1 was used. Although test conditions were basically the same as those in Experiment 1, an axial inclination of 2/1000 rad with respect to a central axis of the roller was applied and the test was conducted with an unevenly distributed load being applied.

Experiment 3: Rotational Torque Test

Samples Nos. 1 to 4 were subjected to a torque measurement test by using a vertical torque test rig. As test conditions, a test load of Fa=7000 N, lubricating oil of turbine oil 56, a lubrication system of oil bath lubrication, and the number of rotations of 5000 rpm were applied.

<Result>

Experiment 1: Life Test

Sample No. 4 exhibited the best result and was considered to have a long life. While samples Nos. 2 and 3 were not comparable to Sample No. 4, they exhibited good results and were thus determined to be sufficiently durable for practical use. Sample No. 1 was shortest in life.

Experiment 2: Life Test with Unevenly Distributed Load Applied

Samples Nos. 4 and 3 exhibited the best result and were considered to have a long life. Sample No. 1 presented a relatively satisfactory result although it was not comparable to samples Nos. 4 and 3. Sample No. 2 presented a result worse than in Experiment 1, and is believed to have a short life due to the unevenly distributed load.

Experiment 3: Rotational Torque Test

Samples Nos. 1, 3, and 4 presented sufficiently small rotational torque and thus presented a good result. In contrast, sample No. 2 was larger in rotational torque than other samples.

From the above results, sample No. 4 generally presented a good result in any of the tests, and thus generally provided the best result. Sample No. 3 also presented a result better than that of samples Nos. 1 and 2.

Figure 31:
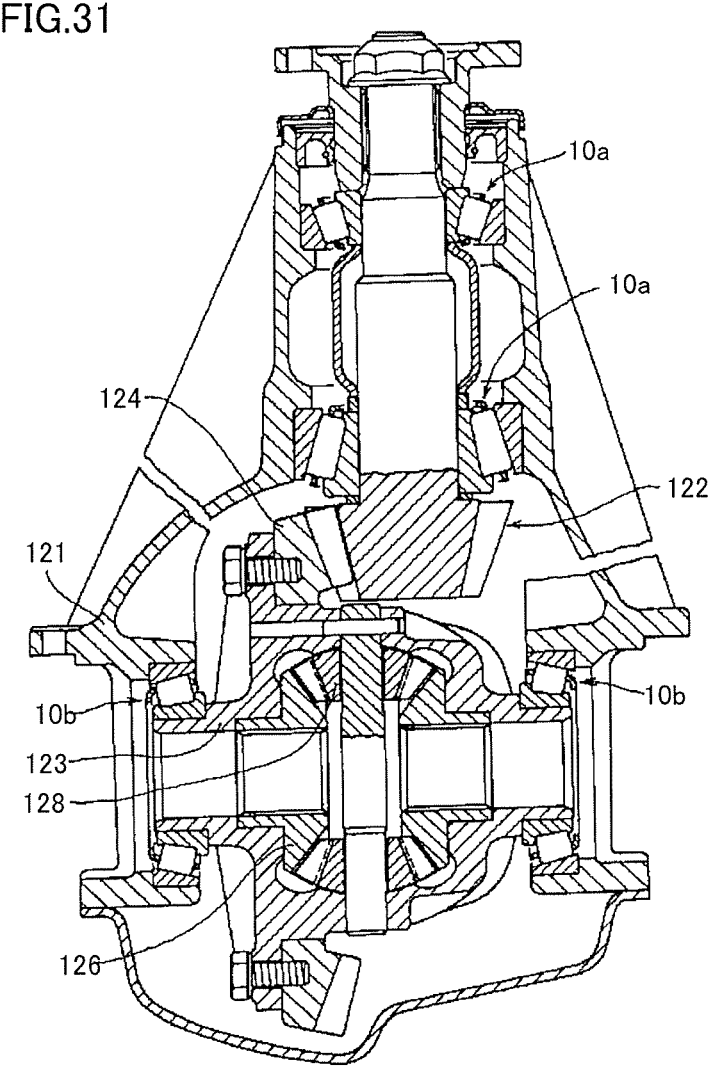
FIG. 31 is a vertical cross-sectional view of a differential gear incorporating a gear shaft support apparatus including the tapered roller bearing in the first embodiment.

An exemplary application of tapered roller bearing 10 according to the present embodiment will be described below. Tapered roller bearing 10 described above is suitably incorporated, for example, in a differential gear or a transmission of an automobile. Tapered roller bearing 10 is suitably used as a tapered roller bearing for an automobile. FIG. 31 shows an exemplary application of tapered roller bearing 10 in the present embodiment to a differential gear of an automobile. FIG. 31 shows a differential gear of an automobile including tapered roller bearing 10 described above. The differential gear is such that a drive pinion 122 coupled to a propeller shaft (not shown) and inserted through a differential case 121 is meshed with a ring gear 124 attached to a differential gear case 123 and a pinion gear 125 attached inside differential gear case 123 is meshed with a side gear 126 coupled to a drive shaft (not shown) inserted through differential gear case 123 from right and left sides so that driving force from an engine is transmitted from the propeller shaft to the left and right drive shafts. In this differential gear, drive pinion 122 serving as a power transmission shaft and differential gear case 123 are supported by a pair of tapered roller bearings 10a and a pair of tapered roller bearings 10b, respectively.

Figure 32:
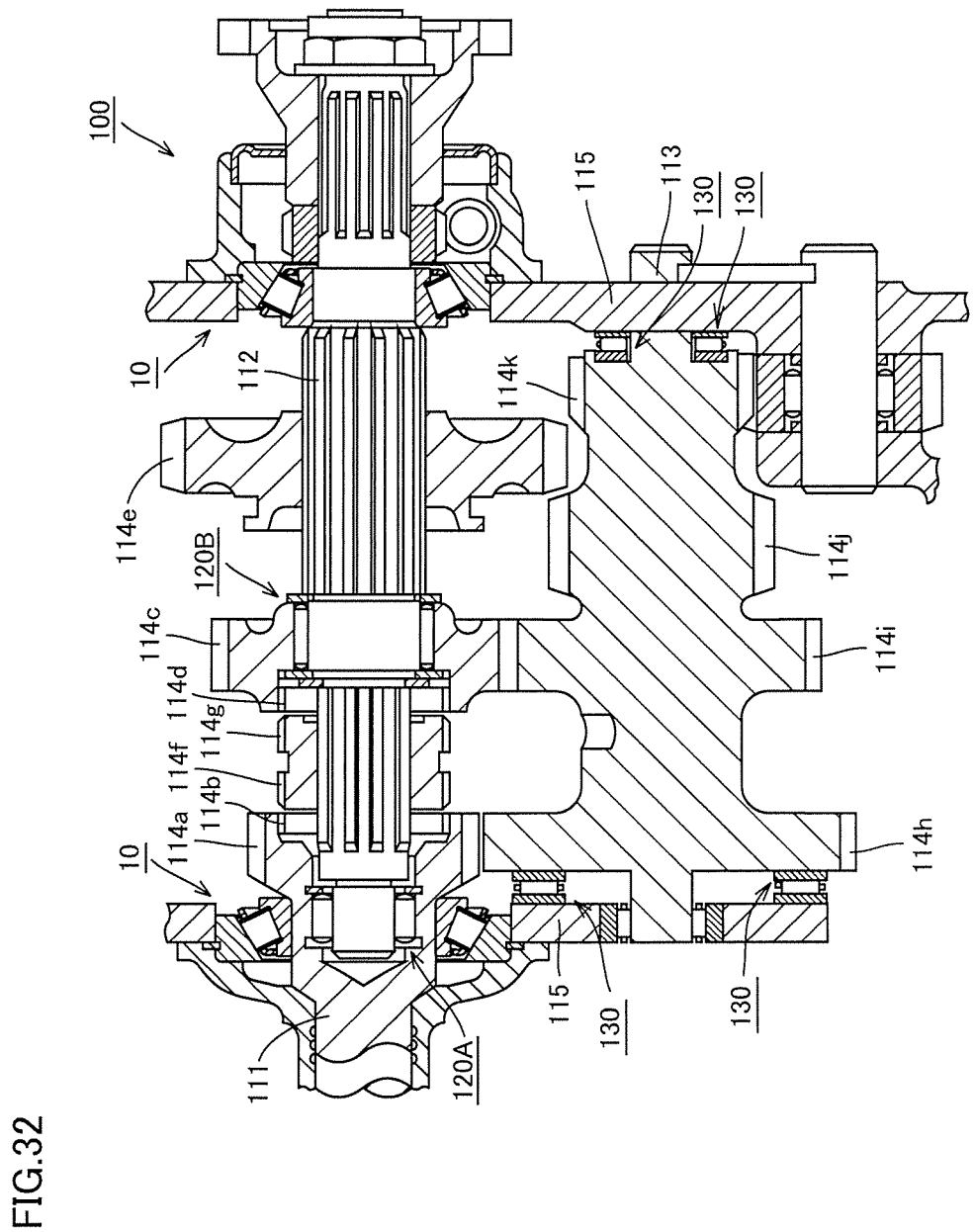
FIG. 32 is a vertical cross-sectional view of a transmission including the tapered roller bearing according to the first embodiment.

Tapered roller bearing 10 in the present embodiment may be incorporated for supporting a gear shaft of a powertrain such as a transmission. Referring to FIG. 32, a manual transmission 100 is a constantly meshing manual transmission, and includes an input shaft 111, an output shaft 112, a countershaft 113, gears 114a to 114k, and a housing 115.

Input shaft 111 is rotatably supported by tapered roller bearing 10 with respect to housing 115. Gear 114a is formed around an outer circumference of input shaft 111 and gear 114b is formed around an inner circumference thereof.

Output shaft 112 is supported by tapered roller bearing 10 on one side (a right side in the figure) rotatably with respect to housing 115 and supported by a rolling bearing 120A on the other side (a left side in the figure) rotatably with respect to input shaft 111. Gears 114c to 114g are attached to output shaft 112.

Gears 114c and 114d are formed around outer and inner circumferences, respectively, of the same member. The member on which gears 114c and 114d are formed is rotatably supported by a rolling bearing 120B with respect to output shaft 112. Gear 114e is attached to output shaft 112 so as to rotate together with output shaft 112 and be slidable along the axis of output shaft 112.

Gears 114f and 114g are formed around an outer circumference of the same member. The member on which gears 114f and 114g are formed is attached to output shaft 112 so as to rotate together with output shaft 112 and be slidable along the axis of output shaft 112. When the member on which gear 114f and gear 114g are formed slides to the left in the figure, gear 114f can mesh with gear 114b, and when the member slides to the right in the figure, gear 114g can mesh with gear 114d.

Countershaft 113 have gears 114h to 114k formed. Two thrust needle roller bearings are arranged between countershaft 113 and housing 115, and a load applied in the axial direction of countershaft 113 (a thrust load) is supported thereby. Gear 114h is constantly in mesh with gear 114a, and gear 114i is constantly in mesh with gear 114c. Gear 114j can mesh with gear 114e when gear 114e slides to the left in the figure. Gear 114k can mesh with gear 114e when gear 114e slides to the right in the figure.

A shift operation of manual transmission 100 will now be described. In manual transmission 100, rotation of input shaft 111 is transmitted to countershaft 113 by meshing of gear 114a formed on input shaft 111 and gear 114h formed on countershaft 113. Rotation of countershaft 113 is transmitted to output shaft 112 by meshing of gears 114i to 114k formed on countershaft 113 and gears 114c and 114e attached to output shaft 112. Thus, rotation of input shaft 111 is transmitted to output shaft 112.

When rotation of input shaft 111 is transmitted to output shaft 112, a rotation speed of output shaft 112 can be changed stepwise relative to a rotation speed of input shaft 111 by changing a gear meshed between input shaft 111 and countershaft 113 and a gear meshed between countershaft 113 and output shaft 112. Rotation of input shaft 111 can also directly be transmitted to output shaft 112 by directly meshing gear 114b of input shaft 111 with gear 114f of output shaft 112 without countershaft 113 being interposed.

The shift operation of manual transmission 100 will more specifically be described below. When gear 114f does not mesh with gear 114b, gear 114g does not mesh with gear 114d, and gear 114e meshes with gear 114j, driving force of input shaft 111 is transmitted to output shaft 112 via gear 114a, gear 114h, gear 114j, and gear 114e. This is referred to, for example, as a first speed.

When gear 114g meshes with gear 114d and gear 114e does not mesh with gear 114j, driving force of input shaft 111 is transmitted to output shaft 112 via gear 114a, gear 114h, gear 114i, gear 114c, gear 114d, and gear 114g. This is referred to, for example, as a second speed.

When gear 114f meshes with gear 114b and gear 114e does not mesh with gear 114j, input shaft 111 is directly coupled to output shaft 112 by meshing of gear 114b and gear 114f, and driving force of input shaft 111 is directly transmitted to output shaft 112. This is referred to, for example, as a third speed.

As described above, manual transmission 100 includes tapered roller bearing 10 for rotatably supporting input shaft 111 and output shaft 112 as rotary members with respect to housing 115 arranged adjacent thereto. Thus, tapered roller bearing 10 according to the embodiment can be used in manual transmission 100. Tapered roller bearing 10 with less torque loss and improved seizure resistance and lifetime is suitable for use in manual transmission 100 in which a high contact pressure is applied between a rolling element and a raceway member.

In transmissions, differential gears, or the like which are powertrains for automobiles, not only lubricating oil low in viscosity is employed but also an amount of oil tends to be reduced for enhanced fuel economy, and formation of a sufficient oil film in a tapered roller bearing may be less likely. When the transmission or the differential gear is used in a low-temperature environment (for example, from −40° C. to −30° C.), viscosity of lubricating oil increases. Therefore, in particular at the time of start, lubricating oil may not sufficiently be supplied to the tapered roller bearing due to splash lubrication caused by rotation of the gear. Therefore, tapered roller bearings for automobiles are required to achieve improved seizure resistance and longer life. The requirement can be satisfied by incorporating tapered roller bearing 10 achieving improved seizure resistance and longer life into a transmission or a differential gear.

Second Embodiment

<Construction of Tapered Roller Bearing>

Figure 33:
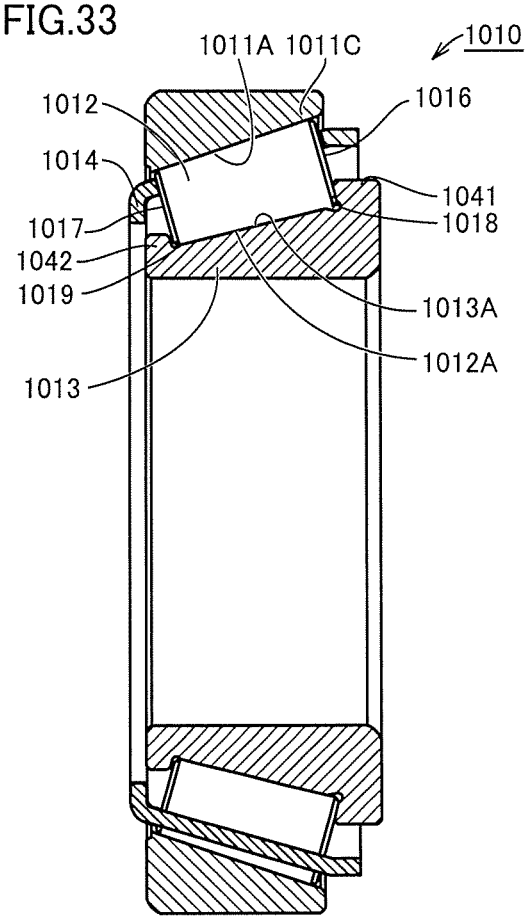
FIG. 33 is a vertical cross-sectional view showing a tapered roller bearing according to a second embodiment.
Figure 34:
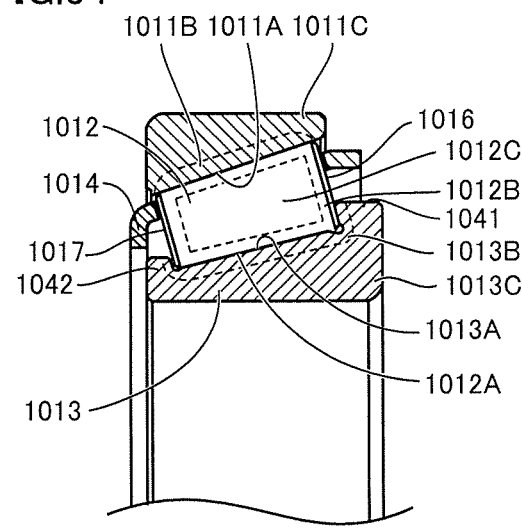
FIG. 34 is a partial cross-sectional view for illustrating a nitrogen enriched layer in the tapered roller bearing according to the second embodiment.
Figure 35:
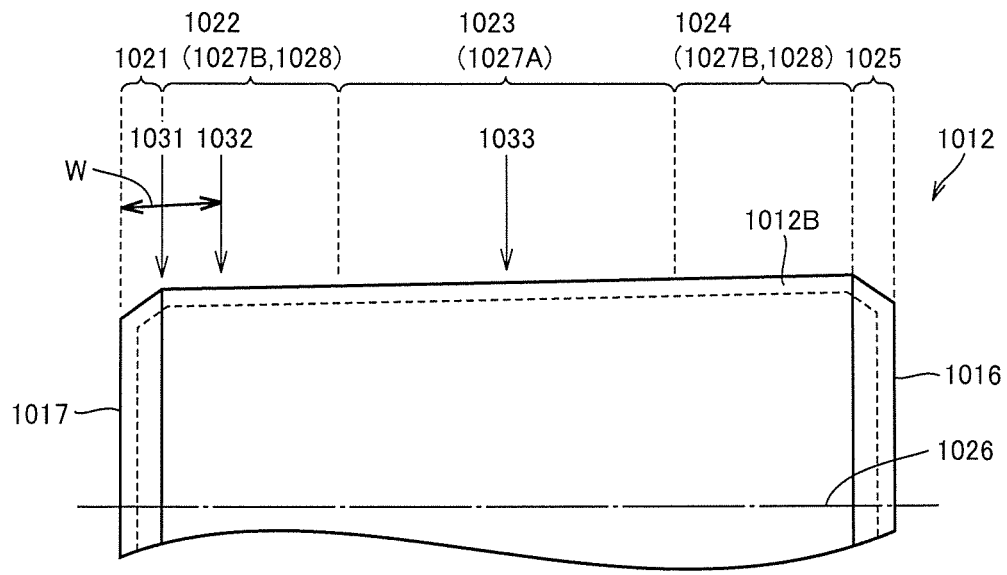
FIG. 35 is a diagram for illustrating a shape of the nitrogen enriched layer in a crowned portion and a central portion of a roller of the tapered roller bearing according to the second embodiment.
Figure 36:
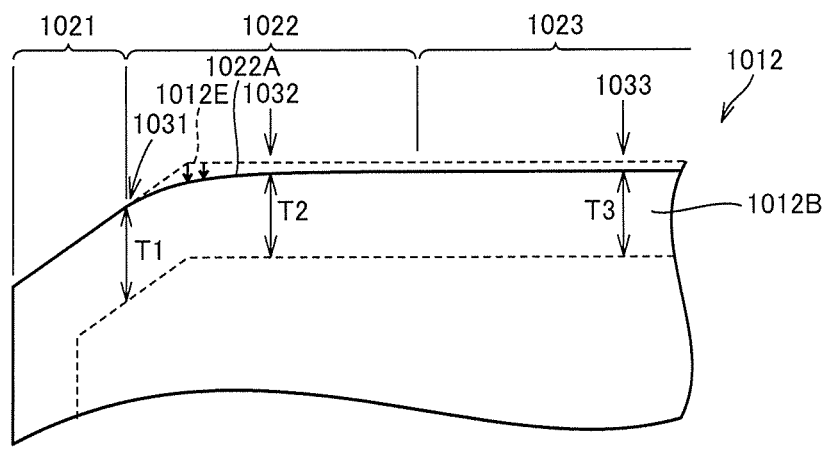
FIG. 36 is a diagram for illustrating a logarithmic crowning profile of the roller of the tapered roller bearing according to the second embodiment.

FIG. 33 is a schematic cross-sectional view of a tapered roller bearing according to an embodiment of the present invention. FIG. 34 is a schematic partial cross-sectional view of the tapered roller bearing shown in FIG. 33. FIG. 35 is a schematic partial cross-sectional view of a tapered roller of the tapered roller bearing shown in FIG. 33. FIG. 36 is a schematic enlarged partial cross-sectional view of the tapered roller shown in FIG. 35. The tapered roller bearing according to the present embodiment will be described with reference to FIGS. 33 to 36.

A tapered roller bearing 1010 shown in FIG. 33 mainly includes an outer ring 1011, an inner ring 1013, a plurality of rollers 1012, and a cage 1014. Outer ring 1011 has an annular shape and includes an outer-ring raceway surface 1011A around its inner circumferential surface. Inner ring 1013 has an annular shape and includes an inner-ring raceway surface 1013A around its outer circumferential surface. Inner ring 1013 is arranged on an inner circumferential side of outer ring 1011 such that inner-ring raceway surface 1013A faces outer-ring raceway surface 1011A.

Rollers 1012 are arranged on the inner circumferential surface of outer ring 1011. Roller 1012 has a roller rolling surface 1012A and comes in contact with inner-ring raceway surface 1013A and outer-ring raceway surface 1011A at roller rolling surface 1012A. The plurality of rollers 1012 are arranged at a prescribed pitch in the circumferential direction in cage 1014 made of a synthetic resin. Thus, roller 1012 is held on the annular raceway of outer ring 1011 and inner ring 1013 in a rollable manner. Tapered roller bearing 1010 is constructed such that the apex of a cone including outer-ring raceway surface 1011A, the apex of a cone including inner-ring raceway surface 1013A, and the apex of a cone including the locus of the rotation axis of roller 1012 when the roller rolls meet at one point on the centerline of the bearing. According to such a construction, outer ring 1011 and inner ring 1013 of tapered roller bearing 1010 are rotatable relative to each other.

Outer ring 1011, inner ring 1013, and roller 1012 may be formed of steel. Steel at least contains at least 0.6 mass % and at most 1.2 mass % of carbon, at least 0.15 mass % and at most 1.1 mass % of silicon, and at least 0.3 mass % and at most 1.5 mass % of manganese in a portion other than nitrogen enriched layers 1011B, 1012B, and 1013B. Steel may further contain at most 2.0 mass % of chromium.

In the above construction, when a carbon content exceeds 1.2 mass %, cold workability is impaired by a high hardness of a material in spite of spheroidizing annealing, and a sufficient amount of cold working and sufficient working accuracy cannot be obtained in cold working. In addition, an over-carburized structure tends to be formed during carbonitriding treatment and cracking strength may be lowered. When the carbon content is lower than 0.6 mass %, it takes a long time to ensure a required surface hardness and a required amount of retained austenite, and it is difficult to obtain a required internal hardness in quenching after reheating.

The Si content of 0.15 to 1.1 mass % is set because Si can increase resistance against softening by tempering to ensure heat resistance and thus improve rolling fatigue life characteristics under lubrication with foreign matters being introduced. When the Si content is lower than 0.15 mass %, the rolling fatigue life characteristics under lubrication with foreign matters being introduced are not improved. When the Si content exceeds 1.1 mass %, a hardness after normalizing becomes too high to impair cold workability.

Mn is effective for ensuring hardenability of a carbonitrided layer and a core portion. When the Mn content is lower than 0.3 mass %, sufficient hardenability cannot be obtained and sufficient strength cannot be ensured in the core portion. When the Mn content exceeds 1.5 mass %, hardenability becomes excessive, and a hardness after normalizing becomes high and cold workability is impaired. Furthermore, austenite is excessively stabilized, which leads to an excessive amount of retained austenite in the core portion and acceleration of dimensional change over time. When steel contains at most 2.0 mass % of chromium, a carbide or a nitride of chromium is precipitated at a surface layer portion and a hardness of the surface layer portion can easily be enhanced. The Cr content of at most 2.0 mass % is set because the Cr content exceeding 2.0 mass % leads to significant lowering in cold workability and the content exceeding 2.0 mass % is less in effect of enhancement to a hardness of the surface layer portion.

Naturally, steel in the present disclosure may contain Fe as a main component, and may contain an inevitable impurity in addition to the elements above. Examples of the inevitable impurity include phosphorus (P), sulfur (S), nitrogen (N), oxygen (O), aluminum (Al), and the like. An amount of these inevitable impurity elements is 0.1 mass % or less.

From a different point of view, outer ring 1011 and inner ring 1013 are preferably made of a steel material representing a bearing material such as JIS SUJ2. Roller 1012 may be made of a steel material representing a bearing material such as JIS SUJ2. Alternatively, roller 1012 may be made of another material such as a sialon sintered material.

As shown in FIG. 34, nitrogen enriched layers 1011B and 1013B are formed in raceway surface 1011A of outer ring 1011 and raceway surface 1013A of inner ring 1013, respectively. In inner ring 1013, nitrogen enriched layer 1013B extends from raceway surface 1013A to a smaller flange surface and a larger flange surface. Nitrogen enriched layers 1011B and 1013B are regions higher in nitrogen concentration than an unnitrided portion 1011C of outer ring 1011 and an unnitrided portion 1013C of inner ring 1013. Nitrogen enriched layer 1012B is formed in a surface of roller 1012 including rolling surface 1012A. Nitrogen enriched layer 1012B of roller 1012 is a region higher in nitrogen concentration than an unnitrided portion 1012C of roller 1012. Nitrogen enriched layers 1011B, 1012B, and 1013B can be formed by any conventionally well-known method such as carbonitriding and nitriding.

Nitrogen enriched layer 1012B may be formed only in roller 1012, nitrogen enriched layer 1011B may be formed only in outer ring 1011, or nitrogen enriched layer 1013B may be formed only in inner ring 1013. Alternatively, a nitrogen enriched layer may be formed in two of outer ring 1011, inner ring 1013, and roller 1012.

As shown in FIG. 35, rolling surface 1012A (see FIG. 34) of roller 1012 includes crowned portions 1022 and 1024 located at opposing ends and a central portion 1023 which connects crowned portions 1022 and 1024 to each other. Central portion 1023 is uncrowned and linear in a cross-section in a direction along a centerline 1026 which is the rotation axis of roller 1012. A chamfered portion 1021 is formed between an end face 1017 of roller 1012 and crowned portion 1022. A chamfered portion 1025 is also formed between an end face 1016 and crowned portion 1024.

In a method of manufacturing roller 1012, in treatment for forming nitrogen enriched layer 1012B (carbonitriding treatment), roller 1012 is not crowned but an outer geometry of roller 1012 is a yet-to-be-worked surface 1012E as shown with a dotted line in FIG. 36. After the nitrogen-enriched layer is formed in this state, roller 1012 has a side surface worked as shown with an arrow in FIG. 36 as finishing so that crowned portions 1022 and 1024 are obtained as shown in FIGS. 35 and 36.

Thickness of Nitrogen Enriched Layer:

A depth of nitrogen-enriched layer 1012B in roller 1012, that is, a distance from the outermost surface of nitrogen-enriched layer 1012B to the bottom of nitrogen-enriched layer 1012B, is 0.2 mm or more. Specifically, at a first measurement point 1031 representing a boundary point between chamfered portion 1021 and crowned portion 1022, a second measurement point 1032 at a distance W of 1.5 mm from an end face 1017, and a measurement point 1033 at the center of the rolling surface of the roller, depths T1, T2, and T3 of nitrogen enriched layer 1012B at these positions are 0.2 mm or more. The depth of nitrogen enriched layer 1012B means a thickness of nitrogen enriched layer 1012B in a radial direction orthogonal to centerline 1026 of roller 1012 and also toward the outer circumference. Values of depths T1, T2, and T3 of nitrogen enriched layer 1012B can be modified as appropriate, depending on a shape and a size of chamfered portions 1021 and 1025 and a process condition such as a condition for treatment to form nitrogen enriched layer 1012B and a condition for finishing. For example, in the exemplary construction shown in FIG. 36, depth T2 of nitrogen enriched layer 1012B is smaller than other depths T1 and T3 thereof due to formation of a crowning profile 1022A after formation of nitrogen enriched layer 1012B as described above. By changing the process condition described above, however, relation in magnitude among the values of depths T1, T2, and T3 of nitrogen enriched layer 10128 can be modified as appropriate.

A thickness of nitrogen enriched layers 1011B and 1013B in outer ring 1011 and inner ring 1013 representing a distance from the outermost surface to the bottom thereof is again not smaller than 0.2 mm. The thickness of nitrogen enriched layers 1011B and 1013B means a distance to nitrogen enriched layers 1011B and 1013B in a direction perpendicular to the outermost surface of nitrogen enriched layers 1011B and 1013B.

Crowning Profile:

A crowning profile formed in crowned portions 1022 and 1024 of roller 1012 is defined as below. More specifically, a sum of crown drops is expressed in a y-z coordinate system with a generatrix of rolling surface 1012A of roller 1012 being defined as the y axis and a direction orthogonal to the generatrix being defined as the z axis, by the expression (1) where $K_1$, $K_2$, and $z_m$ represent design parameters, Q represents a load, L represents a length of an effective contact portion of rolling surface 1012A of roller 1012 along the generatrix, E' represents an equivalent elastic modulus, a represents a length from an origin on the generatrix of the rolling surface of roller 1012 to an end of the effective contact portion, and A is defined as $A=2K_1Q/\pi LE'$.

Figure 37:
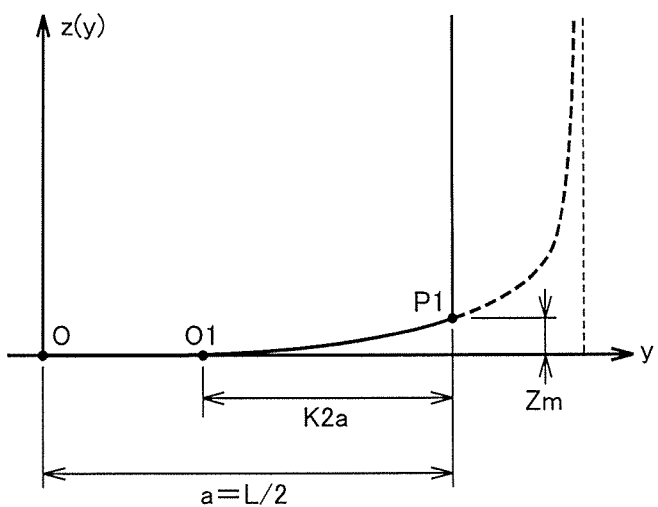
FIG. 37 is a y-z coordinate diagram representing an exemplary crowning profile.

FIG. 37 is a y-z coordinate diagram representing an exemplary crowning profile. FIG. 37 shows one exemplary crowning profile expressed in the expression (1) in a y-z coordinate system with a generatrix of roller 1012 being defined as the y axis, the origin O taken on the generatrix of roller 1012 at the central portion of the effective contact portion between inner ring 1013 or outer ring 1011 and roller 1012, and a direction (a direction of radius) orthogonal to the generatrix being defined as the z axis. In FIG. 37, the ordinate represents the z axis and the abscissa represents the y axis. The effective contact portion is a portion of contact between inner ring 1013 or outer ring 1011 and roller 1012 when roller 1012 is uncrowned. Since the plurality of rollers 1012 constituting tapered roller bearing 1010 are normally crowned in line symmetry with respect to the z axis passing through the central portion of the effective contact portion, FIG. 37 only shows one crowning profile 1022A.

Load Q, length L of the effective contact portion along the generatrix, and equivalent elastic modulus E' are given as design conditions, and length a from the origin to the end of the effective contact portion is a value determined by the position of the origin.

In the expression (1), z(y) represents drop of crowning profile 1022A at a position y in the direction of the generatrix of roller 1012, and a coordinate of starting point O1 of crowning profile 1022A is expressed as $(a-K_2a, 0)$. Therefore, in the expression (1), y has a range of $y>(a-K_2 a)$. In FIG. 37, since origin O is defined at the central portion of the effective contact portion, relation of $a=L/2$ is satisfied. A region from origin O to starting point O1 of crowning profile 1022A is the uncrowned central portion (a straight portion). Therefore, when relation of $0 \le y \le (a-K_2 a)$ is satisfied, relation of $z(y)=0$ is satisfied.

Design parameter $K_1$ means a multiplying factor for load Q and geometrically means a degree of curvature of crowning profile 1022A. Design parameter $K_2$ means a ratio of a length ym of crowning profile 1022A along the generatrix to length a from origin O to the end of the effective contact portion along the generatrix ($K_2$=ym/a). Design parameter $z_m$ means drop at the end of the effective contact portion, that is, maximum drop of crowning profile 1022A.

A crowning profile of the roller shown in FIG. 42 which will be described later is a full crowning profile without a straight portion defined by a design parameter $K_2$=1, and ensures sufficient drop which does not cause edge loading. Excessive drop, however, leads to a large machining allowance taken from a raw material as a material to be worked, which will invite increase in cost. Accordingly, design parameters $K_1$, $K_2$, and $z_m$ are optimized as below.

Design parameters $K_1$, $K_2$, and $z_m$ can be optimized by various methods, and for example, a direct search method such as the Rosenbrock method can be adopted. Since surface-originating damage in a rolling surface of a roller depends on a contact pressure, by setting the contact pressure as an objective function for optimization, a crowning profile that prevents oil film breakage at the contact surface under lean lubrication can be obtained.

Ratio Rprocess/R between actual radius of curvature Rprocess (see FIG. 41) and reference radius of curvature R (see FIG. 40) is not lower than 0.8 where Rprocess represents an actual radius of curvature after working of a larger end face of a tapered roller.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape. From a different point of view, a projection resulting from the punch of the forging apparatus is formed in an outer circumferential portion of a surface to be the larger end face of the formed product obtained by forging. The projection has, for example, an annular two-dimensional shape. At least a part of the projection of the formed product is removed by subsequently performed grinding.

Figure 38:
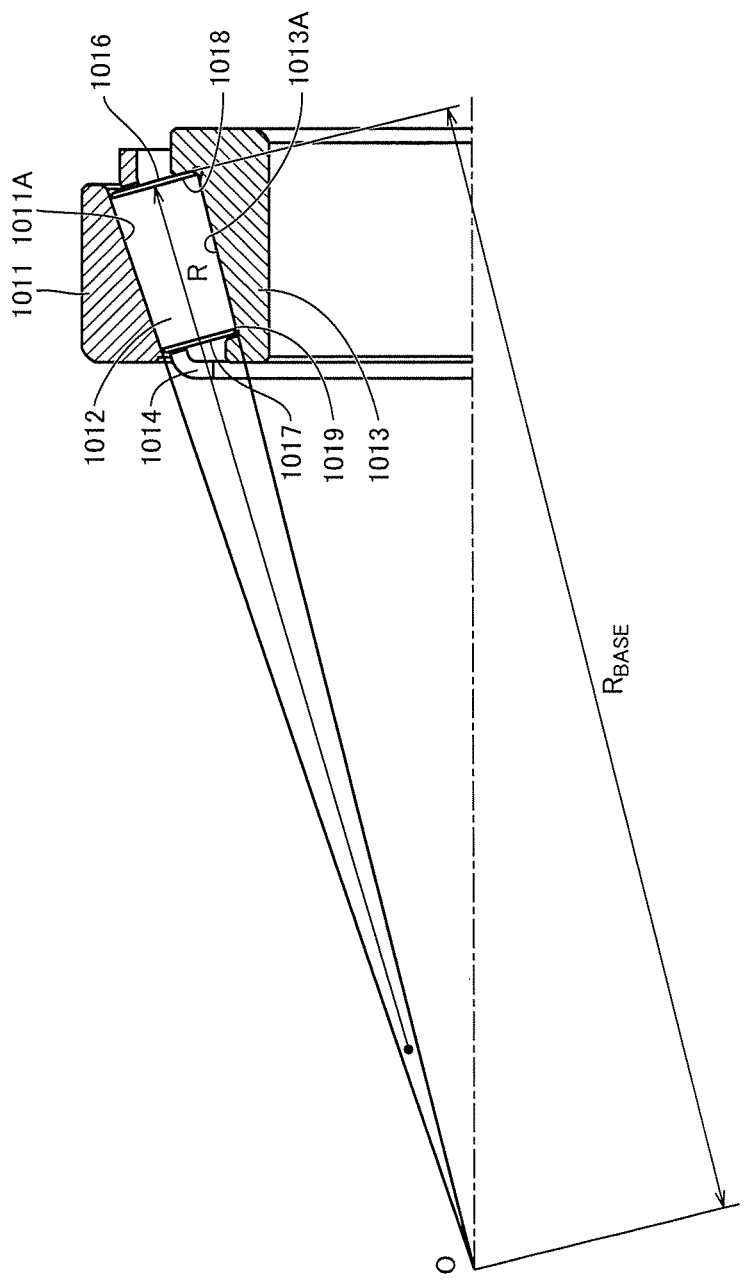
FIG. 38 is a cross-sectional view illustrating design specifications of the tapered roller bearing according to the second embodiment.
Figure 39:
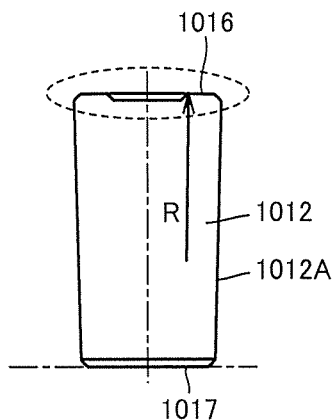
FIG. 39 is a cross-sectional view for illustrating a reference radius of curvature of the roller in the tapered roller bearing according to the second embodiment.
Figure 40:
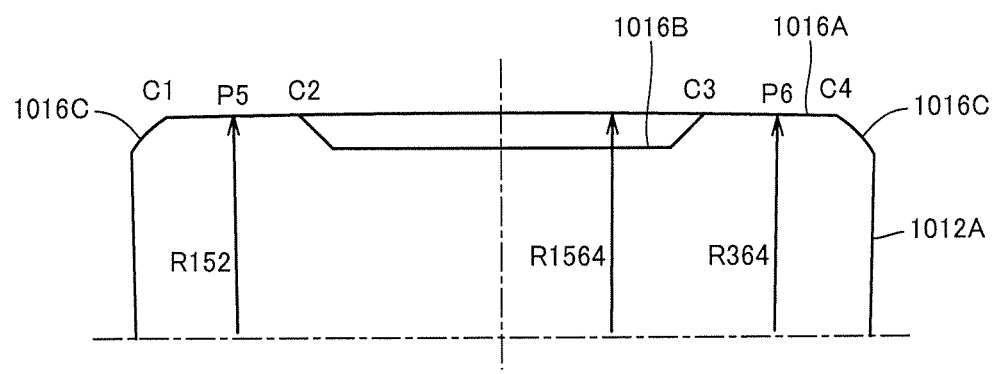
FIG. 40 is a partial cross-sectional view showing an area surrounded by a dotted line in FIG. 39.

FIGS. 39 and 40 are schematic cross-sectional views along an axis of rolling of the tapered roller obtained when grinding is ideally performed. When grinding is ideally performed, the obtained larger end face of the tapered roller defines a part of a spherical surface around apex O (see FIG. 38) of the cone angle of tapered roller 1012. As shown in FIGS. 39 and 40, when such grinding as leaving a part of a projection 1016A is ideally performed, the larger end face of the tapered roller including an end face of projection 1016A defines a part of one spherical surface around the apex of the cone angle of the tapered roller. In this case, an inner circumferential end of projection 1016A in the radial direction around the axis of rolling of the tapered roller is connected to a recess 1016B with points C2 and C3 being interposed. An outer circumferential end of the projection is connected to a chamfered portion with points C1 and C4 being interposed. In the ideal larger end face, points C1 to C4 are arranged on one spherical surface as described above.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape. From a different point of view, a projection resulting from the punch of the forging apparatus is formed in an outer circumferential portion of a surface to be the larger end face of the formed product obtained by forging. The projection has, for example, an annular two-dimensional shape. At least a part of the projection of the formed product is removed by subsequently performed grinding.

Radius of curvature R of a larger end face 1016 of roller 1012 refers to an R dimension when larger end face 1016 of roller 12 shown in FIG. 39 is a set ideal spherical surface. Specifically, as shown in FIG. 40, with points at an end of larger end face 1016 of roller 1012 being defined as C1, C2, C3, and C4, with a point intermediate between points C1 and C2 being defined as P5, and with a point intermediate between points C3 and C4 being defined as P6, radius of curvature R152 which passes through points C1, P5, and C2, a radius of curvature R364 which passes through points C3, P6, and C4, and a radius of curvature R1564 which passes through points C1, P5, P6, and C4 define an ideal single arcuate curve which satisfies relation of R152=R364=R1564. Points C1 and C4 are points of connection between projection 1016A and a chamfered portion 1016C and points C2 and C3 are points of connection between projection 1016A and recess 1016B. The ideal single arcuate curve which satisfies relation of R=R152=R364=R1564 is called a reference radius of curvature. Reference radius of curvature R is different from actual radius of curvature Rprocess measured as a radius of curvature of the larger end face of the roller obtained by actual grinding as will be described later.

Figure 41:
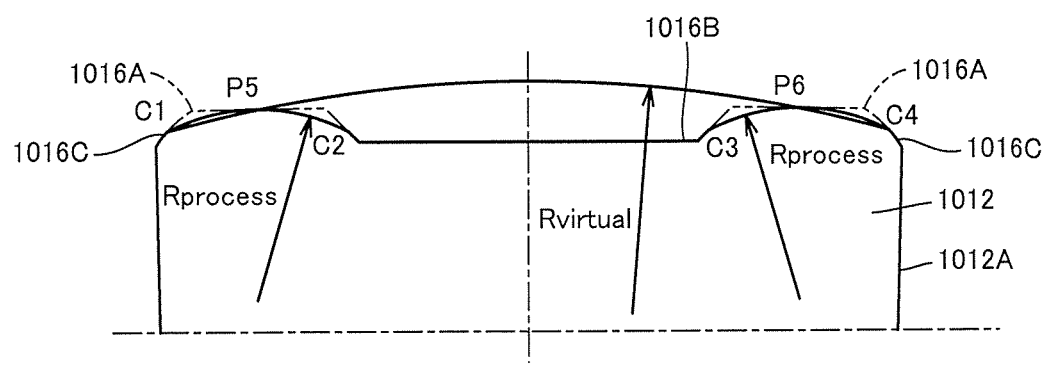
FIG. 41 is a cross-sectional view for illustrating an actual radius of curvature of the roller in the tapered roller bearing according to the second embodiment.

FIG. 41 is a schematic cross-sectional view along the axis of rolling of the tapered roller obtained by actual grinding. FIG. 41 shows the ideal larger end face shown in FIG. 40 with a dotted line. As shown in FIG. 41, the larger end face of the tapered roller actually obtained by grinding a formed product provided with the recess and the projection as above does not define a part of one spherical surface around an apex of a cone angle of the tapered roller. Points C1 to C4 on the projection of the actually obtained tapered roller sag as compared with the projection shown in FIG. 40. As compared with points C1 and C4 shown in FIG. 40, points C1 and C4 shown in FIG. 41 are arranged on an outer circumferential side in the radial direction with respect to the center of the axis of rolling and arranged on an inner side in a direction of extension of the axis of rolling (R152 on one side with respect to R1564 of the entire larger end face 1016 being not identical but being small). As compared with points C2 and C3 shown in FIG. 40, points C2 and C3 shown in FIG. 41 are arranged on an inner circumferential side in the radial direction with respect to the center of the axis of rolling and arranged on the inner side in the direction of extension of the axis of rolling (R364 on one side with respect to R1564 of the entire larger end face 1016 not being identical but being small). Intermediate points P5 and P6 shown in FIG. 41 are formed at positions substantially equal to intermediate points P5 and P6 shown, for example, in FIG. 40.

As shown in FIG. 41, in the larger end face actually formed by grinding, apex C1 and apex C2 are arranged on one spherical surface and apex C3 and apex C4 are arranged on another spherical surface. In general grinding, a radius of curvature of one circular arc defined by a part of the larger end face formed on one projection is substantially equal to a radius of curvature of a circular arc defined by a part of the larger end face formed on the other projection. R152 on one side after working of larger end face 1016 of roller 1012 shown in FIG. 41 is substantially equal to R364 on the other side. R152 and R364 on one side after working of larger end face 1016 of roller 1012 are called actual radius of curvature Rprocess. Actual radius of curvature Rprocess is not greater than reference radius of curvature R.

The tapered roller of the tapered roller bearing according to the present embodiment has ratio Rprocess/R of actual radius of curvature Rprocess to reference radius of curvature R not lower than 0.8.

As shown in FIG. 41, in the larger end face actually formed by grinding, radius of curvature Rvirtual of a virtual circular arc (which is referred to as a virtual radius of curvature below) which passes through apex C1, intermediate point P5, intermediate point P6, and apex C4 is not greater than reference radius of curvature R. The tapered roller of the tapered roller bearing according to the present embodiment has ratio Rprocess/Rvirtual of actual radius of curvature Rprocess to virtual radius of curvature Rvirtual not lower than 0.8.

Actual radius of curvature Rprocess and virtual radius of curvature Rvirtual of the tapered roller actually formed by grinding can be measured by any method, and can be measured, for example, by using a surface roughness measurement instrument (Surface Roughness Tester Surftest SV-100 manufactured by Mitutoyo Corporation). When the surface roughness measurement instrument is used, an axis of measurement is initially set along the radial direction around the axis of rolling and a surface profile of the larger end face is determined. Apexes C1 to C4 and intermediate points P5 and P6 are plotted on the obtained profile of the larger end face. Actual radius of curvature Rprocess is calculated as a radius of curvature of a circular arc which passes through plotted apex C1, intermediate point P5, and apex C2. Virtual radius of curvature Rvirtual is calculated as a radius of curvature of a circular arc which passes through plotted apex C1, intermediate points P5 and P6, and apex C4.

Reference radius of curvature R is estimated based on each dimension of a tapered roller obtained by actual grinding, for example, based on industrial standards such as the JIS.

Preferably, the larger end face has surface roughness Ra not greater than 0.10 µm. Preferably, a larger flange surface has surface roughness Ra not greater than 0.063 µm.

Figure 51:
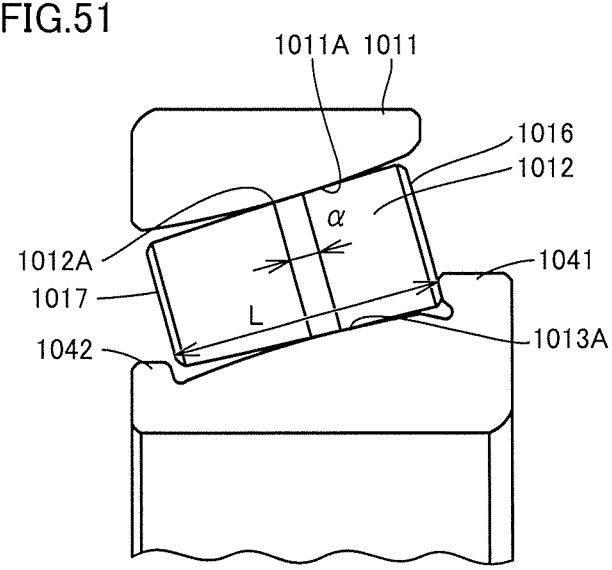
FIG. 51 is a cross-sectional view showing an exemplary method of changing a position of abutment between a raceway surface and a rolling surface in the tapered roller bearing according to the second embodiment.
Figure 52:
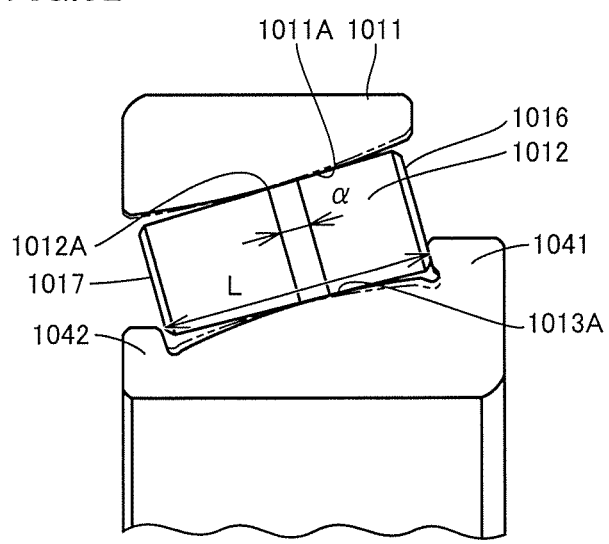
FIG. 52 is a cross-sectional view showing another exemplary method of changing a position of abutment between a raceway surface and a rolling surface in the tapered roller bearing according to the second embodiment.

Preferably, as shown in FIGS. 51 and 52, ratio α/L of amount α of displacement from a midpoint of the rolling surface in a direction of extension of the axis of rolling, of a position of abutment between raceway surface 1011A of outer ring 1011 or raceway surface 1013A of inner ring 1013 and rolling surface 1012A to width L of the roller rolling surface in the direction of extension is not lower than 0% and lower than 20%. The position of abutment when ratio α/L exceeds 0% is located at a central position in the rolling surface or located closer to the larger end face than the central position in the direction of extension of the axis of rolling.

A construction in which ratio α/L exceeds 0% can be realized by relatively displacing a position of an apex of each of a crowning profile formed in the roller rolling surface and a crowning profile formed in raceway surfaces 1011A and 1013A of the inner ring and outer ring 1011 as shown in FIG. 51.

Alternatively, the construction in which ratio α/L exceeds 0% can be realized by relatively varying an angle formed by raceway surface 1013A of the inner ring with respect to the axial direction of the inner ring and an angle formed by raceway surface 1011A of outer ring 1011 with respect to the axial direction of outer ring 1011 as shown in FIG. 52. Specifically, the construction in which ratio α/L exceeds 0% can be realized by at least any method of increasing an angle formed by raceway surface 1013A of the inner ring with respect to the axial direction of the inner ring and decreasing an angle formed by raceway surface 1011A of outer ring 1011 with respect to the axial direction of outer ring 1011 as compared with an example in which amount α of displacement of the position of abutment shown with a dotted line in FIG. 52 is zero.

Ratio $R/R_{BASE}$ between reference radius of curvature R of larger end face 1016 of tapered roller 1012 and distance $R_{BASE}$ from O point to larger flange surface 1018 of inner ring 1013:

The smaller flange surface of inner ring 1013 is finished to a ground surface in parallel to smaller end face 1017 of tapered roller 1012 disposed on raceway surface 1013A.

As shown in FIG. 38, apexes of cone angles of tapered roller 1012 and raceway surfaces 1011A and 1013A of outer ring 1011 and inner ring 1013 meet at one point O on the centerline of tapered roller bearing 1010 and ratio $R/R_{BASE}$ between radius of curvature R of larger end face 1016 of tapered roller 1012 and distance $R_{BASE}$ from the O point to larger flange surface 1018 of inner ring 1013 is within a range not smaller than 0.75 and not greater than 0.87. Larger flange surface 1018 is ground to have surface roughness Ra, for example, not greater than 0.12 µm.

Figure 49:
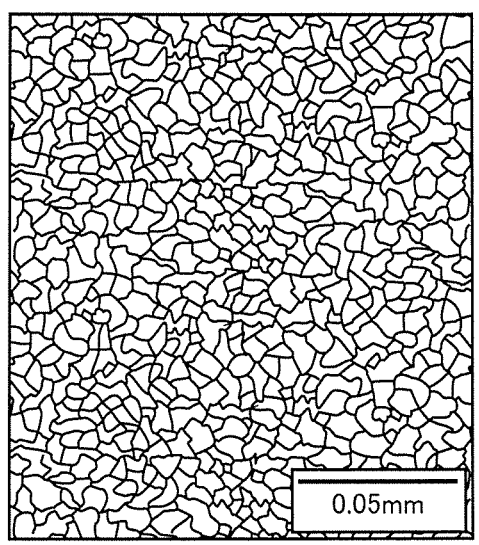
FIG. 49 is a diagram showing an austenite grain boundary of a bearing component according to the second embodiment.

Crystal Structure of Nitrogen-Enriched Layer:

FIG. 49 schematically illustrates a microstructure, in particular a prior austenite crystal grain boundary, of a bearing component constituting the tapered roller bearing according to the present embodiment. FIG. 49 shows a microstructure in nitrogen enriched layer 1012B. A grain size number defined under the JIS, of a prior austenite crystal grain size in nitrogen enriched layer 1012B in the present embodiment is equal to or greater than 10, and the grain size is sufficiently fine even in comparison with a conventional general hardened product.

<Method of Measuring Various Characteristics>

Method of Measuring Nitrogen Concentration:

Bearing components such as outer ring 1011, roller 1012, and inner ring 1013 are subjected to line analysis in a direction of depth by Electron Probe Micro Analysis (EPMA) in cross-sections perpendicular to surfaces of regions where nitrogen enriched layers 1011B, 1012B, and 1013B are formed. Measurement is conducted by cutting each bearing component from a measurement position in a direction perpendicular to the surface to expose a cut surface and subjecting the surface to measurement. For example, roller 1012 is cut from each of first measurement point 1031 to third measurement point 1033 shown in FIG. 35 in a direction perpendicular to centerline 1026 to expose a cut surface. The cut surface is analyzed for a nitrogen concentration by EPMA at a plurality of measurement positions each located at a distance of 0.05 mm inward from the surface of roller 1012. For example, five measurement positions are determined, and an average value of measurement data obtained at the five locations is adopted as a nitrogen concentration of roller 1012.

For outer ring 1011 and inner ring 1013, a central portion of raceway surfaces 1011A and 1013A in the direction of the central axis of the bearing is set as a measurement position and a cross-section along the central axis and a radial direction orthogonal to the central axis is exposed, and the cross-section is thereafter subjected to nitrogen concentration measurement in the same manner as described above.

Method of Measuring Distance from Outermost Surface to Bottom of Nitrogen Enriched Layer:

Outer ring 1011 and inner ring 1013 are subjected to hardness distribution measurement in a direction of depth from a surface in the cross-section subjected to measurement in the method of measuring a nitrogen concentration. A Vickers hardness measurement instrument can be employed for measurement. Tapered roller bearing 1010 tempered at 500° C.×1 h is subjected to hardness measurement at a plurality of measurement points aligned in the direction of depth such as measurement points arranged at intervals of 0.5 mm. A region having a Vickers hardness of HV 450 or more is determined as a nitrogen enriched layer.

Roller 1012 is subjected to hardness distribution measurement in the direction of depth as described above in a cross-section at first measurement point 1031 shown in FIG. 35, to determine the region of the nitrogen enriched layer.

Method of Measuring Grain Size Number:

A prior austenite crystal grain size is measured by a method defined under JIS G0551: 2013. Measurement is conducted in the cross-section subjected to measurement in the method of measuring a distance to the bottom of the nitrogen enriched layer.

Method of Measuring Crowning Profile:

A crowning profile of roller 1012 can be measured by any method. For example, the crowning profile may be measured by measuring the profile of roller 1012 with a three-dimensional profile measurement instrument.

<Function and Effect of Tapered Roller Bearing>

Characteristic features of the above-described tapered roller bearing will be listed below, although description may partially be redundant.

Tapered roller bearing 1010 according to the present disclosure includes outer ring 1011, inner ring 1013, and rollers 1012 as a plurality of tapered rollers. Outer ring 1011 includes outer-ring raceway surface 1011A around an inner circumferential surface thereof. Inner ring 1013 includes inner-ring raceway surface 1013A around an outer circumferential surface thereof, and is arranged on an inner side of outer ring 1011. The plurality of rollers 1012 are disposed between outer-ring raceway surface 1011A and inner-ring raceway surface 1013A, and the roller includes rolling surface 1012A in contact with outer-ring raceway surface 1011A and inner-ring raceway surface 1013A. At least one of outer ring 1011, inner ring 1013, and the plurality of rollers 1012 includes nitrogen enriched layer 1011B, 1013B, or 1012B formed on a surface layer of outer-ring raceway surface 1011A, inner-ring raceway surface 1013A, or rolling surface 1012A. A distance T1 from an outermost surface of the surface layer to a bottom of nitrogen enriched layer 1011B, 1012B, or 1013B is 0.2 mm or more. Rolling surface 1012A of roller 1012 is provided with crowning profile 1022A. A sum of drops of crowning profile 1022A is represented in a y-z coordinate system with a generatrix of rolling surface 1012A of roller 1012 being defined as a y axis and a direction orthogonal to the generatrix being defined as a z axis by the expression (1) where $K_1$, $K_2$, and $z_m$ represent design parameters, Q represents a load, L represents a length in a direction of the generatrix of an effective contact portion of rolling surface 1012A of roller 1012, E' represents an equivalent elastic modulus, a represents a length from an origin on the generatrix of the rolling surface of roller 1012 to an end of the effective contact portion, and A is defined as $A=2K_1 Q/\pi L E'$.

Load Q, length L of the effective contact portion along the generatrix, and equivalent elastic modulus E' are given as design conditions, and length a from the origin to the end of the effective contact portion has a value determined by a position of the origin.

The tapered roller bearing according to the present second embodiment has ratio Rprocess/R of actual radius of curvature Rprocess to reference radius of curvature R not lower than 0.8. The present inventors confirmed that the tapered roller bearing having ratio Rprocess/R not lower than 0.8 could achieve improved seizure resistance as compared with a tapered roller bearing having Rprocess/R lower than 0.8.

The tapered roller bearing can bear a certain axial load as the larger end face of the roller and the larger flange surface of the inner ring are in sliding contact. Owing to sliding contact, when lubrication between the larger end face and the larger flange surface is insufficient, a contact surface pressure between the larger end face and the larger flange surface increases and metal-to-metal contact occurs. Consequently, seizure is caused by heat generation, which finally leads to locking of a bearing.

When the rolling surface of the tapered roller is crowned as in the tapered roller bearing, increase in contact surface pressure between the roller rolling surface and raceway surfaces 1011A and 1013A of the inner and outer rings can be suppressed whereas skew occurs. When skew occurs, tangential force applied between the larger end face and the larger flange surface increases and friction torque increases. When a skew angle increases, the larger end face and the larger flange surface are in what is called edge contact with each other. Then, metal-to-metal contact occurs between these surfaces and seizure is caused by heat generation.

Therefore, in order to further improve seizure resistance of the tapered roller bearing, increase in rotational torque due to friction at a point of contact between the larger end face of the roller and the larger flange surface of the inner ring should be suppressed and heat generation should be reduced.

In order to suppress metal-to-metal contact between the larger end face of the roller and the larger flange surface of the inner ring and to reduce heat generation, a sufficient thickness of an oil film between the surfaces should be secured.

As described above, a value of ratio $R/R_{BASE}$ of reference radius of curvature R of the larger end face of the tapered roller to distance $R_{BASE}$ from the apex of the cone angle of the tapered roller to the larger flange surface of the inner ring is not smaller than 0.75 and not greater than 0.87. Therefore, an oil film thickness t can be large and maximum Hertz stress p can be small based on FIGS. 44 and 45, and torque loss and heat generation due to sliding friction between the larger end face and the larger flange surface can be reduced.

Since the tapered roller bearing according to the second embodiment has ratio Rprocess/R not lower than 0.8, it can achieve a reduced contact surface pressure between the larger end face and the larger flange surface and suppressed increase in skew angle as compared with the tapered roller bearing having ratio Rprocess/R lower than 0.8. Consequently, increase in contact surface pressure between the larger end face and the larger flange surface can be suppressed and a sufficient oil film thickness between the surfaces can be secured. This effect was confirmed by a result of calculation in Experimental Example 4 which will be described later.

Preferably, in the tapered roller bearing according to the second embodiment, the larger end face has surface roughness Ra not greater than 0.10 µm and the larger flange surface has surface roughness Ra not greater than 0.063 µm. Thus, a more sufficient oil film thickness can be secured between the larger end face of the roller and the larger flange surface of the inner ring. Specifically, when surface roughness Ra of the larger end face and surface roughness Ra of the larger flange surface are within the numeric range, an oil film parameter $\Lambda$ (=h/$\sigma$) defined as "a ratio between an oil film thickness h and composite roughness $\sigma$ of root mean roughness of a larger end face and a larger flange surface found based on elastohydrodynamic lubrication theory" can be enhanced as compared with an example in which surface roughness is out of the numeric range. Therefore, a sufficient oil film thickness can be secured between the larger end face and the larger flange surface.

Preferably, in the tapered roller bearing according to the second embodiment, ratio $\alpha$/L of amount $\alpha$ of displacement from the midpoint of the rolling surface in the direction of extension of the axis of rolling, of the position of abutment between raceway surfaces 1011A and 1013A of outer ring 1011 and the inner ring and the rolling surface to width L of the roller rolling surface in the direction of extension is not lower than 0% and lower than 20%, and the position of abutment is located at a central position or located closer to the larger end face than the central position in the rolling surface in the direction of extension of the axis of rolling. The present inventors confirmed that, by setting ratio $\alpha$/L to be not lower than 0% and lower than 20% and setting the position of abutment when ratio $\alpha$/L exceeded 0% to be located at the central position or closer to the larger end face than the central position of the rolling surface in the direction of extension of the axis of rolling, a skew angle could be decreased and increase in rotational torque could be suppressed as compared with an example in which the position of abutment when ratio $\alpha$/L exceeded 0% was located at the central position or closer to the smaller end face than the central position of the rolling surface in the direction of extension of the axis of rolling (see Experimental Example 4 which will be described later).

Since rolling surface 1012A of roller 1012 is provided with a crowning profile with a contour line being represented by such a logarithmic function (what is called a logarithmic crowning profile) that the expression (1) represents a sum of drops, local increase in contact pressure can be suppressed and wear of the rolling surface of the roller can be suppressed as compared with an example in which a conventional crowning profile represented by a partial circular arc is formed.

An effect of the logarithmic crowning profile described above will now be described in more detail. FIG. 42 shows a contour line of a roller provided with a crowning profile with the contour line being represented by a logarithmic function and a contact surface pressure at a roller rolling surface as being superposed on each other. FIG. 43 shows a contour line of a roller provided with a partially arcuate crowning profile and a straight portion and a contact surface pressure at a roller rolling surface as being superposed on each other. In FIGS. 42 and 43, the ordinate on the left side represents drop (unit: mm) of the crowning profile. In FIG. 43, the abscissa represents a position in the axial direction in the roller (unit: mm). In FIGS. 42 and 43, the ordinate on the right side represents a contact surface pressure (unit: GPa).

When the contour line of the rolling surface of the tapered roller is formed in a shape including a partially arcuate crowning profile and a straight portion, the contact surface pressure increases at the boundary between the crowned portion and the straight portion as shown in FIG. 43. Therefore, unless a lubricating film having a sufficient thickness is formed, wear due to metal-to-metal contact easily occurs. When the contact surface is partially worn, metal-to-metal contact more easily occurs in the vicinity thereof, which accelerates wear of the contact surface and results in damage to the tapered roller.

Figure 42:
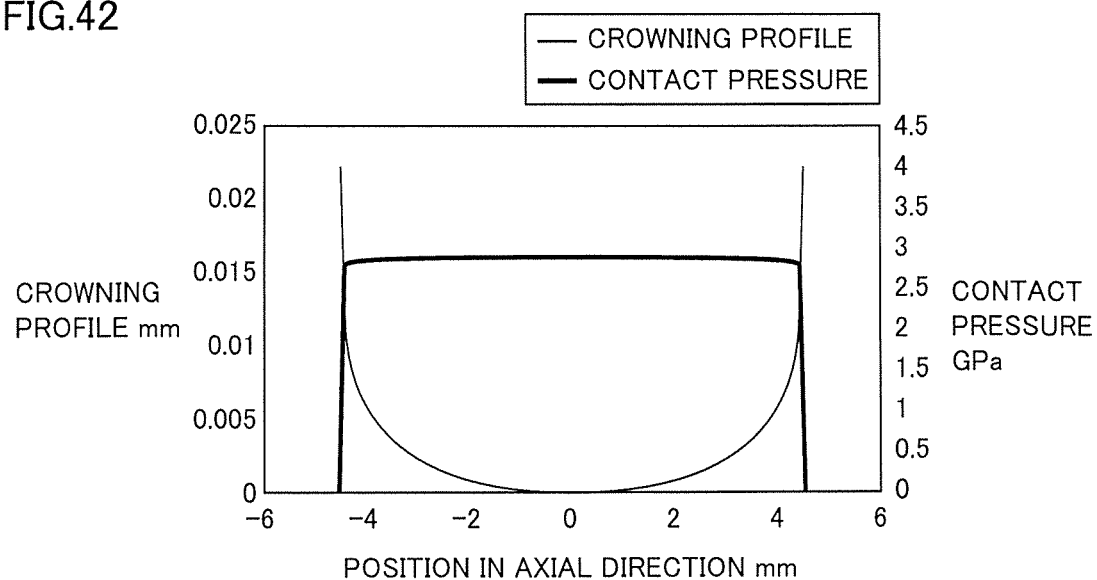
FIG. 42 is a diagram showing a roller provided with a crowning profile having a contour line expressed by a logarithmic function.
Figure 43:
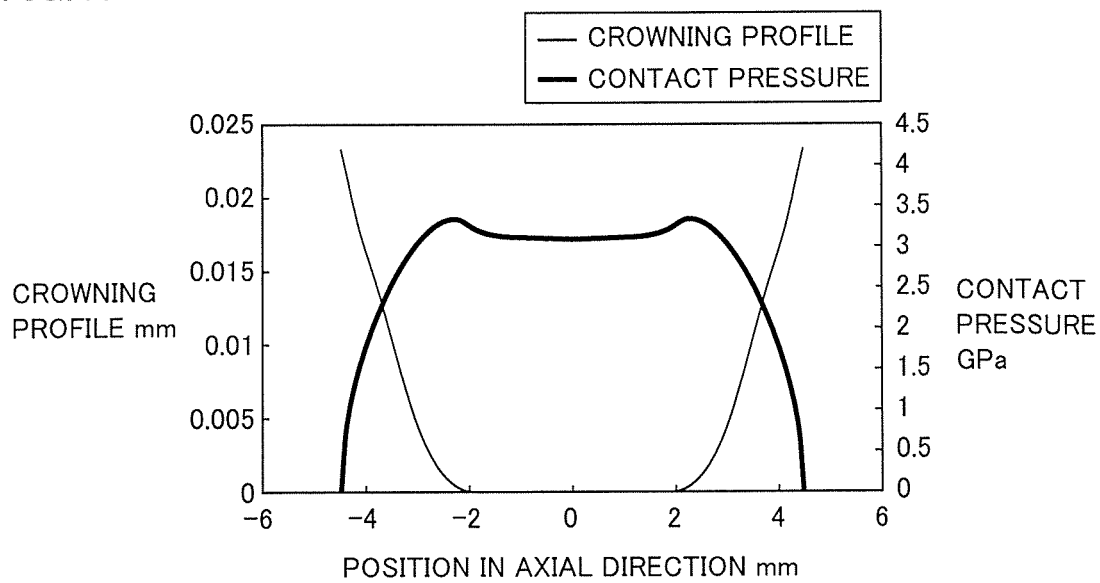
FIG. 43 shows a contour line of a roller provided with a partially arcuate crowning profile and a straight portion and a contact surface pressure at a roller rolling surface as being superimposed on each other.

When the rolling surface of the tapered roller serving as a contact surface is provided with a crowning profile of which contour line is defined by a logarithmic function, as shown, for example, in FIG. 42, a local contact pressure is lower and wear of a contact surface is less likely than in an example where a crowning profile represented by a partially arcuate arc in FIG. 43 is provided. Therefore, even when lubricant present on the rolling surface of the tapered roller is reduced to a small amount or reduced in viscosity and a lubricating film is reduced in thickness, the contact surface can be prevented from being worn and the tapered roller can be prevented from being damaged. FIGS. 42 and 43 show the contour line of the roller with origin O of the abscissa being set at the central portion of the effective contact portion between the inner ring or the outer ring and the roller in a rectangular coordinate system with the abscissa representing the direction of the generatrix of the roller and the ordinate representing a direction orthogonal to the generatrix and show a contact surface pressure as being superimposed on the former with the contact pressure being represented on the ordinate. Thus, tapered roller bearing 1010 exhibiting a long lifetime and high durability can be provided by adopting the construction as described above.

In tapered roller bearing 1010, a nitrogen concentration in nitrogen enriched layers 1011B, 1012B, and 1013B at a position of depth of 0.05 mm from the outermost surface is 0.1 mass % or more. In this case, since the nitrogen concentration in the outermost surface of nitrogen enriched layers 1011B, 1012B, and 1013B can have a sufficient value, a hardness of the outermost surface of nitrogen enriched layers 1011B, 1012B, and 1013B can be sufficiently high. Conditions such as the prior austenite crystal grain size in grain size number, the distance to the bottom of the nitrogen enriched layer, and the nitrogen concentration described above are preferably satisfied at least at first measurement point 1031 in FIG. 35.

In tapered roller bearing 1010, at least one of outer ring 1011, inner ring 1013, and roller 1012 in which nitrogen enriched layer 1011B, 1012B, or 1013B is formed is made of steel. Steel at least contains at least 0.6 mass % and at most 1.2 mass % of carbon (C), at least 0.15 mass % and at most 1.1 mass % of silicon (Si), and at least 0.3 mass % and at most 1.5 mass % of manganese (Mn) in a portion other than nitrogen enriched layers 1011B, 1012B, and 1013B, that is, unnitrided portions 1011C, 1012C, and 1013C. In the tapered roller bearing, steel may further contain at most 2.0 mass % of chromium. In this case, nitrogen enriched layers 1011B, 1012B, and 1013B constructed as defined in the present embodiment can easily be formed by using heat treatment or the like which will be described later.

In tapered roller bearing 1010, at least one of design parameters $K_1$, $K_2$, and $z_m$ in the expression (1) is optimized, with a contact surface pressure between the tapered roller and the outer ring or the inner ring being defined as an objective function.

While design parameters $K_1$, $K_2$, and $z_m$ are optimized and determined with any one of a contact surface pressure, stress, and a lifetime being defined as an objective function, damage originating from a surface depends on a contact surface pressure. According to the embodiment, design parameters $K_1$, $K_2$, and $z_m$ are optimized and set with a contact surface pressure being defined as an objective function, and hence a crowning profile that can prevent the contact surface from being worn even under a condition where lubricant is lean can be obtained.

In tapered roller bearing 1010, at least one of outer ring 1011 and inner ring 1013 includes nitrogen enriched layer 1011B or 1013B. In this case, in at least one of outer ring 1011 and inner ring 1013, nitrogen enriched layer 1011B or 1013B made finer in crystal structure is formed so that outer ring 1011 or inner ring 1013 long in lifetime and high in durability can be obtained.

In tapered roller bearing 1010, roller 1012 includes nitrogen enriched layer 1012B. In this case, in roller 1012, nitrogen enriched layer 1012B made finer in crystal structure is formed so that roller 1012 long in lifetime and high in durability can be obtained.

A grain size number defined under the JIS, of a prior austenite crystal grain size in nitrogen enriched layers 1011B, 1012B, and 1013B is equal to or greater than 10.

Since nitrogen enriched layer 1011B, 1012B, or 1013B having a sufficiently fine prior austenite crystal grain size has thus been formed in at least one of outer ring 1011, inner ring 1013, and roller 1012 as the tapered roller, a rolling fatigue life can be long and a Charpy impact value, a fracture toughness value, ultimate strength, and the like can be improved.

The reason why the smaller flange surface of the inner ring is formed as a surface in parallel to the smaller end face of the tapered roller is as set forth below. By providing smaller flange surface 1019 of inner ring 1013 as a surface in parallel to smaller end face 1017 of tapered roller 1012 disposed on raceway surface 1013A, influence by variation in chamfer dimension and shape of smaller end face 1017 of tapered roller 1012 onto a first gap between larger end face 1016 of tapered roller 1012 and larger flange surface 1018 of inner ring 1013 in the initial assembled state described previously (equal to a gap between smaller end face 1017 and smaller flange surface 1019 of inner ring 1013 when tapered roller 1012 is set in place) can be eliminated. Even though a chamfer dimension or a shape of smaller end face 1017 is different, smaller end face 1017 and smaller flange surface 1019 in parallel to each other are in surface contact with each other in the initial assembled state. Therefore, the first gap between larger end face 1016 and larger flange surface 1018 at this time is always constant, variation in time until each tapered roller 1012 is set in place is eliminated, and a running-in period can be shorter.

The reason why ratio $R/R_{BASE}$ between radius of curvature R of the larger end face of the tapered roller and distance $R_{BASE}$ from the apex of the cone angle of the tapered roller to the larger flange surface of the inner ring is within a range not smaller than 0.75 and not greater than 0.87 is as set forth below.

Figure 44:
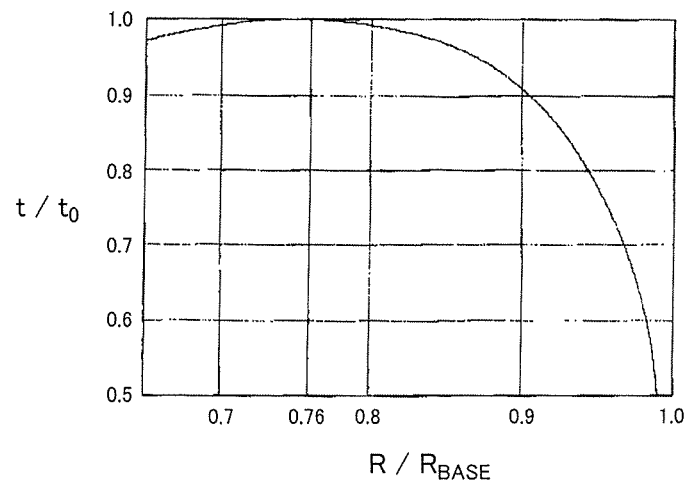
FIG. 44 shows a graph showing relation between a radius of curvature of a larger end face of the roller of the tapered roller bearing according to the second embodiment and a thickness of an oil film.

FIG. 44 shows a result of calculation based on the expression of Karna, of a thickness t of an oil film formed between the larger flange surface of the inner ring and the larger end face of the tapered roller. The ordinate represents a ratio t/t0 to an oil film thickness t0 when relation of $R/R_{BASE}$=0.76 is satisfied. Oil film thickness t is maximized when relation of $R/R_{BASE}$=0.76 is satisfied, and when $R/R_{BASE}$ exceeds 0.9, the oil film thickness abruptly decreases.

Figure 45:
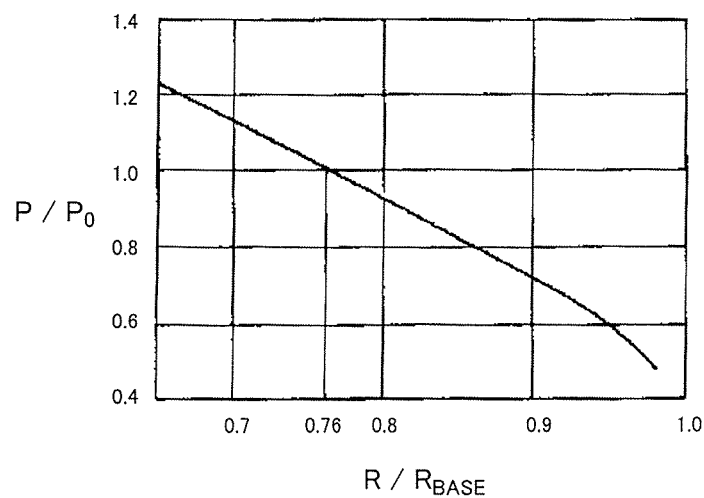
FIG. 45 shows a graph showing relation between a radius of curvature of the larger end face of the roller of the tapered roller bearing according to the second embodiment and maximum Hertz stress.

FIG. 45 shows a result of calculation of maximum Hertz stress p between the larger flange surface of the inner ring and the larger end face of the tapered roller. The ordinate represents a ratio p/p0 to maximum Hertz stress p0 when relation of $R/R_{BASE}$=0.76 is satisfied as in FIG. 44. Maximum Hertz stress p monotonously decreases with increase in $R/R_{BASE}$.

In order to reduce torque loss and heat generation due to sliding friction between the larger flange surface of the inner ring and the larger end face of the tapered roller, desirably, oil film thickness t is made larger and maximum Hertz stress p is lowered. The present inventors determined that a proper range of $R/R_{BASE}$ was not smaller than 0.75 and not greater than 0.87 based on a result of a seizure resistance test shown later in Table 8 with reference to the results of calculation in FIGS. 44 and 45. For a conventional tapered roller bearing, a value of $R/R_{BASE}$ is designed within a range not smaller than 0.90 and not greater than 0.97.

<Method of Manufacturing Tapered Roller Bearing>

Figure 46:
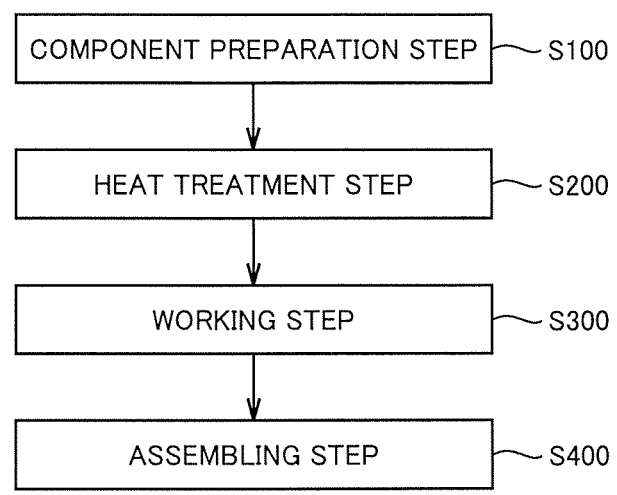
FIG. 46 is a flowchart of a method of manufacturing a tapered roller bearing according to the second embodiment.
Figure 47:
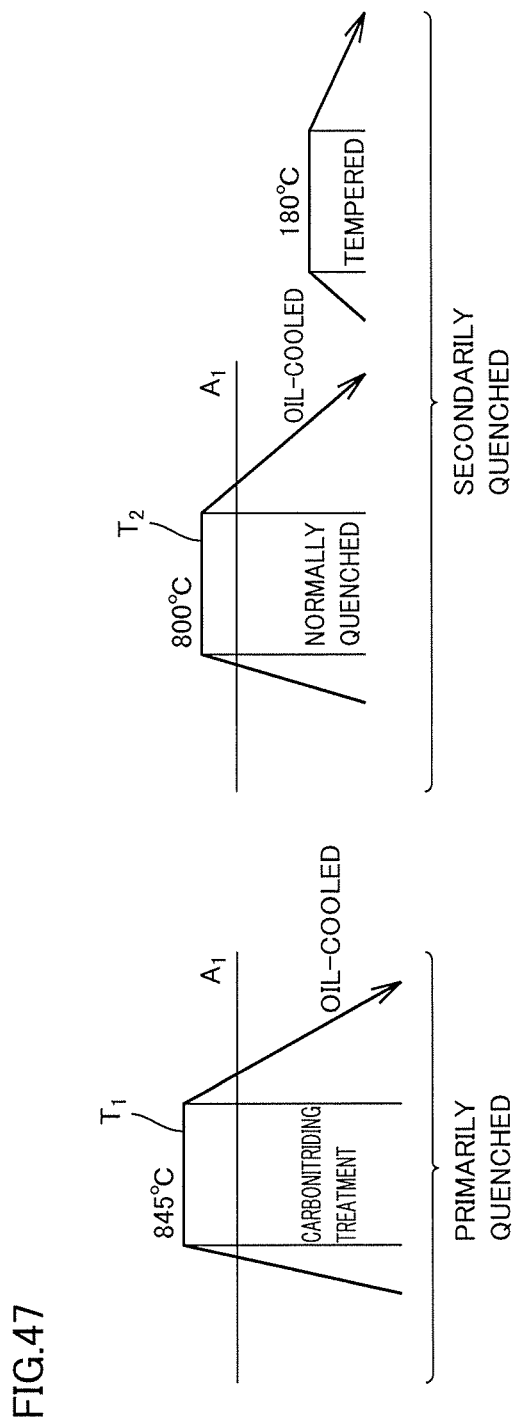
FIG. 47 is a diagram for illustrating a heat treatment method in the second embodiment.
Figure 48:
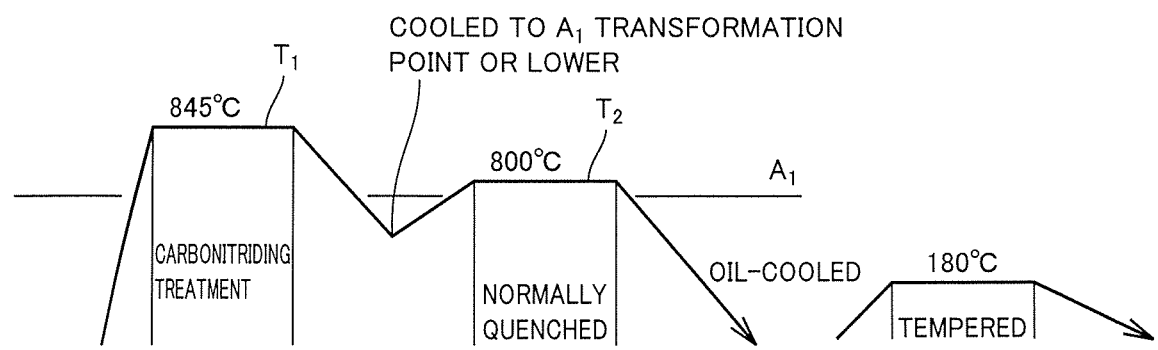
FIG. 48 is a diagram for illustrating a modification to the heat treatment method in the second embodiment.
Figure 50:
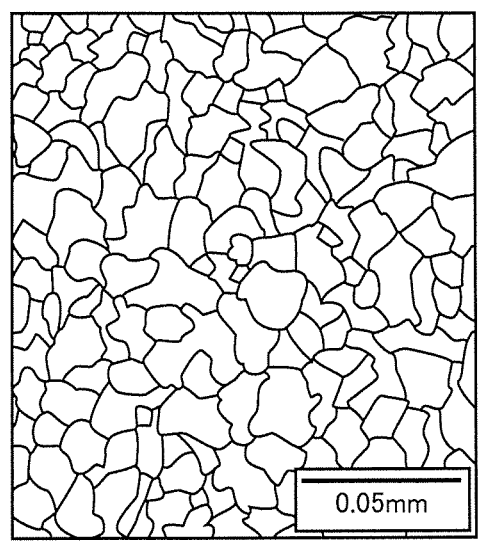
FIG. 50 is a diagram showing an austenite grain boundary of a conventional bearing component.

FIG. 46 is a flowchart for illustrating a method of manufacturing the tapered roller bearing shown in FIG. 33. FIG. 47 is a schematic diagram showing a heat treatment pattern in a heat treatment step in FIG. 46. FIG. 48 is a schematic diagram showing a modification to the heat treatment pattern shown in FIG. 47. FIG. 50 is a schematic diagram illustrating a microstructure, in particular a prior austenite crystal grain boundary, of a bearing component as a comparative example. A method of manufacturing a tapered roller bearing will be described below.

As shown in FIG. 46, initially, a component preparation step (S100) is performed. In this step (S100), members to be bearing components such as outer ring 1011, inner ring 1013, roller 1012, and cage 1014 are prepared. A member to be roller 1012 is uncrowned, and a surface of the member is yet-to-be-worked surface 1012E shown with a dotted line in FIG. 36.

Then, the heat treatment step (S200) is performed. In this step (S200), prescribed heat treatment is performed to control characteristics of the bearing components. For example, in order to form nitrogen enriched layer 1011B, 1012B, or 1013B according to the present embodiment in at least one of outer ring 1011, roller 1012, and inner ring 1013, carbonitriding or nitriding, quenching, tempering, and the like are performed. An exemplary heat treatment pattern in this step (S200) is shown in FIG. 47. FIG. 47 shows a heat treatment pattern representing a method of performing primary quenching and secondary quenching. FIG. 48 shows a heat treatment pattern representing a method in which a material is cooled to a temperature lower than an $A_1$ transformation point during quenching and thereafter the material is reheated and finally quenched. In these figures, in treatment $T_1$, carbon, nitrogen, and the like are diffused through a steel matrix and carbon is sufficiently dissolved therein, and thereafter the material is cooled to a temperature lower than the $A_1$ transformation point. Then, in treatment $T_2$ shown in the figure, the material is reheated to a temperature lower than in treatment $T_1$ and oil-quenched. Thereafter, the material is tempered, for example, at a heating temperature of 180° C.

According to the heat treatment, as compared with ordinary quenching, that is, carbonitriding treatment followed by quenching once, cracking strength can be improved and a rate of change in dimension over time can be lowered while a surface layer portion of a bearing component is carbonitrided. According to the heat treatment step (S200), nitrogen enriched layers 1011B, 1012B, and 1013B as a quenched structure have such a microstructure as shown in FIG. 49 that a grain size of prior austenite crystal grains is equal to or less than ½ of that of a microstructure in a conventional quenched structure shown in FIG. 50. The bearing component subjected to the heat treatment has a long life against rolling fatigue and increased cracking strength, and can also achieve a reduced rate of change in dimension over time.

Then, a working step (S300) is performed. In this step (S300), the material is finished to have a final shape of each bearing component. Roller 1012 is provided with crowning profile 1022A and chamfered portion 1021 by machining such as cutting, as shown in FIG. 36.

Then, an assembling step (S400) is performed. In this step (S400), tapered roller bearing 1010 shown in FIG. 33 is obtained by assembling the bearing components prepared as described above. Thus, tapered roller bearing 1010 shown in FIG. 33 can be manufactured.

Example 5

Experimental Example 1

<Samples>

Four types of tapered rollers of samples Nos. 1 to 4 were prepared as samples. The model number of the tapered rollers was 30206. As a material for the tapered rollers, a JIS SUJ2 material (1.0 mass % of C-0.25 mass % of Si-0.4 mass % of Mn-1.5 mass % of Cr) was used.

Sample No. 1 was carbonitrided and quenched, and thereafter provided at opposing ends with a logarithmic crowning profile according to the present embodiment shown in FIG. 37. The sample was carbonitrided at 845° C. for 150 minutes. The sample was carbonitrided in an atmosphere of RX gas+ammonia gas. Sample No. 2 was carbonitrided and quenched similarly to Sample No. 1, and thereafter provided with the partially arcuate crowning profile shown in FIG. 43.

Sample No. 3 was subjected to the heat treatment pattern shown in FIG. 47 and thereafter provided at opposing ends with the logarithmic crowning profile according to the present embodiment shown in FIG. 37. The sample was carbonitrided at 845° C. for 150 minutes. The sample was carbonitrided in an atmosphere of RX gas+ammonia gas. The sample was finally quenched at 800° C.

Sample No. 4 was subjected to the heat treatment pattern shown in FIG. 47, and thereafter provided at opposing ends with the logarithmic crowning profile according to the present embodiment shown in FIG. 37. In order to achieve a nitrogen concentration not lower than 0.1 mass % in the nitrogen enriched layer at a position of depth of 0.05 mm from the outermost surface of the sample, the sample was carbonitrided at 845° C. for 150 minutes. The sample was carbonitrided in an atmosphere of RX gas+ammonia gas. The atmosphere in the furnace was strictly controlled. Specifically, unevenness of the temperature in the furnace and unevenness of the ammonia gas atmosphere were suppressed. The sample was finally quenched at 800° C. Samples Nos. 3 and 4 described above correspond to Examples of the present invention. Samples Nos. 1 and 2 correspond to Comparative Examples.

<Contents of Experiments>

Experiment 1: Life Test

A life test apparatus was employed. As test conditions, test loads of Fr=18 kN and Fa=2 kN, lubricating oil of turbine oil 56, and a lubricating system of oil bath lubrication were applied. In the life test apparatus, two tapered roller bearings to be tested were arranged to support a support shaft at opposing ends. At a central portion of the support shaft in a direction of extension, that is, at a central portion between the two tapered roller bearings, a cylindrical roller bearing for applying a radial load to the tapered roller bearings via the support shaft was arranged. By applying a radial load to the load applying cylindrical roller bearing, the radial load was applied to the tapered roller bearings to be tested. An axial load was transmitted from one tapered roller bearing to the support shaft through a housing of the life test apparatus and applied to the other tapered roller bearing. Thus, the tapered roller bearing was subjected to a life test.

Experiment 2: Life Test with Unevenly Distributed Load Applied

The same test apparatus as in the life test in Experiment 1 was used. Although test conditions were basically the same as in Experiment 1, an axial inclination of 2/1000 rad with respect to a central axis of the roller was applied and the test was conducted with an unevenly distributed load being applied.

Experiment 3: Rotational Torque Test

Samples Nos. 1 to 4 were subjected to a torque measurement test by using a vertical torque test rig. As test conditions, a test load of Fa=7000 N, lubricating oil of turbine oil 56, a lubrication system of oil bath lubrication, and the number of rotations of 5000 rpm were applied.

<Result>

Experiment 1: Life Test

Sample No. 4 exhibited the best result and was considered to have a long life.

Though samples Nos, 2 and 3 were not comparable to Sample No. 4, they exhibited good results and were thus determined to be sufficiently durable for practical use. Sample No. 1 was shortest in life.

Experiment 2: Life Test with Unevenly Distributed Load Applied

Samples Nos. 4 and 3 exhibited the best result and were considered to have a long life. Sample No. 1 presented a relatively satisfactory result although it was not comparable to samples Nos. 4 and 3. Sample No. 2 presented a result worse than in Experiment 1, and it is believed to have a short life due to the unevenly distributed load.

Experiment 3: Rotational Torque Test

Samples Nos. 1, 3, and 4 presented sufficiently small rotational torque and thus presented a good result. In contrast, sample No. 2 was larger in rotational torque than other samples.

From the above results, sample No. 4 generally presented a good result in any of the tests and thus generally provided the best result. Sample No. 3 also presented a result better than that of samples Nos. 1 and 2.

Experimental Example 2

<Sample>

Sample No. 4 in Experimental Example 1 was used.

<Contents of Experiment>

Measurement of Nitrogen Concentration at Position of Depth of 0.05 mm from Surface:

A nitrogen concentration and a depth of a nitrogen enriched layer of sample No. 4 were measured. Measurement was conducted as below. At the first to third measurement points shown in FIG. 35, a tapered roller as the sample was cut in a direction perpendicular to the centerline to expose a cut surface. The cut surface was analyzed for a nitrogen concentration by EPMA at a plurality of measurement positions each located at a distance of 0.05 mm inward from the surface of the sample. Five measurement positions were determined in a cross-section at each of the first to third measurement points, and an average value of measurement data obtained at the five locations was adopted as a nitrogen concentration at each measurement point.

Measurement of Distance to Bottom of Nitrogen Enriched Layer:

In a cross-section of the tapered roller subjected to tempering treatment at 500° C.×1 h at the first to third measurement points, a hardness was measured at a plurality of measurement points aligned in the direction of depth at intervals of 0.5 mm. A region having a Vickers hardness of HV 450 or more was determined as a nitrogen enriched layer, and a depth of a position where the hardness attained to HV 450 was determined as the bottom of the nitrogen enriched layer.

<Result>

Measurement of Nitrogen Concentration at Position of Depth of 0.05 mm from Surface:

Nitrogen concentrations were 0.2 mass %, 0.25 mass %, and 0.3 mass % at the first, second, and third measurement points, respectively. The measurement points all presented measurement results falling within the scope of the present invention.

Measurement of Distance to Bottom of Nitrogen Enriched Layer:

Distances to the bottom of the nitrogen enriched layer at the first, second, and third measurement points were 0.3 mm, 0.35 mm and 0.3 mm, respectively. The measurement points all presented measurement results falling within the scope of the present invention.

Experimental Example 3

<Sample in Example>

A tapered roller bearing (samples Nos. 5 to 8 in Table 8) in which radius of curvature R of the larger end face of the tapered roller was within a range of $R/R_{BASE}$ not smaller than 0.75 and not greater than 0.87, the larger flange surface of the inner ring had surface roughness Ra of 0.12 μm, the smaller flange surface was formed as a ground surface in parallel to the smaller end face of the tapered roller, and the first gap was within the dimension restricted range not greater than 0.4 mm shown in FIG. 38 was prepared. The bearing had an inner diameter of 40 mm and an outer diameter of 68 mm.

<Sample in Comparative Example>

A tapered roller bearing (samples Nos. 9 to 11 in Table 8) in which a value of $R/R_{BASE}$ was out of the scope of the present application, the smaller flange surface of the inner ring was inclined outward relative to the smaller end face of the tapered roller, and the first gap exceeded 0.4 mm was prepared. Each bearing had a dimension the same as in Example.

The tapered roller bearings in Example and Comparative Example were subjected to a seizure resistance test by using a rotary test rig. A running-in test was also conducted for the tapered roller bearings of samples No. 6 and 10. The number of samples in the running-in test was set to 66 for sample No. 6 and to 10 for sample No. 10. Conditions for the seizure resistance test included an applied load of 19.61 kN, the number of rotations of 1000 to 3500 rpm, and lubricating oil of turbine VG56 (an amount of oil feed of 40 milliliters/min. and a temperature of fed oil of 40° C.±3° C.).

Table 8 shows results of the test. Seizure in the seizure resistance test occurred between the larger flange surface of the inner ring and the larger end face of the tapered roller.

TABLE 8

| Sample NO. | Radius of Curvature $R/R_{BASE}$ | Surface Roughness Ra (μm) | Limit Number of Rotations Until Occurrence of Seizure in Seizure Resistance Test (rpm) | The Number of Rotations Until Settling in Running-in Test (Times) | |
|---|---|---|---|---|---|
| | | | | Average Value | Standard Deviation |
| Sample 5 | 0.75 | 0.12 | 2700 | — | — |
| Sample 6 | 0.80 | 0.12 | 3500 | 2.96 | 0.56 |
| Sample 7 | 0.85 | 0.12 | 3000 | — | — |
| Sample 8 | 0.87 | 0.12 | 2700 | — | — |
| Sample 9 | 0.70 | 0.12 | 2200 | — | — |
| Sample 10 | 0.94 | 0.12 | 2500 | 6.00 | 1.33 |
| Sample 11 | 0.94 | 0.25 | 2200 | — | — |

It can be seen that the tapered roller bearing in Example achieved the limit number of rotations not less than 2700 rpm until occurrence of seizure in the seizure resistance test, and was low in friction resistance between the larger flange surface of the inner ring and the larger end face of the tapered roller. The tapered roller bearing in Comparative Example achieved the limit number of rotations not more than 2500 rpm until occurrence of seizure, which may give rise to a problem under a normal condition of use of a differential gear or the like. Sample 11 large in surface roughness Ra of the larger flange surface exhibited the limit number of rotations until occurrence of seizure being smaller than sample No. 10 equal in radius of curvature R.

Regarding results of the running-in test, in Comparative Example, an average value of the number of rotations until the tapered roller was set in place was six, whereas in Example, the average value was 2.96 which was approximately half that in Comparative Example. It can be seen that Example was small also in standard deviation in variation in number of rotations and could be shorter in running-in period in a stable manner.

As set forth above, in the tapered roller bearing according to the present invention, radius of curvature R of the larger end face of the tapered roller had a value satisfying a range of $R/R_{BASE}$ not smaller than 0.75 and not greater than 0.87 and the smaller flange surface of the inner ring was formed as a surface in parallel to the smaller end face of the tapered roller. Therefore, torque loss and heat generation due to sliding friction between the larger flange surface of the inner ring and the larger end face of the tapered roller could be reduced to prevent seizure and a running-in period could be shorter to make a bearing attachment operation more efficient. Durability of a gear shaft support apparatus for automobiles can be improved.

Experimental Example 4

As to Ratio Rprocess/R:

Table 9 shows a result of calculation of each ratio of contact surface pressure p between the larger end face and the larger flange surface, skew angle $\theta$, and oil film parameter $\Lambda$ with ratio Rprocess/R being varied to contact surface pressure p0, skew angle $\theta 0$, and oil film parameter $\Lambda 0$ when ratio Rprocess/R is 1.

TABLE 9

| Ratio $R_{prosess}$/R of Radius of Curvature | 0.5 | 0.7 | 0.8 | 0.9 | 1.0 |
|---|---|---|---|---|---|
| Ratio p/p0 of Contact Surface Pressure | 2.2 | 1.6 | 1.4 | 1.2 | 1 |
| Ratio $\Phi/\Phi 0$ of Skew Angle | 5 | 3 | 1.5 | 1.2 | 1 |
| Ratio $\Lambda/\Lambda 0$ of Oil Film Parameter | 0.3 | 0.5 | 0.8 | 0.9 | 1 |

As shown in Table 9, when ratio Rprocess/R is not higher than 0.7, ratio p/p0 of the contact surface pressure between the larger end face and the larger flange surface is not lower than 1.6, ratio $\theta/\theta 0$ of the skew angle is not lower than 3, and ratio $\Lambda/\Lambda 0$ of the oil film parameter is not higher than 0.5. When such a tapered roller bearing is used, for example, in an environment not good in lubrication where oil film parameter $\Lambda$ is smaller than 2, oil film parameter $\Lambda$ is lower than 1 and a state of contact between the larger end face and the larger flange surface is in a boundary lubrication region where metal-to-metal contact occurs. In contrast, when ratio Rprocess/R is not lower than 0.8, ratio p/p0 of the contact surface pressure is not higher than 1.4, ratio $\theta/\theta 0$ of the skew angle is not higher than 1.5, and ratio $\Lambda/\Lambda 0$ of the oil film parameter is not lower than 0.8. Therefore, it was confirmed based on a result of calculation that the tapered roller bearing having ratio Rprocess/R not lower than 0.8 could secure an oil film thickness between the larger end face and the larger flange surface as compared with the tapered roller bearing having ratio Rprocess/R lower than 0.8.

As to Ratio $\alpha$/L:

Table 10 shows a result of calculation of ratios $\theta/\theta 0$ and M/M0 of skew angle $\theta$ and rotational torque M with displacement amount $\alpha$ being varied to skew angle $\theta 0$ and rotational torque M0 when displacement amount $\alpha$ is 0, that is, the position of abutment between raceway surfaces 1011A and 1013A of the inner ring and outer ring 1011 and the rolling surface is located at a midpoint of the rolling surface in the direction of extension of the axis of rolling. Table 10 shows with a negative value, a displacement amount when the position of abutment is displaced toward the smaller end face relative to the midpoint. A sample of which ratio of rotational torque M/M0 was not higher than 1.1 was evaluated as good (A in Table 10) and a sample of which ratio of rotational torque M/M0 exceeded 1.1 was evaluated as not good (B in Table 10).

TABLE 10

| | Displacement Amount $\alpha$ (%) | | | | | | |
|---|---|---|---|---|---|---|---|
| | −10 | −5 | 0 | 5 | 10 | 15 | 20 |
| Ratio $\Phi/\Phi 0$ of Skew Angle | 2 | 1.5 | 1 | 0.75 | 0.5 | 0.4 | 0.3 |

TABLE 10-continued

| | Displacement Amount $\alpha$ (%) | | | | | | |
|---|---|---|---|---|---|---|---|
| | −10 | −5 | 0 | 5 | 10 | 15 | 20 |
| Ratio M/M0 of Rotational Torque | 1.2 | 1.1 | 1 | 1.03 | 1.05 | 1.1 | 1.2 |
| Determination | B | A | A | A | A | A | B |

As shown in Table 10, when the position of abutment is relatively greatly displaced toward the smaller end face relative to the midpoint, that is, displacement amount $\alpha$ is less than −5%, ratio $\theta/\theta 0$ of the skew angle is as high as two or more and slight increase in displacement amount results in significant increase in rotational torque.

In contrast, when the position of abutment is displaced relatively slightly toward the smaller end face relative to the midpoint, that is, displacement amount $\alpha$ is not lower than −5% and lower than 0%, ratio $\theta/\theta 0$ of the skew angle is lower and a rate of increase in rotational torque with increase in displacement amount is lower than in an example where displacement amount $\alpha$ is smaller than −5%.

When displacement amount $\alpha$ is not lower than 0% and not higher than 20%, ratio $\theta/\theta 0$ of the skew angle is not greater than 1 and slight increase in displacement amount does not result in significant increase in rotational torque.

Though not shown in Table 10, when displacement amount $\alpha$ exceeds 20%, rotational torque is unfavorably high to such an extent as causing other defects such as peeling. Therefore, it was confirmed based on the result of calculation that a skew angle could be decreased by setting ratio $\alpha$/L to be not lower than 0% and lower than 20% and setting the position of abutment when ratio $\alpha$/L exceeded 0% to the central position or a position closer to the larger end face than the central position in the rolling surface in the direction of extension of the axis of rolling.

Third Embodiment

Though a tapered roller bearing according to a third embodiment is basically similar in construction to tapered roller bearing 1010 according to the second embodiment, it is different in that curvature R8 of the generatrix of a non-contact area crowned portion 1028 not in contact with inner-ring raceway surface 1013A in the crowning profile formed portion in the roller rolling surface is smaller than curvature R7 of the generatrix of a contact area crowned portion 1027 in contact with inner-ring raceway surface 1013A.

As shown in FIG. 33, the tapered roller bearing according to the third embodiment includes inner ring 1013, outer ring 1011, and a plurality of rollers 1012 interposed between the inner ring and the outer ring. Inner-ring raceway surface 1013A is formed around the outer circumference of inner ring 1013, and a larger flange portion 1041 and a smaller flange portion 1042 are provided on a larger diameter side and a smaller diameter side of inner-ring raceway surface 1013A, respectively. A grinding undercut 1043 is provided at a corner where inner-ring raceway surface 1013A and larger flange portion 1041 meet each other, and a grinding undercut 1044 is provided at a corner between inner-ring raceway surface 1013A and smaller flange portion 1042. Inner-ring raceway surface 1013A has a linear generatrix extending in the axial direction of the inner ring. Around the inner circumference of outer ring 1011, outer-ring raceway surface 1011A opposed to inner-ring raceway surface 1013A is formed, no flange is provided, and outer-ring raceway surface 1011A has a linear generatrix extending in the axial direction of the outer ring.

Figure 54:
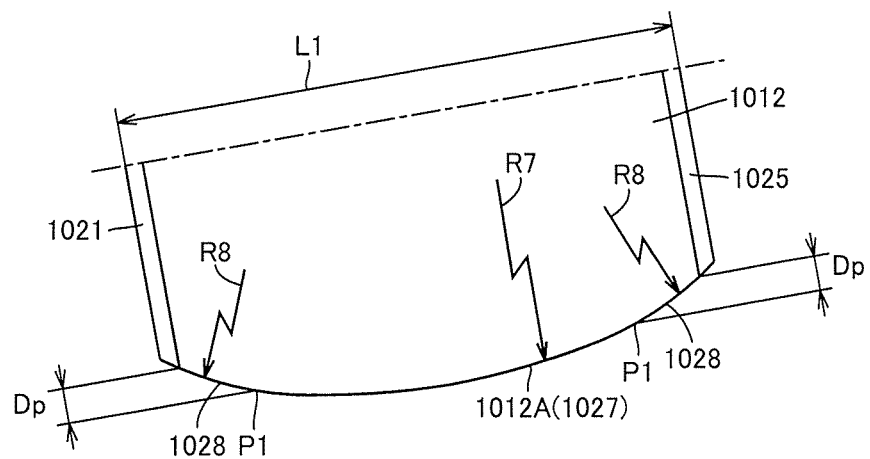
FIG. 54 is a diagram showing a crowning profile of a roller of the tapered roller bearing shown in FIG. 53.

As shown in FIGS. 33, 34, and 54, the roller rolling surface around the outer circumference of roller 1012 is crowned and chamfered portions 1021 and 1025 are provided at opposing ends of roller 1012. The crowning profile formed portion of the roller rolling surface includes contact area crowned portion 1027 and non-contact area crowned portion 1028. Of these, contact area crowned portion 1027 is within a range of the axial direction of inner-ring raceway surface 1013A and in contact with inner-ring raceway surface 1013A. Non-contact area crowned portion 1028 is out of the range in the axial direction of inner-ring raceway surface 1013A and not in contact with inner-ring raceway surface 1013A.

Contact area crowned portion 1027 and non-contact area crowned portion 1028 have generatrices extending in the axial direction of the roller expressed by functions different from each other and being smoothly continuous at connection point P1. In the vicinity of connection point P1, curvature R8 of the generatrix of non-contact area crowned portion 1028 is smaller than curvature R7 of the generatrix of contact area crowned portion 1027.

In the tapered roller bearing, of the contact area on the side of inner ring 1013 and the contact area on the side of outer ring 1011, the side of inner ring 1013 is smaller in equivalent radius in the circumferential direction and hence higher in contact pressure. Accordingly, in designing the crowning profile, it is sufficient to study contact on the side of inner ring 1013.

The tapered roller bearing having the bearing number of 30316 will now be considered, assuming that a radial load effective to 35% of a basic dynamic rated load is applied and the bearing has misalignment of 1/600. Misalignment at this time is assumed to refer to such inclination that a contact pressure is higher on the larger diameter side than on the smaller diameter side of roller 1012. The basic dynamic rated load refers to a load without variation in direction and magnitude under which a rated lifetime of one million revolutions is achieved when a group of identical bearings is operated individually under a condition in which inner ring 1013 is rotated while outer ring 1011 remains at rest. Misalignment refers to offset in axis between a shaft to which inner ring 1013 is fitted and a not-shown housing to which outer ring 1011 is fitted, and is expressed by a fraction expressing an amount of inclination as above.

Contact area crowned portion 1027 may have a generatrix defined by a logarithmic curve of a logarithmic crowning profile expressed in the expression (1).

In order to secure working accuracy of the crowning profile, the outer circumference of roller 1012 desirably includes a straight portion which occupies ½ or more of a total length L1 of the roller. Accordingly, when the straight portion occupies ½ of total length L1 of the roller and the crowning profile is in symmetry between a portion on the smaller diameter side and a portion on the larger diameter side with the center in the axial direction of the roller being defined as the reference, among the design parameters in the logarithmic crowning expression (1), $K_2$ is fixed and $K_1$ and $z_m$ are to be designed.

Figure 53:
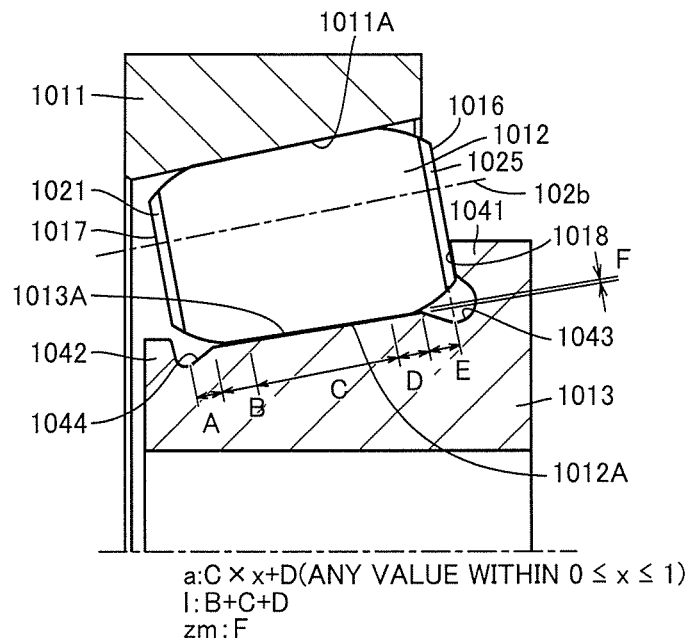
FIG. 53 is a partial cross-sectional view of a tapered roller bearing according to a third embodiment.
Figure 55:
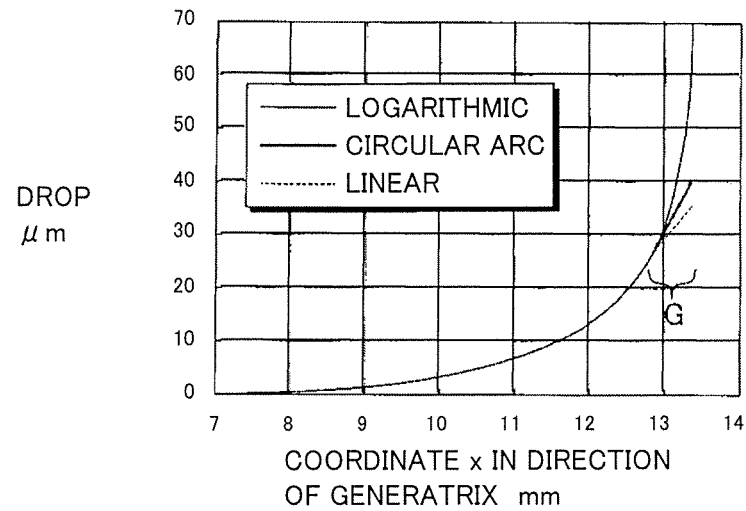
FIG. 55 is a diagram showing relation between a coordinate in a direction of a generatrix and drop of the roller of the tapered roller bearing shown in FIG. 53.

When a crowning profile is optimized by a mathematical optimization approach which will be described later, under the present condition, a crowning profile as shown with "logarithmic" in FIG. 55 is obtained. Largest drop of the crowning profile of roller 1012 at this time is 69 μm. A region shown with G in FIG. 55, however, corresponds to a region shown with E which faces grinding undercuts 1043 and 1044 of inner ring 1013 in FIG. 53, and it does not come in contact with inner ring 1013. Therefore, region G of roller 1012 does not have to be provided with the logarithmic crowning profile and it may be defined by a straight line, a circular arc, or other functions. Even though region G of roller 1012 is defined by a straight line, a circular arc, or other functions, a contact pressure distribution therein is identical to that in an example in which the entire roller is provided with a logarithmic crowning profile and a function thereof is comparable.

The approach to mathematical optimization of the logarithmic crowning profile will now be described.

By appropriately selecting $K_1$ and $z_m$ in the functional expression (1) expressive of the logarithmic crowning profile, the optimum logarithmic crowning profile can be designed.

The crowning profile is generally designed to reduce a maximum value of stress or a contact pressure in a contact area. It is assumed that a rolling fatigue life occurs in accordance with von Mises yield criterion and $K_1$ and $z_m$ are selected to minimize the maximum value of von Mises equivalent stress.

$K_1$ and $z_m$ can be selected with the use of an appropriate mathematical optimization approach. Though various algorithms have been suggested for the mathematical optimization approach, a direct search method representing one of those can allow optimization without using a differential coefficient of a function and is useful when an objective function and a variable cannot directly be expressed by a mathematical formula. Optimum values of $K_1$ and $z_m$ are determined by the Rosenbrock method representing one of the direct search methods.

Figure 56:
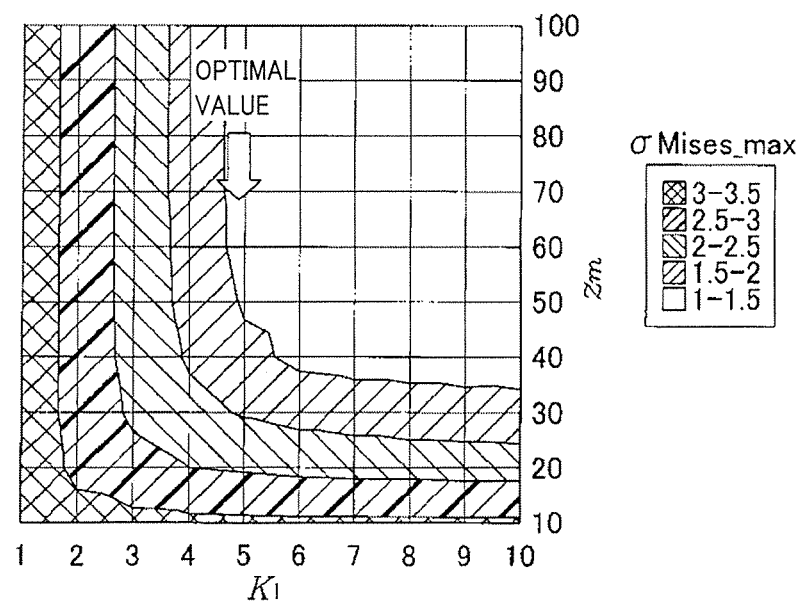
FIG. 56 is a diagram showing relation between a maximum value of von Mises equivalent stress and a logarithmic crowning parameter.

When a radial load effective to 35% of the basic dynamic rated load is applied to the tapered roller bearing having the bearing number of 30316 and misalignment is 1/600, a maximum value sMises_max of von Mises equivalent stress and logarithmic crowning parameters $K_1$ and $z_m$ assume relation as in FIG. 56. When appropriate initial values are given to $K_1$ and $z_m$ and $K_1$ and $z_m$ are modified under the rules of the Rosenbrock method, a combination of optimum values in FIG. 56 is derived and sMises_max is minimized.

So long as contact between roller 1012 and inner ring 1013 is considered, any crowning profile in region G in FIG. 55 may be applicable. When contact with outer ring 1011 or formability by a grindstone during working is taken into consideration, however, it is not desirable that gradient at point P1 of connection with a logarithmically crowned portion is smaller than gradient at the logarithmically crowned portion. Since drop will increase when gradient greater than gradient of the logarithmically crowned portion is given to the crowning profile in region G, this is also undesirable. In other words, the crowning profile in region G and the logarithmic crowning profile are desirably designed to smoothly be continuous to each other with their gradients matching with each other at connection point P1. In FIG. 55, a linear crowning profile in region G of roller 12 is shown with a dotted line and an arcuate crowning profile thereof is shown with a bold solid line. When the crowning profile in region G is linear, drop Dp of the crowning profile of roller 1012 is, for example, 36 μm. When the crowning profile in region G is arcuate, drop Dp of the crowning profile of roller 1012 is, for example, 40 μm.

According to the tapered roller bearing described above, a crowning profile is formed in the roller rolling surface around the outer circumference of roller 1012, so that a grindstone can be applied to the roller rolling surface in a more necessary and sufficient manner than in formation of a crowning profile only in inner-ring raceway surface 1013A. Therefore, poor working of the rolling surface can be prevented. The crowing profile formed in the roller rolling surface can achieve lowering in contact pressure or stress in a contact area and a longer lifetime of the tapered roller bearing. In the vicinity of connection point P1 between contact area crowned portion 1027 and non-contact area crowned portion 1028, curvature R8 of the generatrix of non-contact area crowned portion 1028 is smaller than curvature R7 of the generatrix of contact area crowned portion 1027, so that drop Dp at opposing ends of roller 1012 can be reduced. Therefore, as compared, for example, with an example of a conventional crowning profile of a single circular arc, an amount of grinding can be suppressed, efficiency in working of roller 1012 can be improved, and manufacturing cost can be reduced.

Figure 57:
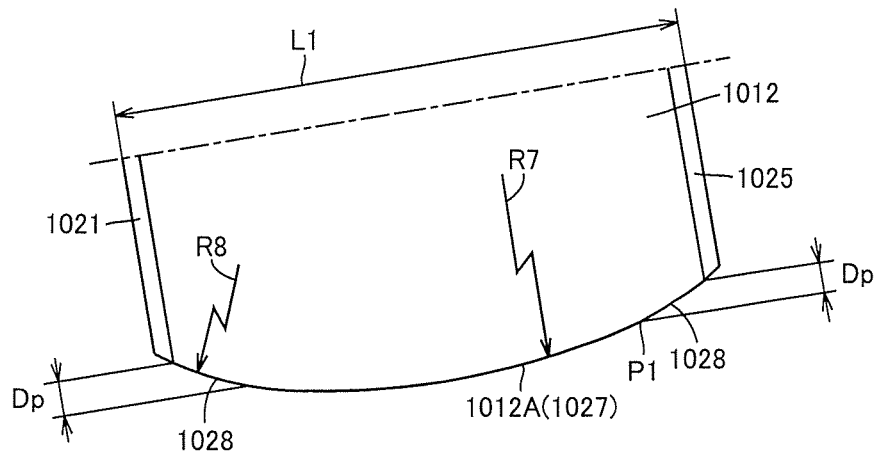
FIG. 57 is a diagram showing a modification to the tapered roller bearing according to the third embodiment.

One or both of portions on the larger and smaller diameter sides of the generatrix of non-contact area crowned portion 1028 may be arcuate. In this case, drop Dp can be made smaller than in an example in which the generatrix of the entire roller rolling surface is expressed, for example, by a logarithmic curve. Accordingly, an amount of grinding can be reduced. As shown in FIG. 57, one or both of portions on the larger and smaller diameter sides of the generatrix of non-contact area crowned portion 1028 may be linear (in the example in FIG. 57, only a portion on the larger diameter side being linear). In this case, drop Dp can further be made smaller than in an example in which the generatrix of non-contact area crowned portion 1028 is arcuate.

Figure 58:
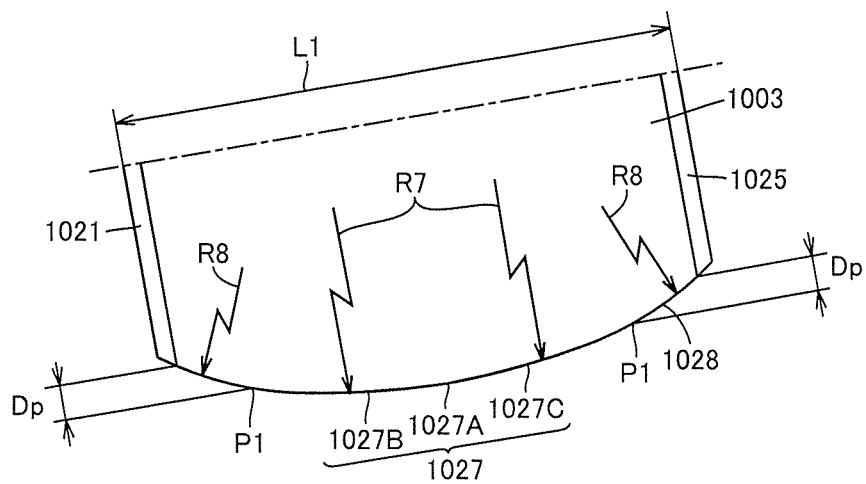
FIG. 58 is a diagram showing another modification to the tapered roller bearing according to the third embodiment.

A part or the entirety of the generatrix of contact area crowned portion 1027 may be represented by a logarithmic crowning profile. Owing to contact area crowned portion 1027 represented by the logarithmic crowning profile, a contact pressure and stress in a contact area can be reduced so that the tapered roller bearing can have a longer lifetime. As shown in FIG. 58, the generatrix of contact area crowned portion 1027 may be represented by a straight portion 1027A formed as being flat along the axial direction of the roller and a portion 1027B defined by a logarithmic curve of the logarithmic crowning profile.

In another embodiment of the present invention, in the tapered roller bearing, the crowning profile may be provided in roller 1012 and also in inner ring 1013. In this case, the sum of drop of roller 1012 and drop of inner ring 1013 is set to be equal to the optimized drop. Owing to those crowning profiles, a contact pressure and stress in the contact area can be reduced so that the tapered roller bearing can have a longer lifetime. As compared, for example, with an example of a conventional crowning profile of a single circular arc, an amount of grinding can be suppressed, efficiency in working of roller 1012 can be improved, and manufacturing cost can be reduced.

The tapered roller bearing according to the present invention includes inner and outer rings and rollers, in which a roller rolling surface around the outer circumference of the roller is at least crowned, the crowning profile formed portion of the roller rolling surface includes a contact area crowned portion within a range of the axial direction of the inner-ring raceway surface and in contact with the inner-ring raceway surface and a non-contact area crowned portion out of the range in the axial direction of the inner-ring raceway surface and not in contact with the inner-ring raceway surface, the contact area crowned portion and the non-contact area crowned portion have such generatrices extending in the axial direction of the roller as expressed by functions different from each other and being smoothly continuous at a point of connection to each other, and in the vicinity of the point of connection, the generatrix of the non-contact area crowned portion is smaller in curvature than the generatrix of the contact area crowned portion.

"Being smoothly continuous" refers to being continuous without forming a corner, and ideally refers to the generatrix of the contact area crowned portion and the generatrix of the non-contact area crowned portion being continuous to have a tangential line in common at a continuous point, that is, such a function that the generatrices can continuously be differentiated at the continuous point.

According to such a construction, the roller rolling surface around the outer circumference of the roller is crowned, so that a grindstone can be applied to the roller rolling surface in a more necessary and sufficient manner than in formation of a crowning profile only in the inner-ring raceway surface. Therefore, poor working of the rolling surface can be prevented. A crowning profile formed in the roller rolling surface can lower a contact pressure or stress in a contact area so that the tapered roller bearing can have a longer lifetime. In the vicinity of the connection point between the contact area crowned portion and the non-contact area crowned portion, the generatrix of the non-contact area crowned portion is smaller in curvature than the generatrix of the contact area crowned portion, so that drop at opposing ends of the roller can be reduced. Therefore, as compared, for example, with an example of a conventional crowning profile of a single circular arc, an amount of grinding can be suppressed, efficiency in working of the roller can be improved, and manufacturing cost can be reduced.

Any one or both of a portion on the larger diameter side and a portion on the smaller diameter side of the generatrix of the non-contact area crowned portion may be arcuate. In this case, drop can be reduced as compared with an example in which the generatrix of the entire roller rolling surface is represented, for example, by a logarithmic curve. Therefore, an amount of grinding can be reduced.

Any one or both of the portion on the larger diameter side and the portion on the smaller diameter side of the generatrix of the non-contact area crowned portion may be linear. In this case, drop can further be reduced as compared with an example in which the generatrix of the non-contact area crowned portion is arcuate.

A part or the entirety of the generatrix of the contact area crowned portion may be represented by the logarithmic crowning profile. Owing to the contact area crowned portion represented by the logarithmic crowning profile, a contact pressure and stress in a contact area can be reduced so that the tapered roller bearing can have a longer lifetime.

The generatrix of the contact area crowned portion may be represented by a straight portion formed as being flat along an axial direction of the roller and a portion defined by a logarithmic curve of the logarithmic crowning profile.

Of the generatrix of the non-contact area crowned portion, a portion of connection to a portion defined by a logarithmic curve of the logarithmic crowning profile may be matched with a gradient of the logarithmic curve. In this case, the generatrix of the contact area crowned portion and the generatrix of the non-contact area crowned portion can be continuous further smoothly at the point of connection.

The generatrix of the contact area crowned portion may be defined by a logarithmic curve of the logarithmic crowning profile expressed in the expression (1).

At least $K_1$ and $z_m$ in the expression (1) may optimally be designed by using a mathematical optimization approach.

The inner-ring raceway surface may be provided with a crowning profile and the sum of drop of the crowning profile of the inner-ring raceway surface and drop of the crowning profile around the outer circumference of the roller may attain to a prescribed value.

A method of designing a tapered roller bearing according to the present invention is a method of designing a tapered roller bearing including inner and outer rings and rollers, in which a roller rolling surface around the outer circumference of the roller is at least provided with a crowning profile, the crowning profile formed portion of the roller rolling surface includes a contact area crowned portion within a range of the axial direction of the inner-ring raceway surface and in contact with the inner-ring raceway surface and a non-contact area crowned portion out of the range in the axial direction of the inner-ring raceway surface and not in contact with the inner-ring raceway surface, the contact area crowned portion and the non-contact area crowned portion have such generatrices extending in the axial direction of the roller as expressed by functions different from each other and being smoothly continuous at a point of connection to each other, the generatrix of the contact area crowned portion is defined by a logarithmic curve of the logarithmic crowning profile expressed in the expression (1), and in the vicinity of the point of connection, the generatrix of the non-contact area crowned portion is designed to be smaller in curvature than the generatrix of the contact area crowned portion.

According to the design method of the present invention, a tapered roller bearing capable of achieving a reduced contact pressure or stress in a contact area and a longer lifetime can be designed in a simplified manner. The tapered roller bearing capable of achieving reduced drop of the roller and reduced manufacturing cost can be designed.

<Application of Tapered Roller Bearing>

An exemplary application of the tapered roller bearing according to second to fifth embodiments will be described. As described above, the tapered roller bearing according to the second to fifth embodiments is suitable for a differential gear and a transmission. Tapered roller bearing 1010 described above is employed for a differential gear or a transmission of automobiles. Tapered roller bearing 1010 is a tapered roller bearing for automobiles.

Figure 59:
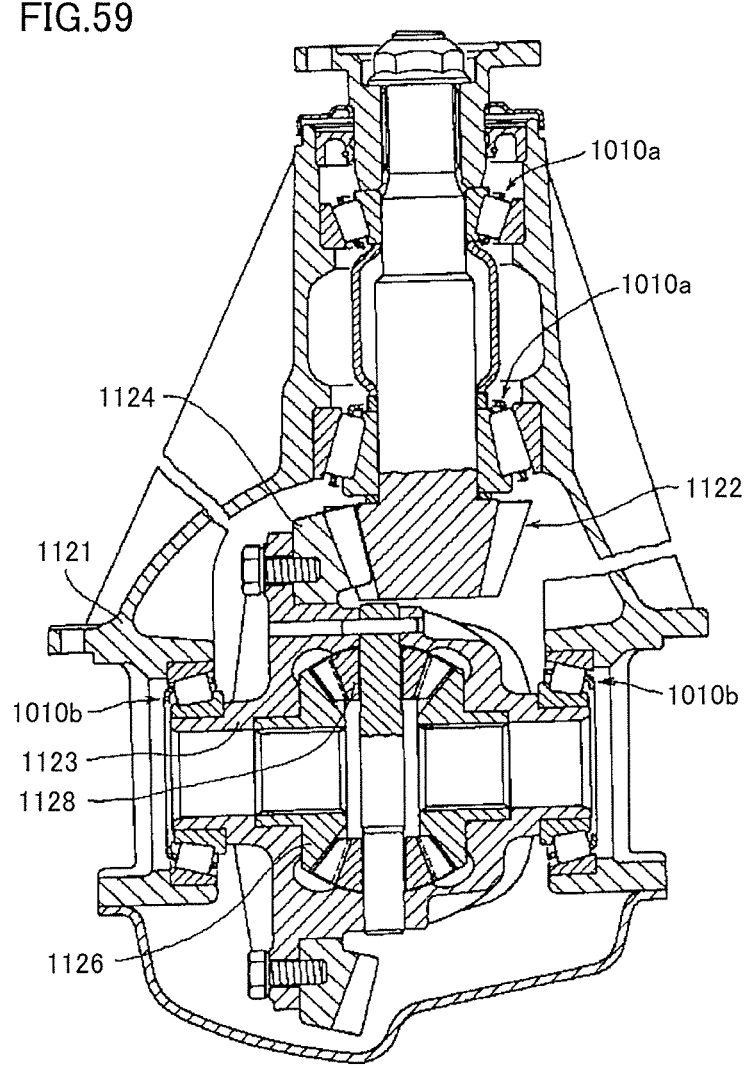
FIG. 59 is a vertical cross-sectional view showing a differential gear including the tapered roller bearing according to the second embodiment.

FIG. 59 shows a differential gear of an automobile including tapered roller bearing 1010 described above. The differential gear is such that a drive pinion 1122 coupled to a propeller shaft (not shown) and inserted through a differential case 1121 is meshed with a ring gear 1124 attached to a differential gear case 1123 and a pinion gear 1125 attached inside differential gear case 1123 is meshed with a side gear 1126 coupled to a drive shaft (not shown) inserted through differential gear case 1123 from right and left sides so that driving force from an engine is transmitted from the propeller shaft to the left and right drive shafts. In this differential gear, drive pinion 1122 serving as a power transmission shaft and differential gear case 1123 are supported by a pair of tapered roller bearings 1010a and a pair of tapered roller bearings 10b, respectively.

Figure 60:
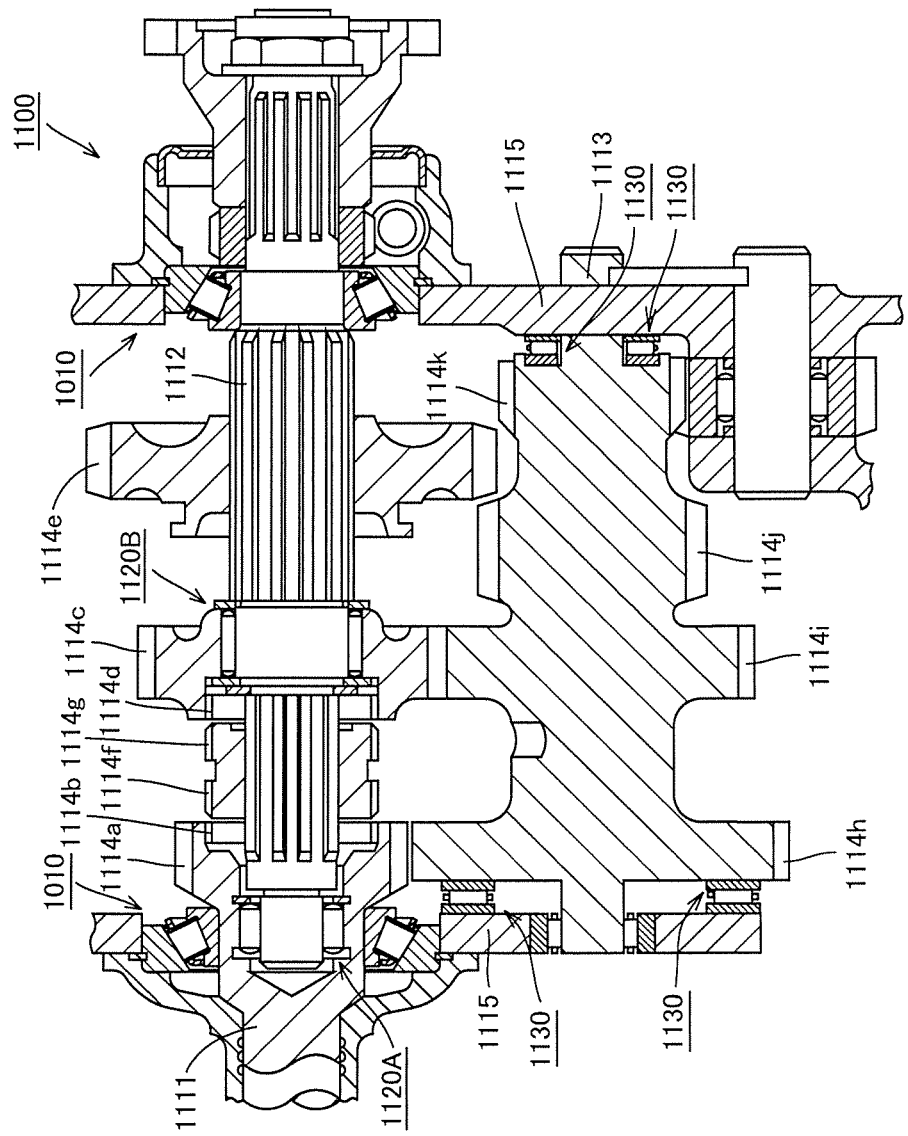
FIG. 60 is a vertical cross-sectional view showing a transmission including the tapered roller bearing according to the second embodiment.

FIG. 60 shows a manual transmission of an automobile including tapered roller bearing 1010 described above. A manual transmission 1100 is a constantly meshing manual transmission, and includes an input shaft 1111, an output shaft 1112, a countershaft 1113, gears 1114a to 1114k, and a housing 1115.

Input shaft 1111 is rotatably supported by tapered roller bearing 1010 with respect to housing 1115. Gear 1114a is formed around an outer circumference of input shaft 1111 and gear 1114b is formed around an inner circumference thereof.

Output shaft 1112 is supported by tapered roller bearing 1010 on one side (a right side in the figure) rotatably with respect to housing 1115 and supported by a rolling bearing 1120A on the other side (a left side in the figure) rotatably with respect to input shaft 1111. Gears 1114a to 1114g are attached to output shaft 1112.

Gears 1114c and 1114d are formed around outer and inner circumferences, respectively, of the same member. The member on which gears 1114c and 1114d are formed is rotatably supported by a rolling bearing 1120B with respect to output shaft 1112. Gear 1114e is attached to output shaft 1112 so as to rotate together with output shaft 1112 and be slidable along the axis of output shaft 1112.

Gears 1114f and 1114g are each formed around an outer circumference of the same member. The member on which gears 1114f and 1114g are formed is attached to output shaft 1112 so as to rotate together with output shaft 1112 and be slidable along the axis of output shaft 1112. When the member on which gear 1114f and gear 1114g are formed slides to the left in the figure, gear 1114f can mesh with gear 1114b, and when the member slides to the right in the figure, gear 1114g can mesh with gear 1114d.

Countershaft 1113 have gears 1114h to 1114k formed. Two thrust needle roller bearings 1130 are arranged between countershaft 1113 and housing 1115, and a load in the axial direction of countershaft 1113 (a thrust load) is supported thereby. Gear 1114h is constantly in mesh with gear 1114a, and gear 1114i is constantly in mesh with gear 1114c. Gear 1114j can mesh with gear 1114e when gear 1114e slides to the left in the figure. Gear 1114k can mesh with gear 1114e when gear 1114e slides to the right in the figure.

A shift operation of manual transmission 1100 will now be described. In manual transmission 1100, rotation of input shaft 1111 is transmitted to countershaft 1113 by meshing of gear 1114a formed on input shaft 1111 and gear 1114h formed on countershaft 1113. Rotation of countershaft 1113 is transmitted to output shaft 1112 by meshing of gears 1114i to 1114k formed on countershaft 1113 and gears 1114c and 1114e attached to output shaft 1112. Thus, rotation of input shaft 1111 is transmitted to output shaft 1112.

When rotation of input shaft 1111 is transmitted to output shaft 1112, a rotation speed of output shaft 1112 can be changed stepwise relative to a rotation speed of input shaft 1111 by changing a gear meshed between input shaft 1111 and countershaft 1113 and a gear meshed between countershaft 1113 and output shaft 1112. Rotation of input shaft 1111 can also directly be transmitted to output shaft 1112 by directly meshing gear 1114b of input shaft 1111 with gear 1114f of output shaft 1112 without countershaft 1113 being interposed.

The shift operation of manual transmission 1100 will more specifically be described below. When gear 1114f does not mesh with gear 1114b, gear 1114g does not mesh with gear 1114d, and gear 1114e meshes with gear 1114j, driving force of input shaft 1111 is transmitted to output shaft 1112 via gear 1114a, gear 1114h, gear 1114j, and gear 1114e. This is referred to, for example, as a first speed.

When gear 1114g meshes with gear 1114d and gear 1114e does not mesh with gear 1114j, driving force of input shaft 1111 is transmitted to output shaft 1112 via gear 1114a, gear 1114h, gear 1114i, gear 1114c, gear 1114d, and gear 1114g. This is referred to, for example, as a second speed.

When gear 1114f meshes with gear 1114b and gear 1114e does not mesh with gear 1114j, input shaft 1111 is directly coupled to output shaft 1112 by meshing of gear 1114b and gear 1114f, and driving force of input shaft 1111 is directly transmitted to output shaft 1112. This is referred to, for example, as a third speed.

As described above, manual transmission 1100 includes tapered roller bearing 1010 for rotatably supporting input shaft 1111 and output shaft 1112 as rotary members with respect to housing 1115 arranged adjacent thereto. Thus, tapered roller bearings 1010 and 1010a according to the first and second embodiments, can be used in manual transmission 1100. Tapered roller bearing 1010 achieving reduced torque loss and improved seizure resistance and lifetime is suitable for use in manual transmission 1100 in which a high contact pressure is applied between a rolling element and a raceway member.

In transmissions, differential gears, or the like which are powertrains for automobiles, not only lubricating oil low in viscosity is used but also an amount oil tends to be decreased for enhanced fuel economy. Therefore, sufficient formation of an oil film is less likely in the tapered roller bearing. When the transmission or the differential gear is used in an environment at a low temperature (for example, from $-40°$ C. to $-30°$ C.), viscosity of lubricating oil increases, and in particular at the time of start, lubricating oil may not sufficiently be supplied to the tapered roller bearing. Therefore, tapered roller bearings for automobiles are required to have improved seizure resistance and lifetime. Such requirement can be satisfied by incorporating tapered roller bearing 1010 having improved seizure resistance and lifetime into a transmission or a differential gear.

Fourth Embodiment

<Construction of Tapered Roller Bearing>

Figure 61:
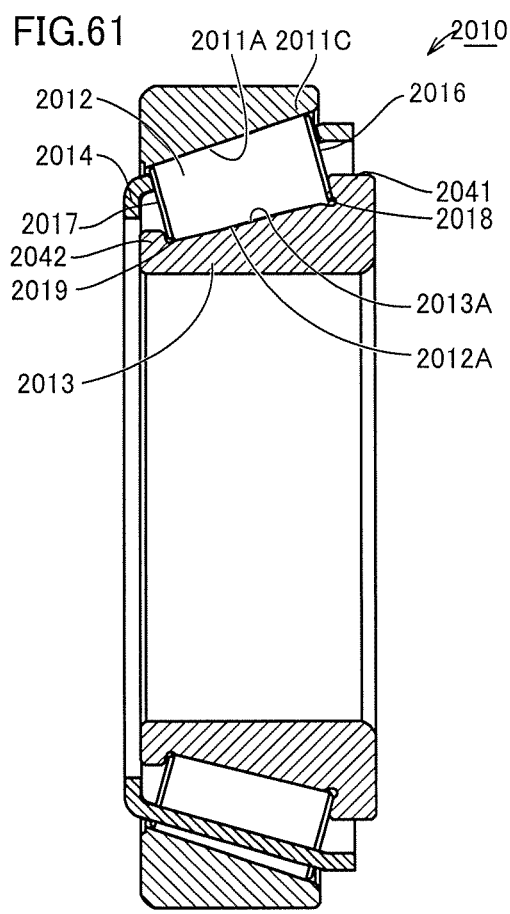
FIG. 61 is a vertical cross-sectional view showing a tapered roller bearing according to a fourth embodiment.
Figure 62:
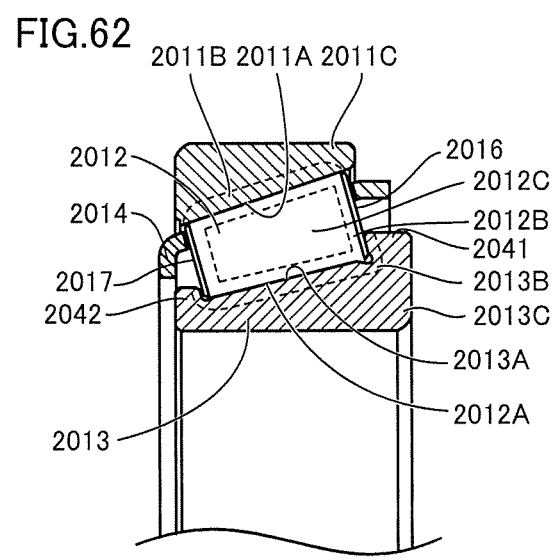
FIG. 62 is a partial cross-sectional view for illustrating a nitrogen enriched layer in the tapered roller bearing according to the fourth embodiment.
Figure 63:
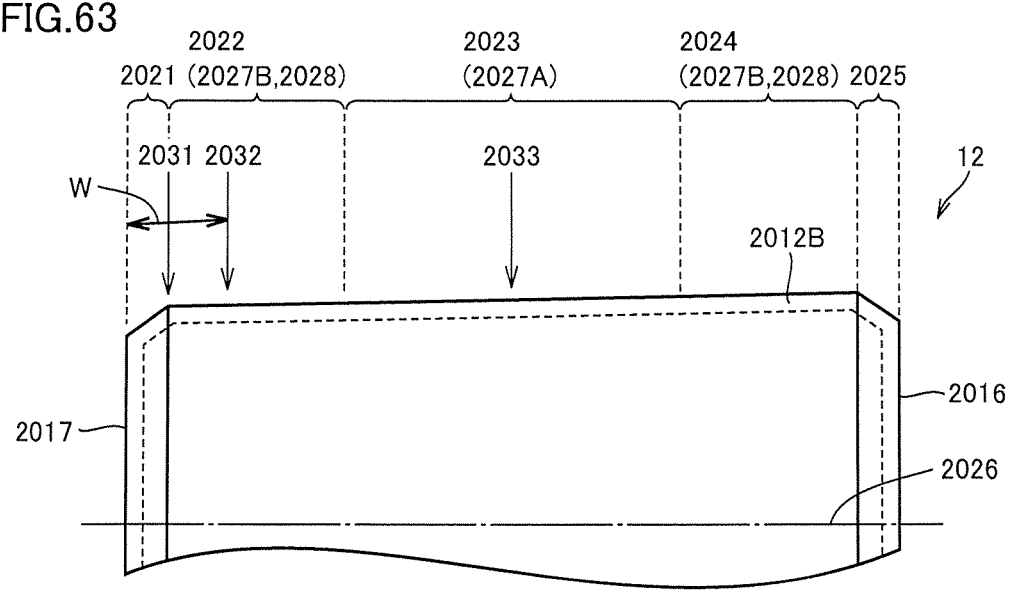
FIG. 63 is a diagram for illustrating a shape of the nitrogen enriched layer in a crowned portion and a central portion of a roller of the tapered roller bearing according to the fourth embodiment.
Figure 64:
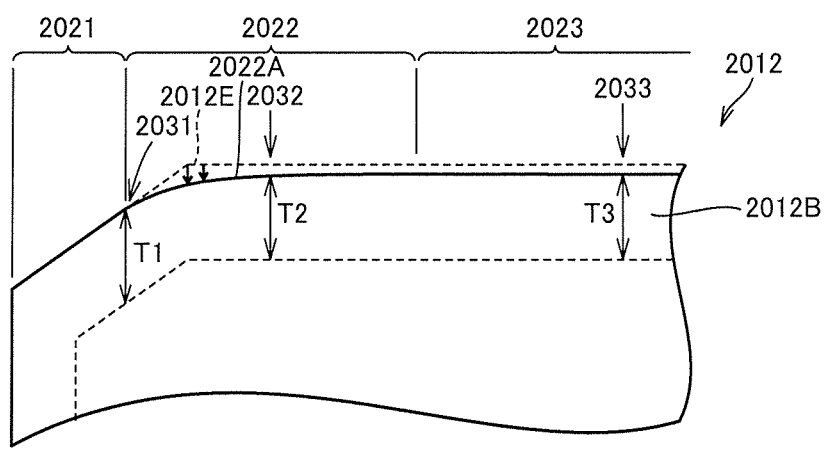
FIG. 64 is a diagram for illustrating a logarithmic crowning profile of the roller of the tapered roller bearing according to the fourth embodiment.

FIG. 61 is a schematic cross-sectional view of a tapered roller bearing according to an embodiment of the present invention. FIG. 62 is a schematic partial cross-sectional view of the tapered roller bearing shown in FIG. 61. FIG. 63 is a schematic partial cross-sectional view of a tapered roller of the tapered roller bearing shown in FIG. 61. FIG. 64 is a schematic enlarged partial cross-sectional view of the tapered roller shown in FIG. 63. The tapered roller bearing according to the present embodiment will be described with reference to FIGS. 61 to 64.

A tapered roller bearing 2010 shown in FIG. 61 mainly includes an outer ring 2011, an inner ring 2013, a plurality of tapered rollers (hereinafter also simply referred to as rollers) 2012, and a cage 2014. Outer ring 2011 has an annular shape and includes an outer-ring raceway surface 2011A around its inner circumferential surface. Inner ring 2013 has an annular shape and includes an inner-ring raceway surface 2013A around its outer circumferential surface. Inner ring 2013 is arranged on an inner circumferential side of outer ring 2011 such that inner-ring raceway surface 2013A faces outer-ring raceway surface 2011A. In the description below, a direction along the central axis of tapered roller bearing 2010 is referred to as an "axial direction," a direction orthogonal to the central axis is referred to as a "radial direction," and a direction along an arc around the central axis is referred to as a "circumferential direction."

Rollers 2012 are arranged on the inner circumferential surface of outer ring 2011. Roller 2012 includes a roller rolling surface 2012A, and comes in contact with inner-ring raceway surface 2013A and outer-ring raceway surface 2011A at roller rolling surface 2012A. The plurality of rollers 2012 are arranged at a prescribed pitch in the circumferential direction in cage 2014 made of a synthetic resin. Thus, roller 2012 is held on the annular raceway of outer ring 2011 and inner ring 2013 in a rollable manner. Tapered roller bearing 2010 is constructed such that the apex of a cone including outer-ring raceway surface 2011A, the apex of a cone including inner-ring raceway surface 2013A, and the apex of a cone including the locus of the rotation axis of roller 2012 when the roller rolls meet at one point on the centerline of the bearing. According to such a construction, outer ring 2011 and inner ring 2013 of tapered roller bearing 2010 are rotatable relative to each other. Cage 2014 is not limited to a cage made of a resin and may be of a metal.

Outer ring 2011, inner ring 2013, and roller 2012 may be formed of steel. Steel at least contains at least 0.6 mass % and at most 1.2 mass % of carbon, at least 0.15 mass % and at most 1.1 mass % of silicon, and at least 0.3 mass % and at most 1.5 mass % of manganese in a portion other than nitrogen enriched layers 2011B, 2012B, and 2013B. Steel may further contain at most 2.0 mass % of chromium.

In the above construction, when a carbon content exceeds 1.2 mass %, cold workability is impaired by a high hardness of a material in spite of spheroidizing annealing, and a sufficient amount of cold working and sufficient working accuracy cannot be obtained in cold working. In addition, an over-carburized structure tends to be formed during carbonitriding treatment and cracking strength may be lowered. When the carbon content is lower than 0.6 mass %, it takes a long time to ensure a required surface hardness and a required amount of retained austenite, and it is difficult to obtain a required internal hardness in quenching after reheating.

The Si content of 0.15 to 1.1 mass % is set because Si can increase resistance against softening by tempering to ensure heat resistance and thus improve rolling fatigue life characteristics under lubrication with foreign matters being introduced. When the Si content is lower than 0.15 mass %, the rolling fatigue life characteristics under lubrication with foreign matters being introduced are not improved. When the Si content exceeds 1.1 mass %, a hardness after normalizing becomes too high to impair cold workability.

Mn is effective for ensuring hardenability of a carbonitrided layer and a core portion. When the Mn content is lower than 0.3 mass %, sufficient hardenability cannot be obtained and sufficient strength cannot be ensured in the core portion. When the Mn content exceeds 1.5 mass %, hardenability becomes excessive, and a hardness after normalizing becomes high and cold workability is impaired. Furthermore, austenite is excessively stabilized, which leads to an excessive amount of retained austenite in the core portion and acceleration of dimensional change over time. When steel contains at most 2.0 mass % of chromium, a carbide or a nitride of chromium is precipitated at a surface layer portion and a hardness of the surface layer portion can easily be enhanced. The Cr content of at most 2.0 mass % is set because the Cr content exceeding 2.0 mass % leads to significant lowering in cold workability and the content exceeding 2.0 mass % is less in effect of enhancement to a hardness of the surface layer portion.

Naturally, steel in the present disclosure may contain Fe as a main component, and may contain an inevitable impurity in addition to the above elements. Examples of the inevitable impurity include phosphorus (P), sulfur (S), nitrogen (N), oxygen (O), aluminum (Al), and the like. An amount of these inevitable impurity elements is 0.1 mass % or less.

From a different point of view, outer ring 2011 and inner ring 2013 are preferably made of a steel material representing a bearing material such as JIS SUJ2. Roller 2012 may be made of a steel material representing a bearing material such as JIS SUJ2. Alternatively, roller 2012 may be made of another material such as a sialon sintered material.

As shown in FIG. 62, nitrogen enriched layers 2011B and 2013B are formed in raceway surface 2011A of outer ring 2011 and raceway surface 2013A of inner ring 2013, respectively. In inner ring 2013, nitrogen enriched layer 2013B extends from raceway surface 2013A to a smaller flange surface and a larger flange surface. Nitrogen enriched layers 2011B and 2013B are regions higher in nitrogen concentration than an unnitrided portion 2011C of outer ring 2011 and an unnitrided portion 2013C of inner ring 2013. Nitrogen enriched layer 2012B is formed in a surface of roller 2012 including rolling surface 2012A. Nitrogen enriched layer 2012B of roller 2012 is a region higher in nitrogen concentration than an unnitrided portion 2012C of roller 2012. Nitrogen enriched layers 2011B, 2012B, and 2013B can be formed by any conventionally well-known method such as carbonitriding and nitriding.

Nitrogen enriched layer 2012B may be formed only in roller 2012, nitrogen enriched layer 2011B may be formed only in outer ring 2011, or nitrogen enriched layer 2013B may be formed only in inner ring 2013. Alternatively, a nitrogen enriched layer may be formed in two of outer ring 2011, inner ring 2013, and roller 2012.

As shown in FIG. 63, rolling surface 2012A (see FIG. 62) of roller 2012 includes crowned portions 2022 and 2024 located at opposing ends and a central portion 2023 connecting crowned portions 2022 and 2024 to each other. Central portion 2023 is uncrowned and linear in cross-section in a direction along a centerline 2026 which is the rotation axis of roller 2012. A chamfered portion 2021 is formed between end face 2016, 2017 of roller 2012 and crowned portion 2022. A chamfered portion 2025 is also formed between end face 2016, 2017 and a crowned portion 2024.

In a method of manufacturing roller 2012, in treatment for forming nitrogen enriched layer 20128 (carbonitriding treatment), roller 2012 is not crowned but an outer geometry of roller 2012 is a yet-to-be-worked surface 2012E as shown with a dotted line in FIG. 64. After the nitrogen-enriched layer is formed in this state, roller 2012 has a side surface worked as shown with an arrow in FIG. 64 as finishing so that crowned portions 2022 and 2024 are obtained as shown in FIGS. 63 and 64.

Thickness of Nitrogen Enriched Layer:

A depth of nitrogen-enriched layer 2012B in roller 2012, that is, a distance from the outermost surface of nitrogen-enriched layer 2012B to the bottom of nitrogen-enriched layer 2012B, is 0.2 mm or more. Specifically, at a first measurement point 2031 representing a boundary point between chamfered portion 2021 and crowned portion 2022, a second measurement point 2032 at a distance W of 1.5 mm from an end face 2012D, and a third measurement point 2033 at the center of rolling surface 2012A of roller 2012, depths T1, T2, and T3 of nitrogen enriched layer 2012B at these positions are 0.2 mm or more. The depth of nitrogen enriched layer 2012B means a thickness of nitrogen enriched layer 2012B in a radial direction orthogonal to centerline 2026 of roller 2012 and toward the outer circumference. Values of depths T1, T2, and T3 of nitrogen enriched layer 2012B can be modified as appropriate, depending on a shape and a size of chamfered portions 2021 and 2025 and a process condition such as a condition for treatment to form nitrogen enriched layer 2012B and a condition for finishing. For example, in the exemplary construction shown in FIG. 64, depth T2 of nitrogen enriched layer 2012B is smaller than other depths T1 and T3 due to formation of a crowning profile 2022A after formation of nitrogen enriched layer 2012B as described above. By changing the process condition described above, however, relation in magnitude among the values of depths T1, T2, and T3 of nitrogen enriched layer 2012B can be modified as appropriate.

A thickness of nitrogen enriched layers 2011B and 2013B in outer ring 2011 and inner ring 2013 representing a distance from the outermost surface to the bottom thereof is again not smaller than 0.2 mm. The thickness of nitrogen enriched layers 2011B and 2013B means a distance to nitrogen enriched layers 2011B and 2013B in a direction perpendicular to the outermost surface of nitrogen enriched layers 2011B and 2013B.

Crowning Profile:

A crowning profile formed in a contact area crowning portion 2027 included in crowned portions 2022 and 2024 of roller 2012 is defined as below. More specifically, a sum of crown drops is expressed in a y-z coordinate system with a generatrix of rolling surface 2012A of roller 2012 being defined as the y axis and a direction orthogonal to the generatrix being defined as the z axis, by the expression (1) where $K_1$, $K_2$, and $z_m$ represent design parameters, Q represents a load, L represents a length of an effective contact portion of rolling surface 2012A of roller 2012 along the generatrix, E' represents an equivalent elastic modulus, a represents a length from an origin on the generatrix of the rolling surface of roller 2012 to an end of the effective contact portion, and A is defined as $A = 2K_1 Q/\pi L E'$.

Figure 65:
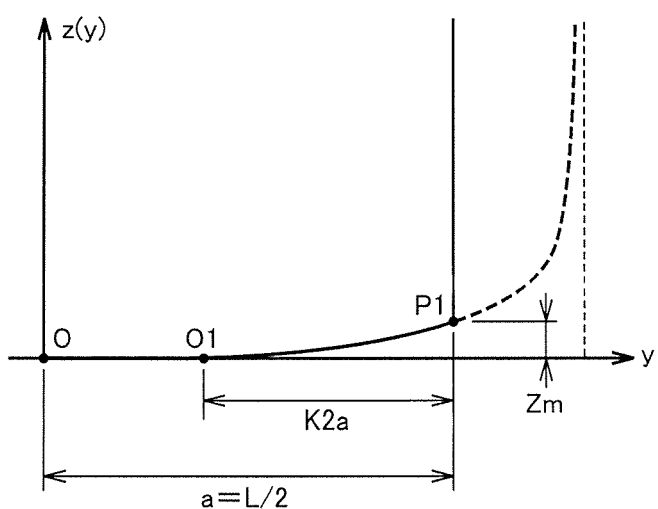
FIG. 65 is a y-z coordinate diagram representing an exemplary crowning profile.

FIG. 65 is a y-z coordinate diagram representing an exemplary crowning profile. FIG. 65 shows the exemplary crowning profile expressed in the expression (1) in the y-z coordinate system with the generatrix of roller 2012 being defined as the y axis, origin O being taken on the generatrix of roller 2012 at the central portion of the effective contact portion between inner ring 2013 or outer ring 2011 and roller 2012, and a direction orthogonal to the generatrix (a direction of radius) being defined as the z axis. In FIG. 65, the ordinate represents the z axis and the abscissa represents the y axis. The effective contact portion is a portion of contact between inner ring 2013 or outer ring 2011 and roller 2012 when roller 2012 is uncrowned. Since the plurality of rollers 2012 constituting tapered roller bearing 2010 are normally crowned in line symmetry with respect to the z axis passing through the central portion of the effective contact portion, FIG. 65 only shows one crowning profile 2022A.

Load Q, length L of the effective contact portion along the generatrix, and equivalent elastic modulus E' are given as design conditions, and length a from the origin to the end of the effective contact portion has a value determined by a position of the origin.

In the expression (1), z(y) represents drop of crowning profile 2022A at a position y in the direction of the generatrix of roller 2012, and a coordinate of starting point O1 of crowning profile 2022A is expressed as $(a - K_2 a, 0)$. Therefore, in the expression (1), y has a range of $y > (a - K_2 a)$. In FIG. 65, since origin O is defined at the central portion of the effective contact portion, relation of $a = L/2$ is satisfied. A region from origin O to starting point O1 of crowning profile 2022A is the uncrowned central portion (a straight portion). Therefore, when relation of $0 \leq y \leq (a - K_2 a)$ is satisfied, relation of $z(y) = 0$ is satisfied.

Design parameter $K_1$ means a multiplying factor for load Q, and geometrically means a degree of curvature of crowning profile 2022A. Design parameter $K_2$ means a ratio of a length ym of crowning profile 2022A along the generatrix to length a from origin O to the end of the effective contact portion along the generatrix ($K_2$=ym/a). Design parameter $z_m$ means drop at the end of the effective contact portion, that is, maximum drop of crowning profile 2022A.

Figure 69:
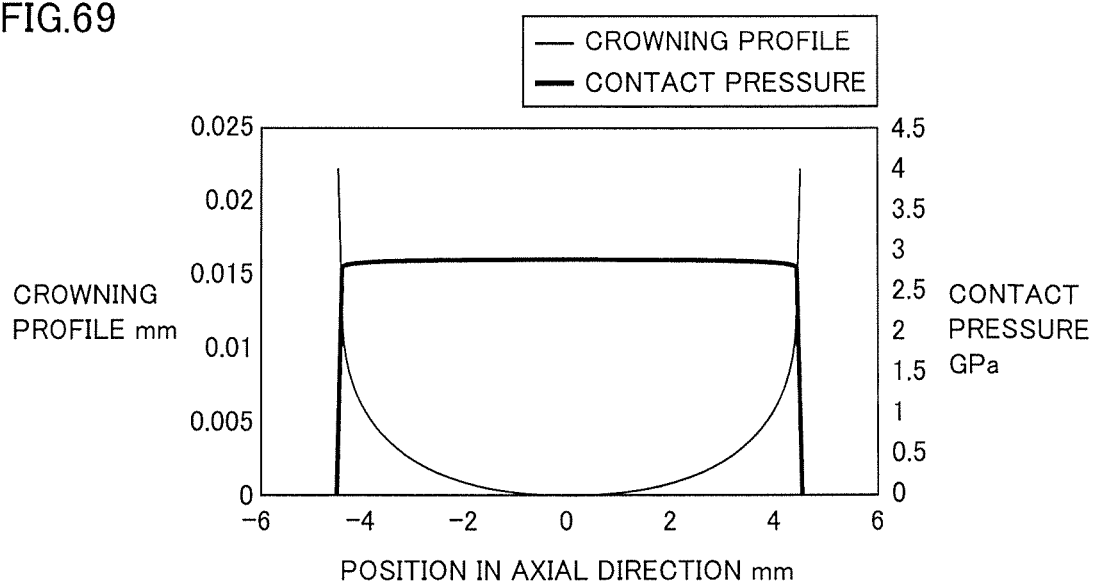
FIG. 69 is a diagram showing a roller provided with a crowning profile having a contour line expressed by a logarithmic function.

A crowning profile of the roller as shown in FIG. 69 which will be described later is a full crowning profile without a straight portion defined by a design parameter $K_2$=1, and ensures sufficient drop which does not cause edge loading. Excessive drop, however, leads to a large machining allowance taken from a raw material as a material to be worked, which will invite increase in cost. Accordingly, design parameters $K_1$, $K_2$, and $z_m$ are optimized as below.

Design parameters $K_1$, $K_2$, and $z_m$ can be optimized by various methods, and for example, a direct search method such as the Rosenbrock method can be adopted. Since surface-originating damage in a rolling surface of a roller depends on a contact pressure, by setting the contact pressure as an objective function for optimization, a crowning profile that prevents oil film breakage at a contact surface under lean lubrication can be obtained.

When the roller is provided with a logarithmic crowning profile, a straight portion (central portion 2023) having a length not shorter than ½ of the entire length is preferably provided in a central portion of the rolling surface in order to secure working accuracy of the roller. In this case, $K_2$ is set to a constant value and $K_1$ and $z_m$ should only be optimized.

Figure 66:
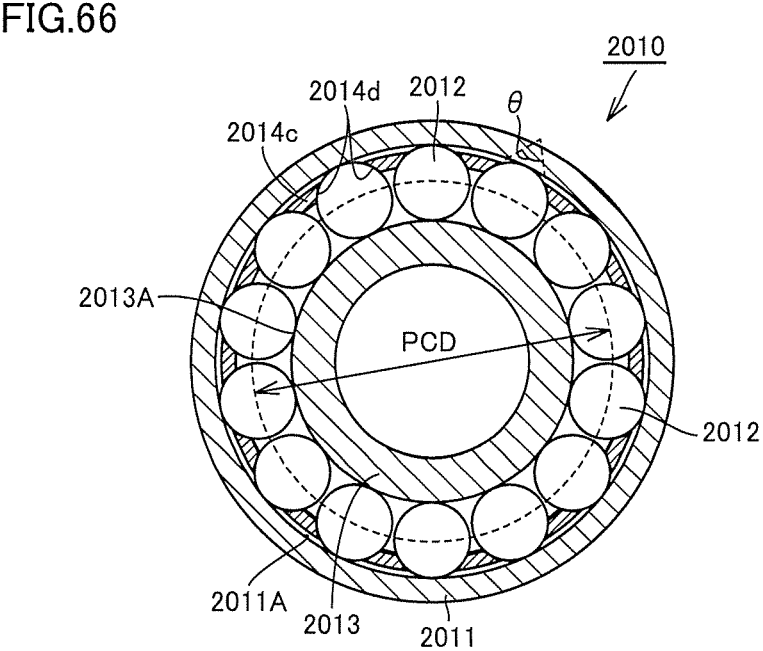
FIG. 66 is a lateral cross-sectional view showing the tapered roller bearing according to the fourth embodiment.

Roller Coefficient:

As shown in FIGS. 61 and 66, inner ring 2013 includes conical raceway surface 2013A and includes a larger flange portion 2041 on the larger diameter side and a smaller flange portion 2042 on the smaller diameter side of raceway surface 2013A. Tapered roller bearing 2010 has a roller coefficient γ which satisfies relation of γ>0.90. Roller coefficient γ is defined by a relational expression γ=(Z·DA)/(π·PCD) with Z represents the number of rollers, DA represents an average diameter of the roller, and PCD represents a pitch circle diameter.

Figure 67:
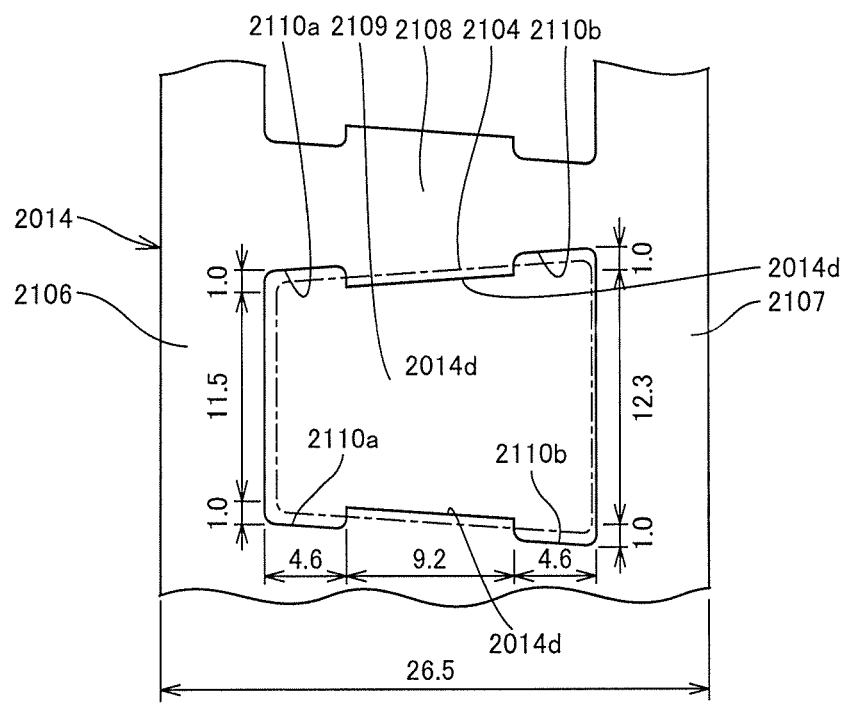
FIG. 67 is a developed plan view of a cage of the tapered roller bearing according to the fourth embodiment.

Shape of Cage:

As shown in FIG. 67, cage 2014 is constituted of a smaller annular portion 2106 continuous on a side of a smaller-diameter end face of tapered roller 2012, a larger annular portion 2107 continuous on a side of a larger-diameter end face of tapered roller 2012, and a plurality of posts 2108 which couple smaller annular portion 2106 and larger annular portion 2107 to each other, and the cage is provided with a pocket 2109 in such a trapezoidal shape that a portion accommodating a smaller diameter side of tapered roller 2012 is defined as a smaller width side and a portion accommodating a larger diameter side is defined as a larger width side. Two notches 2110a and two notches 2110b are provided on respective opposing sides of post 2108, and each of notches 2110a and 2110b has a depth of 1.0 mm and a width of 4.6 mm.

Ratio $R/R_{BASE}$ Between Radius of Curvature R of Larger End Face 2016 of Tapered Roller 2012 and Distance $R_{BASE}$ from O Point to Larger Flange Surface 2018 of Inner Ring 2013:

The smaller flange surface of inner ring 2013 is finished to a ground surface in parallel to a smaller end face 2017 of tapered roller 2012 disposed on raceway surface 2013A.

Figure 68:
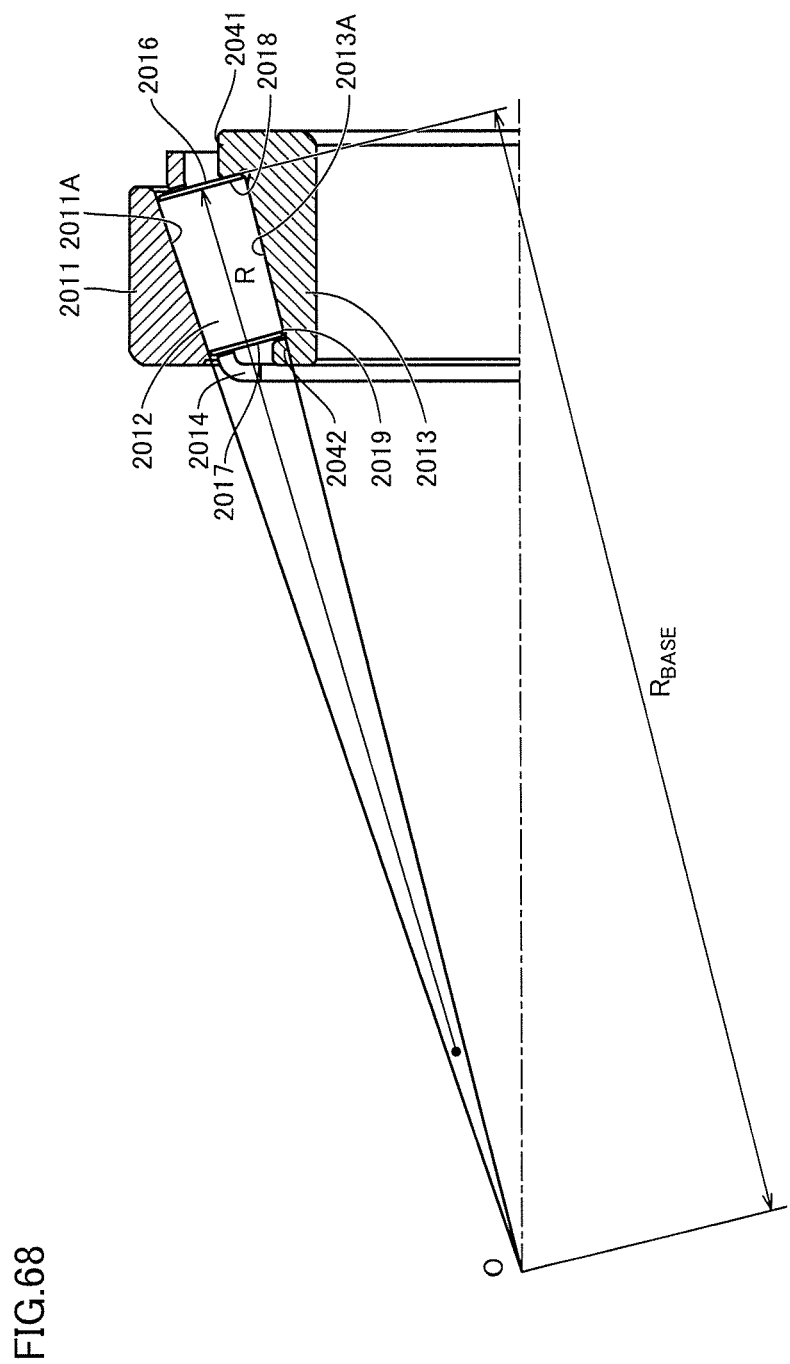
FIG. 68 is a cross-sectional view illustrating design specifications of the tapered roller bearing according to the fourth embodiment.

As shown in FIG. 68, apexes of cone angles of tapered roller 2012 and raceway surfaces 2011A and 2013A of outer ring 2011 and inner ring 2013 meet one another at one point O on the centerline of tapered roller bearing 2010 and ratio $R/R_{BASE}$ between radius of curvature R of larger end face 2016 of tapered roller 2012 and distance $R_{BASE}$ from the O point to a larger flange surface 2018 of inner ring 2013 is within a range not smaller than 0.75 and not greater than 0.87. Larger flange surface 2018 is ground to have surface roughness Ra, for example, not greater than 0.12 μm.

Figure 76:
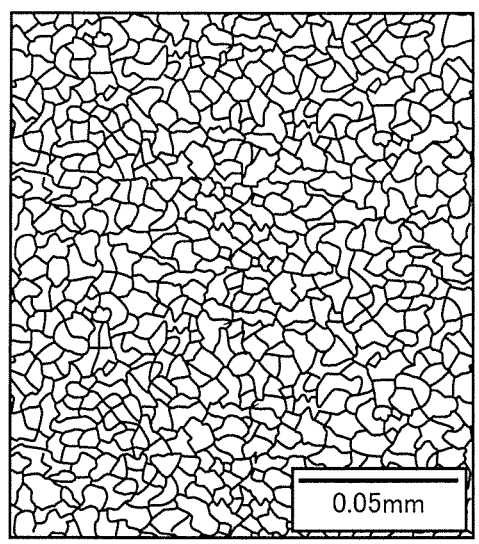
FIG. 76 is a diagram showing an austenite grain boundary of a bearing component according to the fourth embodiment.

Crystal Structure of Nitrogen-Enriched Layer:

FIG. 76 schematically illustrates a microstructure, in particular a prior austenite crystal grain boundary, of a bearing component constituting the tapered roller bearing according to the present embodiment. FIG. 76 shows a microstructure in nitrogen enriched layer 2012B. A grain size number defined under the JIS, of a prior austenite crystal grain size in nitrogen enriched layer 2012B in the present embodiment is equal to or greater than 10, and the grain size is sufficiently fine even in comparison with a conventional general hardened product.

<Method of Measuring Various Characteristics>

Method of Measuring Nitrogen Concentration:

Bearing components such as outer ring 2011, roller 2012, and inner ring 2013 are subjected to line analysis in a direction of depth by electron probe micro analysis (EPMA) in cross-sections perpendicular to surfaces of regions where nitrogen enriched layers 2011B, 2012B, and 2013B are formed. Measurement is conducted by cutting each bearing component from a measurement position in a direction perpendicular to the surface to expose a cut surface and subjecting the surface to measurement. For example, roller 2012 is cut in a direction perpendicular to centerline 2026 from each of first measurement point 2031 to third measurement point 2033 shown in FIG. 63 to expose a cut surface. The cut surface is analyzed for a nitrogen concentration by EPMA at a plurality of measurement positions each located at a distance of 0.05 mm inward from the surface of roller 2012. For example, five measurement positions are determined, and an average value of measurement data obtained at the five locations is adopted as a nitrogen concentration of roller 2012.

For outer ring 2011 and inner ring 2013, a central portion of raceway surfaces 2011A and 2013A in the direction of the central axis of the bearing is set as a measurement position and a cross-section along the central axis and a radial direction orthogonal to the central axis is exposed, and the cross-section is thereafter subjected to nitrogen concentration measurement in the same manner as above.

Method of Measuring Distance from Outermost Surface to Bottom of Nitrogen Enriched Layer:

Outer ring 2011 and inner ring 2013 are subjected to hardness distribution measurement in a direction of depth from a surface in the cross-section subjected to measurement in the method of measuring a nitrogen concentration. A Vickers hardness measurement instrument can be employed for measurement. Tapered roller bearing 2010 tempered at 500° C.×1 h is subjected to hardness measurement at a plurality of measurement points aligned in the direction of depth such as measurement points arranged at intervals of 0.5 mm. A region having a Vickers hardness of HV 450 or more is determined as a nitrogen enriched layer.

Roller 2012 is subjected to hardness distribution measurement in the direction of depth as described above in a cross-section at first measurement point 2031 shown in FIG. 63, to determine the region of the nitrogen enriched layer.

Method of Measuring Grain Size Number:

A prior austenite crystal grain size is measured by a method defined under JIS G0551: 2013. Measurement is conducted in the cross-section subjected to measurement by the method of measuring a distance to the bottom of the nitrogen enriched layer.

Method of Measuring Crowning Profile:

A crowning profile of roller 2012 can be measured by any method. For example, the crowning profile may be measured by measuring a profile of roller 2012 with a surface texture measurement instrument.

<Function and Effect of Tapered Roller Bearing>

Characteristic features of the above-described tapered roller bearing will be listed below, although description may partially be redundant.

Tapered roller bearing 2010 according to the present disclosure includes outer ring 2011, inner ring 2013, and rollers 2012 as a plurality of tapered rollers. Outer ring 2011 includes outer-ring raceway surface 2011A around an inner circumferential surface thereof. Inner ring 2013 includes inner-ring raceway surface 2013A around an outer circumferential surface thereof, and is arranged on a radially inner side of outer ring 2011. The plurality of rollers 2012 are disposed between outer-ring raceway surface 2011A and inner-ring raceway surface 2013A, and the roller includes rolling surface 2012A in contact with outer-ring raceway surface 2011A and inner-ring raceway surface 2013A. At least one of outer ring 2011, inner ring 2013, and the plurality of rollers 2012 includes nitrogen enriched layer 2011B, 2013B, or 2012B formed in a surface layer of outer-ring raceway surface 2011A, inner-ring raceway surface 2013A, or rolling surface 2012A. A grain size number defined under the JIS, of a prior austenite crystal grain size in nitrogen enriched layers 2011B, 2012B, and 2013B is equal to or greater than 10. Distance T1 from an outermost surface of the surface layer to a bottom of nitrogen enriched layer 2011B, 2012B, or 2013B is 0.2 mm or more. Rolling surface 2012A of roller 2012 is provided with crowning profile 2022A. A sum of drops of crowning profile 2022A is represented in a y-z coordinate system with a generatrix of rolling surface 2012A of roller 2012 being defined as a y axis and a direction orthogonal to the generatrix being defined as a z axis by the expression (1) where $K_1$, $K_2$, and $z_m$ represent design parameters, Q represents a load, L represents a length in a direction of the generatrix of an effective contact portion of rolling surface 2012A of roller 2012, E' represents an equivalent elastic modulus, a represents a length from an origin on the generatrix of the rolling surface of roller 2012 to an end of the effective contact portion, and A is defined as $A = 2K_1 Q/\pi LE'$.

Load Q, length L of the effective contact portion along the generatrix, and equivalent elastic modulus E' are given as design conditions, and length a from the origin to the end of the effective contact portion has a value determined by a position of the origin.

Since nitrogen enriched layer 2011B, 2012B, or 2013B having a sufficiently fine prior austenite crystal grain size has thus been formed in at least one of outer ring 2011, inner ring 2013, and roller 2012 as the tapered roller, a rolling fatigue life can be long and a Charpy impact value, a fracture toughness value, ultimate strength, and the like can be improved.

Since rolling surface 2012A of roller 2012 is provided with a crowning profile with a contour line being represented by such a logarithmic function (what is called a logarithmic crowning profile) that the expression (1) represents a sum of drops, local increase in contact pressure can be suppressed and wear of rolling surface 2012A of roller 2012 can be suppressed as compared with an example in which a conventional crowning profile represented by a partial circular arc is formed.

Figure 70:
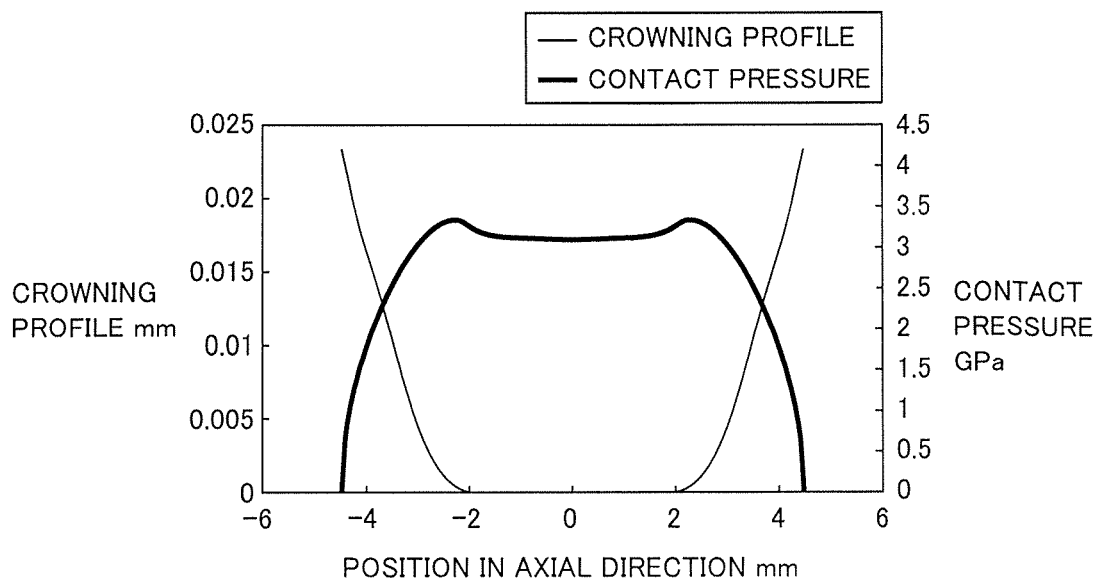
FIG. 70 shows a contour line of a roller in which a portion between a partially arcuate crowning profile and a straight portion is expressed by an auxiliary circular arc and a contact surface pressure at a roller rolling surface as being superimposed on each other.

An effect of the logarithmic crowning profile described above will now be described in more detail. FIG. 69 shows a contour line of a roller provided with a crowning profile with the contour line being represented by a logarithmic function and a contact surface pressure at a roller rolling surface as being superposed on each other. FIG. 70 shows a contour line of a roller with a portion between a partially arcuate crowning profile and a straight portion being represented by an auxiliary circular arc and a contact surface pressure at a roller rolling surface as being superposed on each other. In FIGS. 69 and 70, the ordinate on the left side represents drop (unit: mm) of the crowning profile. In FIGS. 69 and 70, the abscissa represents a position in the axial direction in the roller (unit: mm). In FIGS. 69 and 70, the ordinate on the right side represents a contact surface pressure (unit: GPa).

In an example in which the contour line of the rolling surface of the tapered roller is formed in a shape including a partially arcuate crowning profile and a straight portion, the contact surface pressure locally increases when a curvature is discontinuous even though gradient at a boundary between the straight portion, the auxiliary circular arc, and the crowning profile is continuous as shown in FIG. 70. Therefore, break of an oil film or damage to a surface may occur. Unless a lubricating film having a sufficient thickness is formed, wear due to metal-to-metal contact easily occurs. When the contact surface is partially worn, metal-to-metal contact more easily occurs in the vicinity thereof, which accelerates wear of the contact surface and results in damage to the tapered roller.

When the rolling surface of the tapered roller serving as a contact surface is provided with a crowning profile of which contour line is defined by a logarithmic function, as shown, for example, in FIG. 69, a local contact pressure is lower and wear of a contact surface is less likely than in an example where a crowning profile represented by a partial arc in FIG. 70 is provided. Therefore, even when lubricant present on the rolling surface of the tapered roller is reduced to a small amount or reduced in viscosity and a lubricating film is reduced in thickness, the contact surface can be prevented from being worn and the tapered roller can be prevented from being damaged. FIGS. 69 and 70 show the contour line of the roller with origin O of the abscissa being set at the central portion of the effective contact portion between the inner ring or the outer ring and the roller in a rectangular coordinate system with the abscissa representing the direction of the generatrix of the roller and the ordinate representing a direction orthogonal to the generatrix and show a contact surface pressure as being superimposed on the former with the contact pressure being represented on the ordinate. Thus, tapered roller bearing 2010 exhibiting a long lifetime and high durability can be provided by adopting the construction as described above.

In tapered roller bearing 2010, a nitrogen concentration in nitrogen enriched layers 2011B, 2012B, and 2013B at a position of depth of 0.05 mm from the outermost surface is 0.1 mass % or more. In this case, since the nitrogen concentration in the outermost surface of nitrogen enriched layers 2011B, 2012B, and 2013B can have a sufficient value, a hardness of the outermost surface of nitrogen enriched layers 2011B, 2012B, and 2013B can be sufficiently high. Conditions such as the prior austenite crystal grain size in grain size number, the distance to the bottom of the nitrogen enriched layer, and the nitrogen concentration described above are preferably satisfied at least at first measurement point 2031 in FIG. 63.

In tapered roller bearing 2010, at least one of outer ring 2011, inner ring 2013, and roller 2012 in which nitrogen enriched layer 2011B, 2012B, or 2013B is formed is made of steel. Steel at least contains at least 0.6 mass % and at most 1.2 mass % of carbon (C), at least 0.15 mass % and at most 1.1 mass % of silicon (Si), and at least 0.3 mass % and at most 1.5 mass % of manganese (Mn) in a portion other than nitrogen enriched layers 2011B, 2012B, and 2013B, that is, unnitrided portions 2011C, 2012C, and 2013C. In the tapered roller bearing, steel may further contain at most 2.0 mass % of chromium. In this case, nitrogen enriched layers 2011B, 2012B, and 2013B constructed as defined in the present embodiment can easily be formed by using heat treatment or the like which will be described later.

In tapered roller bearing 2010, at least one of design parameters $K_1$, $K_2$, and $z_m$ in the expression (1) is optimized, with a contact surface pressure between the tapered roller and the outer ring or between the roller and the inner ring being defined as an objective function.

While design parameters $K_1$, $K_2$, and $z_m$ are optimized and determined with any one of a contact surface pressure, stress, and a lifetime being defined as an objective function, damage originating from a surface depends on a contact surface pressure. According to the embodiment, since design parameters $K_1$, $K_2$, and $z_m$ are optimized and set with a contact surface pressure being defined as an objective function, a crowning profile that can prevent the contact surface from being worn even under a condition where lubricant is lean can be obtained.

In tapered roller bearing 2010, at least one of outer ring 2011 and inner ring 2013 includes nitrogen enriched layer 2011B or 2013B. In this case, in at least one of outer ring 2011 and inner ring 2013, nitrogen enriched layer 2011B or 2013B made finer in crystal structure is formed so that outer ring 2011 or inner ring 2013 long in lifetime and high in durability can be obtained.

In tapered roller bearing 2010, roller 2012 includes nitrogen enriched layer 2012B. In this case, in roller 2012, nitrogen enriched layer 2012B made finer in crystal structure is formed so that roller 2012 long in lifetime and high in durability can be obtained.

The reason why the smaller flange surface of the inner ring is formed as a surface in parallel to the smaller end face of the tapered roller is as set forth below. By providing a smaller flange surface 2019 of inner ring 2013 as a surface in parallel to smaller end face 2017 of tapered roller 2012 disposed on raceway surface 2013A, influence by variation in chamfer dimension and shape of smaller end face 2017 of tapered roller 2012 onto a first gap between larger end face 2016 of tapered roller 2012 and larger flange surface 2018 of inner ring 2013 in the initial assembled state described previously (equal to a gap between smaller end face 2017 and smaller flange surface 2019 of inner ring 2013 when tapered roller 2012 is set in place) can be eliminated. Even though a chamfer dimension or a shape of smaller end face 2017 is different, smaller end face 2017 and smaller flange surface 2019 in parallel to each other are in surface contact with each other in the initial assembled state. Therefore, the first gap between larger end face 2016 and larger flange surface 2018 at this time is always constant, variation in time until each tapered roller 2012 is set in place is eliminated, and a running-in period can be shorter.

The reason why ratio $R/R_{BASE}$ between radius of curvature R of the larger end face of the tapered roller and distance $R_{BASE}$ from the apex of the cone angle of the tapered roller to the larger flange surface of the inner ring is within a range not smaller than 0.75 and not greater than 0.87 is as set forth below.

Figure 71:
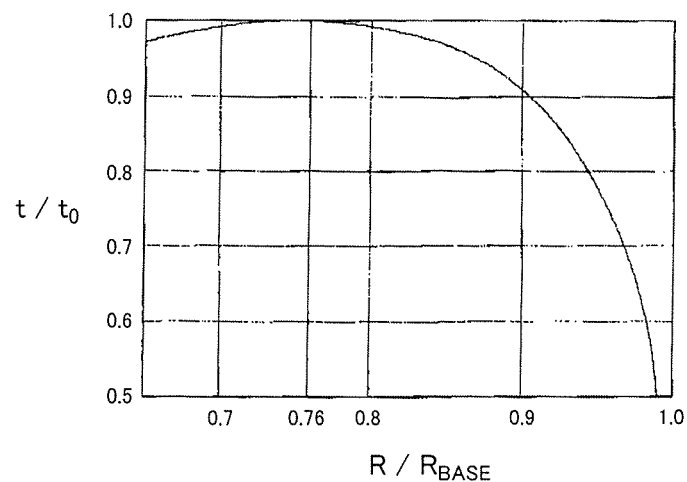
FIG. 71 shows a graph showing relation between a radius of curvature of a larger end face of the roller of the tapered roller bearing according to the fourth embodiment and a thickness of an oil film.

FIG. 71 shows a result of calculation based on the expression of Karna, of thickness t of an oil film formed between the larger flange surface of the inner ring and the larger end face of the tapered roller. The ordinate represents ratio t/t0 to oil film thickness t0 when relation of $R/R_{BASE}=0.76$ is satisfied. Oil film thickness t is maximized when relation of $R/R_{BASE}=0.76$ is satisfied, and when $R/R_{BASE}$ exceeds 0.9, the oil film thickness abruptly decreases.

Figure 72:
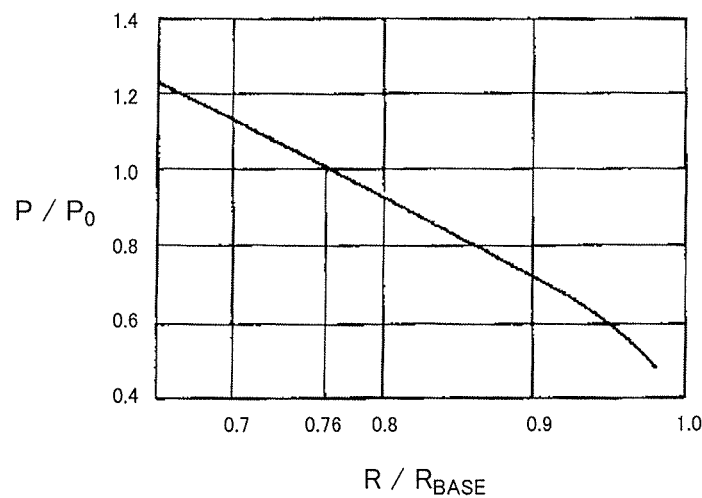
FIG. 72 shows a graph showing relation between a radius of curvature of the larger end face of the roller of the tapered roller bearing according to the fourth embodiment and maximum Hertz stress.

FIG. 72 shows a result of calculation of maximum Hertz stress p between the larger flange surface of the inner ring and the larger end face of the tapered roller.

The ordinate represents ratio p/p0 to maximum Hertz stress p0 when relation of $R/R_{BASE}=0.76$ is satisfied as in FIG. 71. Maximum Hertz stress p monotonously decreases with increase in $R/R_{BASE}$.

In order to reduce torque loss and heat generation due to sliding friction between the larger flange surface of the inner ring and the larger end face of the tapered roller, desirably, oil film thickness t is larger and maximum Hertz stress p is lower. The present inventors determined that a proper range of $R/R_{BASE}$ was not smaller than 0.75 and not greater than 0.87 based on a result of a seizure resistance test shown later in Table 11 with reference to the results of calculation in FIGS. 71 and 72. For a conventional tapered roller bearing, a value of $R/R_{BASE}$ is designed within a range not smaller than 0.90 and not greater than 0.97.

<Method of Manufacturing Tapered Roller Bearing>

Figure 73:
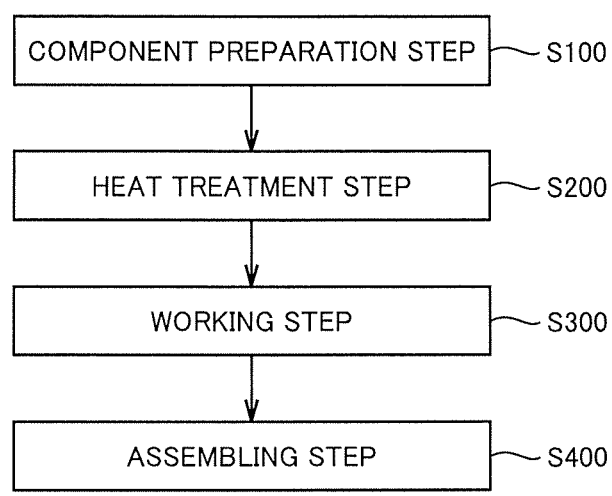
FIG. 73 is a flowchart of a method of manufacturing a tapered roller bearing according to the fourth embodiment.
Figure 74:
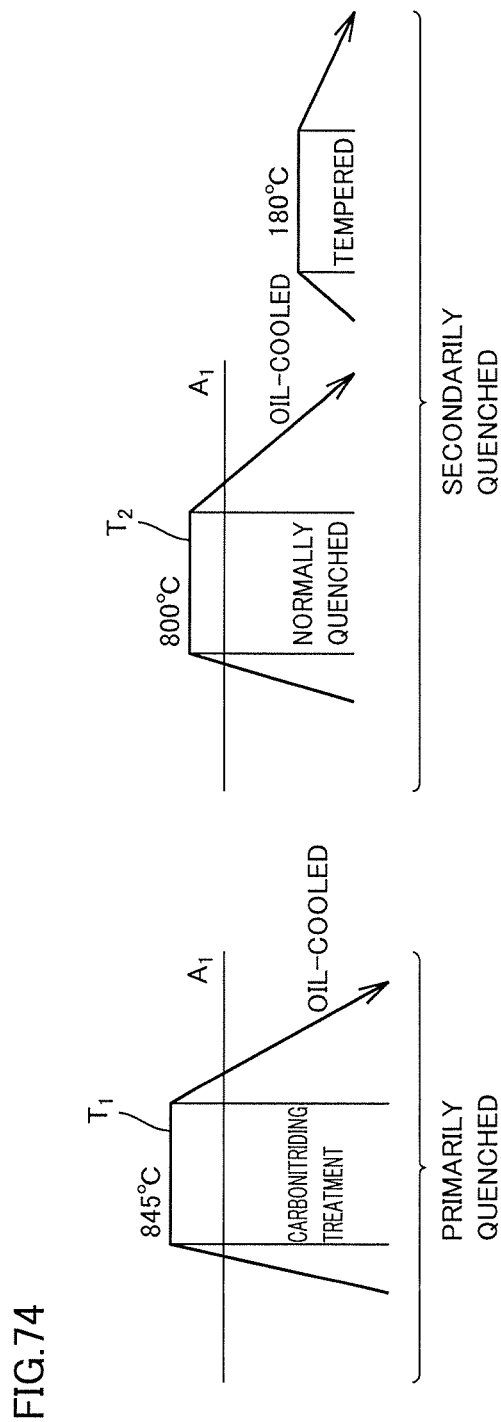
FIG. 74 is a diagram for illustrating a heat treatment method in the fourth embodiment.
Figure 75:
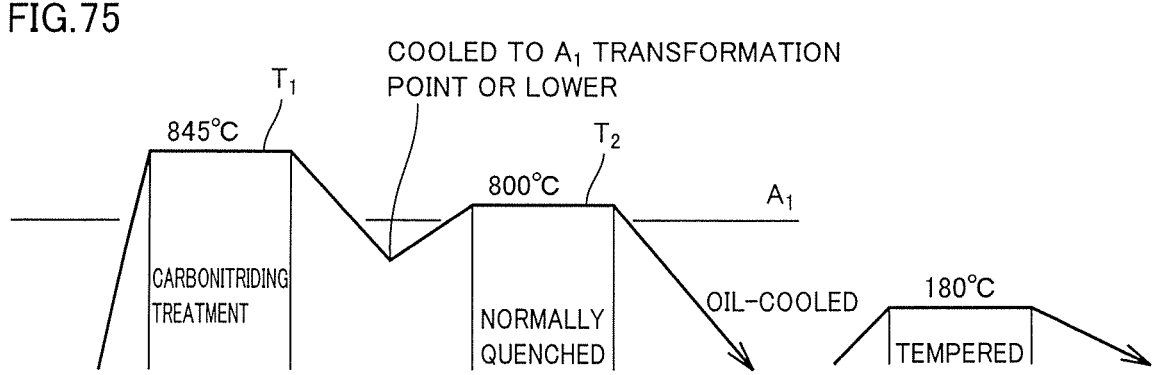
FIG. 75 is a diagram for illustrating a modification to the heat treatment method in the fourth embodiment.
Figure 77:
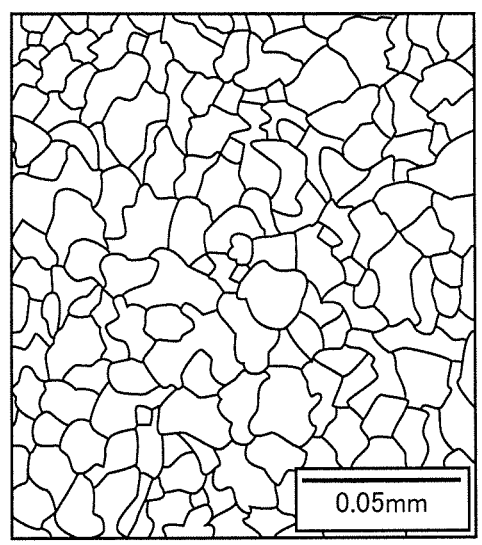
FIG. 77 is a diagram showing an austenite grain boundary of a conventional bearing component.

FIG. 73 is a flowchart for illustrating a method of manufacturing the tapered roller bearing shown in FIG. 61. FIG. 74 is a schematic diagram representing a heat treatment pattern in a heat treatment step in FIG. 73. FIG. 75 is a schematic diagram representing a modification to the heat treatment pattern shown in FIG. 74. FIG. 77 is a schematic diagram illustrating a microstructure, in particular a prior austenite crystal grain boundary, of a bearing component as a comparative example. A method of manufacturing a tapered roller bearing will be described below.

As shown in FIG. 73, initially, a component preparation step (S100) is performed. In this step (S100), members to be bearing components such as outer ring 2011, inner ring 2013, roller 2012, and cage 2014 are prepared. A member to be roller 2012 is uncrowned, and a surface of the member is yet-to-be-worked surface 2012E shown with a dotted line in FIG. 64.

Then, a heat treatment step (S200) is performed. In this step (S200), prescribed heat treatment is performed to control characteristics of the bearing components. For example, in order to form nitrogen enriched layer 2011B, 2012B, or 2013B according to the present embodiment in at least one of outer ring 2011, roller 2012, and inner ring 2013, carbonitriding or nitriding, quenching, tempering, and the like are performed. An exemplary heat treatment pattern in this step (S200) is shown in FIG. 74. FIG. 74 shows a heat treatment pattern representing a method of performing primary quenching and secondary quenching. FIG. 75 shows a heat treatment pattern representing a method in which a material is cooled to a temperature lower than an $A_1$ transformation point during quenching and thereafter the material is reheated and finally quenched. In these figures, in treatment $T_1$, carbon, nitrogen, and the like are diffused through a steel matrix and carbon is sufficiently dissolved therein, and thereafter the material is cooled to a temperature lower than the $A_1$ transformation point. Then, in treatment $T_2$ in the figure, the material is reheated to a temperature lower than in treatment $T_1$ and oil-quenched. Thereafter, the material is tempered, for example, at a heating temperature of 180° C.

According to the heat treatment, as compared with ordinary quenching, that is, carbonitriding treatment followed by quenching once, cracking strength can be improved and a rate of change in dimension over time can be lowered while a surface layer portion of a bearing component is carbonitrided. According to the heat treatment step (S200), such a microstructure as shown in FIG. 76 that a grain size of prior austenite crystal grains is not greater than ½ of that in a microstructure in the conventional quenched structure shown in FIG. 77 can be obtained in nitrogen enriched layers 2011B, 2012B, and 2013B having a quenched structure. The bearing component subjected to the above heat treatment has a long life against rolling fatigue and increased cracking strength, and can also achieve a reduced rate of change in dimension over time.

Then, a working step (S300) is performed. In this step (S300), the material is finished to have a final shape of each bearing component. Roller 2012 is provided with crowning profile 2022A and chamfered portion 2021 by machining such as cutting, as shown in FIG. 64.

Then, an assembling step (S400) is performed. In this step (S400), tapered roller bearing 2010 shown in FIG. 61 is obtained by assembling the bearing components prepared as described above. Thus, tapered roller bearing 2010 shown in FIG. 61 can be manufactured.

Example 6

Experimental Example 1

<Sample>

Four types of tapered rollers of samples Nos. 1 to 4 were prepared as samples.

The model number of the tapered rollers was 30206. As a material for the tapered rollers, a JIS SUJ2 material (1.0 mass % of C-0.25 mass % of Si-0.4 mass % of Mn-1.5 mass % of Cr) was used.

Sample No. 1 was carbonitrided and quenched, and thereafter provided at opposing ends with a logarithmic crowning profile according to the present embodiment shown in FIG. 65. The sample was carbonitrided at 845° C. for 150 minutes. The sample was carbonitrided in an atmosphere of RX gas+ammonia gas. Sample No. 2 was carbonitrided and quenched similarly to Sample No. 1, and thereafter provided with the partially arcuate crowning profile shown in FIG. 70.

Sample No. 3 was subjected to the heat treatment pattern shown in FIG. 74 and thereafter provided at opposing ends with the logarithmic crowning profile according to the present embodiment shown in FIG. 65. The sample was carbonitrided at 845° C. for 150 minutes. The sample was carbonitrided in an atmosphere of RX gas+ammonia gas. The sample was finally quenched at 800° C.

Sample No. 4 was subjected to the heat treatment pattern shown in FIG. 74, and thereafter provided at opposing ends with the logarithmic crowning profile according to the present embodiment shown in FIG. 65. The sample was finally quenched at 800° C. In order to achieve a nitrogen concentration not lower than 0.1 mass % in the nitrogen enriched layer at a position of depth of 0.05 mm from the outermost surface of the sample, the sample was carbonitrided at 845° C. for 150 minutes. The sample was carbonitrided in an atmosphere of RX gas+ammonia gas. The atmosphere in the furnace was strictly controlled. Specifically, unevenness of the temperature in the furnace and unevenness of the ammonia gas atmosphere were suppressed. Samples Nos. 3 and 4 described above correspond to Examples of the present invention. Samples Nos. 1 and 2 correspond to Comparative Examples.

<Contents of Experiments>

Experiment 1: Life Test

A life test apparatus was employed. As test conditions, test loads of Fr=18 kN and Fa=2 kN, lubricating oil of turbine oil 56, and a lubricating system of oil bath lubrication were applied. In the life test apparatus, two tapered roller bearings to be tested were arranged to support a support shaft at opposing ends. At a central portion of the support shaft in a direction of extension, that is, at a central portion between the two tapered roller bearings, a cylindrical roller bearing for applying a radial load to the tapered roller bearings via the support shaft was arranged. By applying a radial load to the load applying cylindrical roller bearing, the radial load was applied to the tapered roller bearings to be tested. An axial load was transmitted from one tapered roller bearing to the support shaft through a housing of the life test apparatus and applied to the other tapered roller bearing. Thus, the tapered roller bearing was subjected to a life test.

Experiment 2: Life Test with Unevenly Distributed Load Applied

The same test apparatus as in the life test in Experiment 1 was used. Although test conditions were basically the same as in Experiment 1, an axial inclination of 2/1000 rad with respect to a central axis of the roller was applied and the test was conducted with an unevenly distributed load being applied.

Experiment 3: Rotational Torque Test

Samples Nos. 1 to 4 were subjected to a torque measurement test by using a vertical torque test rig. As test conditions, a test load of Fa=7000 N, lubricating oil of turbine oil 56, a lubrication system of oil bath lubrication, and the number of rotations of 5000 rpm were applied.

<Result>

Experiment 1: Life Test

Sample No. 4 exhibited the best result and was considered to have a long life. Though samples Nos. 2 and 3 were not comparable to Sample No. 4, they exhibited good results and were thus determined to be sufficiently durable for practical use. Sample No. 1 was shortest in life.

Experiment 2: Life Test with Unevenly Distributed Load Applied

Samples Nos. 4 and 3 exhibited the best result and were considered to have a long life. Sample No. 1 presented a relatively satisfactory result although it was not comparable to samples Nos. 4 and 3. Sample No. 2 presented a result worse than in Experiment 1, and it is believed to have a short life due to the unevenly distributed load.

Experiment 3: Rotational Torque Test

Samples Nos. 1, 3, and 4 presented sufficiently small rotational torque and thus presented a good result. In contrast, sample No. 2 was larger in rotational torque than other samples.

From the above results, sample No. 4 generally presented a good result in any of the tests, and thus generally provided the best result. Sample No. 3 also presented a result better than that of samples Nos. 1 and 2.

Experimental Example 2

<Sample>

Sample No. 4 in Experimental Example 1 was used.

<Contents of Experiment>

Measurement of Nitrogen Concentration at Position of Depth of 0.05 mm from Surface:

A nitrogen concentration and a depth of a nitrogen enriched layer of sample No. 4 were measured. Measurement was conducted as below. At the first to third measurement points shown in FIG. 63, a tapered roller as the sample was cut in a direction perpendicular to the centerline to expose a cut surface. The cut surface was analyzed for a nitrogen concentration by EPMA at a plurality of measurement positions each located at a distance of 0.05 mm inward from the surface of the sample. Five measurement positions were determined in a cross-section at each of the first to third measurement points, and an average value of measurement data obtained at the five locations was adopted as a nitrogen concentration at each measurement point.

Measurement of Distance to Bottom of Nitrogen Enriched Layer:

In a cross-section of the tapered roller subjected to tempering treatment at 500° C.×1 h at the first to third measurement points, a hardness was measured at a plurality of measurement points aligned in the direction of depth at intervals of 0.5 mm. A region having a Vickers hardness of HV 450 or more was determined as a nitrogen enriched layer, and a depth of a position where the hardness attained to HV 450 was determined as the bottom of the nitrogen enriched layer.

<Sample in Comparative Example>

A tapered roller bearing (samples Nos. 9 to 11 in Table 11) in which a value of $R/R_{BASE}$ was out of the range of the present application, the smaller flange surface of the inner ring was inclined outward relative to the smaller end face of the tapered roller, and the first gap exceeded 0.4 mm was prepared. Each bearing had a dimension the same as in Example.

The tapered roller bearings in Example and Comparative Example were subjected to a seizure resistance test by using a rotary test rig. The tapered roller bearings of samples Nos. 6 and 10 were also subjected to a running-in test. The number of samples in the running-in test was set to 66 for sample No. 6 and to 10 for sample No. 10. Conditions for the seizure resistance test included an applied load of 19.61 kN, the number of rotations of 1000 to 3500 rpm, and lubricating oil of turbine VG56 (an amount of oil feed of 40 milliliters/min. and a temperature of fed oil of 40° C.±3° C.).

Table 11 shows results of the test. Seizure in the seizure resistance test occurred between the larger flange surface of the inner ring and the larger end face of the tapered roller.

TABLE 11

| Sample NO. | Radius of Curvature $R/R_{BASE}$ | Surface Roughness Ra (μm) | Limit Number of Rotations Until Occurrence of Seizure in Seizure Resistance Test (rpm) | The Number of Rotations Until Settling in Running-in Test (Times) | |
|---|---|---|---|---|---|
| | | | | Average Value | Standard Deviation |
| Sample 5  | 0.75 | 0.12 | 2700 | —    | —    |
| Sample 6  | 0.80 | 0.12 | 3500 | 2.96 | 0.56 |
| Sample 7  | 0.85 | 0.12 | 3000 | —    | —    |
| Sample 8  | 0.87 | 0.12 | 2700 | —    | —    |
| Sample 9  | 0.70 | 0.12 | 2200 | —    | —    |
| Sample 10 | 0.94 | 0.12 | 2500 | 6.00 | 1.33 |
| Sample 11 | 0.94 | 0.25 | 2200 | —    | —    |

<Result>

Measurement of Nitrogen Concentration at Position of Depth of 0.05 mm from Surface:

Nitrogen concentrations were 0.2 mass %, 0.25 mass %, and 0.3 mass % at the first, second, and third measurement points, respectively. The measurement points all presented measurement results falling within the scope of the present invention.

Measurement of Distance to Bottom of Nitrogen Enriched Layer:

Distances to the bottom of the nitrogen enriched layer at the first, second, and third measurement points were 0.3 mm, 0.35 mm, and 0.3 mm, respectively. The measurement points all presented measurement results falling within the scope of the present invention.

Experimental Example 3

<Sample in Example>

A tapered roller bearing (samples Nos. 5 to 8 in Table 11) in which radius of curvature R of the larger end face of the tapered roller was within a range of $R/R_{BASE}$ not smaller than 0.75 and not greater than 0.87, the larger flange surface of the inner ring had surface roughness Ra of 0.12 μm, the smaller flange surface was formed as a ground surface in parallel to the smaller end face of the tapered roller, and the first gap was within the dimension restricted range not greater than 0.4 mm shown in FIG. 68 was prepared. The bearing had an inner diameter of 40 mm and an outer diameter of 68 mm.

It can be seen that the tapered roller bearing in Example achieved the limit number of rotations not less than 2700 rpm until occurrence of seizure in the seizure resistance test, and was low in friction resistance between the larger flange surface of the inner ring and the larger end face of the tapered roller. The tapered roller bearing in Comparative Example achieved the limit number of rotations not more than 2500 rpm until occurrence of seizure, which may give rise to a problem under a normal condition of use of a differential gear or the like. Sample 11 large in surface roughness Ra of the larger flange surface exhibited the limit number of rotations until occurrence of seizure being smaller than sample No. 10 equal in radius of curvature R.

Regarding results of the running-in test, in Comparative Example, an average value of the number of rotations until the tapered roller was set in place was six, whereas in Example, the average value was 2.96 which was approximately half that in Comparative Example. It can be seen that Example was small also in standard deviation in variation in number of rotations and could be shorter in running-in period in a stable manner.

As set forth above, in the tapered roller bearing according to the present invention, radius of curvature R of the larger end face of the tapered roller has a value within a range of $R/R_{BASE}$ not smaller than 0.75 and not greater than 0.87 and the smaller flange surface of the inner ring is formed as a surface in parallel to the smaller end face of the tapered roller. Therefore, torque loss and heat generation due to sliding friction between the larger flange surface of the inner ring and the larger end face of the tapered roller can be reduced to prevent occurrence of seizure and a running-in period can be shorter to make a bearing attachment operation more efficient. Durability of a gear shaft support apparatus for automobiles can be improved.

In tapered roller bearing 2010 according to the fourth embodiment, cage 2014 includes smaller annular portion 2106 continuous on the side of the smaller-diameter end face of tapered roller 2012, larger annular portion 2107 continuous on the side of the larger-diameter end face of tapered roller 2012, and a plurality of posts 2108 which couple the annular portions to each other. Pocket 2109 is provided in such a trapezoidal shape that a portion accommodating a smaller diameter side of tapered roller 2012 is defined as a smaller width side and a portion accommodating a larger diameter side thereof is defined as a larger width side. By providing a notch having a width in the post on the smaller width side of pocket 2109 of cage 2014 from a boundary between smaller annular portion 2106 and the post toward larger annular portion 2107, lubricating oil which flows from the inner diameter side of cage 2014 toward the inner ring is quickly discharged from the notch toward the outer ring on the outer diameter side, and an edge of smaller annular portion 2106 on a side of pocket 2109 is in such a shape that a base portion on the smaller width side of pocket 2109 extends to the post.

Some tapered roller bearings included in a portion where lubricating oil flows in from the outside are provided with a notch in a pocket of a cage so that lubricating oil which flows in as being divided into lubricating oil on the outer diameter side and lubricating oil on the inner diameter side of the cage passes through the notch and flow of lubricating oil inside the bearing is improved. It has been found, however, that, in a tapered roller bearing in which lubricating oil flows into the inside of the bearing as being divided into lubricating oil on the outer diameter side and lubricating oil on the inner diameter side of the cage, torque loss increases with increase in ratio of lubricating oil which flows from the inner diameter side of the cage toward the inner ring. The reason may be as set forth below.

Lubricating oil which flows from the outer diameter side of the cage toward the outer ring smoothly flows along the raceway surface thereof toward the larger diameter side of the tapered roller and flows out of the inside of the bearing because there is no obstacle in an inner-diameter surface of the outer ring. Lubricating oil which flows from the inner diameter side of the cage toward the inner ring, however, is blocked by a larger flange when it flows along the raceway surface thereof and passes toward the larger diameter side of the tapered roller because of the presence of the larger flange on an outer-diameter surface of the inner ring, and lubricating oil tends to stay in the inside of the bearing. Therefore, with increase in ratio of lubricating oil which flows from the inner-diameter side of the cage toward the inner ring, an amount of lubricating oil which stays in the inside of the bearing may increase and lubricating oil that stays may become flow resistance against rotation of the bearing, which may lead to increase in torque loss.

In tapered roller bearing 2010 according to the fourth embodiment, a notch is provided in a post on the smaller-width side of the trapezoidal pocket of the cage so that lubricating oil which flows from the inner-diameter side of the cage toward the inner ring is quickly discharged from the notch toward the outer ring on the smaller-width side of the pocket which accommodates the smaller-diameter side of the tapered roller, an amount of lubricating oil which reaches the larger flange along the raceway surface of the inner ring is decreased, an amount of lubricating oil that stays in the inside of the bearing is decreased, and torque loss due to flow resistance of the lubricating oil can be reduced.

Fifth Embodiment

Figure 78:
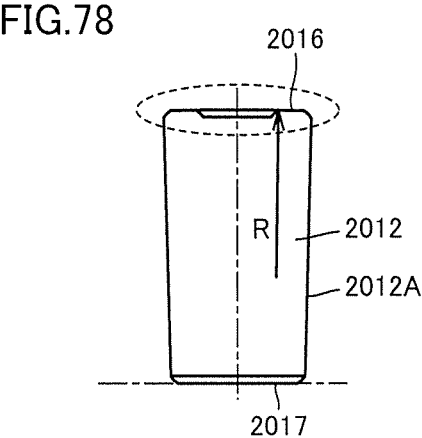
FIG. 78 is a cross-sectional view for illustrating a reference radius of curvature of a roller in a tapered roller bearing according to a fifth embodiment.
Figure 79:
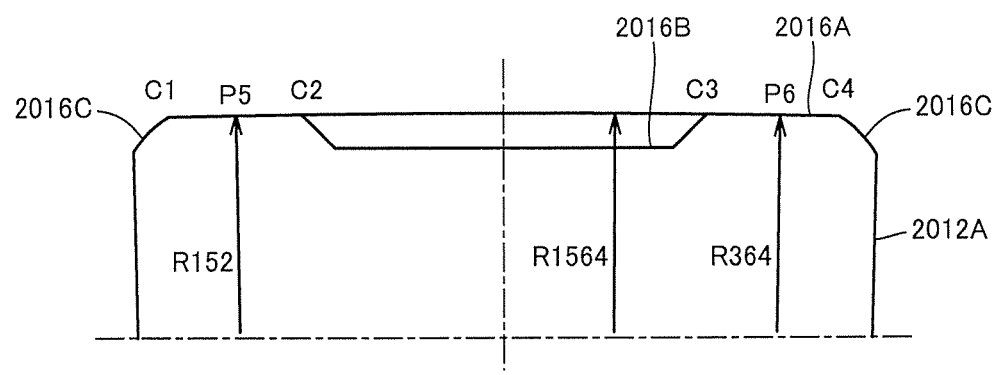
FIG. 79 is a partial cross-sectional view showing an area surrounded by a dotted line in FIG. 78.
Figure 80:
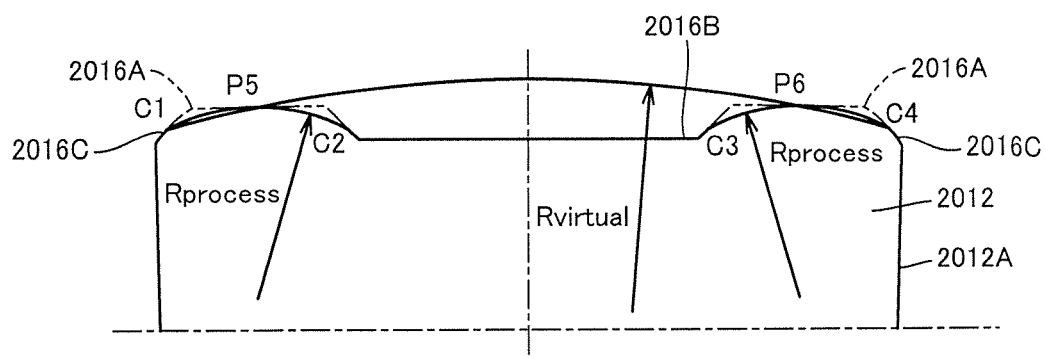
FIG. 80 is a cross-sectional view for illustrating an actual radius of curvature of the roller in the tapered roller bearing according to the fifth embodiment.

Referring to FIGS. 78 to 80, though a tapered roller bearing according to a fifth embodiment is basically similar in construction to tapered roller bearing 2010 according to the fourth embodiment, it is different in that ratio Rprocess/R between actual radius of curvature Rprocess (see FIG. 80) and reference radius of curvature R (see FIG. 79) is specified as being not lower than 0.8 where Rprocess represents an actual radius of curvature after working of larger end face 2016 of roller 2012.

FIGS. 78 and 79 are schematic cross-sectional views along an axis of rolling of the tapered roller obtained when ideal grinding is performed. When ideal grinding is performed, the larger end face of the obtained tapered roller defines a part of a spherical surface around apex O (see FIG. 68) of a cone angle of tapered roller 2012. When ideal grinding as leaving a part of a projection 2016A is performed as shown in FIGS. 78 and 79, larger end face 2016 of roller 2012 including an end face of projection 2016A defines a part of one spherical surface around the apex of the cone angle of roller 2012. In this case, an inner circumferential end of the projection in the radial direction around the axis of rolling (an axis of revolution) of roller 2012 is connected to a recess with points C2 and C3 being interposed. An outer circumferential end of the projection is connected to a chamfered portion with points C1 and C4 being interposed. On an ideal larger end face, points C1 to C4 are arranged on one spherical surface as described above.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape. From a different point of view, a projection resulting from the punch of the forging apparatus is formed in an outer circumferential portion of a surface to be the larger end face of the formed product obtained by forging. The projection has, for example, an annular two-dimensional shape. At least a part of the projection of the formed product is removed by subsequently performed grinding.

Radius of curvature R of larger end face 2016 of roller 2012 refers to an R dimension when larger end face 2016 of roller 2012 shown in FIG. 78 is a set ideal spherical surface. Specifically, as shown in FIG. 79, with points at an end of larger end face 2016 of roller 2012 being defined as C1, C2, C3, and C4, with a point intermediate between points C1 and C2 being defined as P5, and with a point intermediate between points C3 and C4 being defined as P6, radius of curvature R152 which passes through points C1, P5, and C2, a radius of curvature R364 which passes through points C3, P6, and C4, and a radius of curvature R1564 which passes through points C1, P5, P6, and C4 define an ideal single arcuate curve which satisfies relation of R152=R364=R1564. Points C1 and C4 are points of connection between projection 2016A and a chamfered portion 2016C and points C2 and C3 are points of connection between projection 2016A and recess 2016B. The ideal single arcuate curve which satisfies relation of R=R152=R364=R1564 is called a reference radius of curvature. Reference radius of curvature R is different from actual radius of curvature Rprocess measured as a radius of curvature of the larger end face of the tapered roller obtained by actual grinding as will be described later.

FIG. 80 is a schematic cross-sectional view along the axis of rolling of the tapered roller obtained by actual grinding. FIG. 80 shows the ideal larger end face shown in FIG. 79 with a dotted line. As shown in FIG. 80, the larger end face of a tapered roller actually obtained by grinding a formed product provided with the recess and the projection as above does not define a part of one spherical surface around an apex of a cone angle of the tapered roller. Points C1 to C4 on the projection of the actually obtained tapered roller sag as compared with the projection shown in FIG. 79. As compared with points C1 and C4 shown in FIG. 79, points C1 and C4 shown in FIG. 80 are arranged on an outer circumferential side in the radial direction with respect to the center of the axis of rolling and arranged on an inner side in a direction of extension of the axis of rolling (R152 on one side with respect to R1564 of the entire larger end face 2016 being not identical but being small). As compared with points C2 and C3 shown in FIG. 79, points C2 and C3 shown in FIG. 80 are arranged on an inner circumferential side in the radial direction with respect to the center of the axis of rolling and arranged on the inner side in the direction of extension of the axis of rolling (R364 on one side with respect to R1564 of the entire larger end face 2016 not being identical but being small). Intermediate points P5 and P6 shown in FIG. 80 are formed at positions substantially equal to intermediate points P5 and P6 shown, for example, in FIG. 79.

As shown in FIG. 80, in the larger end face actually formed by grinding, apex C1 and apex C2 are arranged on one spherical surface and apex C3 and apex C4 are arranged on another spherical surface. In general grinding, a radius of curvature of one circular arc defined by a part of the larger end face formed on one projection is substantially equal to a radius of curvature of a circular arc defined by a part of the larger end face formed on the other projection. R152 on one side after working of larger end face 2016 of roller 2012 shown in FIG. 80 is substantially equal to R364 on the other side. R152 and R364 on one side after working of larger end face 2016 of roller 2012 are called actual radius of curvature Rprocess. Actual radius of curvature Rprocess is not greater than reference radius of curvature R.

The tapered roller of the tapered roller bearing according to the present embodiment has ratio Rprocess/R of actual radius of curvature Rprocess to reference radius of curvature R not lower than 0.8.

As shown in FIG. 80, in the larger end face actually formed by grinding, a radius of curvature Rvirtual of a virtual circular arc (which is referred to as a virtual radius of curvature below) which passes through apex C1, intermediate point P5, intermediate point P6, and apex C4 is not greater than reference radius of curvature R. The tapered roller of the tapered roller bearing according to the present embodiment has ratio Rprocess/Rvirtual of actual radius of curvature Rprocess to virtual radius of curvature Rvirtual not lower than 0.8.

Actual radius of curvature Rprocess and virtual radius of curvature Rvirtual of the tapered roller actually formed by grinding can be measured by any method, and can be measured, for example, by using a surface roughness measurement instrument (Surface Roughness Tester Surftest SV-100 manufactured by Mitutoyo Corporation). When the surface roughness measurement instrument is used, an axis of measurement is initially set along the radial direction around the axis of rolling and a surface profile of the larger end face is determined. Apexes C1 to C4 and intermediate points P5 and P6 are plotted on the obtained profile of the larger end face. Actual radius of curvature Rprocess is calculated as a radius of curvature of a circular arc which passes through plotted apex C1, intermediate point P5, and apex C2. Virtual radius of curvature Rvirtual is calculated as a radius of curvature of a circular arc which passes through plotted apex C1, intermediate points P5 and P6, and apex C4.

Reference radius of curvature R is estimated based on each dimension of a tapered roller obtained by actual grinding, for example, based on industrial standards such as the JIS.

Preferably, the larger end face has surface roughness Ra not greater than 0.10 μm. Preferably, the larger flange surface has surface roughness Ra not greater than 0.063 μm.

Figure 81:
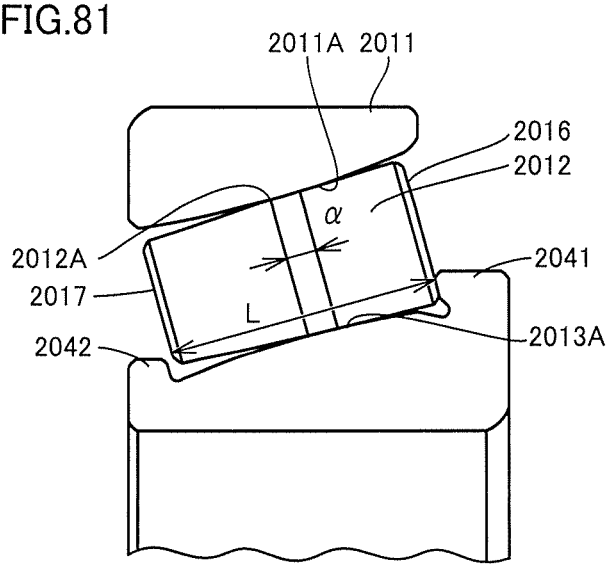
FIG. 81 is a cross-sectional view showing an exemplary method of changing a position of abutment between a rolling contact surface and a rolling surface in the tapered roller bearing according to the fifth embodiment.
Figure 82:
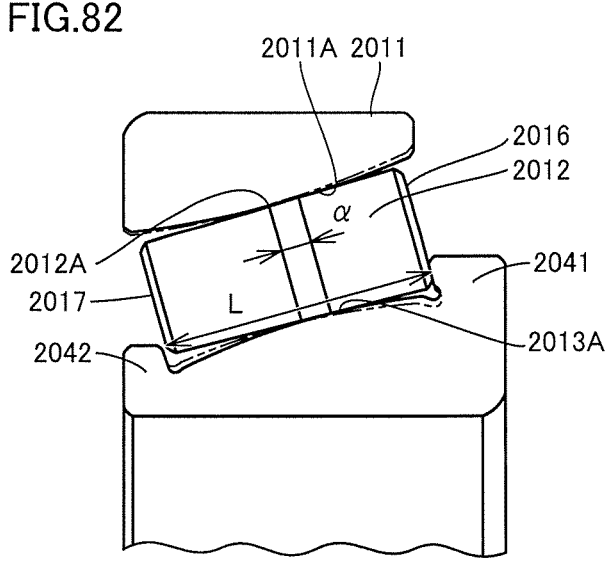
FIG. 82 is a cross-sectional view showing another exemplary method of changing a position of abutment between a rolling contact surface and a rolling surface in the tapered roller bearing according to the fifth embodiment.

Preferably, as shown in FIGS. 81 and 82, ratio α/L of amount α of displacement from a midpoint of the rolling surface in a direction of extension of the axis of rolling, of a position of abutment between raceway surfaces 2011A and 2013A of the inner ring and outer ring 2011 and the rolling surface to width L of the roller rolling surface in the direction of extension is not lower than 0% and lower than 20%. The position of abutment when ratio α/L exceeds 0% is located at a central position or located closer to the larger end face than the central position in the rolling surface in the direction of extension of the axis of rolling.

A construction in which ratio α/L exceeds 0% can be realized by relatively displacing a position of an apex of each of a crowning profile formed in the roller rolling surface and a crowning profile formed in raceway surfaces 2011A and 2013A of the inner ring and outer ring 2011 as shown in FIG. 81.

Alternatively, the construction in which ratio α/L exceeds 0% can be realized by relatively varying an angle formed by raceway surface 2013A of the inner ring with respect to the axial direction of the inner ring and an angle formed by raceway surface 2011A of outer ring 2011 with respect to the axial direction of outer ring 2011 as shown in FIG. 82. Specifically, the construction in which ratio α/L exceeds 0% can be realized by at least any method of increasing an angle formed by raceway surface 2013A of the inner ring with respect to the axial direction of the inner ring and decreasing an angle formed by raceway surface 2011A of outer ring 2011 with respect to the axial direction of outer ring 2011 as compared with an example in which amount α of displacement of the position of abutment shown with a dotted line in FIG. 82 is zero.

<Function and Effect>

Since the tapered roller bearing according to the present fifth embodiment is basically similar in construction to tapered roller bearing 2010 according to the fourth embodiment, it can achieve effects similar to those of tapered roller bearing 2010 according to the fourth embodiment.

The tapered roller bearing according to the present fifth embodiment has ratio Rprocess/R of actual radius of curvature Rprocess to reference radius of curvature R not lower than 0.8. The present inventors confirmed that the tapered roller bearing having ratio Rprocess/R not lower than 0.8 could achieve improved seizure resistance as compared with the tapered roller bearing having Rprocess/R lower than 0.8.

The tapered roller bearing can bear a certain axial load as the larger end face of the roller and the larger flange surface of the inner ring are in sliding contact. Owing to sliding contact, when lubrication between the larger end face and the larger flange surface is insufficient, a contact surface pressure between the larger end face and the larger flange surface increases and metal-to-metal contact occurs.

When the rolling surface of the tapered roller is crowned as in the tapered roller bearing, increase in contact surface pressure between the roller rolling surface and raceway surfaces 2011A and 2013A of the inner and outer rings can be suppressed whereas skew occurs. When skew occurs, tangential force applied between the larger end face and the larger flange surface increases and friction torque increases. When a skew angle increases, the larger end face and the larger flange surface are in what is called edge contact with each other. Then, metal-to-metal contact occurs between these surfaces and seizure is caused by heat generation.

Therefore, in order to further improve seizure resistance of the tapered roller bearing, increase in rotational torque due to friction at a point of contact between the larger end face of the roller and the larger flange surface of the inner ring should be suppressed and heat generation should be reduced.

In order to suppress metal-to-metal contact between the larger end face of the roller and the larger flange surface of the inner ring and to reduce heat generation, a sufficient thickness of an oil film between the surfaces should be secured.

As described above, a value of ratio $R/R_{BASE}$ of reference radius of curvature R of the larger end face of the tapered roller to distance $R_{BASE}$ from the apex of the cone angle of the tapered roller to the larger flange surface of the inner ring is not smaller than 0.75 and not greater than 0.87. Therefore, oil film thickness t can be large and maximum Hertz stress p can be small based on FIGS. 71 and 72, and torque loss and heat generation due to sliding friction between the larger end face and the larger flange surface can be reduced.

Since the tapered roller bearing according to the fifth embodiment has ratio Rprocess/R not lower than 0.8, a contact surface pressure between the larger end face and the larger flange surface can be lowered and increase in skew angle can be suppressed as compared with the tapered roller bearing of which ratio Rprocess/R is lower than 0.8. Consequently, increase in contact surface pressure between the larger end face and the larger flange surface can be suppressed and a sufficient oil film thickness between the surfaces can be secured. This effect was confirmed by a result of calculation below.

Table 12 shows a result of calculation of each ratio of contact surface pressure p between the larger end face and the larger flange surface, skew angle θ, and oil film parameter Λ with ratio Rprocess/R being varied to contact surface pressure p0, skew angle θ0, and oil film parameter Λ when ratio Rprocess/R is 1.

TABLE 12

| Ratio $R_{proess}$/R of Radius of Curvature | 0.5 | 0.7 | 0.8 | 0.9 | 1.0 |
|---|---|---|---|---|---|
| Ratio p/p0 of Contact Surface Pressure | 2.2 | 1.6 | 1.4 | 1.2 | 1 |
| Ratio Φ/Φ0 of Skew Angle | 5 | 3 | 1.5 | 1.2 | 1 |
| Ratio Λ/Λ0 of Oil Film Parameter | 0.3 | 0.5 | 0.8 | 0.9 | 1 |

As shown in Table 12, when ratio Rprocess/R is not higher than 0.7, ratio p/p0 of the contact surface pressure between the larger end face and the larger flange surface is not lower than 1.6, ratio θ/θ0 of the skew angle is not lower than 3, and ratio Λ/Λ0 of the oil film parameter is not higher than 0.5. When such a tapered roller bearing is used, for example, in an environment not good in lubrication where oil film parameter Λ is smaller than 2, oil film parameter Λ is smaller than 1 and a state of contact between the larger end face and the larger flange surface is in a boundary lubrication region where metal-to-metal contact occurs. In contrast, when ratio Rprocess/R is not lower than 0.8, ratio p/p0 of the contact surface pressure is not higher than 1.4, ratio θ/θ0 of the skew angle is not higher than 1.5, and ratio Λ/Λ0 of the oil film parameter is not lower than 0.8. Therefore, it was confirmed based on the result of calculation that the tapered roller bearing having ratio Rprocess/R not lower than 0.8 could secure an oil film thickness between the larger end face and the larger flange surface as compared with the tapered roller bearing having ratio Rprocess/R lower than 0.8.

Preferably, in the tapered roller bearing according to the fifth embodiment, the larger end face has surface roughness Ra not greater than 0.10 μm and the larger flange surface has surface roughness Ra not greater than 0.063 μm. Thus, a more sufficient oil film thickness can be secured between the larger end face of the roller and the larger flange surface of the inner ring. Specifically, when the larger end face and the larger flange surface each have surface roughness Ra within the numeric range, oil film parameter Λ (=h/σ) defined as "a ratio between an oil film thickness h and composite roughness σ of root mean roughness of a larger end face and a larger flange surface found based on elastohydrodynamic lubrication theory" can be enhanced as compared with an example in which the surface roughness is out of the numeric range. Therefore, a sufficient oil film thickness can be secured between the larger end face and the larger flange surface.

Preferably, in the tapered roller bearing according to the fifth embodiment, ratio α/L of amount α of displacement from the midpoint of the rolling surface in the direction of extension of the axis of rolling, of the position of abutment between raceway surface 2011A of outer ring 2011 or raceway surface 2013A of inner ring 2013 and rolling surface 2012A to width L of the roller rolling surface in the direction of extension is not lower than 0% and lower than 20%, and the position of abutment is located at a central position or located closer to the larger end face than the central position in the rolling surface in the direction of extension of the axis of rolling. The present inventors confirmed that, by setting ratio α/L to be not lower than 0% and lower than 20% and setting the position of abutment when ratio α/L exceeded 0% to be located at the central position or closer to the larger end face than the central position in the rolling surface in the direction of extension of the axis of rolling, a skew angle could be decreased and increase in rotational torque could be suppressed as compared with an example in which the position of abutment when ratio α/L exceeded 0% was located at the central position or closer to the smaller end face than the central position in the rolling surface in the direction of extension of the axis of rolling.

Table 13 shows a result of calculation of ratios of skew angle θ and rotational torque M with displacement amount α being varied to skew angle θ0 and rotational torque M0 when displacement amount α is 0, that is, the position of abutment between raceway surfaces 2011A and 2013A of the inner ring and outer ring 2011 and the rolling surface is located at the midpoint of the rolling surface in the direction of extension of the axis of rolling. Table 13 shows with a negative value, a displacement amount when the position of abutment is displaced toward the smaller end face relative to the midpoint. A sample of which ratio of rotational torque M/M0 was not higher than 1.1 was evaluated as good (A in Table 13) and a sample of which ratio of rotational torque M/M0 exceeded 1.1 was evaluated as not good (B in Table 13).

TABLE 13

| | Displacement Amount α (%) | | | | | | |
|---|---|---|---|---|---|---|---|
| | −10 | −5 | 0 | 5 | 10 | 15 | 20 |
| Ratio Φ/Φ0 of Skew Angle | 2 | 1.5 | 1 | 0.75 | 0.5 | 0.4 | 0.3 |
| Ratio M/M0 of Rotational Torque | 1.2 | 1.1 | 1 | 1.03 | 1.05 | 1.1 | 1.2 |
| Determination | B | A | A | A | A | A | B |

As shown in Table 13, when the position of abutment is relatively greatly displaced toward the smaller end face relative to the midpoint, that is, displacement amount α is less than −5%, ratio θ/θ0 of the skew angle is as high as two or more and slight increase in displacement amount results in significant increase in rotational torque.

In contrast, when the position of abutment is displaced relatively slightly toward the smaller end face relative to the midpoint, that is, displacement amount α is not lower than −5% and lower than 0%, ratio θ/θ0 of the skew angle is lower and a rate of increase in rotational torque with increase in displacement amount is lower than in an example where displacement amount α is smaller than −5%.

When displacement amount α is not lower than 0% and not higher than 20%, ratio θ/θ0 of the skew angle is not higher than 1 and slight increase in displacement amount does not result in significant increase in rotational torque.

Though not shown in Table 13, when displacement amount α exceeds 20%, rotational torque is unfavorably high to such an extent as causing other defects such as peeling. Therefore, it was confirmed based on the result of calculation that a skew angle could be decreased by setting ratio α/L to be not lower than 0% and lower than 20% and setting the position of abutment when ratio α/L exceeded 0% to the central position or a position closer to the larger end face than the central position in the rolling surface in the direction of extension of the axis of rolling.

Sixth Embodiment

Though a tapered roller bearing according to a sixth embodiment is basically similar in construction to tapered roller bearing 2010 according to the fourth embodiment, it is different in that curvature R8 of the generatrix of non-contact area crowned portion 2028 not in contact with inner-ring raceway surface 2013A in the crowning profile formed portion in the roller rolling surface is smaller than curvature R7 of the generatrix of contact area crowned portion 2027 in contact with inner-ring raceway surface 2013A.

As shown in FIG. 61, the tapered roller bearing according to the sixth embodiment includes inner ring 2013, outer ring 2011, and a plurality of rollers 2012 interposed between the inner ring and the outer ring. Inner-ring raceway surface 2013A is formed around the outer circumference of inner ring 2013, and larger flange portion 2041 and smaller flange portion 2042 are provided on the larger diameter side and the smaller diameter side of inner-ring raceway surface 2013A, respectively. A grinding undercut 2043 is provided at a corner where inner-ring raceway surface 2013A and larger flange portion 2041 meet each other, and a grinding undercut 2044 is provided at a corner between inner-ring raceway surface 2013A and smaller flange portion 2042. Inner-ring raceway surface 2013A has a linear generatrix extending in the axial direction of the inner ring. Around the inner circumference of outer ring 2011, outer-ring raceway surface 2011A opposed to inner-ring raceway surface 2013A is formed, no flange is provided, and outer-ring raceway surface 2011A has a linear generatrix extending in the axial direction of the outer ring.

Figure 83:
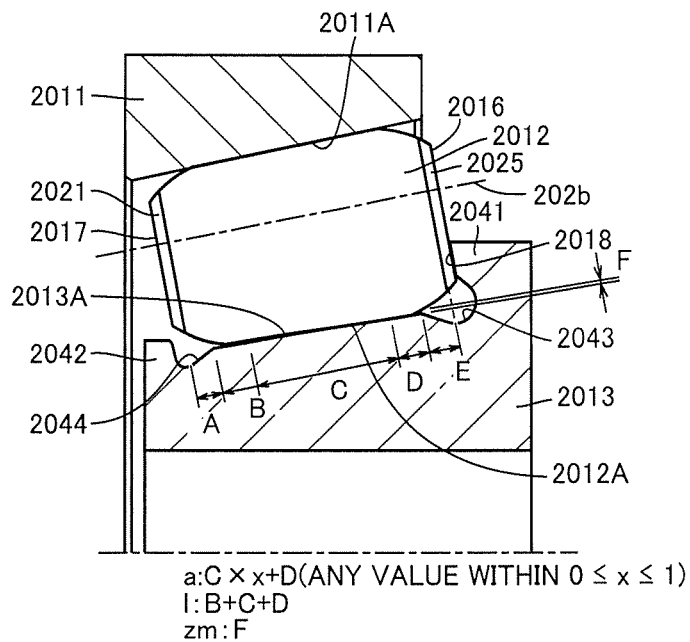
FIG. 83 is a partial cross-sectional view of a tapered roller bearing according to a sixth embodiment.
Figure 84:
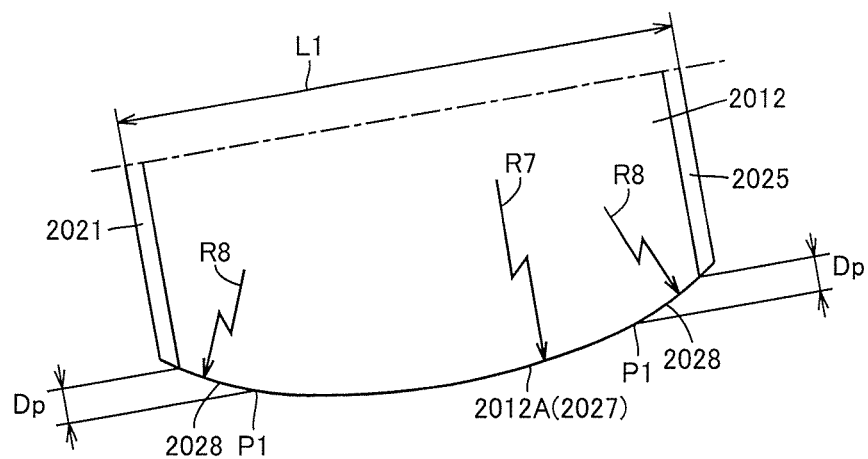
FIG. 84 is a diagram showing a crowning profile of a roller of the tapered roller bearing shown in FIG. 83.

As shown in FIGS. 61, 83, and 84, the roller rolling surface around the outer circumference of roller 2012 is crowned and chamfered portions 2021 and 2025 are provided at opposing ends of roller 2012. The crowning profile formed portion of the roller rolling surface includes contact area crowned portion 2027 and non-contact area crowned portion 2028. Of these, contact area crowned portion 2027 is within a range of the axial direction of inner-ring raceway surface 2013A and in contact with inner-ring raceway surface 2013A. Non-contact area crowned portion 2028 is out of the range in the axial direction of inner-ring raceway surface 2013A and not in contact with inner-ring raceway surface 2013A.

Contact area crowned portion 2027 and non-contact area crowned portion 2028 have generatrices extending in the axial direction of the roller expressed by functions different from each other and being smoothly continuous at connection point P1. In the vicinity of connection point P1, curvature R8 of the generatrix of non-contact area crowned portion 2028 is smaller than curvature R7 of the generatrix of contact area crowned portion 2027.

In the tapered roller bearing, of the contact area on the side of inner ring 2013 and the contact area on the side of outer ring 2011, the side of inner ring 2013 is smaller in equivalent radius in the circumferential direction and hence higher in contact pressure. Accordingly, in designing the crowning profile, it is sufficient to study contact on the side of inner ring 2013.

The tapered roller bearing having the bearing number of 30316 will now be considered, assuming that a radial load effective to 35% of a basic dynamic rated load is applied and the bearing has misalignment of 1/600. Misalignment at this time is assumed to refer to such inclination that a contact pressure is higher on the larger diameter side than on the smaller diameter side of roller 2012. The basic dynamic rated load refers to a load without variation in direction and magnitude under which a rated lifetime of one million revolutions is achieved when a group of identical bearings is operated individually under a condition in which inner ring 2013 is rotated while outer ring 2011 remains at rest. Misalignment refers to offset in axis between a shaft to which inner ring 2013 is fitted and a not-shown housing to which outer ring 2011 is fitted, and is expressed by a fraction expressing an amount of inclination as above.

Contact area crowned portion 2027 has a generatrix defined by a logarithmic curve of the logarithmic crowning profile expressed in the expression (1).

In order to secure working accuracy of the crowning profile, the outer circumference of roller 2012 desirably includes a straight portion which occupies ½ or more of total length L1 of the roller. Accordingly, when the straight portion occupies ½ of total length L1 of the roller and the crowning profile is in symmetry between a portion on the smaller diameter side and a portion on the larger diameter side with the center in the axial direction of the roller being defined as the reference, among the design parameters in the logarithmic crowning expression (1), K2 is fixed and $K_1$ and $z_m$ are to be designed.

Figure 85:
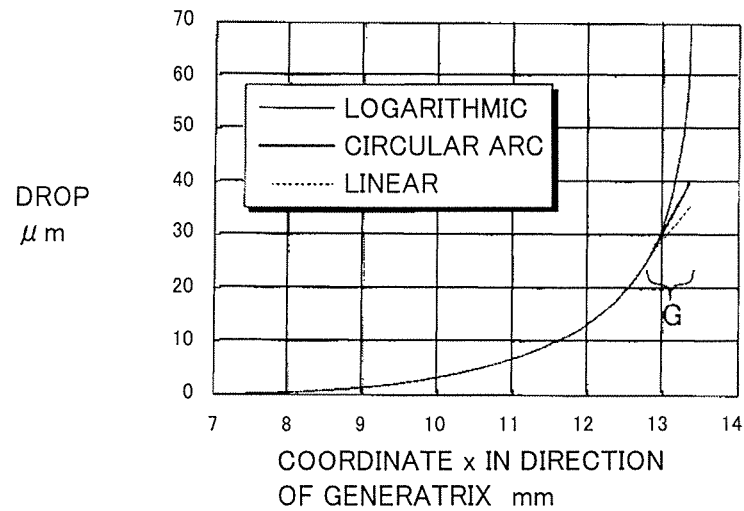
FIG. 85 is a diagram showing relation between a coordinate in a direction of a generatrix and drop of the roller of the tapered roller bearing shown in FIG. 83.

When a crowning profile is optimized by a mathematical optimization approach which will be described later, under the present condition, a crowning profile as shown with "logarithmic" in FIG. 85 is obtained. Largest drop of the crowning profile of roller 2012 at this time is 69 μm. A region shown with G in FIG. 85, however, corresponds to a region shown with E which faces grinding undercut 2043, 2044 of inner ring 2013 in FIG. 83, and it does not come in contact with inner ring 2013. Therefore, region G of roller 2012 does not have to be provided with the logarithmic crowning profile and it may be defined by a straight line, a circular arc, or other functions. Even though region G of roller 2012 is defined by a straight line, a circular arc, or other functions, a contact pressure distribution in this case is identical to that in an example in which the entire roller is provided with a logarithmic crowning profile and a function thereof is comparable.

The approach to mathematical optimization of the logarithmic crowning profile will be described.

By appropriately selecting parameters $K_1$ and $z_m$ in the functional expression (1) expressive of the logarithmic crowning profile, the optimum logarithmic crowning profile can be designed.

The crowning profile is generally designed to reduce a maximum value of stress or a contact pressure in a contact area. It is assumed that a rolling fatigue life occurs in accordance with von Mises yield criterion and $K_1$ and $z_m$ are selected to minimize the maximum value of von Mises equivalent stress.

$K_1$ and $z_m$ can be selected with the use of an appropriate mathematical optimization approach. Though various algorithms have been suggested for the mathematical optimization approach, a direct search method representing one of those can allow optimization without using a differential coefficient of a function and is useful when an objective function and a variable cannot directly be expressed by a mathematical formula. Optimum values of $K_1$ and $z_m$ are determined by the Rosenbrock method representing one of the direct search methods.

Figure 86:
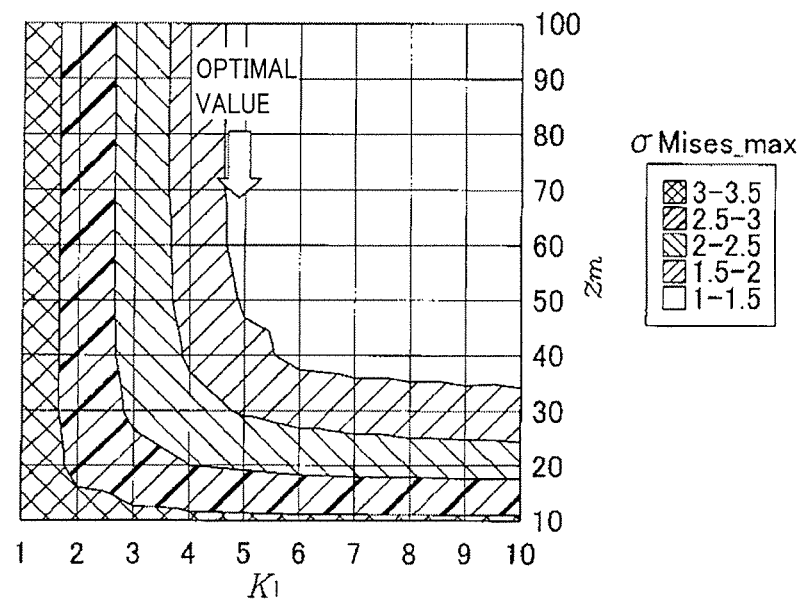
FIG. 86 is a diagram showing relation between a maximum value of von Mises equivalent stress and a logarithmic crowning parameter.

When a radial load effective to 35% of the basic dynamic rated load is applied to the tapered roller bearing having the bearing number of 30316 and misalignment is 1/600, maximum value sMises_max of von Mises equivalent stress and logarithmic crowning parameters $K_1$ and $z_m$ assume relation as shown in FIG. 86. When appropriate initial values are given to $K_1$ and $z_m$ and $K_1$ and $z_m$ are modified under the rules of the Rosenbrock method, a combination of optimum values in FIG. 86 is derived and sMises_max is minimized.

So long as contact between roller 2012 and inner ring 2013 is considered, any crowning profile in region G in FIG. 85 may be applicable. When contact with outer ring 2011 or formability by a grindstone during working is taken into consideration, however, it is not desirable that gradient at point P1 of connection with a logarithmically crowned portion is smaller than gradient at the logarithmically crowned portion. Since drop will increase when gradient greater than gradient of the logarithmically crowned portion is given to the crowning profile in region G, this is also undesirable. In other words, the crowning profile in region G and the logarithmic crowning profile are desirably designed to smoothly be continuous to each other with their gradients matching with each other at connection point P1. In FIG. 85, a linear crowning profile in region G of roller 2012 is shown with a dotted line and an arcuate crowning profile thereof is shown with a bold solid line. When the crowning profile in region G is linear, drop Dp of the crowning profile of roller 2012 is, for example, 36 μm. When the crowning profile in region G is arcuate, drop Dp of the crowning profile of roller 2012 is, for example, 40 μm.

According to the tapered roller bearing described above, a crowning profile is formed in the roller rolling surface around the outer circumference of roller 2012, so that a grindstone can be applied to the roller rolling surface in a more necessary and sufficient manner than in formation of a crowning profile only in inner-ring raceway surface 2013A. Therefore, poor working of the rolling surface can be prevented. The crowing profile formed in the roller rolling surface can achieve lowering in contact pressure or stress in a contact area and a longer lifetime of the tapered roller bearing. In the vicinity of connection point P1 between contact area crowned portion 2027 and non-contact area crowned portion 2028, curvature R8 of the generatrix of non-contact area crowned portion 2028 is smaller than curvature R7 of the generatrix of contact area crowned portion 2027, so that drop Dp at opposing ends of roller 2012 can be reduced. Therefore, as compared, for example, with an example of a conventional crowning profile of a single circular arc, an amount of grinding can be suppressed, efficiency in working of roller 2012 can be improved, and manufacturing cost can be reduced.

Figure 87:
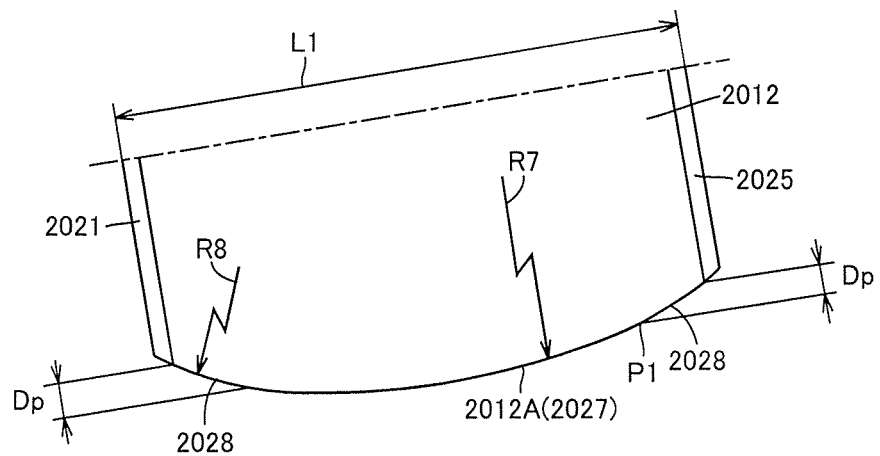
FIG. 87 is a diagram showing a modification to the tapered roller bearing according to the sixth embodiment.

One or both of portions on the larger and smaller diameter sides of the generatrix of non-contact area crowned portion 2028 may be arcuate. In this case, drop Dp can be made smaller than in an example in which the generatrix of the entire roller rolling surface is represented, for example, by a logarithmic curve. Accordingly, an amount of grinding can be reduced. As shown in FIG. 87, one or both of portions on the larger and smaller diameter sides of the generatrix of non-contact area crowned portion 2028 may be linear (in the example in FIG. 87, only a portion on the larger diameter side being linear). In this case, drop Dp can further be made smaller than in an example in which the generatrix of non-contact area crowned portion 2028 is arcuate.

Figure 88:
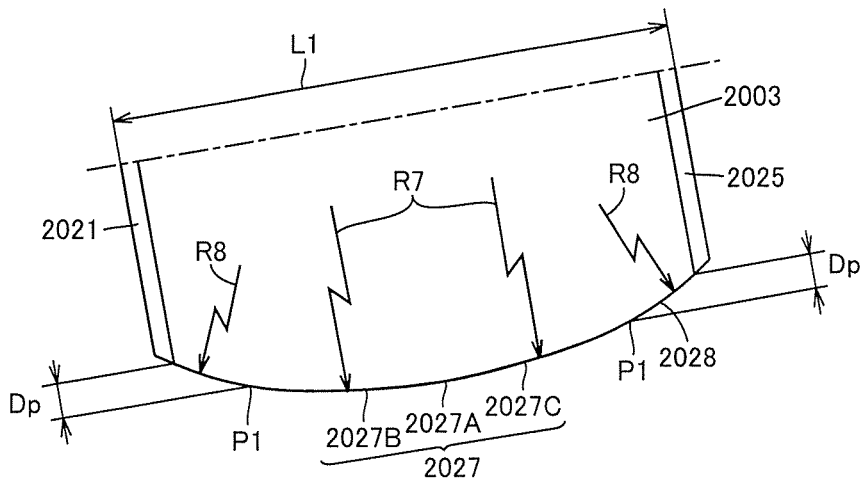
FIG. 88 is a diagram showing another modification to the tapered roller bearing according to the sixth embodiment.

A part or the entirety of the generatrix of contact area crowned portion 2027 may be represented by the logarithmic crowning profile. Owing to contact area crowned portion 2027 expressed by the logarithmic crowning profile, a contact pressure and stress in the contact area can be reduced so that the tapered roller bearing can have a longer lifetime. As shown in FIG. 88, the generatrix of contact area crowned portion 2027 may be represented by a straight portion 2027A formed as being flat along the axial direction of the roller and a portion 2027B defined by a logarithmic curve of the logarithmic crowning profile.

In another embodiment of the present invention, in the tapered roller bearing, the crowning profile may be provided in roller 2012 and also in inner ring 2013. In this case, the sum of drop of roller 2012 and drop of inner ring 2013 is set to be equal to the optimized drop. Owing to those crowning profiles, a contact pressure and stress in the contact area can be reduced so that the tapered roller bearing can have a longer lifetime. As compared, for example, with an example of a conventional crowning profile of a single circular arc, an amount of grinding can be suppressed, efficiency in working of roller 2012 can be improved, and manufacturing cost can be reduced.

(Function and Effect)

The tapered roller bearing according to the present invention includes inner and outer rings and rollers, in which a roller rolling surface around the outer circumference of the roller is at least crowned, the crowning profile formed portion of the roller rolling surface includes the contact area crowned portion within a range of the axial direction of the inner-ring raceway surface and in contact with the inner-ring raceway surface and a non-contact area crowned portion out of the range in the axial direction of the inner-ring raceway surface and not in contact with the inner-ring raceway surface, the contact area crowned portion and the non-contact area crowned portion have such generatrices extending in the axial direction of the roller as expressed by functions different from each other and being smoothly continuous at a point of connection to each other, and in the vicinity of the point of connection, the generatrix of the non-contact area crowned portion is smaller in curvature than the generatrix of the contact area crowned portion.

"Being smoothly continuous" refers to being continuous without forming a corner, and ideally refers to the generatrix of the contact area crowned portion and the generatrix of the non-contact area crowned portion being continuous to have a tangential line in common at a continuous point, that is, such a function that the generatrices can continuously be differentiated at the continuous point.

According to such a construction, the roller rolling surface around the outer circumference of the roller is crowned, so that a grindstone can be applied to the roller rolling surface in a more necessary and sufficient manner than in formation of a crowning profile only in the inner-ring raceway surface. Therefore, poor working of the rolling surface can be prevented. A crowning profile formed in the roller rolling surface can lower a contact pressure or stress in a contact area and the tapered roller bearing can have a longer lifetime. In the vicinity of the connection point between the contact area crowned portion and the non-contact area crowned portion, the generatrix of the non-contact area crowned portion is smaller in curvature than the generatrix of the contact area crowned portion, so that drop at opposing ends of the roller can be reduced. Therefore, as compared, for example, with an example of a conventional crowning profile of a single circular arc, an amount of grinding can be suppressed, efficiency in working of the roller can be improved, and manufacturing cost can be reduced.

Any one or both of a portion on the larger diameter side and a portion on the smaller diameter side of the generatrix of the non-contact area crowned portion may be arcuate. In this case, drop can be reduced as compared with an example in which the generatrix of the entire roller rolling surface is represented, for example, by a logarithmic curve. Therefore, an amount of grinding can be reduced.

Any one or both of the portion on the larger diameter side and the portion on the smaller diameter side of the generatrix of the non-contact area crowned portion may be linear. In this case, drop can further be reduced as compared with an example in which the generatrix of the non-contact area crowned portion is arcuate.

A part or the entirety of the generatrix of the contact area crowned portion may be represented by the logarithmic crowning profile. Owing to the contact area crowned portion represented by the logarithmic crowning profile, a contact pressure and stress in the contact area can be reduced so that the tapered roller bearing can have a longer lifetime.

The generatrix of the contact area crowned portion may be represented by a straight portion formed as being flat along an axial direction of the roller and a portion defined by a logarithmic curve of the logarithmic crowning profile.

Of the generatrix of the non-contact area crowned portion, a portion of connection to a portion defined by a logarithmic curve of the logarithmic crowning profile may be matched with gradient of the logarithmic curve. In this case, the generatrix of the contact area crowned portion and the generatrix of the non-contact area crowned portion can be continuous further smoothly at the point of connection.

The generatrix of the contact area crowned portion may be defined by a logarithmic curve of the logarithmic crowning profile expressed in the expression (1).

At least $K_1$ and $z_m$ in the expression (1) may optimally be designed by using a mathematical optimization approach.

The inner-ring raceway surface may be provided with a crowning profile and the sum of drop of the crowning profile of the inner-ring raceway surface and drop of the crowning profile around the outer circumference of the roller may attain to a prescribed value.

A method of designing a tapered roller bearing according to the present invention is a method of designing a tapered roller bearing including inner and outer rings and rollers, in which a roller rolling surface around the outer circumference of the roller is at least provided with a crowning profile, the crowning profile formed portion of the roller rolling surface includes a contact area crowned portion within a range of the axial direction of the inner-ring raceway surface and in contact with the inner-ring raceway surface and a non-contact area crowned portion out of the range in the axial direction of the inner-ring raceway surface and not in contact with the inner-ring raceway surface, the contact area crowned portion and the non-contact area crowned portion have such generatrices extending in the axial direction of the roller as expressed by functions different from each other and being smoothly continuous at a point of connection to each other, the generatrix of the contact area crowned portion is defined by a logarithmic curve of the logarithmic crowning profile expressed in the expression (1), and in the vicinity of the point of connection, the generatrix of the non-contact area crowned portion is designed to be smaller in curvature than the generatrix of the contact area crowned portion.

According to the design method of the present invention, a tapered roller bearing capable of achieving a reduced contact pressure or stress in a contact area and a longer lifetime can be designed in a simplified manner. The tapered roller bearing capable of achieving reduced drop of the roller and reduced manufacturing cost can be designed.

Seventh Embodiment

Though a tapered roller bearing according to a seventh embodiment is basically similar in construction to tapered roller bearing 2010 according to the fourth embodiment, it is different in notch in cage 2014.

Figure 89:
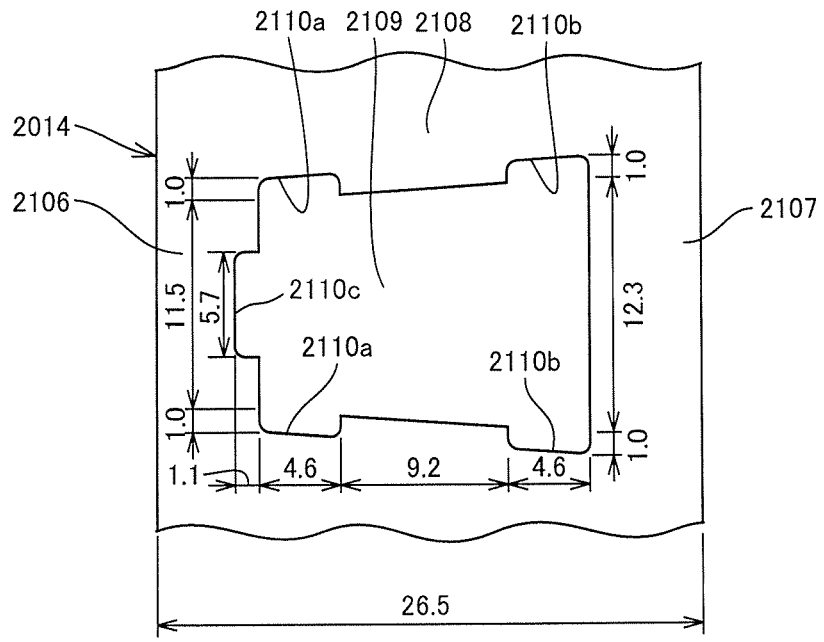
FIG. 89 is a developed plan view of a cage of a tapered roller bearing according to a seventh embodiment.

As shown in FIG. 89, smaller annular portion 2106 on the smaller width side of pocket 2109 is also provided with a notch 2110c, and a total area of three notches 2110a and 2110c on the smaller width side is greater than a total area of two notches 2110b on the larger width side. Notch 2110c has a depth of 1.0 mm and a width of 5.7 mm.

Figure 90:
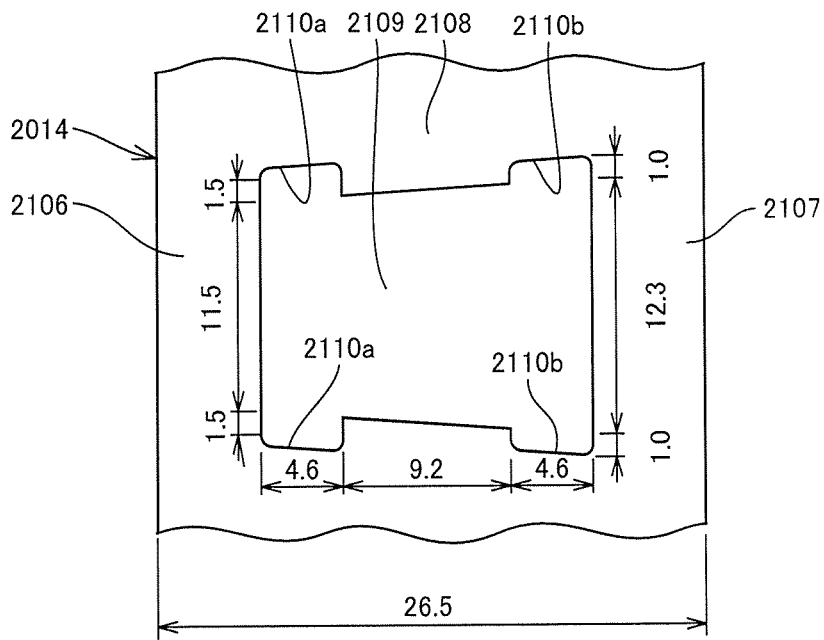
FIG. 90 is a developed plan view of a modification to the cage of the tapered roller bearing according to the seventh embodiment.

In a modification shown in FIG. 90, each notch 2110a in post 2108 on the smaller width side has a depth of 1.5 mm which is greater than that of notch 2110b in post 2108 on the larger width side, and a total area of notches 2110a on the smaller width side is greater than a total area of notches 2110b on the larger width side.

Figure 92:
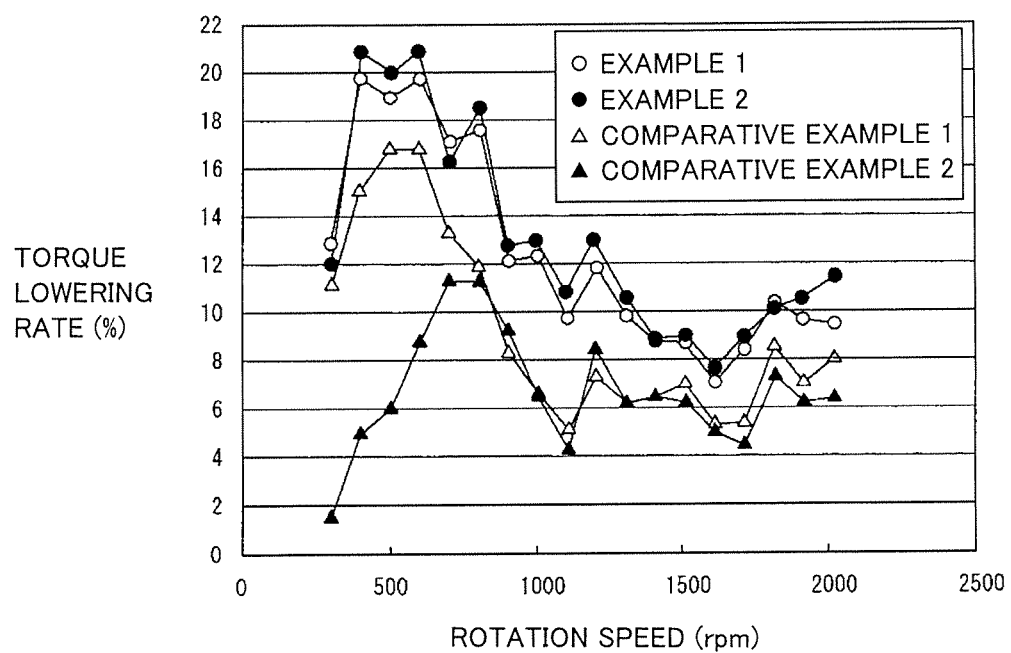
FIG. 92 is a graph showing a result of a torque measurement test.

On an axially outer side of smaller annular portion 2106 of cage 2014, as shown in FIG. 61, a radially inward flange opposed to an outer diameter surface of smaller flange portion 2042 of inner ring 2013 is provided, and as shown in FIG. 92 later, a second gap δ between an inner diameter surface of the flange of smaller annular portion 2106 and the outer diameter surface of smaller flange portion 2042 of inner ring 2013 that are opposed to each other is set to be not greater than 2.0% of a dimension of an outer diameter of smaller flange portion 2042.

Figure 93:
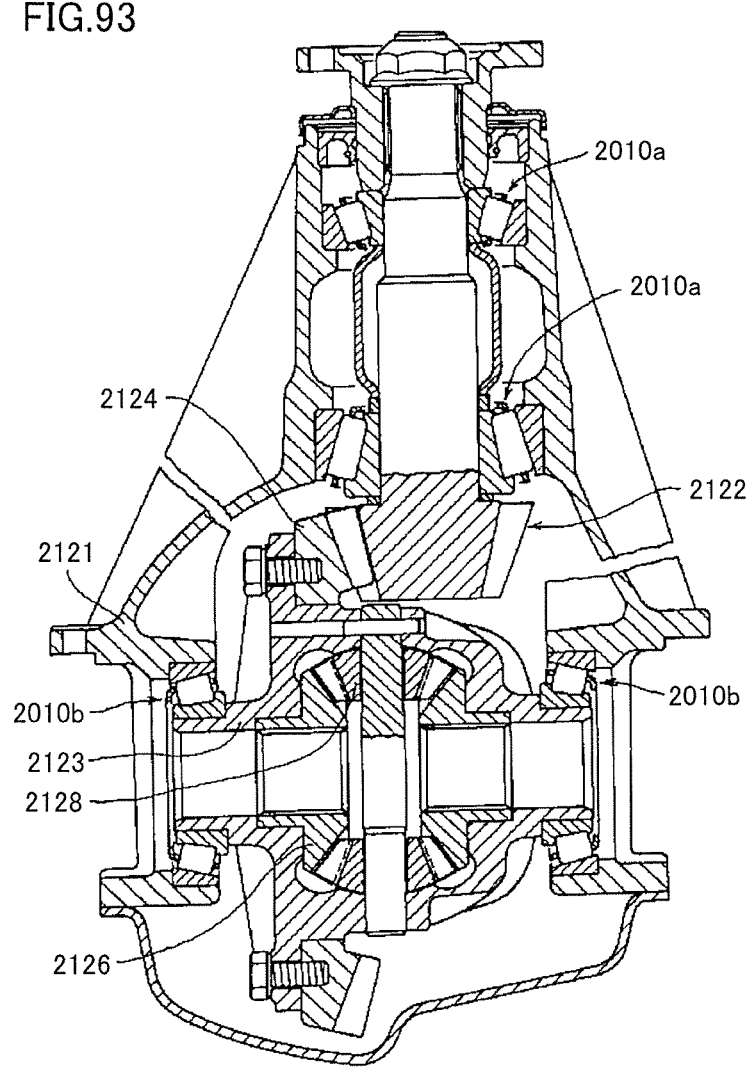
FIG. 93 is a cross-sectional view showing a differential gear including the tapered roller bearing according to the seventh embodiment.

Tapered roller bearing 2010 described above is employed for a differential gear or a transmission of automobiles. Tapered roller bearing 2010 is a tapered roller bearing for automobiles. FIG. 93 shows a differential gear for automobiles including tapered roller bearing 2010 described above. The differential gear is such that a drive pinion 2122 coupled to a propeller shaft (not shown) and inserted through a differential case 2121 is meshed with a ring gear 2124 attached to a differential gear case 2123 and a pinion gear 2125 attached inside differential gear case 2123 is meshed with a side gear 2126 coupled to a drive shaft (not shown) inserted through differential gear case 2123 from right and left sides so that driving force from an engine is transmitted from the propeller shaft to the left and right drive shafts. In this differential gear, drive pinion 2122 serving as a power transmission shaft and differential gear case 2123 are supported by a pair of tapered roller bearings 2010a and a pair of tapered roller bearings 2010b, respectively.

Figure 91:
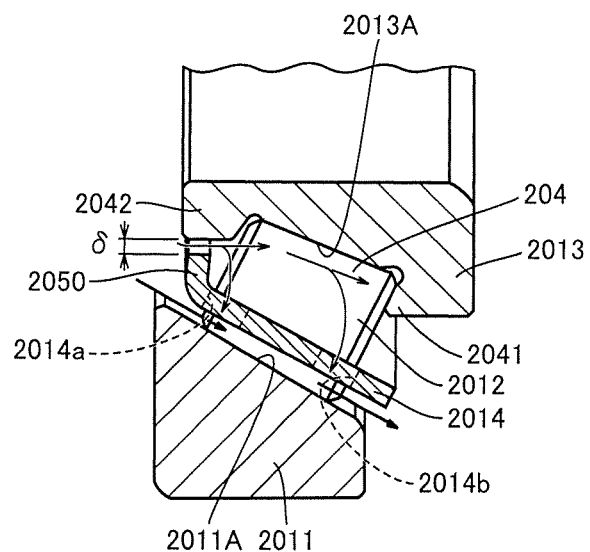
FIG. 91 is a vertical cross-sectional view showing a flow of lubricating oil into the inside of the tapered roller bearing in FIG. 93.

When tapered roller bearings 2010a and 2010b are rotated at a high speed and a lower portion thereof is immersed in an oil bath, as shown with an arrow in FIG. 91, lubricating oil in the oil bath flows from the smaller diameter side of tapered roller 2012 into the bearing as being divided into lubricating oil on the outer diameter side of cage 2014 and lubricating oil on the inner diameter side thereof, and lubricating oil which has flowed from the outer diameter side of cage 2014 into outer ring 2011 passes along raceway surface 2011A of outer ring 2011 toward the large diameter side of tapered roller 2012 and flows out of the inside of the bearing. Lubricating oil which flows from the inner diameter side of cage 2014 toward inner ring 2013 is much smaller in amount than lubricating oil which flows from the outer diameter side of cage 2014 because narrow second gap δ is set between a flange 2050 of smaller annular portion 2106 (see FIG. 89) of cage 2014 and smaller flange portion 2042 of inner ring 2013. Furthermore, most of lubricating oil which flows through second gap δ passes through notch 2110a provided in post 2108 on the smaller width side of pocket 2109 and moves toward the outer diameter side of cage 2014. Therefore, an amount of lubricating oil which directly reaches larger flange portion 2041 along raceway surface 2013A of inner ring 2013 is very small and an amount of lubricating oil which stays inside the bearing can be reduced.

In the tapered roller bearing according to the present seventh embodiment, the smaller annular portion on the smaller width side of the trapezoidal pocket is also provided with a notch so that lubricating oil which flows from the inner diameter side of the cage toward the inner ring can escape to the outer ring also through the notch in the smaller annular portion. An amount of lubricating oil which reaches the larger flange along the raceway surface of the inner ring can be reduced and torque loss due to flow resistance of lubricating oil can further be reduced.

By providing a notch at least in a post on the larger width side of the trapezoidal pocket, the tapered roller can be in slide contact with the post in a balanced manner.

By setting a total area of notches provided on the smaller width side of the trapezoidal pocket to be greater than a total area of notches provided on the larger width side of the trapezoidal pocket as well, an amount of lubricating oil which reaches the larger flange along the raceway surface of the inner ring can be decreased and torque loss due to flow resistance of lubricating oil can further be reduced.

By providing on the axially outer side of the smaller annular portion of the cage, a radially inward flange opposed to the outer diameter surface of the smaller flange of the inner ring and setting a gap between the inner diameter surface of the flange of the smaller annular portion and an outer diameter surface of the smaller flange of the inner ring which are opposed to each other to be not higher than 2.0% of the dimension of the outer diameter of the smaller flange of the inner ring, an amount of lubricating oil which flows from the inner diameter side of the cage toward the inner ring can be reduced and torque loss due to flow resistance of lubricating oil can further be reduced.

Experimental Example 4

In Example, a tapered roller bearing (Example 1) including the cage shown in FIG. 67 and a tapered roller bearing (Example 2) including the cage shown in FIG. 89 were prepared. In Comparative Example, a tapered roller bearing (Comparative Example 1) including a cage without a notch in a pocket, a tapered roller bearing (Comparative Example 2) provided with a notch in a central portion of a post between pockets of the cage, and a tapered roller bearing (Comparative Example 3) provided with a notch in a smaller annular portion and a larger annular portion at axial opposing ends of a pocket of the cage were prepared. Each tapered roller bearing had a dimension of an outer diameter of 100 mm, an inner diameter of 45 mm, and a width of 27.25 mm and the tapered roller bearings were identical to one another other than the notch in the pocket.

The tapered roller bearings in Examples and Comparative Examples were subjected to a torque measurement test by using a vertical torque test rig. Test conditions are as below.
Axial load: 300 kgf
Rotation speed: 300 to 2000 rpm (100 rpm pitch)
Lubrication condition: lubrication by oil bath (lubricating oil: 75W-90)

FIG. 92 shows a result of the torque measurement test. The ordinate in the graph in FIG. 92 represents a rate of lowering in torque with respect to torque in Comparative Example 1 including the cage without a notch in the pocket. Though a torque lowering effect was found in Comparative Example 2 provided with a notch in the central portion of the post of the pocket and also in Comparative Example 3 provided with a notch in the smaller annular portion and the larger annular portion of the pocket, Example 1 provided with a notch in the post on the smaller width side of the pocket was found to achieve a torque lowering effect higher than in Comparative Examples, and Example 2 provided with a notch also in the smaller annular portion on the smaller width side and being greater in total area of notches on the smaller width side than on the larger width side was found to achieve a further higher torque lowering effect.

The rate of lowering in torque at 2000 rpm representing a highest rotation speed in the test was 9.5% in Example 1 and 11.5% in Example 2, and an excellent torque lowering effect could be obtained even under a condition of use in rotation at a high speed in the differential gear or the transmission. Rates of lowering in torque at a rotation speed of 2000 rpm in Comparative Examples 2 and 3 were 8.0% and 6.5%, respectively.

Eighth Embodiment

Though a tapered roller bearing according to an eighth embodiment is basically similar in construction to tapered roller bearing 2010 according to the fourth embodiment, it is different in that a window angle θ of a post surface 2014*d* shown in FIG. 66 is specified as being not smaller than 46 degrees and not greater than 65 degrees. Post surface 2014*d* is a surface of post 2108 which faces pocket 2109 in a portion where no notch is provided.

The reason why a lower limit window angle θmin was set to 46 degrees or greater is to secure a good state of contact with a roller, and when the window angle is smaller than 46 degrees, a state of contact with the roller becomes poor. When the window angle is equal to or greater than 46 degrees, strength of the cage is secured, and then relation of γ>0.90 is satisfied and a good state of contact can be secured. The reason why an upper limit window angle θmax was set to 65 degrees or smaller is because a window angle greater than that leads to greater force of pressing in a direction of radius and even a self-lubricating resin material may not achieve smooth rotation. The window angle in a typical tapered roller bearing with a cage in which the cage is distant from an outer ring is at most approximately 50 degrees.

TABLE 14

| Bearing | Roller Coefficient | Lifetime | Remarks |
|---|---|---|---|
| Sample 12 | 0.96 | 40.2 hours | Stopped due to increase in torque caused by wear of cage |
| Sample 13 | 0.96 | 200 hours or longer | Terminated without abnormal condition |
| Sample 14 | 0.86 | 16.4 hours | Flaking of inner ring |

Table 14 shows a result of the life test of the bearing. In Table 14, "Sample No. 14" in the field of "bearing" represents a typical and conventional tapered roller bearing in which the cage and the outer ring are distant from each other, "Sample No. 12" represents a tapered roller bearing different only in roller coefficient γ exceeding 0.90 from the conventional product among the tapered roller bearings according to the present invention, and "Sample No. 13" represents a tapered roller bearing according to the present invention having roller coefficient γ exceeding 0.90 and a window angle within a range not smaller than 46 degrees and not greater than 65 degrees. The test was conducted under conditions of severe lubrication and application of an excessive load. As is clear from Table 14, "Sample No. 12" was at least twice as long in lifetime as "Sample No. 14." In particular, in a powertrain of automobiles such as a transmission or a differential gear in recent years, viscosity of lubricating oil to be used is lower and hence the tapered roller bearing tends to be used under a more severe lubrication environment than in the conventional example. By setting roller coefficient γ to be within a range exceeding 0.90, tapered roller bearing 2010 can have a longer lifetime even though the tapered roller bearing is incorporated in an apparatus in which such low-viscosity lubricating oil is used. Though the bearing of "Sample No. 13" had a roller coefficient of 0.96 as large as that of "Sample No. 12," it was longer in lifetime at least approximately five times than "Sample No. 12." "Sample No. 14," "Sample No. 12," and "Sample No. 13" had a dimension of ϕ45×ϕ81×16 (unit of mm), included 24 rollers ("Sample No. 14") and 27 rollers ("Sample No. 12" and "Sample No. 13"), and had oil film parameter Λ=0.2.

<Application of Tapered Roller Bearing>

An exemplary application of the tapered roller bearing according to the fourth to fifth embodiments will be described. As described above, the tapered roller bearing according to the fourth to fifth embodiments is suitable for a differential gear and a transmission. Another application of the tapered roller bearing according to the fourth to fifth embodiment other than the application to the differential gear shown in FIG. 93 will be described.

Figure 94:
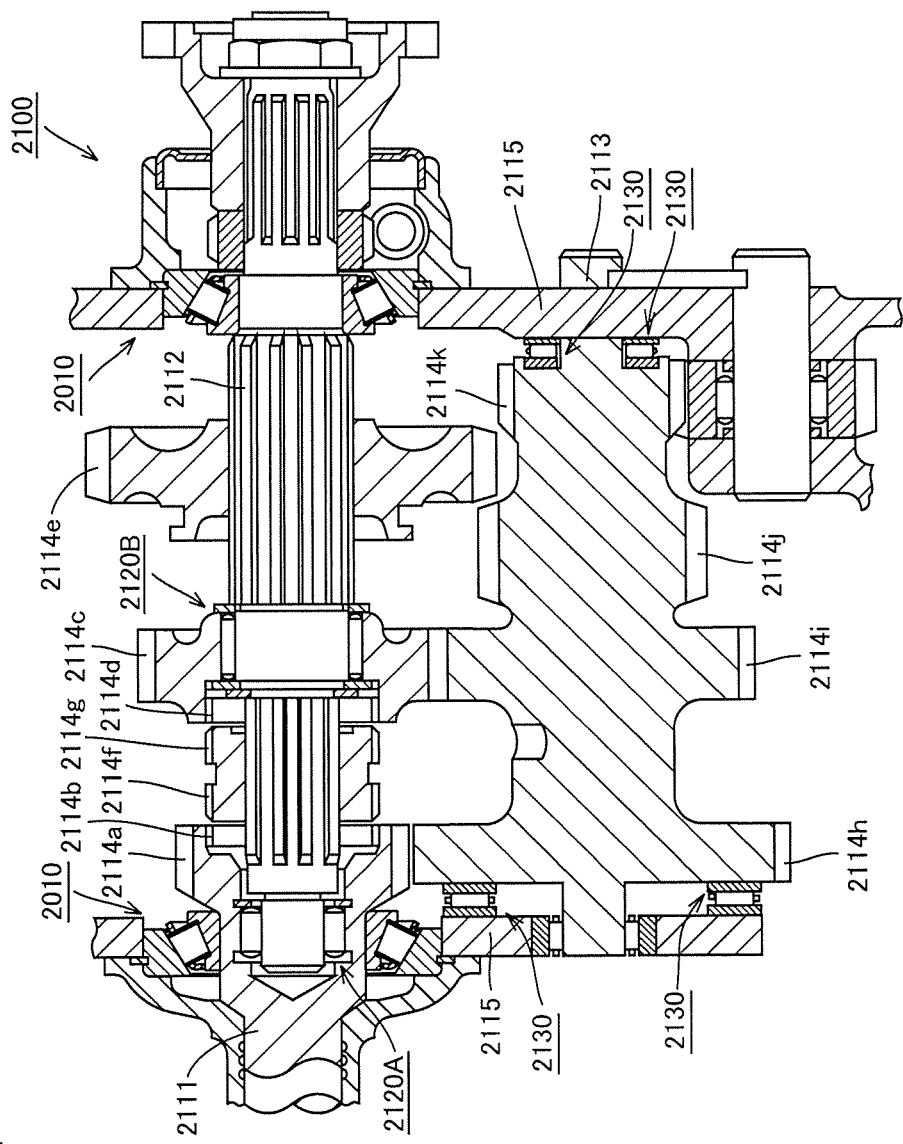
FIG. 94 is a vertical cross-sectional view showing a transmission including the tapered roller bearing according to the fourth embodiment.

Referring to FIG. 94, a manual transmission 2100 is a constantly meshing manual transmission, and includes an input shaft 2111, an output shaft 2112, a countershaft 2113, gears 2114*a* to 2114*k*, and a housing 2115.

Input shaft 2111 is rotatably supported by tapered roller bearing 2010 with respect to housing 2115. Gear 2114*a* is formed around an outer circumference of input shaft 2111, and gear 2114*b* is formed around an inner circumference thereof.

Output shaft 2112 is supported by tapered roller bearing 2010 on one side (a right side in the figure) rotatably with respect to housing 2115 and supported by a rolling bearing 2120A on the other side (a left side in the figure) rotatably with respect to input shaft 2111. Gears 2114*c* to 2114*g* are attached to output shaft 2112.

Gears 2114*c* and 2114*d* are formed around outer and inner circumferences, respectively, of the same member. The member on which gears 2114*c* and 2114*d* are formed is rotatably supported by a rolling bearing 2120B with respect to output shaft 2112. Gear 2114*e* is attached to output shaft 2112 so as to rotate together with output shaft 2112 and be slidable along the axis of output shaft 2112.

Gears 2114*f* and 2114*g* are formed around an outer circumference of the same member. The member on which gears 2114*f* and 2114*g* are formed is attached to output shaft 2112 so as to rotate together with output shaft 2112 and be slidable along the axis of output shaft 2112. When the member on which gear 2114*f* and gear 2114*g* are formed slides to the left in the figure, gear 2114*f* can mesh with gear 2114*b*, and when the member slides to the right in the figure, gear 2114*g* can mesh with gear 2114*d*.

Countershaft 2113 have gears 2114*h* to 2114*k* formed. Two thrust needle roller bearings are arranged between countershaft 2113 and housing 2115, and a load applied in the direction of the axis of countershaft 2113 (a thrust load) is supported thereby. Gear 2114*h* is constantly in mesh with gear 2114*a* and gear 2114*i* is constantly in mesh with gear 2114*c*. Gear 2114*j* can mesh with gear 2114*e* when gear 2114*e* slides to the left in the figure. Gear 2114*k* can mesh with gear 2114*e* when gear 2114*e* slides to the right in the figure.

A shift operation of manual transmission 2100 will now be described. In manual transmission 2100, rotation of input shaft 2111 is transmitted to countershaft 2113 by meshing of gear 2114*a* formed on input shaft 2111 and gear 2114*h* formed on countershaft 2113. Rotation of countershaft 2113 is transmitted to output shaft 2112 by meshing of gears 2114*i* to 2114*k* formed on countershaft 2113 and gears 2114*c* and 2114*e* attached to output shaft 2112. Thus, rotation of input shaft 2111 is transmitted to output shaft 2112.

When rotation of input shaft 2111 is transmitted to output shaft 2112, a rotation speed of output shaft 2112 can be changed stepwise relative to a rotation speed of input shaft 2111 by changing a gear meshed between input shaft 2111 and countershaft 2113 and a gear meshed between countershaft 2113 and output shaft 2112. Rotation of input shaft 2111 can also directly be transmitted to output shaft 2112 by directly meshing gear 2114*b* of input shaft 2111 with gear 2114*f* of output shaft 2112 without countershaft 2113 being interposed.

The shift operation of manual transmission 2100 will more specifically be described below. When gear 2114*f* does not mesh with gear 2114*b*, gear 2114*g* does not mesh with gear 2114*d*, and gear 2114*e* meshes with gear 2114*j*, driving force of input shaft 2111 is transmitted to output shaft 2112 via gear 2114*a*, gear 2114*h*, gear 2114*j*, and gear 2114*e*. This is referred to, for example, as a first speed.

When gear 2114*g* meshes with gear 2114*d* and gear 2114*e* does not mesh with gear 2114*j*, driving force of input shaft 2111 is transmitted to output shaft 2112 via gear 2114*a*, gear 2114*h*, gear 2114*i*, gear 2114*c*, gear 2114*d*, and gear 2114*g*. This is referred to, for example, as a second speed.

When gear 2114*f* meshes with gear 2114*b* and gear 2114*e* does not mesh with gear 2114*j*, input shaft 2111 is directly coupled to output shaft 2112 by meshing of gear 2114*b* and gear 2114*f*, and driving force of input shaft 2111 is directly transmitted to output shaft 2112. This is referred to, for example, as a third speed.

As described above, manual transmission 2100 includes tapered roller bearing 2010 for rotatably supporting input shaft 2111 and output shaft 2112 as rotary members with respect to housing 2115 arranged adjacent thereto. Thus, tapered roller bearing 2010 according to the fourth and fifth embodiments can be used in manual transmission 2100. Tapered roller bearing 2010 achieving reduced torque loss and improved seizure resistance and lifetime is suitable for use in manual transmission 2100 in which a high contact pressure is applied between a rolling element and a raceway member.

In transmissions, differential gears, or the like which are powertrains for automobiles, not only lubricating oil low in viscosity is used but also an amount of oil tends to be decreased for enhanced fuel economy. Therefore, sufficient formation of an oil film is less likely in the tapered roller bearing. Therefore, tapered roller bearings for automobiles are required to have improved seizure resistance and lifetime. Such requirement can be satisfied by incorporating tapered roller bearing 2010 achieving improved seizure resistance and lifetime into a transmission or a differential gear.

Features described in each example included in the embodiments described above may be applied as being combined as appropriate within the technically consistent scope.

It should be understood that the embodiments and Examples disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

1 housing; 2, 3 tapered roller bearing; 4 drive pinion; 5 ring gear; 7 differential gear case; 8 pinion; 9 side gear; 10, 1010, 1010*a*, 2010, 2010*a* tapered roller bearing; 11, 1011, 2011 outer ring; 11A, 13A, 1011A, 1013A, 2011A, 2013A raceway surface; 11B, 12B, 13B, 1011B, 1012B, 1013B, 2011B, 2012B, 2013B nitrogen enriched layer; 11C, 12C, 13C, 1011C, 1012C, 1013C, 2011C, 2012C, 2013C unnitrided portion; 12, 1012, 2012 roller; 12A, 1012A, 2012A rolling surface; 12E, 1012E, 2012E yet-to-be-worked surface; 13, 1013, 2013 inner ring; 14, 1014, 2014 cage; 16, 1016, 2016 larger end face; 16A projection; 16B recess; 16C circular arc; 16*s* spherical surface; 17, 1017, 2017 smaller end face; 18, 1018, 2018 larger flange surface; 18*a* conical surface; 18*b* flank; 18*c* chamfer; 19, 1019, 2019 smaller flange surface; 21, 25, 1021, 2021 chamfered portion; 22, 24, 1022, 1024, 2022, 2024 crowned portion; 22A crowning profile; 23, 1023, 2023 central portion; 26, 1026, 2026 centerline; 27, 1017, 2027 contact area crowned portion; 27A, 1027A, 2027A straight portion; 27B, 1027B, 2027B portion formed by logarithmic curve; 28, 1028, 2028 non-contact area crowned portion; 31, 1031, 2031 first measurement point; 32, 1032, 2032 second measurement point; 33, 1033, 2033 third measurement point; 41 larger flange; 42 smaller flange; 43 first grinding undercut; 44 second grinding undercut; 1041, 2041 larger flange portion; 1042, 2042 smaller flange portion; 1043, 1044, 2043, 2044 grinding undercut

The invention claimed is:

1. A tapered roller bearing comprising:
   an outer ring including an outer-ring raceway surface around an inner circumferential surface;
   an inner ring arranged on a radially inner side relative to the outer ring, the inner ring including an inner-ring raceway surface around an outer circumferential surface and a larger flange surface arranged on a larger diameter side relative to the inner-ring raceway surface; and
   a plurality of tapered rollers disposed between the outer-ring raceway surface and the inner-ring raceway surface, the tapered roller including a rolling surface in contact with the outer-ring raceway surface and the inner-ring raceway surface and a larger end face in contact with the larger flange surface,
   a value of $R/R_{BASE}$ being not smaller than 0.75 and not greater than 0.87, with R representing a reference radius of curvature of the larger end face of the tapered roller and $R_{BASE}$ representing a distance from an apex of a cone angle of the tapered roller to the larger flange surface of the inner ring,
   a nitrogen enriched layer being formed on a surface layer of the outer-ring raceway surface of the outer ring, the inner-ring raceway surface of the inner ring, or the rolling surface of the tapered rollers,
   a distance from an outermost surface of the surface layer to a bottom of the nitrogen enriched layer being not shorter than 0.2 mm,
   the rolling surface of the tapered roller being provided with a crowning profile, and
   a sum of drops of the crowning profiles being expressed in a y-z coordinate system with a generatrix of the rolling surface of the tapered roller being defined as a y axis and a direction orthogonal to the generatrix being defined as a z axis, in an expression (1)

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

where $K_1$, $K_2$, and $z_m$ represent design parameters, Q represents a load, L represents a length in a direction of the generatrix, of an effective contact portion of the rolling surface in the tapered roller, E' represents an equivalent elastic modulus, a represents a length from an origin on the generatrix of the rolling surface of the tapered roller to an end of the effective contact portion, and A is defined as $A = 2K_1 Q/\pi L E'$.

2. The tapered roller bearing according to claim 1, wherein
   at least a part of the larger end face of the tapered roller is ground, and
   a ratio $R_{process}/R$ between an actual radius of curvature $R_{process}$ and the reference radius of curvature R is not lower than 0.8, where $R_{process}$ represents an actual radius of curvature after grinding of the larger end face of the tapered roller.

3. The tapered roller bearing according to claim 1, further comprising a cage including a plurality of pockets arranged at prescribed intervals in a circumferential direction, the cage accommodating and holding the plurality of tapered rollers in the plurality of pockets, wherein
a roller coefficient γ is greater than 0.90,
the cage includes a smaller annular portion continuous on a small-diameter end face side of the tapered roller, a larger annular portion continuous on a large-diameter end face side of the tapered roller, and a plurality of posts which couple the annular portions to each other,
the pocket is provided in such a trapezoidal shape that a portion accommodating a smaller diameter side of the tapered roller is located on a smaller width side and a portion accommodating a larger diameter side is located on a larger width side, and
by providing a notch having a width in the post on the smaller width side of the pocket of the cage from a boundary between the smaller annular portion and the post toward the larger annular portion, lubricating oil which flows from an inner diameter side of the cage toward the inner ring is discharged from the notch toward the outer ring on an outer diameter side,
and an edge of the smaller annular portion on a side of the pocket is in such a shape that a base portion on the smaller width side of the pocket extends to the post.

4. The tapered roller bearing according to claim 1, wherein
a grain size number of a prior austenite crystal grain size in the nitrogen enriched layer is equal to or greater than 10, and
the grain size number and a method of measuring the prior austenite crystal grain are defined under JIS G0551: 2013.

5. The tapered roller bearing according to claim 1, wherein
a nitrogen concentration in the nitrogen enriched layer is not lower than 0.1 mass % at a position of depth of 0.05 mm from the outermost surface.

6. The tapered roller bearing according to claim 1, wherein
at least one of $K_1$, $K_2$, and $z_m$ in the expression (1) is optimized with a contact pressure being defined as an objective function.

7. The tapered roller bearing according to claim 1, wherein
a crowning profile formed portion where the crowning profile is formed in the rolling surface of the tapered roller includes a contact area crowned portion which is located within a range in an axial direction of the inner-ring raceway surface and is in contact with the inner-ring raceway surface and a non-contact area crowned portion which is located out of the range in the axial direction of the inner-ring raceway surface and is not in contact with the inner-ring raceway surface,
in the contact area crowned portion and the non-contact area crowned portion, generatrices extending in the axial direction of the roller are lines expressed by functions different from each other and smoothly continuous to each other at a connection point, and
in vicinity of the connection point, the generatrix of the non-contact area crowned portion is smaller in curvature than the generatrix of the contact area crowned portion.

8. The tapered roller bearing according to claim 7, wherein
any one or both of a portion on a larger diameter side and a portion on a smaller diameter side of the generatrix of the non-contact area crowned portion is straight.

9. The tapered roller bearing according to claim 7, wherein
any one or both of a portion on a larger diameter side and a portion on a smaller diameter side of the generatrix of the non-contact area crowned portion is arcuate.

10. The tapered roller bearing according to claim 7, wherein
the generatrix of the contact area crowned portion is represented by a logarithmic crowning profile in part or in entirety.

11. The tapered roller bearing according to claim 10, wherein
the generatrix of the contact area crowned portion is represented by a straight portion formed as being flat along the axial direction of the roller and a portion formed by a logarithmic curve of the logarithmic crowning profile.

12. The tapered roller bearing according to claim 1, wherein
the smaller annular portion on the smaller width side of the pocket is also provided with a notch.

13. The tapered roller bearing according to claim 1, wherein
the larger flange surface has arithmetic mean roughness Ra not smaller than 0.1 μm and not greater than 0.2 μm,
a roughness profile of the larger flange surface has skewness Rsk not smaller than −1.0 and not greater than −0.3, and
the roughness profile of the larger flange surface has kurtosis Rku not smaller than 3.0 and not greater than 5.0.

14. The tapered roller bearing according to claim 13, wherein
a dimension of projections and recesses in the larger flange surface has a maximum value not greater than 1 μm.

15. The tapered roller bearing according claim 1, wherein
the larger end face of the tapered roller has arithmetic mean roughness Ra not greater than 0.1 μm.

16. The tapered roller bearing according to claim 1, wherein
at least one of the outer ring and the inner ring includes the nitrogen enriched layer.

17. The tapered roller bearing according to claim 1, wherein
the tapered roller includes the nitrogen enriched layer.

* * * * *